US012784755B2

(12) United States Patent
Orr et al.

(10) Patent No.: US 12,784,755 B2
(45) Date of Patent: *Nov. 3, 2026

(54) INTELLIGENT ASSISTANT FOR HOME AUTOMATION

(71) Applicant: Apple Inc., Cupertino, CA (US)

(72) Inventors: Ryan M. Orr, La Honda, CA (US); Garett R. Nell, Seattle, WA (US); Benjamin L. Brumbaugh, San Jose, CA (US)

(73) Assignee: Apple Inc., Cupertino, CA (US)

( * ) Notice: Subject to any disclaimer, the term of this patent is extended or adjusted under 35 U.S.C. 154(b) by 253 days.

This patent is subject to a terminal disclaimer.

(21) Appl. No.: 18/775,767

(22) Filed: Jul. 17, 2024

(65) Prior Publication Data

US 2024/0371381 A1 Nov. 7, 2024

Related U.S. Application Data

(63) Continuation of application No. 18/200,764, filed on May 23, 2023, now Pat. No. 12,067,990, which is a (Continued)

(51) Int. Cl.
*G10L 17/22* (2013.01)
*G05B 15/02* (2006.01)
(Continued)

(52) U.S. Cl.
CPC .............. *G10L 17/22* (2013.01); *G05B 15/02* (2013.01); *G06F 3/167* (2013.01);
(Continued)

(58) Field of Classification Search
CPC ......... G10L 17/22; G10L 15/26; G10L 15/30; G05B 15/02; G05B 2219/23373;
(Continued)

(56) References Cited

U.S. PATENT DOCUMENTS 6,400,996 B1 6/2002 Hoffberg et al.
8,473,485 B2 6/2013 Wong et al.
(Continued)

FOREIGN PATENT DOCUMENTS

AU 2014100581 B4 9/2014
AU 2015203483 A1 7/2015
(Continued)

OTHER PUBLICATIONS

Machine translation for WO 2013/107604 (Year: 2013).*
(Continued)

*Primary Examiner* — Qian Yang
(74) *Attorney, Agent, or Firm* — YHE Law LLP

(57) ABSTRACT

This relates to systems and processes for using a virtual assistant to control electronic devices. In one example process, a user can speak an input in natural language form to a user device to control one or more electronic devices. The user device can transmit the user speech to a server to be converted into a textual representation. The server can identify the one or more electronic devices and appropriate commands to be performed by the one or more electronic devices based on the textual representation. The identified one or more devices and commands to be performed can be transmitted back to the user device, which can forward the commands to the appropriate one or more electronic devices for execution. In response to receiving the commands, the one or more electronic devices can perform the commands and transmit their current states to the user device.

36 Claims, 15 Drawing Sheets

Related U.S. Application Data continuation of application No. 17/540,942, filed on Dec. 2, 2021, now Pat. No. 11,699,448, which is a continuation of application No. 16/881,625, filed on May 22, 2020, now Pat. No. 11,257,504, which is a continuation of application No. 16/174,046, filed on Oct. 29, 2018, now Pat. No. 10,714,095, which is a continuation of application No. 14/503,105, filed on Sep. 30, 2014, now Pat. No. 10,170,123.

(60) Provisional application No. 62/005,893, filed on May 30, 2014.

(51) Int. Cl.
*G06F 3/16* (2006.01)
*H04L 12/28* (2006.01)

(52) U.S. Cl.
CPC ........ *H04L 12/2816* (2013.01); *H04L 12/282* (2013.01); *G05B 2219/23373* (2013.01); *G05B 2219/23386* (2013.01); *G05B 2219/2642* (2013.01)

(58) Field of Classification Search
CPC .. G05B 2219/23386; G05B 2219/2642; G05B 19/418; G06F 3/167; H04L 12/2816; H04L 12/282
See application file for complete search history.

(56) References Cited

U.S. PATENT DOCUMENTS 8,626,681 B1 1/2014 Jurca et al.
8,630,841 B2 1/2014 Van Caldwell et al.
8,635,073 B2 1/2014 Chang
8,638,363 B2 1/2014 King et al.
8,639,516 B2 1/2014 Lindahl et al.
8,645,128 B1 2/2014 Agiomyrgiannakis
8,645,137 B2 2/2014 Bellegarda et al.
8,645,138 B1 2/2014 Weinstein et al.
8,654,936 B1 2/2014 Eslambolchi et al.
8,655,646 B2 2/2014 Lee et al.
8,655,901 B1 2/2014 Li et al.
8,660,843 B2 2/2014 Falcon et al.
8,660,849 B2 2/2014 Gruber et al.
8,660,924 B2 2/2014 Hoch et al.
8,660,970 B1 2/2014 Fiedorowicz
8,661,112 B2 2/2014 Creamer et al.
8,661,340 B2 2/2014 Goldsmith et al.
8,670,979 B2 3/2014 Gruber et al.
8,675,084 B2 3/2014 Bolton et al.
8,676,273 B1 3/2014 Fujisaki
8,676,583 B2 3/2014 Gupta et al.
8,676,904 B2 3/2014 Lindahl
8,677,377 B2 3/2014 Cheyer et al.
8,681,950 B2 3/2014 Mack et al.
8,682,667 B2 3/2014 Haughay
8,687,777 B1 4/2014 Lavian et al.
8,688,446 B2 4/2014 Yanagihara
8,688,453 B1 4/2014 Joshi et al.
8,689,135 B2 4/2014 Portele et al.
8,694,322 B2 4/2014 Snitkovskiy et al.
8,695,074 B2 4/2014 Saraf et al.
8,696,364 B2 4/2014 Cohen
8,706,472 B2 4/2014 Ramerth et al.
8,706,474 B2 4/2014 Blume et al.
8,706,503 B2 4/2014 Cheyer et al.
8,707,195 B2 4/2014 Fleizach et al.
8,707,419 B2 4/2014 Kurapati et al.
8,712,778 B1 4/2014 Thenthiruperai
8,713,119 B2 4/2014 Lindahl et al.
8,713,418 B2 4/2014 King et al.
8,719,006 B2 5/2014 Bellegarda
8,719,014 B2 5/2014 Wagner
8,719,039 B1 5/2014 Sharifi
8,731,610 B2 5/2014 Appaji
8,731,912 B1 5/2014 Tickner et al.
8,731,942 B2 5/2014 Cheyer et al.
8,739,208 B2 5/2014 Davis et al.
8,744,852 B1 6/2014 Seymour et al.
8,751,971 B2 6/2014 Fleizach et al.
8,760,537 B2 6/2014 Johnson et al.
8,762,145 B2 6/2014 Ouchi et al.
8,762,156 B2 6/2014 Chen
8,762,469 B2 6/2014 Lindahl
8,768,693 B2 7/2014 Somekh et al.
8,768,702 B2 7/2014 Mason et al.
8,775,154 B2 7/2014 Clinchant et al.
8,775,177 B1 7/2014 Heigold et al.
8,775,341 B1 7/2014 Commons
8,775,931 B2 7/2014 Fux et al.
8,781,456 B2 7/2014 Prociw
8,781,841 B1 7/2014 Wang
8,788,271 B2 7/2014 James et al.
8,793,301 B2 7/2014 Wegenkittl et al.
8,798,255 B2 8/2014 Lubowich et al.
8,798,995 B1 8/2014 Edara
8,799,000 B2 8/2014 Guzzoni et al.
8,805,684 B1 8/2014 Aleksic et al.
8,805,690 B1 8/2014 Lebeau et al.
8,812,299 B1 8/2014 Su
8,812,302 B2 8/2014 Xiao et al.
8,812,321 B2 8/2014 Gilbert et al.
8,823,507 B1 9/2014 Touloumtzis
8,823,793 B2 9/2014 Clayton et al.
8,825,474 B1 9/2014 Zhai et al.
8,831,947 B2 9/2014 Wasserblat et al.
8,831,949 B1 9/2014 Smith et al.
8,838,457 B2 9/2014 Cerra et al.
8,843,369 B1 9/2014 Sharifi
8,855,915 B2 10/2014 Furuhata et al.
8,861,925 B1 10/2014 Ohme
8,862,252 B2 10/2014 Rottler et al.
8,868,111 B1 10/2014 Kahn et al.
8,868,400 B2 10/2014 Susarla et al.
8,868,409 B1 10/2014 Mengibar et al.
8,868,431 B2 10/2014 Yamazaki et al.
8,868,469 B2 10/2014 Xu et al.
8,868,529 B2 10/2014 Lerenc
8,880,405 B2 11/2014 Cerra et al.
8,886,534 B2 11/2014 Nakano et al.
8,886,540 B2 11/2014 Cerra et al.
8,886,541 B2 11/2014 Friedlander
8,892,446 B2 11/2014 Cheyer et al.
8,893,023 B2 11/2014 Perry et al.
8,897,822 B2 11/2014 Martin
8,898,064 B1 11/2014 Thomas et al.
8,898,568 B2 11/2014 Bull et al.
8,903,716 B2 12/2014 Chen et al.
8,909,693 B2 12/2014 Frissora et al.
8,918,321 B2 12/2014 Czahor
8,922,485 B1 12/2014 Lloyd
8,930,176 B2 1/2015 Li et al.
8,930,191 B2 1/2015 Gruber et al.
8,938,394 B1 1/2015 Faaborg et al.
8,938,450 B2 1/2015 Spivack et al.
8,938,688 B2 1/2015 Bradford et al.
8,942,986 B2 1/2015 Cheyer et al.
8,943,423 B2 1/2015 Merrill et al.
8,954,440 B1 2/2015 Gattani et al.
8,964,947 B1 2/2015 Noolu et al.
8,965,770 B2 2/2015 Petrushin
8,972,240 B2 3/2015 Brockett et al.
8,972,432 B2 3/2015 Shaw et al.
8,972,878 B2 3/2015 Mohler et al.
8,976,063 B1 3/2015 Hawkins et al.
8,976,108 B2 3/2015 Hawkins et al.
8,977,255 B2 3/2015 Freeman et al.
8,983,383 B1 3/2015 Haskin
8,983,846 B2 3/2015 Di Profio et al.
8,984,098 B1 3/2015 Tomkins et al.
8,989,713 B2 3/2015 Doulton
8,990,235 B2 3/2015 King et al.

(56) References Cited

U.S. PATENT DOCUMENTS

| | | | |
|---|---|---|---|
| 8,994,660 | B2 | 3/2015 | Neels et al. |
| 8,995,972 | B1 | 3/2015 | Cronin |
| 8,996,350 | B1 | 3/2015 | Dub et al. |
| 8,996,376 | B2 | 3/2015 | Fleizach et al. |
| 8,996,381 | B2 | 3/2015 | Mozer et al. |
| 8,996,550 | B2 | 3/2015 | Ko et al. |
| 8,996,639 | B1 | 3/2015 | Faaborg et al. |
| 9,002,714 | B2 | 4/2015 | Kim et al. |
| 9,009,046 | B1 | 4/2015 | Stewart |
| 9,013,992 | B2 | 4/2015 | Perkins |
| 9,015,036 | B2 | 4/2015 | Zangvil et al. |
| 9,020,804 | B2 | 4/2015 | Barbaiani et al. |
| 9,026,425 | B2 | 5/2015 | Nikoulina et al. |
| 9,026,426 | B2 | 5/2015 | Wu et al. |
| 9,031,834 | B2 | 5/2015 | Coorman et al. |
| 9,031,970 | B1 | 5/2015 | Das et al. |
| 9,037,967 | B1 | 5/2015 | Al-Jefri et al. |
| 9,043,208 | B2 | 5/2015 | Koch et al. |
| 9,043,210 | B1 | 5/2015 | Adcock et al. |
| 9,043,211 | B2 | 5/2015 | Haiut et al. |
| 9,043,319 | B1 | 5/2015 | Burns et al. |
| 9,046,932 | B2 | 6/2015 | Medlock et al. |
| 9,049,255 | B2 | 6/2015 | Macfarlane et al. |
| 9,049,295 | B1 | 6/2015 | Cooper et al. |
| 9,053,706 | B2 | 6/2015 | Jitkoff et al. |
| 9,058,105 | B2 | 6/2015 | Drory et al. |
| 9,058,332 | B1 | 6/2015 | Darby et al. |
| 9,058,811 | B2 | 6/2015 | Wang et al. |
| 9,063,979 | B2 | 6/2015 | Chiu et al. |
| 9,064,495 | B1 | 6/2015 | Torok et al. |
| 9,065,660 | B2 | 6/2015 | Ellis et al. |
| 9,070,247 | B2 | 6/2015 | Kuhn et al. |
| 9,070,366 | B1 | 6/2015 | Mathias et al. |
| 9,071,701 | B2 | 6/2015 | Donaldson et al. |
| 9,075,435 | B1 | 7/2015 | Noble et al. |
| 9,075,824 | B2 | 7/2015 | Gordo et al. |
| 9,076,448 | B2 | 7/2015 | Bennett et al. |
| 9,076,450 | B1 | 7/2015 | Sadek et al. |
| 9,081,411 | B2 | 7/2015 | Kalns et al. |
| 9,081,482 | B1 | 7/2015 | Zhai et al. |
| 9,082,402 | B2 | 7/2015 | Yadgar et al. |
| 9,083,581 | B1 | 7/2015 | Addepalli et al. |
| 9,087,508 | B1 | 7/2015 | Dzik |
| 9,092,433 | B2 | 7/2015 | Rodriguez |
| 9,092,789 | B2 | 7/2015 | Anshul |
| 9,094,576 | B1 | 7/2015 | Karakotsios |
| 9,094,636 | B1 | 7/2015 | Sanders et al. |
| 9,098,467 | B1 | 8/2015 | Blanksteen et al. |
| 9,101,279 | B2 | 8/2015 | Ritchey et al. |
| 9,110,635 | B2 | 8/2015 | Knox et al. |
| 9,112,984 | B2 | 8/2015 | Sejnoha et al. |
| 9,117,212 | B2 | 8/2015 | Sheets et al. |
| 9,117,447 | B2 | 8/2015 | Gruber et al. |
| 9,122,697 | B1 | 9/2015 | Bono et al. |
| 9,123,338 | B1 | 9/2015 | Sanders et al. |
| 9,143,907 | B1 | 9/2015 | Caldwell et al. |
| 9,159,319 | B1 | 10/2015 | Hoffmeister |
| 9,164,983 | B2 | 10/2015 | Liu et al. |
| 9,171,541 | B2 | 10/2015 | Kennewick et al. |
| 9,171,546 | B1 | 10/2015 | Pike |
| 9,172,747 | B2 | 10/2015 | Walters et al. |
| 9,183,845 | B1 | 11/2015 | Gopalakrishnan et al. |
| 9,190,062 | B2 | 11/2015 | Haughay |
| 9,196,245 | B2 | 11/2015 | Larcheveque et al. |
| 9,197,848 | B2 | 11/2015 | Felkai et al. |
| 9,201,955 | B1 | 12/2015 | Quintao et al. |
| 9,202,520 | B1 | 12/2015 | Tang |
| 9,208,153 | B1 | 12/2015 | Zaveri et al. |
| 9,213,754 | B1 | 12/2015 | Zhan et al. |
| 9,214,137 | B2 | 12/2015 | Bala et al. |
| 9,218,122 | B2 | 12/2015 | Thoma et al. |
| 9,218,809 | B2 | 12/2015 | Bellegard et al. |
| 9,218,819 | B1 | 12/2015 | Stekkelpa et al. |
| 9,223,529 | B1 | 12/2015 | Khafizova |
| 9,223,537 | B2 | 12/2015 | Brown et al. |
| 9,230,561 | B2 | 1/2016 | Ostermann et al. |
| 9,232,293 | B1 | 1/2016 | Hanson |
| 9,236,047 | B2 | 1/2016 | Rasmussen |
| 9,240,022 | B2 | 1/2016 | Treyz et al. |
| 9,241,073 | B1 | 1/2016 | Rensburg et al. |
| 9,245,151 | B2 | 1/2016 | LeBeau et al. |
| 9,245,388 | B2 | 1/2016 | Poulos et al. |
| 9,246,984 | B2 | 1/2016 | Zises |
| 9,247,377 | B2 | 1/2016 | Pai et al. |
| 9,247,525 | B2 | 1/2016 | Jacobs et al. |
| 9,250,703 | B2 | 2/2016 | Hernandez-Abrego et al. |
| 9,251,713 | B1 | 2/2016 | Giovanniello et al. |
| 9,251,787 | B1 | 2/2016 | Hart et al. |
| 9,255,812 | B2 | 2/2016 | Maeoka et al. |
| 9,256,596 | B2 | 2/2016 | Nissan et al. |
| 9,257,120 | B1 | 2/2016 | Guevara et al. |
| 9,258,604 | B1 | 2/2016 | Bilobrov et al. |
| 9,262,412 | B2 | 2/2016 | Yang et al. |
| 9,262,612 | B2 | 2/2016 | Cheyer |
| 9,263,058 | B2 | 2/2016 | Huang et al. |
| 9,274,598 | B2 | 3/2016 | Beymer et al. |
| 9,280,535 | B2 | 3/2016 | Varma et al. |
| 9,282,211 | B2 | 3/2016 | Osawa |
| 9,286,727 | B2 | 3/2016 | Kim et al. |
| 9,286,910 | B1 | 3/2016 | Li et al. |
| 9,292,487 | B1 | 3/2016 | Weber |
| 9,292,489 | B1 | 3/2016 | Sak et al. |
| 9,292,492 | B2 | 3/2016 | Sarikaya et al. |
| 9,298,358 | B1 | 3/2016 | Wilden et al. |
| 9,299,344 | B2 | 3/2016 | Braho et al. |
| 9,300,718 | B2 | 3/2016 | Khanna |
| 9,301,256 | B2 | 3/2016 | Mohan et al. |
| 9,305,543 | B2 | 4/2016 | Fleizach et al. |
| 9,305,548 | B2 | 4/2016 | Kennewick et al. |
| 9,311,308 | B2 | 4/2016 | Sankarasubramaniam et al. |
| 9,311,912 | B1 | 4/2016 | Swietlinski et al. |
| 9,313,317 | B1 | 4/2016 | LeBeau et al. |
| 9,318,108 | B2 | 4/2016 | Gruber et al. |
| 9,325,809 | B1 | 4/2016 | Barros et al. |
| 9,325,842 | B1 | 4/2016 | Siddiqi et al. |
| 9,330,659 | B2 | 5/2016 | Ju et al. |
| 9,330,668 | B2 | 5/2016 | Nanavati et al. |
| 9,330,720 | B2 | 5/2016 | Lee |
| 9,335,983 | B2 | 5/2016 | Breiner et al. |
| 9,338,057 | B2 | 5/2016 | Jangra et al. |
| 9,338,242 | B1 | 5/2016 | Suchland et al. |
| 9,338,493 | B2 | 5/2016 | Van Os et al. |
| 9,342,829 | B2 | 5/2016 | Zhou et al. |
| 9,342,930 | B1 | 5/2016 | Kraft et al. |
| 9,349,368 | B1 | 5/2016 | Lebeau et al. |
| 9,355,472 | B2 | 5/2016 | Kocienda et al. |
| 9,361,084 | B1 | 6/2016 | Costa |
| 9,361,625 | B2 | 6/2016 | Parker et al. |
| 9,367,541 | B1 | 6/2016 | Servan et al. |
| 9,368,114 | B2 | 6/2016 | Larson et al. |
| 9,377,865 | B2 | 6/2016 | Berenson et al. |
| 9,377,871 | B2 | 6/2016 | Waddell et al. |
| 9,378,456 | B2 | 6/2016 | White et al. |
| 9,378,740 | B1 | 6/2016 | Rosen et al. |
| 9,380,155 | B1 | 6/2016 | Reding et al. |
| 9,383,827 | B1 | 7/2016 | Faaborg et al. |
| 9,384,185 | B2 | 7/2016 | Medlock et al. |
| 9,390,726 | B1 | 7/2016 | Smus et al. |
| 9,396,722 | B2 | 7/2016 | Chung et al. |
| 9,400,779 | B2 | 7/2016 | Convertino et al. |
| 9,401,140 | B1 | 7/2016 | Weber et al. |
| 9,401,147 | B2 | 7/2016 | Jitkoff et al. |
| 9,405,741 | B1 | 8/2016 | Schaaf et al. |
| 9,406,224 | B1 | 8/2016 | Sanders et al. |
| 9,406,299 | B2 | 8/2016 | Gollan et al. |
| 9,408,182 | B1 | 8/2016 | Hurley et al. |
| 9,412,392 | B2 | 8/2016 | Lindahl |
| 9,418,650 | B2 | 8/2016 | Bharadwaj et al. |
| 9,423,266 | B2 | 8/2016 | Clark et al. |
| 9,424,246 | B2 | 8/2016 | Spencer et al. |
| 9,424,840 | B1 | 8/2016 | Hart et al. |
| 9,431,021 | B1 | 8/2016 | Scalise et al. |
| 9,432,499 | B2 | 8/2016 | Hajdu et al. |
| 9,436,918 | B2 | 9/2016 | Pantel et al. |

(56) References Cited

U.S. PATENT DOCUMENTS

| | | | |
|---|---|---|---|
| 9,437,186 | B1 | 9/2016 | Liu et al. |
| 9,437,189 | B2 | 9/2016 | Epstein et al. |
| 9,442,687 | B2 | 9/2016 | Park et al. |
| 9,443,527 | B1 | 9/2016 | Watanabe et al. |
| 9,445,230 | B1 | 9/2016 | Sipher et al. |
| 9,454,599 | B2 | 9/2016 | Golden et al. |
| 9,454,957 | B1 | 9/2016 | Mathias et al. |
| 9,460,713 | B1 | 10/2016 | Mengibar et al. |
| 9,465,798 | B2 | 10/2016 | Lin |
| 9,465,833 | B2 | 10/2016 | Aravamudan et al. |
| 9,465,864 | B2 | 10/2016 | Hu et al. |
| 9,466,027 | B2 | 10/2016 | Byrne et al. |
| 9,466,121 | B2 | 10/2016 | Yang et al. |
| 9,466,294 | B1 | 10/2016 | Tunstall-Pedoe et al. |
| 9,471,566 | B1 | 10/2016 | Zhang et al. |
| 9,472,196 | B1 | 10/2016 | Wang et al. |
| 9,483,388 | B2 | 11/2016 | Sankaranarasimhan et al. |
| 9,483,461 | B2 | 11/2016 | Fleizach et al. |
| 9,483,529 | B1 | 11/2016 | Pasoi et al. |
| 9,484,021 | B1 | 11/2016 | Mairesse et al. |
| 9,485,286 | B1 | 11/2016 | Sellier et al. |
| 9,495,129 | B2 | 11/2016 | Fleizach et al. |
| 9,501,741 | B2 | 11/2016 | Cheyer et al. |
| 9,502,025 | B2 | 11/2016 | Kennewick et al. |
| 9,508,028 | B2 | 11/2016 | Bannister et al. |
| 9,510,044 | B1 | 11/2016 | Pereira et al. |
| 9,514,470 | B2 | 12/2016 | Topatan et al. |
| 9,516,014 | B2 | 12/2016 | Zafiroglu et al. |
| 9,519,453 | B2 | 12/2016 | Perkuhn et al. |
| 9,524,355 | B2 | 12/2016 | Forbes et al. |
| 9,529,500 | B1 | 12/2016 | Gauci et al. |
| 9,531,803 | B2 | 12/2016 | Chen et al. |
| 9,531,823 | B1 | 12/2016 | Suchland et al. |
| 9,531,862 | B1 | 12/2016 | Vadodaria |
| 9,535,906 | B2 | 1/2017 | Lee et al. |
| 9,536,518 | B2 | 1/2017 | Itoh et al. |
| 9,536,527 | B1 | 1/2017 | Carlson |
| 9,536,544 | B2 | 1/2017 | Osterman et al. |
| 9,547,647 | B2 | 1/2017 | Badaskar |
| 9,548,050 | B2 | 1/2017 | Gruber et al. |
| 9,548,053 | B1 | 1/2017 | Basye et al. |
| 9,548,979 | B1 | 1/2017 | Johnson et al. |
| 9,569,549 | B1 | 2/2017 | Jenkins et al. |
| 9,571,645 | B2 | 2/2017 | Quast et al. |
| 9,571,995 | B1 | 2/2017 | Scheer et al. |
| 9,574,894 | B1 | 2/2017 | Karakotsios et al. |
| 9,575,964 | B2 | 2/2017 | Yadgar et al. |
| 9,576,196 | B1 | 2/2017 | Natarajan |
| 9,576,575 | B2 | 2/2017 | Heide |
| 9,578,173 | B2 | 2/2017 | Sanghavi et al. |
| 9,584,946 | B1 | 2/2017 | Lyren et al. |
| 9,586,318 | B2 | 3/2017 | Djugash et al. |
| 9,602,946 | B2 | 3/2017 | Karkkainen et al. |
| 9,606,986 | B2 | 3/2017 | Bellegarda |
| 9,607,612 | B2 | 3/2017 | Deleeuw |
| 9,612,999 | B2 | 4/2017 | Prakah-Asante et al. |
| 9,619,200 | B2 | 4/2017 | Chakladar et al. |
| 9,619,459 | B2 | 4/2017 | Hebert et al. |
| 9,620,113 | B2 | 4/2017 | Kennewick et al. |
| 9,620,126 | B2 | 4/2017 | Chiba |
| 9,626,695 | B2 | 4/2017 | Balasubramanian et al. |
| 9,626,799 | B2 | 4/2017 | McArdle et al. |
| 9,626,955 | B2 | 4/2017 | Fleizach et al. |
| 9,633,004 | B2 | 4/2017 | Giuli et al. |
| 9,633,191 | B2 | 4/2017 | Fleizach et al. |
| 9,633,660 | B2 | 4/2017 | Haughay |
| 9,633,674 | B2 | 4/2017 | Sinha |
| 9,646,313 | B2 | 5/2017 | Kim et al. |
| 9,648,107 | B1 | 5/2017 | Penilla et al. |
| 9,652,453 | B2 | 5/2017 | Mathur et al. |
| 9,658,746 | B2 | 5/2017 | Cohn et al. |
| 9,659,002 | B2 | 5/2017 | Medlock et al. |
| 9,659,298 | B2 | 5/2017 | Lynch et al. |
| 9,665,567 | B2 | 5/2017 | Li et al. |
| 9,665,662 | B1 | 5/2017 | Gautam et al. |
| 9,668,121 | B2 | 5/2017 | Naik et al. |
| 9,672,725 | B2 | 6/2017 | Dotan-Cohen et al. |
| 9,672,822 | B2 | 6/2017 | Brown et al. |
| 9,678,664 | B2 | 6/2017 | Zhai et al. |
| 9,679,570 | B1 | 6/2017 | Edara |
| 9,690,542 | B2 | 6/2017 | Reddy et al. |
| 9,691,161 | B1 | 6/2017 | Yalniz et al. |
| 9,691,378 | B1 | 6/2017 | Meyers et al. |
| 9,691,384 | B1 | 6/2017 | Wang et al. |
| 9,696,963 | B2 | 7/2017 | Son et al. |
| 9,697,016 | B2 | 7/2017 | Jacob |
| 9,697,822 | B1 | 7/2017 | Naik et al. |
| 9,697,827 | B1 | 7/2017 | Lilly et al. |
| 9,697,828 | B1 | 7/2017 | Prasad et al. |
| 9,697,829 | B1 | 7/2017 | Tickner et al. |
| 9,698,999 | B2 | 7/2017 | Mutagi |
| 9,711,148 | B1 | 7/2017 | Sharifi et al. |
| 9,715,875 | B2 | 7/2017 | Piernot et al. |
| 9,720,907 | B2 | 8/2017 | Bangalore et al. |
| 9,721,566 | B2 | 8/2017 | Newendorp et al. |
| 9,721,570 | B1 | 8/2017 | Beal et al. |
| 9,723,130 | B2 | 8/2017 | Rand |
| 9,734,817 | B1 | 8/2017 | Putrycz |
| 9,734,839 | B1 | 8/2017 | Adams |
| 9,741,343 | B1 | 8/2017 | Miles et al. |
| 9,747,083 | B1 | 8/2017 | Roman et al. |
| 9,747,093 | B2 | 8/2017 | Latino et al. |
| 9,754,591 | B1 | 9/2017 | Kumar et al. |
| 9,755,605 | B1 | 9/2017 | Li et al. |
| 9,760,566 | B2 | 9/2017 | Heck et al. |
| 9,767,710 | B2 | 9/2017 | Lee et al. |
| 9,772,994 | B2 | 9/2017 | Karov et al. |
| 9,786,271 | B1 | 10/2017 | Combs et al. |
| 9,792,907 | B2 | 10/2017 | Bocklet et al. |
| 9,798,719 | B2 | 10/2017 | Karov et al. |
| 9,812,128 | B2 | 11/2017 | Mixter et al. |
| 9,813,882 | B1 | 11/2017 | Masterman |
| 9,818,400 | B2 | 11/2017 | Paulik et al. |
| 9,823,811 | B2 | 11/2017 | Brown et al. |
| 9,823,828 | B2 | 11/2017 | Zambetti et al. |
| 9,824,379 | B2 | 11/2017 | Khandelwal et al. |
| 9,824,691 | B1 | 11/2017 | Montero et al. |
| 9,824,692 | B1 | 11/2017 | Khoury et al. |
| 9,830,044 | B2 | 11/2017 | Brown et al. |
| 9,830,449 | B1 | 11/2017 | Wagner |
| 9,842,168 | B2 | 12/2017 | Heck et al. |
| 9,842,584 | B1 | 12/2017 | Hart et al. |
| 9,846,685 | B2 | 12/2017 | Li |
| 9,846,836 | B2 | 12/2017 | Gao et al. |
| 9,858,925 | B2 | 1/2018 | Gruber et al. |
| 9,858,927 | B2 | 1/2018 | Williams et al. |
| 9,886,953 | B2 | 2/2018 | Lemay et al. |
| 9,887,949 | B2 | 2/2018 | Shepherd et al. |
| 9,891,811 | B2 | 2/2018 | Federighi et al. |
| 9,892,732 | B1 | 2/2018 | Tian et al. |
| 9,911,415 | B2 | 3/2018 | Vanblon et al. |
| 9,916,839 | B1 | 3/2018 | Scalise et al. |
| 9,922,642 | B2 | 3/2018 | Pitschel et al. |
| 9,928,835 | B1 | 3/2018 | Tang |
| 9,934,777 | B1 | 4/2018 | Joseph et al. |
| 9,934,785 | B1 | 4/2018 | Hulaud |
| 9,940,616 | B1 | 4/2018 | Morgan et al. |
| 9,946,862 | B2 | 4/2018 | Yun et al. |
| 9,948,728 | B2 | 4/2018 | Linn et al. |
| 9,953,634 | B1 | 4/2018 | Pearce et al. |
| 9,959,129 | B2 | 5/2018 | Kannan et al. |
| 9,959,506 | B1 | 5/2018 | Karppanen |
| 9,959,867 | B2 | 5/2018 | Lindahl |
| 9,966,065 | B2 | 5/2018 | Gruber et al. |
| 9,966,068 | B2 | 5/2018 | Cash et al. |
| 9,967,381 | B1 | 5/2018 | Kashimba et al. |
| 9,971,495 | B2 | 5/2018 | Shetty et al. |
| 9,972,304 | B2 | 5/2018 | Paulik et al. |
| 9,972,318 | B1 | 5/2018 | Kelly et al. |
| 9,983,785 | B2 | 5/2018 | Wong et al. |
| 9,984,686 | B1 | 5/2018 | Mutagi et al. |
| 9,986,419 | B2 | 5/2018 | Naik et al. |
| 9,990,129 | B2 | 6/2018 | Yang et al. |
| 9,990,176 | B1 | 6/2018 | Gray |

(56) References Cited

U.S. PATENT DOCUMENTS

| | | | |
|---|---|---|---|
| 9,990,921 | B2 | 6/2018 | Vanblon et al. |
| 9,990,926 | B1 | 6/2018 | Pearce |
| 9,996,626 | B1 | 6/2018 | Bailey et al. |
| 9,998,552 | B1 | 6/2018 | Ledet |
| 10,001,817 | B2 | 6/2018 | Zambetti et al. |
| 10,009,666 | B1 | 6/2018 | Van Scheltinga et al. |
| 10,013,416 | B1 | 7/2018 | Bhardwaj et al. |
| 10,013,654 | B1 | 7/2018 | Levy et al. |
| 10,013,979 | B1 | 7/2018 | Roma et al. |
| 10,019,436 | B2 | 7/2018 | Huang |
| 10,025,378 | B2 | 7/2018 | Venable et al. |
| 10,026,209 | B1 | 7/2018 | Dagley et al. |
| 10,026,401 | B1 | 7/2018 | Mutagi et al. |
| 10,027,662 | B1 | 7/2018 | Mutagi et al. |
| 10,032,451 | B1 | 7/2018 | Mamkina et al. |
| 10,032,455 | B2 | 7/2018 | Newman et al. |
| 10,037,758 | B2 | 7/2018 | Jing et al. |
| 10,043,516 | B2 | 8/2018 | Saddler et al. |
| 10,048,748 | B2 | 8/2018 | Sridharan et al. |
| 10,049,161 | B2 | 8/2018 | Kaneko |
| 10,049,663 | B2 | 8/2018 | Orr et al. |
| 10,049,668 | B2 | 8/2018 | Huang et al. |
| 10,055,390 | B2 | 8/2018 | Sharifi et al. |
| 10,055,681 | B2 | 8/2018 | Brown et al. |
| 10,068,570 | B2 | 9/2018 | Dai et al. |
| 10,074,360 | B2 | 9/2018 | Kim |
| 10,074,371 | B1 | 9/2018 | Wang et al. |
| 10,078,487 | B2 | 9/2018 | Gruber et al. |
| 10,083,213 | B1 | 9/2018 | Podgorny et al. |
| 10,083,688 | B2 | 9/2018 | Piernot et al. |
| 10,083,690 | B2 | 9/2018 | Giuli et al. |
| 10,088,972 | B2 | 10/2018 | Brown et al. |
| 10,089,072 | B2 | 10/2018 | Piersol et al. |
| 10,089,393 | B2 | 10/2018 | Agarwal et al. |
| 10,089,983 | B1 | 10/2018 | Gella et al. |
| 10,096,319 | B1 | 10/2018 | Jin et al. |
| 10,101,887 | B2 | 10/2018 | Bernstein et al. |
| 10,102,359 | B2 | 10/2018 | Cheyer |
| 10,102,851 | B1 | 10/2018 | Kiss et al. |
| 10,115,055 | B2 | 10/2018 | Weiss et al. |
| 10,127,901 | B2 | 11/2018 | Zhao et al. |
| 10,127,908 | B1 | 11/2018 | Deller et al. |
| 10,127,926 | B2 | 11/2018 | James |
| 10,134,425 | B1 | 11/2018 | Johnson, Jr. |
| 10,135,965 | B2 | 11/2018 | Woolsey et al. |
| 10,140,845 | B1 | 11/2018 | Knas |
| 10,142,222 | B1 | 11/2018 | Zhang |
| 10,146,923 | B2 | 12/2018 | Pitkanen et al. |
| 10,147,421 | B2 | 12/2018 | Liddell et al. |
| 10,147,441 | B1 | 12/2018 | Pogue et al. |
| 10,149,156 | B1 | 12/2018 | Tiku et al. |
| 10,158,728 | B1 | 12/2018 | Vanblon et al. |
| 10,162,512 | B2 | 12/2018 | Seo et al. |
| 10,162,817 | B2 | 12/2018 | Schlesinger et al. |
| 10,169,329 | B2 | 1/2019 | Futrell et al. |
| 10,170,123 | B2 | 1/2019 | Orr et al. |
| 10,170,135 | B1 | 1/2019 | Pearce et al. |
| 10,175,879 | B2 | 1/2019 | Missig et al. |
| 10,176,167 | B2 | 1/2019 | Evermann |
| 10,176,802 | B1 | 1/2019 | Ladhak et al. |
| 10,176,808 | B1 | 1/2019 | Lovitt et al. |
| 10,178,301 | B1 | 1/2019 | Welbourne et al. |
| 10,185,542 | B2 | 1/2019 | Carson et al. |
| 10,186,254 | B2 | 1/2019 | Williams et al. |
| 10,186,266 | B1 | 1/2019 | Devaraj et al. |
| 10,191,627 | B2 | 1/2019 | Cieplinski et al. |
| 10,191,646 | B2 | 1/2019 | Zambetti et al. |
| 10,191,718 | B2 | 1/2019 | Rhee et al. |
| 10,192,546 | B1 | 1/2019 | Piersol et al. |
| 10,192,552 | B2 | 1/2019 | Raitio et al. |
| 10,192,557 | B2 | 1/2019 | Lee et al. |
| 10,193,840 | B1 | 1/2019 | Dar |
| 10,198,877 | B1 | 2/2019 | Maltsev et al. |
| 10,199,051 | B2 | 2/2019 | Binder et al. |
| 10,200,824 | B2 | 2/2019 | Gross et al. |
| 10,204,627 | B2 | 2/2019 | Nitz et al. |
| 10,210,860 | B1 | 2/2019 | Ward et al. |
| 10,216,351 | B2 | 2/2019 | Yang |
| 10,216,832 | B2 | 2/2019 | Bangalore et al. |
| 10,223,066 | B2 | 3/2019 | Martel et al. |
| 10,224,030 | B1 | 3/2019 | Kiss et al. |
| 10,225,711 | B2 | 3/2019 | Parks et al. |
| 10,228,904 | B2 | 3/2019 | Raux |
| 10,229,109 | B1 | 3/2019 | Cherepanov et al. |
| 10,229,356 | B1 | 3/2019 | Liu et al. |
| 10,229,680 | B1 | 3/2019 | Gillespie et al. |
| 10,236,016 | B1 | 3/2019 | Li et al. |
| 10,237,711 | B2 | 3/2019 | Linn et al. |
| 10,241,644 | B2 | 3/2019 | Gruber et al. |
| 10,242,501 | B1 | 3/2019 | Pusch et al. |
| 10,248,308 | B2 | 4/2019 | Karunamuni et al. |
| 10,248,771 | B1 | 4/2019 | Ziraknejad et al. |
| 10,249,300 | B2 | 4/2019 | Booker et al. |
| 10,249,305 | B2 | 4/2019 | Yu |
| 10,255,922 | B1 | 4/2019 | Sharifi et al. |
| 10,257,314 | B2 | 4/2019 | Agrawal et al. |
| 10,261,672 | B1 | 4/2019 | Dolbakian et al. |
| 10,261,830 | B2 | 4/2019 | Gupta et al. |
| 10,269,345 | B2 | 4/2019 | Sanchez et al. |
| 10,271,093 | B1 | 4/2019 | Jobanputra et al. |
| 10,275,513 | B1 | 4/2019 | Cowan et al. |
| 10,276,170 | B2 | 4/2019 | Gruber et al. |
| 10,282,737 | B2 | 5/2019 | Clark et al. |
| 10,283,111 | B1 | 5/2019 | Mairesse et al. |
| 10,289,205 | B1 | 5/2019 | Sumter et al. |
| 10,291,066 | B1 | 5/2019 | Leabman et al. |
| 10,296,160 | B2 | 5/2019 | Shah et al. |
| 10,297,253 | B2 | 5/2019 | Walker, II et al. |
| 10,303,715 | B2 | 5/2019 | Graham et al. |
| 10,303,772 | B2 | 5/2019 | Hosn et al. |
| 10,304,463 | B2 | 5/2019 | Mixter et al. |
| 10,311,482 | B2 | 6/2019 | Baldwin |
| 10,311,871 | B2 | 6/2019 | Newendorp et al. |
| 10,317,992 | B2 | 6/2019 | Prokofieva et al. |
| 10,325,598 | B2 | 6/2019 | Basye et al. |
| 10,331,312 | B2 | 6/2019 | Napolitano et al. |
| 10,332,509 | B2 | 6/2019 | Catanzaro et al. |
| 10,332,513 | B1 | 6/2019 | D'Souza et al. |
| 10,332,518 | B2 | 6/2019 | Garg et al. |
| 10,339,224 | B2 | 7/2019 | Fukuoka |
| 10,339,714 | B2 | 7/2019 | Corso et al. |
| 10,339,721 | B1 | 7/2019 | Dascola et al. |
| 10,339,925 | B1 | 7/2019 | Rastrow et al. |
| 10,346,540 | B2 | 7/2019 | Karov et al. |
| 10,346,541 | B1 | 7/2019 | Phillips et al. |
| 10,346,753 | B2 | 7/2019 | Soon-Shiong et al. |
| 10,346,878 | B1 | 7/2019 | Ostermann et al. |
| 10,353,975 | B2 | 7/2019 | Oh et al. |
| 10,354,168 | B2 | 7/2019 | Bluche |
| 10,354,677 | B2 | 7/2019 | Mohamed et al. |
| 10,356,243 | B2 | 7/2019 | Sanghavi et al. |
| 10,360,305 | B2 | 7/2019 | Larcheveque et al. |
| 10,360,716 | B1 | 7/2019 | Van Der Meulen et al. |
| 10,365,887 | B1 | 7/2019 | Mulherkar |
| 10,366,160 | B2 | 7/2019 | Castelli et al. |
| 10,366,692 | B1 | 7/2019 | Adams et al. |
| 10,372,814 | B2 | 8/2019 | Gliozzo et al. |
| 10,372,881 | B2 | 8/2019 | Ingrassia, Jr. et al. |
| 10,373,381 | B2 | 8/2019 | Nuernberger et al. |
| 10,382,799 | B1 | 8/2019 | Walters et al. |
| 10,387,461 | B2 | 8/2019 | Sharifi et al. |
| 10,389,876 | B2 | 8/2019 | Engelke et al. |
| 10,402,066 | B2 | 9/2019 | Kawana |
| 10,403,272 | B1 | 9/2019 | Fanty et al. |
| 10,403,283 | B1 | 9/2019 | Schramm et al. |
| 10,409,454 | B2 | 9/2019 | Kagan et al. |
| 10,410,637 | B2 | 9/2019 | Paulik et al. |
| 10,416,760 | B2 | 9/2019 | Burns et al. |
| 10,417,037 | B2 | 9/2019 | Gruber et al. |
| 10,417,344 | B2 | 9/2019 | Futrell et al. |
| 10,417,554 | B2 | 9/2019 | Scheffler |
| 10,418,032 | B1 | 9/2019 | Mohajer et al. |
| 10,431,210 | B1 | 10/2019 | Huang et al. |
| 10,437,928 | B2 | 10/2019 | Bhaya et al. |

(56) References Cited

U.S. PATENT DOCUMENTS 10,446,142 B2 10/2019 Lim et al.
10,453,117 B1 10/2019 Reavely et al.
10,469,665 B1 11/2019 Bell et al.
10,474,961 B2 11/2019 Brigham et al.
10,475,446 B2 11/2019 Gruber et al.
10,482,875 B2 11/2019 Henry
10,482,904 B1 11/2019 Hardie et al.
10,490,195 B1 11/2019 Krishnamoorthy et al.
10,496,364 B2 12/2019 Yao
10,496,705 B1 12/2019 Irani et al.
10,497,250 B1 12/2019 Hayward et al.
10,497,365 B2 12/2019 Gruber et al.
10,497,366 B2 12/2019 Sapugay et al.
10,499,146 B2 12/2019 Lang et al.
10,504,513 B1 12/2019 Gray et al.
10,504,518 B1 12/2019 Irani et al.
10,512,750 B1 12/2019 Lewin et al.
10,515,133 B1 12/2019 Sharifi
10,515,623 B1 12/2019 Grizzel
10,521,946 B1 12/2019 Roche et al.
10,528,386 B2 1/2020 Yu
10,540,976 B2 1/2020 Van Os et al.
10,558,893 B2 2/2020 Bluche
10,559,225 B1 2/2020 Tao et al.
10,559,299 B1 2/2020 Arel et al.
10,566,007 B2 2/2020 Fawaz et al.
10,568,032 B2 2/2020 Freeman et al.
10,572,885 B1 2/2020 Guo et al.
10,579,401 B2 3/2020 Dawes
10,580,409 B2 3/2020 Walker, II et al.
10,582,355 B1 3/2020 Lebeau et al.
10,585,957 B2 3/2020 Heck et al.
10,586,369 B1 3/2020 Roche et al.
10,599,449 B1 3/2020 Chatzipanagiotis et al.
10,599,758 B1 3/2020 Yu et al.
10,628,483 B1 4/2020 Rao et al.
10,629,186 B1 4/2020 Slifka
10,630,795 B2 4/2020 Aoki et al.
10,642,934 B2 5/2020 Heck et al.
10,643,611 B2 5/2020 Lindahl
10,649,652 B2 5/2020 Sun
10,652,392 B1 5/2020 Eades
10,652,394 B2 5/2020 Van Os et al.
10,659,851 B2 5/2020 Lister et al.
10,671,428 B2 6/2020 Zeitlin
10,679,007 B2 6/2020 Jia et al.
10,679,608 B2 6/2020 Mixter et al.
10,684,099 B2 6/2020 Zaetterqvist
10,684,703 B2 6/2020 Hindi et al.
10,685,187 B2 6/2020 Badr et al.
10,691,473 B2 6/2020 Karashchuk et al.
10,699,697 B2 6/2020 Qian et al.
10,706,841 B2 7/2020 Gruber et al.
10,706,848 B1 7/2020 Greene et al.
10,721,190 B2 7/2020 Zhao et al.
10,732,708 B1 8/2020 Roche et al.
10,743,107 B1 8/2020 Yoshioka et al.
10,747,498 B2 8/2020 Stasior et al.
10,748,529 B1 8/2020 Milden
10,748,546 B2 8/2020 Kim et al.
10,754,658 B2 8/2020 Tamiya
10,755,032 B2 8/2020 Douglas et al.
10,757,499 B1 8/2020 Vautrin et al.
10,757,552 B2 8/2020 Gross et al.
10,769,385 B2 9/2020 Evermann
10,776,933 B2 9/2020 Faulkner
10,778,839 B1 9/2020 Newstadt et al.
10,783,151 B1 9/2020 Bushkin et al.
10,783,166 B2 9/2020 Hurley et al.
10,783,883 B2 9/2020 Mixter et al.
10,789,945 B2 9/2020 Acero et al.
10,791,176 B2 9/2020 Phipps et al.
10,791,215 B2 9/2020 Ly et al.
10,795,944 B2 10/2020 Brown et al.
10,796,100 B2 10/2020 Bangalore et al.
10,803,255 B2 10/2020 Dubyak et al.
10,811,013 B1 10/2020 Secker-Walker et al.
10,818,288 B2 10/2020 Garcia et al.
10,831,494 B2 11/2020 Grocutt et al.
10,832,031 B2 11/2020 Kienzle et al.
10,832,684 B2 11/2020 Sarikaya
10,842,968 B1 11/2020 Kahn et al.
10,846,618 B2 11/2020 Ravi et al.
10,847,142 B2 11/2020 Newendorp et al.
10,860,629 B1 12/2020 Gangadharaiah et al.
10,861,483 B2 12/2020 Feinauer et al.
10,877,637 B1 12/2020 Antos et al.
10,878,047 B1 12/2020 Mutagi et al.
10,880,668 B1 12/2020 Robinson et al.
10,885,277 B2 1/2021 Ravi et al.
10,891,968 B2 1/2021 Chung et al.
10,892,996 B2 1/2021 Piersol
10,904,488 B1 1/2021 Weisz et al.
10,909,171 B2 2/2021 Graham et al.
10,909,459 B2 2/2021 Tsatsin et al.
10,931,999 B1 2/2021 Jobanputra et al.
10,937,263 B1 3/2021 Tout et al.
10,937,410 B1 3/2021 Rule
10,942,702 B2 3/2021 Piersol et al.
10,942,703 B2 3/2021 Martel et al.
10,944,859 B2 3/2021 Weinstein et al.
10,957,310 B1 3/2021 Mohajer et al.
10,957,311 B2 3/2021 Solomon et al.
10,957,337 B2 3/2021 Chen et al.
10,970,660 B1 4/2021 Harris et al.
10,974,139 B2 4/2021 Feder et al.
10,978,056 B1 4/2021 Challa et al.
10,978,090 B2 4/2021 Binder et al.
10,983,971 B2 4/2021 Carvalho et al.
11,009,970 B2 5/2021 Hindi et al.
11,010,127 B2 5/2021 Orr et al.
11,010,763 B1 5/2021 Fillinger
11,012,942 B2 5/2021 Freeman et al.
11,017,766 B2 5/2021 Chao et al.
11,037,565 B2 6/2021 Kudurshian et al.
11,038,934 B1 6/2021 Hansen et al.
11,043,086 B1 6/2021 Daoura et al.
11,043,220 B1 6/2021 Hansen et al.
11,048,473 B2 6/2021 Carson et al.
11,061,543 B1 7/2021 Blatz et al.
11,062,696 B2 7/2021 Tadpatrikar et al.
11,072,344 B2 7/2021 Provost et al.
11,076,039 B2 7/2021 Weinstein et al.
11,080,336 B2 8/2021 Van Dusen
11,086,858 B1 8/2021 Koukoumidis et al.
11,087,759 B2 8/2021 Lemay et al.
11,093,306 B1 8/2021 Libin
11,094,311 B2 8/2021 Candelore et al.
11,112,875 B1 9/2021 Zhou et al.
11,113,598 B2 9/2021 Socher et al.
11,126,331 B2 9/2021 Lo et al.
11,126,400 B2 9/2021 Stasior et al.
11,132,172 B1 9/2021 Naik et al.
11,133,008 B2 9/2021 Piernot et al.
11,151,899 B2 10/2021 Pitschel et al.
11,152,002 B2 10/2021 Walker et al.
11,169,660 B2 11/2021 Gupta et al.
11,181,988 B1 11/2021 Bellegarda et al.
11,183,193 B1 11/2021 Hansen et al.
11,183,205 B1 11/2021 Ebenezer et al.
11,200,027 B2 12/2021 Aggarwal et al.
11,204,787 B2 12/2021 Radebaugh et al.
11,205,192 B1 12/2021 Rivera et al.
11,210,062 B1 12/2021 Heikinheimo et al.
11,210,477 B2 12/2021 Srinivasan et al.
11,211,048 B2 12/2021 Kim et al.
11,211,058 B1 12/2021 Eakin et al.
11,217,255 B2 1/2022 Kim et al.
11,223,699 B1 1/2022 Niewczas
11,235,248 B1 2/2022 Orrino et al.
11,269,426 B2 3/2022 Jorasch et al.
11,269,678 B2 3/2022 Gruber et al.
11,283,631 B2 3/2022 Yan et al.
11,289,082 B1 3/2022 Lacy et al.

(56) References Cited

U.S. PATENT DOCUMENTS 11,301,766 B2 4/2022 Muramoto et al.
11,302,310 B1 4/2022 Gandhe et al.
11,347,754 B1 5/2022 Ho et al.
11,348,582 B2 5/2022 Lindahl
11,361,863 B2 6/2022 Gass et al.
11,373,645 B1 6/2022 Mathew et al.
11,380,310 B2 7/2022 Acero et al.
11,380,323 B2 7/2022 Shin et al.
11,388,291 B2 7/2022 Van Os et al.
11,418,461 B1 8/2022 Elfardy et al.
11,423,866 B2 8/2022 Park et al.
11,449,802 B2 9/2022 Maalouf et al.
11,481,552 B2 10/2022 Krause et al.
11,481,559 B1 10/2022 Asefi et al.
11,487,932 B2 11/2022 Kramer
11,495,218 B2 11/2022 Newendorp et al.
11,507,183 B2 11/2022 Manjunath et al.
11,508,380 B2 11/2022 Hu et al.
11,538,469 B2 12/2022 Acero et al.
11,580,990 B2 2/2023 Paulik et al.
11,669,788 B2 6/2023 Balasubramanian et al.
11,671,920 B2 6/2023 Freeman et al.
11,675,829 B2 6/2023 Graham et al.
11,704,552 B2 7/2023 Sim et al.
11,755,275 B2 9/2023 Lovitt
11,756,548 B1 9/2023 Perkins et al.
11,768,880 B1 9/2023 Nemani et al.
11,769,497 B2 9/2023 Manjunath et al.
11,783,805 B1 10/2023 Nadig et al.
11,784,893 B1 10/2023 Chang
11,809,783 B2 11/2023 Piersol et al.
11,818,111 B1 11/2023 Debolt
11,837,232 B2 12/2023 Manjunath et al.
12,021,806 B1 6/2024 Lebrecht et al.
2003/0187659 A1 10/2003 Cho et al.
2004/0030560 A1 2/2004 Takami et al.
2005/0184852 A1* 8/2005 Lee ........................ G05B 15/02 340/3.1
2006/0218244 A1 9/2006 Rasmussen et al.
2007/0050191 A1 3/2007 Weider et al.
2007/0075965 A1 4/2007 Huppi et al.
2008/0048908 A1 2/2008 Sato
2008/0071391 A1 3/2008 Busby et al.
2008/0189110 A1 8/2008 Freeman et al.
2009/0043580 A1 2/2009 Mozer et al.
2009/0234655 A1 9/2009 Kwon
2010/0169098 A1 7/2010 Patch
2010/0332235 A1 12/2010 David
2011/0184730 A1 7/2011 LeBeau et al.
2011/0295590 A1 12/2011 Lloyd et al.
2012/0016678 A1 1/2012 Gruber et al.
2012/0162540 A1 6/2012 Ouchi et al.
2012/0232886 A1 9/2012 Capuozzo et al.
2013/0051755 A1 2/2013 Brown et al.
2013/0054945 A1 2/2013 Free et al.
2013/0063256 A1 3/2013 Tartz et al.
2013/0073293 A1 3/2013 Jang et al.
2013/0097709 A1 4/2013 Basavapatna et al.
2013/0109412 A1 5/2013 Nguyen et al.
2013/0176592 A1 7/2013 Sasaki
2013/0185074 A1 7/2013 Gruber et al.
2013/0223279 A1 8/2013 Tinnakornsrisuphap et al.
2013/0238326 A1 9/2013 Kim et al.
2013/0325844 A1 12/2013 Plaisant
2013/0325967 A1 12/2013 Parks et al.
2014/0001255 A1 1/2014 Anthoine
2014/0002338 A1 1/2014 Raffa et al.
2014/0006012 A1 1/2014 Zhou et al.
2014/0006025 A1 1/2014 Krishnan et al.
2014/0006027 A1 1/2014 Kim et al.
2014/0006028 A1 1/2014 Hu
2014/0006030 A1 1/2014 Fleizach et al.
2014/0006153 A1 1/2014 Thangam et al.
2014/0006191 A1 1/2014 Shankar et al.
2014/0006483 A1 1/2014 Garmark et al.
2014/0006496 A1 1/2014 Dearman et al.
2014/0006562 A1 1/2014 Handa et al.
2014/0006944 A1 1/2014 Selig et al.
2014/0006947 A1 1/2014 Garmark et al.
2014/0006951 A1 1/2014 Hunter
2014/0006955 A1 1/2014 Greenzeiger et al.
2014/0008163 A1 1/2014 Mikonaho et al.
2014/0012574 A1 1/2014 Pasupalak et al.
2014/0012575 A1 1/2014 Ganong et al.
2014/0012580 A1 1/2014 Ganong, III et al.
2014/0012586 A1 1/2014 Rubin et al.
2014/0012587 A1 1/2014 Park
2014/0013336 A1 1/2014 Yang
2014/0019116 A1 1/2014 Lundberg et al.
2014/0019133 A1 1/2014 Bao et al.
2014/0019135 A1 1/2014 Talwar et al.
2014/0019460 A1 1/2014 Sambrani et al.
2014/0019873 A1 1/2014 Gupta et al.
2014/0025383 A1 1/2014 Dai et al.
2014/0026037 A1 1/2014 Garb et al.
2014/0028029 A1 1/2014 Jochman
2014/0028477 A1 1/2014 Michalske
2014/0028603 A1 1/2014 Xie et al.
2014/0028735 A1 1/2014 Williams et al.
2014/0032453 A1 1/2014 Eustice et al.
2014/0032678 A1 1/2014 Koukoumidis et al.
2014/0032706 A1 1/2014 Kuscher et al.
2014/0033071 A1 1/2014 Gruber et al.
2014/0033215 A1 1/2014 Otomo et al.
2014/0035823 A1 2/2014 Khoe et al.
2014/0035824 A1 2/2014 Bernstein et al.
2014/0037075 A1 2/2014 Bouzid et al.
2014/0039888 A1 2/2014 Taubman et al.
2014/0039893 A1 2/2014 Weiner et al.
2014/0039894 A1 2/2014 Shostak
2014/0040228 A1 2/2014 Kritt et al.
2014/0040274 A1 2/2014 Aravamudan et al.
2014/0040748 A1 2/2014 Lemay et al.
2014/0040754 A1 2/2014 Donelli
2014/0040801 A1 2/2014 Patel et al.
2014/0040905 A1 2/2014 Tsunoda et al.
2014/0040918 A1 2/2014 Li
2014/0040961 A1 2/2014 Green et al.
2014/0045547 A1 2/2014 Singamsetty et al.
2014/0046922 A1 2/2014 Crook et al.
2014/0046934 A1 2/2014 Zhou et al.
2014/0047001 A1 2/2014 Phillips et al.
2014/0051399 A1 2/2014 Walker
2014/0052451 A1 2/2014 Cheong et al.
2014/0052680 A1 2/2014 Nitz et al.
2014/0052791 A1 2/2014 Chakra et al.
2014/0053082 A1 2/2014 Park
2014/0053101 A1 2/2014 Buehler et al.
2014/0053198 A1 2/2014 Sirpal et al.
2014/0053210 A1 2/2014 Cheong et al.
2014/0056439 A1 2/2014 Kim
2014/0057610 A1 2/2014 Olincy et al.
2014/0058732 A1 2/2014 Labsky et al.
2014/0059030 A1 2/2014 Hakkani-Tur et al.
2014/0059423 A1 2/2014 Gorga et al.
2014/0067094 A1* 3/2014 Park ...................... H04W 12/06 700/90
2014/0067131 A1* 3/2014 Park ........................ D06F 34/05 700/275
2014/0067361 A1 3/2014 Nikoulina et al.
2014/0067371 A1 3/2014 Liensberger
2014/0067402 A1 3/2014 Kim
2014/0067649 A1 3/2014 Kannan et al.
2014/0067738 A1 3/2014 Kingsbury
2014/0067740 A1 3/2014 Solari
2014/0068751 A1 3/2014 Last
2014/0071069 A1 3/2014 Anderson et al.
2014/0071241 A1 3/2014 Yang et al.
2014/0074454 A1 3/2014 Brown et al.
2014/0074466 A1 3/2014 Sharifi et al.
2014/0074470 A1 3/2014 Jansche et al.
2014/0074472 A1 3/2014 Lin et al.
2014/0074482 A1 3/2014 Ohno
2014/0074483 A1 3/2014 Van Os

(56) References Cited

U.S. PATENT DOCUMENTS

2014/0074589 A1 3/2014 Nielsen et al.
2014/0074815 A1 3/2014 Plimton
2014/0074846 A1 3/2014 Moss et al.
2014/0075453 A1 3/2014 Bellessort et al.
2014/0078065 A1 3/2014 Akkok
2014/0079195 A1 3/2014 Srivastava et al.
2014/0080410 A1 3/2014 Jung et al.
2014/0080428 A1 3/2014 Rhoads et al.
2014/0081619 A1 3/2014 Solntseva et al.
2014/0081633 A1 3/2014 Badaskar
2014/0081635 A1 3/2014 Yanagihara
2014/0081829 A1 3/2014 Milne
2014/0081941 A1 3/2014 Bai et al.
2014/0082500 A1 3/2014 Wilensky et al.
2014/0082501 A1 3/2014 Bae et al.
2014/0082545 A1 3/2014 Zhai et al.
2014/0082569 A1 3/2014 Borgman
2014/0082715 A1 3/2014 Grajek et al.
2014/0084165 A1 3/2014 Fadell et al.
2014/0086458 A1 3/2014 Rogers
2014/0087711 A1 3/2014 Geyer et al.
2014/0088952 A1 3/2014 Fife et al.
2014/0088961 A1 3/2014 Woodward et al.
2014/0088964 A1 3/2014 Bellegarda
2014/0088970 A1 3/2014 Kang
2014/0088989 A1 3/2014 Krishnapuram et al.
2014/0092007 A1 4/2014 Kim et al.
2014/0095171 A1 4/2014 Lynch et al.
2014/0095172 A1 4/2014 Cabaco et al.
2014/0095173 A1 4/2014 Lynch et al.
2014/0095432 A1 4/2014 Trumbull et al.
2014/0095601 A1 4/2014 Abuelsaad et al.
2014/0095965 A1 4/2014 Li
2014/0096077 A1 4/2014 Jacob et al.
2014/0096209 A1 4/2014 Saraf et al.
2014/0098247 A1 4/2014 Rao et al.
2014/0100847 A1 4/2014 Ishii et al.
2014/0101127 A1 4/2014 Simhon et al.
2014/0104175 A1 4/2014 Ouyang et al.
2014/0108010 A1 4/2014 Maltseff et al.
2014/0108017 A1 4/2014 Mason et al.
2014/0108357 A1 4/2014 Procops et al.
2014/0108391 A1 4/2014 Volkert
2014/0108792 A1 4/2014 Borzycki et al.
2014/0112556 A1 4/2014 Kalinli-Akbacak
2014/0114554 A1 4/2014 Lagassey
2014/0115062 A1 4/2014 Liu et al.
2014/0115114 A1 4/2014 Garmark et al.
2014/0118155 A1 5/2014 Bowers et al.
2014/0118624 A1 5/2014 Jang et al.
2014/0120961 A1 5/2014 Buck
2014/0122057 A1 5/2014 Chelba et al.
2014/0122059 A1 5/2014 Patel et al.
2014/0122085 A1 5/2014 Piety et al.
2014/0122086 A1 5/2014 Kapur et al.
2014/0122136 A1 5/2014 Jayanthi
2014/0122153 A1 5/2014 Truitt
2014/0122589 A1 5/2014 Fyke et al.
2014/0123022 A1 5/2014 Lee et al.
2014/0128021 A1 5/2014 Walker et al.
2014/0129006 A1 5/2014 Chen et al.
2014/0129226 A1 5/2014 Lee et al.
2014/0132935 A1 5/2014 Kim et al.
2014/0134983 A1 5/2014 Jung et al.
2014/0135036 A1 5/2014 Bonanni et al.
2014/0136013 A1 5/2014 Wolverton et al.
2014/0136187 A1 5/2014 Wolverton et al.
2014/0136195 A1 5/2014 Abdossalami et al.
2014/0136212 A1 5/2014 Kwon et al.
2014/0136946 A1 5/2014 Matas
2014/0136987 A1 5/2014 Rodriguez
2014/0142922 A1 5/2014 Liang et al.
2014/0142923 A1 5/2014 Jones et al.
2014/0142934 A1 5/2014 Kim
2014/0142935 A1 5/2014 Lindahl et al.
2014/0142953 A1 5/2014 Kim et al.
2014/0143550 A1 5/2014 Ganong, III et al.
2014/0143721 A1 5/2014 Suzuki et al.
2014/0143784 A1 5/2014 Mistry et al.
2014/0145914 A1 5/2014 Latta et al.
2014/0146200 A1 5/2014 Scott et al.
2014/0148209 A1 5/2014 Weng et al.
2014/0149118 A1 5/2014 Lee et al.
2014/0152577 A1 6/2014 Yuen et al.
2014/0153709 A1 6/2014 Byrd et al.
2014/0155031 A1 6/2014 Lee et al.
2014/0156262 A1 6/2014 Yuen et al.
2014/0156268 A1 6/2014 Arizmendi et al.
2014/0156269 A1 6/2014 Lee et al.
2014/0156279 A1 6/2014 Okamoto et al.
2014/0156564 A1 6/2014 Knight et al.
2014/0157319 A1 6/2014 Kimura et al.
2014/0157422 A1 6/2014 Livshits et al.
2014/0160032 A1 6/2014 Che et al.
2014/0160157 A1 6/2014 Poulos et al.
2014/0163751 A1 6/2014 Davis et al.
2014/0163951 A1 6/2014 Nikoulina et al.
2014/0163953 A1 6/2014 Parikh
2014/0163954 A1 6/2014 Joshi et al.
2014/0163962 A1 6/2014 Castelli et al.
2014/0163976 A1 6/2014 Park et al.
2014/0163977 A1 6/2014 Hoffmeister et al.
2014/0163978 A1 6/2014 Basye et al.
2014/0163981 A1 6/2014 Cook et al.
2014/0163995 A1 6/2014 Burns et al.
2014/0164305 A1 6/2014 Lynch et al.
2014/0164312 A1 6/2014 Lynch et al.
2014/0164476 A1 6/2014 Thomson
2014/0164508 A1 6/2014 Lynch et al.
2014/0164532 A1 6/2014 Lynch et al.
2014/0164533 A1 6/2014 Lynch et al.
2014/0164953 A1 6/2014 Lynch et al.
2014/0165006 A1 6/2014 Chaudhri et al.
2014/0165187 A1 6/2014 Daesung et al.
2014/0168344 A1 6/2014 Shoemake et al.
2014/0169795 A1 6/2014 Clough
2014/0171064 A1 6/2014 Das
2014/0172412 A1 6/2014 Viegas et al.
2014/0172878 A1 6/2014 Clark et al.
2014/0173445 A1 6/2014 Grassiotto
2014/0173460 A1 6/2014 Kim
2014/0176814 A1 6/2014 Ahn
2014/0179295 A1 6/2014 Luebbers et al.
2014/0180499 A1 6/2014 Cooper et al.
2014/0180689 A1 6/2014 Kim
2014/0180697 A1 6/2014 Torok et al.
2014/0181123 A1 6/2014 Blaise et al.
2014/0181703 A1 6/2014 Sullivan et al.
2014/0181715 A1 6/2014 Axelrod et al.
2014/0181741 A1 6/2014 Apacible et al.
2014/0181865 A1 6/2014 Koganei
2014/0184542 A1 7/2014 Mao et al.
2014/0188335 A1 7/2014 Madhok et al.
2014/0188460 A1 7/2014 Ouyang et al.
2014/0188477 A1 7/2014 Zhang
2014/0188478 A1 7/2014 Zhang
2014/0188485 A1 7/2014 Kim et al.
2014/0188835 A1 7/2014 Zhang et al.
2014/0195226 A1 7/2014 Yun et al.
2014/0195230 A1 7/2014 Han et al.
2014/0195233 A1 7/2014 Bapat et al.
2014/0195244 A1 7/2014 Cha et al.
2014/0195251 A1 7/2014 Zeinstra et al.
2014/0195252 A1 7/2014 Gruber et al.
2014/0198048 A1 7/2014 Unruh et al.
2014/0200891 A1 7/2014 Larcheveque et al.
2014/0201655 A1 7/2014 Mahaffey et al.
2014/0203939 A1 7/2014 Harrington et al.
2014/0205076 A1 7/2014 Kumar et al.
2014/0207439 A1 7/2014 Venkatapathy et al.
2014/0207446 A1 7/2014 Klein et al.
2014/0207447 A1 7/2014 Jiang et al.
2014/0207466 A1 7/2014 Smadi
2014/0207468 A1 7/2014 Bartnik

(56) References Cited

U.S. PATENT DOCUMENTS

2014/0207582 A1 7/2014 Flinn et al.
2014/0211944 A1 7/2014 Hayward et al.
2014/0214429 A1 7/2014 Pantel
2014/0214537 A1 7/2014 Yoo et al.
2014/0215367 A1 7/2014 Kim et al.
2014/0215513 A1 7/2014 Ramer et al.
2014/0218372 A1 8/2014 Missig et al.
2014/0222422 A1 8/2014 Sarikaya et al.
2014/0222435 A1 8/2014 Li et al.
2014/0222436 A1 8/2014 Binder et al.
2014/0222678 A1 8/2014 Sheets et al.
2014/0222967 A1 8/2014 Harrang et al.
2014/0223377 A1 8/2014 Shaw et al.
2014/0223481 A1 8/2014 Fundament
2014/0223586 A1 8/2014 Berger et al.
2014/0226503 A1 8/2014 Cooper et al.
2014/0229158 A1 8/2014 Zweig et al.
2014/0229184 A1 8/2014 Shires
2014/0229847 A1 8/2014 Park
2014/0230055 A1 8/2014 Boehl
2014/0232570 A1 8/2014 Skinder et al.
2014/0232656 A1 8/2014 Pasquero et al.
2014/0236595 A1 8/2014 Gray
2014/0236986 A1 8/2014 Guzman
2014/0237042 A1 8/2014 Ahmed et al.
2014/0237366 A1 8/2014 Poulos et al.
2014/0244248 A1 8/2014 Arisoy et al.
2014/0244249 A1 8/2014 Mohamed et al.
2014/0244254 A1 8/2014 Ju et al.
2014/0244257 A1 8/2014 Colibro et al.
2014/0244258 A1 8/2014 Song et al.
2014/0244263 A1 8/2014 Pontual et al.
2014/0244266 A1 8/2014 Brown et al.
2014/0244268 A1 8/2014 Abdelsamie et al.
2014/0244270 A1 8/2014 Han et al.
2014/0244271 A1 8/2014 Lindahl
2014/0244712 A1 8/2014 Walters et al.
2014/0245140 A1 8/2014 Brown et al.
2014/0247383 A1 9/2014 Dave et al.
2014/0247926 A1 9/2014 Gainsboro et al.
2014/0249812 A1 9/2014 Bou-Ghazale et al.
2014/0249816 A1 9/2014 Pickering et al.
2014/0249817 A1 9/2014 Hart et al.
2014/0249820 A1 9/2014 Hsu et al.
2014/0249821 A1 9/2014 Kennewick et al.
2014/0250046 A1 9/2014 Winn et al.
2014/0253455 A1 9/2014 Mauro et al.
2014/0257809 A1 9/2014 Goel et al.
2014/0257815 A1 9/2014 Zhao et al.
2014/0257902 A1 9/2014 Moore et al.
2014/0258324 A1 9/2014 Mauro et al.
2014/0258357 A1 9/2014 Singh et al.
2014/0258857 A1 9/2014 Dykstra-Erickson et al.
2014/0258905 A1 9/2014 Lee et al.
2014/0267022 A1 9/2014 Kim
2014/0267599 A1 9/2014 Drouin et al.
2014/0267933 A1 9/2014 Young
2014/0272821 A1 9/2014 Pitschel et al.
2014/0273974 A1 9/2014 Varghese et al.
2014/0273979 A1 9/2014 Van Os et al.
2014/0274005 A1 9/2014 Luna et al.
2014/0274203 A1 9/2014 Ganong, III et al.
2014/0274211 A1 9/2014 Sejnoha et al.
2014/0278051 A1 9/2014 McGavran et al.
2014/0278343 A1 9/2014 Tran
2014/0278349 A1 9/2014 Grieves et al.
2014/0278379 A1 9/2014 Coccaro et al.
2014/0278390 A1 9/2014 Kingsbury et al.
2014/0278391 A1 9/2014 Braho et al.
2014/0278394 A1 9/2014 Bastyr et al.
2014/0278406 A1 9/2014 Tsumura et al.
2014/0278413 A1 9/2014 Pitschel et al.
2014/0278419 A1 9/2014 Bishop et al.
2014/0278426 A1 9/2014 Jost et al.
2014/0278429 A1 9/2014 Ganong, III
2014/0278435 A1 9/2014 Ganong, III et al.
2014/0278436 A1 9/2014 Khanna et al.
2014/0278438 A1 9/2014 Hart et al.
2014/0278443 A1 9/2014 Gunn et al.
2014/0278444 A1 9/2014 Larson et al.
2014/0278513 A1 9/2014 Prakash et al.
2014/0279622 A1 9/2014 Lamoureux et al.
2014/0279739 A1 9/2014 Elkington et al.
2014/0279787 A1 9/2014 Cheng et al.
2014/0280072 A1 9/2014 Coleman
2014/0280107 A1 9/2014 Heymans et al.
2014/0280138 A1 9/2014 Li et al.
2014/0280292 A1 9/2014 Skinder
2014/0280353 A1 9/2014 Delaney et al.
2014/0280450 A1 9/2014 Luna
2014/0280757 A1 9/2014 Tran
2014/0281944 A1 9/2014 Winer
2014/0281983 A1 9/2014 Xian et al.
2014/0281997 A1 9/2014 Fleizach et al.
2014/0282003 A1 9/2014 Gruber et al.
2014/0282007 A1 9/2014 Fleizach
2014/0282016 A1 9/2014 Hosier, Jr.
2014/0282045 A1 9/2014 Ayanam et al.
2014/0282178 A1 9/2014 Borzello et al.
2014/0282201 A1 9/2014 Pasquero et al.
2014/0282203 A1 9/2014 Pasquero et al.
2014/0282559 A1 9/2014 Verduzco et al.
2014/0282586 A1 9/2014 Shear et al.
2014/0282743 A1 9/2014 Howard et al.
2014/0283111 A1 9/2014 Dolph et al.
2014/0288990 A1 9/2014 Moore et al.
2014/0289508 A1 9/2014 Wang
2014/0297267 A1 10/2014 Spencer et al.
2014/0297281 A1 10/2014 Togawa et al.
2014/0297284 A1 10/2014 Gruber et al.
2014/0297288 A1 10/2014 Yu et al.
2014/0297296 A1 10/2014 Koppens et al.
2014/0297348 A1 10/2014 Ellis
2014/0298200 A1 10/2014 Cierniak
2014/0298395 A1 10/2014 Yang et al.
2014/0304086 A1 10/2014 Dasdan et al.
2014/0304605 A1 10/2014 Ohmura et al.
2014/0309990 A1 10/2014 Gandrabur et al.
2014/0309996 A1 10/2014 Zhang
2014/0310001 A1 10/2014 Kalns et al.
2014/0310002 A1 10/2014 Nitz et al.
2014/0310348 A1 10/2014 Keskitalo et al.
2014/0310365 A1 10/2014 Sample et al.
2014/0310595 A1 10/2014 Acharya et al.
2014/0313007 A1 10/2014 Harding
2014/0315492 A1 10/2014 Woods
2014/0316585 A1 10/2014 Boesveld et al.
2014/0316764 A1 10/2014 Ayan et al.
2014/0317030 A1 10/2014 Shen et al.
2014/0317502 A1 10/2014 Brown et al.
2014/0317578 A1 10/2014 Chaudhri
2014/0320398 A1 10/2014 Papstein
2014/0324429 A1 10/2014 Weilhammer et al.
2014/0324884 A1 10/2014 Lindahl et al.
2014/0330560 A1 11/2014 Venkatesha et al.
2014/0330569 A1 11/2014 Kolavennu et al.
2014/0330951 A1 11/2014 Sukoff et al.
2014/0335823 A1 11/2014 Heredia et al.
2014/0337037 A1 11/2014 Chi
2014/0337048 A1 11/2014 Brown et al.
2014/0337266 A1 11/2014 Wolverton et al.
2014/0337370 A1 11/2014 Aravamudan et al.
2014/0337371 A1 11/2014 Li
2014/0337438 A1 11/2014 Govande et al.
2014/0337621 A1 11/2014 Nakhimov
2014/0337751 A1 11/2014 Lim et al.
2014/0337814 A1 11/2014 Kalns et al.
2014/0341217 A1 11/2014 Eisner et al.
2014/0342762 A1 11/2014 Hajdu et al.
2014/0343834 A1 11/2014 Demerchant et al.
2014/0343943 A1 11/2014 Al-Telmissani
2014/0343946 A1 11/2014 Torok et al.
2014/0343950 A1 11/2014 Simpson et al.
2014/0344205 A1 11/2014 Luna et al.

(56) References Cited

U.S. PATENT DOCUMENTS

| | | | |
|---|---|---|---|
| 2014/0344627 | A1 | 11/2014 | Schaub et al. |
| 2014/0344687 | A1 | 11/2014 | Durham et al. |
| 2014/0344727 | A1 | 11/2014 | Chaudhry |
| 2014/0347181 | A1 | 11/2014 | Luna et al. |
| 2014/0350847 | A1 | 11/2014 | Ichinokawa |
| 2014/0350924 | A1 | 11/2014 | Zurek et al. |
| 2014/0350933 | A1 | 11/2014 | Bak et al. |
| 2014/0351268 | A1 | 11/2014 | Weskamp et al. |
| 2014/0351741 | A1 | 11/2014 | Medlock et al. |
| 2014/0351760 | A1 | 11/2014 | Skory et al. |
| 2014/0358519 | A1 | 12/2014 | Mirkin et al. |
| 2014/0358521 | A1 | 12/2014 | Mikutel et al. |
| 2014/0358523 | A1 | 12/2014 | Sheth et al. |
| 2014/0358549 | A1 | 12/2014 | O'Connor et al. |
| 2014/0359456 | A1 | 12/2014 | Thiele et al. |
| 2014/0359637 | A1 | 12/2014 | Yan |
| 2014/0359709 | A1 | 12/2014 | Nassar et al. |
| 2014/0361973 | A1 | 12/2014 | Raux et al. |
| 2014/0363074 | A1 | 12/2014 | Dolfing et al. |
| 2014/0364149 | A1 | 12/2014 | Marti et al. |
| 2014/0364171 | A1 | 12/2014 | Heiman et al. |
| 2014/0365209 | A1 | 12/2014 | Evermann |
| 2014/0365214 | A1 | 12/2014 | Bayley |
| 2014/0365216 | A1 | 12/2014 | Gruber et al. |
| 2014/0365218 | A1 | 12/2014 | Chang et al. |
| 2014/0365226 | A1 | 12/2014 | Sinha |
| 2014/0365227 | A1 | 12/2014 | Cash et al. |
| 2014/0365407 | A1 | 12/2014 | Brown et al. |
| 2014/0365505 | A1 | 12/2014 | Clark et al. |
| 2014/0365878 | A1 | 12/2014 | Dai et al. |
| 2014/0365880 | A1 | 12/2014 | Bellegarda |
| 2014/0365885 | A1 | 12/2014 | Carson et al. |
| 2014/0365895 | A1 | 12/2014 | Magahern et al. |
| 2014/0365912 | A1 | 12/2014 | Karunamuni et al. |
| 2014/0365922 | A1 | 12/2014 | Yang |
| 2014/0365945 | A1 | 12/2014 | Karunamuni et al. |
| 2014/0370817 | A1 | 12/2014 | Luna |
| 2014/0370841 | A1 | 12/2014 | Roberts et al. |
| 2014/0372112 | A1 | 12/2014 | Xue et al. |
| 2014/0372356 | A1 | 12/2014 | Bilal et al. |
| 2014/0372468 | A1 | 12/2014 | Collins et al. |
| 2014/0372931 | A1 | 12/2014 | Zhai et al. |
| 2014/0375683 | A1 | 12/2014 | Salter et al. |
| 2014/0379326 | A1 | 12/2014 | Sarikaya et al. |
| 2014/0379334 | A1 | 12/2014 | Fry |
| 2014/0379338 | A1 | 12/2014 | Fry |
| 2014/0379341 | A1 | 12/2014 | Seo et al. |
| 2014/0379798 | A1 | 12/2014 | Bunner et al. |
| 2014/0380214 | A1 | 12/2014 | Huang et al. |
| 2014/0380285 | A1 | 12/2014 | Gabel et al. |
| 2015/0001850 | A1 | 1/2015 | Jaw et al. |
| 2015/0003797 | A1 | 1/2015 | Schmidt |
| 2015/0004958 | A1 | 1/2015 | Wang et al. |
| 2015/0005009 | A1 | 1/2015 | Tomkins et al. |
| 2015/0006147 | A1 | 1/2015 | Schmidt |
| 2015/0006148 | A1 | 1/2015 | Goldszmit et al. |
| 2015/0006157 | A1 | 1/2015 | Silva et al. |
| 2015/0006167 | A1 | 1/2015 | Kato et al. |
| 2015/0006176 | A1 | 1/2015 | Pogue et al. |
| 2015/0006178 | A1 | 1/2015 | Peng et al. |
| 2015/0006182 | A1 | 1/2015 | Schmidt |
| 2015/0006184 | A1 | 1/2015 | Marti et al. |
| 2015/0006199 | A1 | 1/2015 | Snider et al. |
| 2015/0006564 | A1 | 1/2015 | Tomkins et al. |
| 2015/0012260 | A1 | 1/2015 | Chakladar |
| 2015/0012271 | A1 | 1/2015 | Peng et al. |
| 2015/0012862 | A1 | 1/2015 | Ikeda et al. |
| 2015/0019219 | A1 | 1/2015 | Tzirkel-Hancock et al. |
| 2015/0019220 | A1 | 1/2015 | Talhami et al. |
| 2015/0019221 | A1 | 1/2015 | Lee et al. |
| 2015/0019445 | A1 | 1/2015 | Glass et al. |
| 2015/0019944 | A1 | 1/2015 | Kalgi |
| 2015/0019954 | A1 | 1/2015 | Dalal et al. |
| 2015/0019974 | A1 | 1/2015 | Doi et al. |
| 2015/0025405 | A1 | 1/2015 | Vairavan et al. |
| 2015/0025890 | A1 | 1/2015 | Jagatheesan et al. |
| 2015/0026620 | A1 | 1/2015 | Kwon et al. |
| 2015/0027178 | A1 | 1/2015 | Scalisi |
| 2015/0031416 | A1 | 1/2015 | Labowicz et al. |
| 2015/0032443 | A1 | 1/2015 | Karov et al. |
| 2015/0032457 | A1 | 1/2015 | Koo et al. |
| 2015/0033130 | A1 | 1/2015 | Scheessele |
| 2015/0033219 | A1 | 1/2015 | Breiner et al. |
| 2015/0033275 | A1 | 1/2015 | Natani et al. |
| 2015/0034855 | A1 | 2/2015 | Shen |
| 2015/0038161 | A1 | 2/2015 | Jakobson et al. |
| 2015/0039292 | A1 | 2/2015 | Suleman et al. |
| 2015/0039295 | A1 | 2/2015 | Soschen |
| 2015/0039299 | A1 | 2/2015 | Weinstein et al. |
| 2015/0039305 | A1 | 2/2015 | Huang |
| 2015/0039606 | A1 | 2/2015 | Salaka et al. |
| 2015/0040012 | A1 | 2/2015 | Faaborg et al. |
| 2015/0042640 | A1 | 2/2015 | Algreatly |
| 2015/0045003 | A1 | 2/2015 | Vora et al. |
| 2015/0045007 | A1 | 2/2015 | Cash |
| 2015/0045068 | A1 | 2/2015 | Soffer et al. |
| 2015/0046375 | A1 | 2/2015 | Mandel et al. |
| 2015/0046434 | A1 | 2/2015 | Lim et al. |
| 2015/0046537 | A1 | 2/2015 | Rakib |
| 2015/0046828 | A1 | 2/2015 | Desai et al. |
| 2015/0049884 | A1 | 2/2015 | Ye |
| 2015/0050633 | A1 | 2/2015 | Christmas et al. |
| 2015/0050923 | A1 | 2/2015 | Tu et al. |
| 2015/0051754 | A1 | 2/2015 | Kwon et al. |
| 2015/0051901 | A1 | 2/2015 | Stonehouse et al. |
| 2015/0052128 | A1 | 2/2015 | Sharifi |
| 2015/0053779 | A1 | 2/2015 | Adamek et al. |
| 2015/0053781 | A1 | 2/2015 | Nelson et al. |
| 2015/0055879 | A1 | 2/2015 | Yang |
| 2015/0058013 | A1 | 2/2015 | Pakhomov et al. |
| 2015/0058018 | A1 | 2/2015 | Georges et al. |
| 2015/0058720 | A1 | 2/2015 | Smadja et al. |
| 2015/0058785 | A1 | 2/2015 | Ookawara |
| 2015/0062043 | A1 | 3/2015 | Kim et al. |
| 2015/0065149 | A1 | 3/2015 | Russell et al. |
| 2015/0065200 | A1 | 3/2015 | Namgung et al. |
| 2015/0066473 | A1 | 3/2015 | Jeong et al. |
| 2015/0066479 | A1 | 3/2015 | Pasupalak et al. |
| 2015/0066494 | A1 | 3/2015 | Salvador et al. |
| 2015/0066496 | A1 | 3/2015 | Deoras et al. |
| 2015/0066506 | A1 | 3/2015 | Romano et al. |
| 2015/0066516 | A1 | 3/2015 | Nishikawa et al. |
| 2015/0066817 | A1 | 3/2015 | Slayton et al. |
| 2015/0067485 | A1 | 3/2015 | Kim et al. |
| 2015/0067521 | A1 | 3/2015 | Heo et al. |
| 2015/0067819 | A1 | 3/2015 | Shribman et al. |
| 2015/0067822 | A1 | 3/2015 | Randall |
| 2015/0068069 | A1 | 3/2015 | Tran et al. |
| 2015/0070148 | A1 | 3/2015 | Cruz-Hernandez et al. |
| 2015/0070163 | A1 | 3/2015 | Bennett et al. |
| 2015/0071121 | A1 | 3/2015 | Patil et al. |
| 2015/0073788 | A1 | 3/2015 | Sak et al. |
| 2015/0073804 | A1 | 3/2015 | Senior et al. |
| 2015/0074524 | A1 | 3/2015 | Nicholson et al. |
| 2015/0074615 | A1 | 3/2015 | Han et al. |
| 2015/0081295 | A1 | 3/2015 | Yun et al. |
| 2015/0082180 | A1 | 3/2015 | Ames et al. |
| 2015/0082229 | A1 | 3/2015 | Ouyang et al. |
| 2015/0086174 | A1 | 3/2015 | Abecassis et al. |
| 2015/0088511 | A1 | 3/2015 | Bharadwaj et al. |
| 2015/0088514 | A1 | 3/2015 | Typrin |
| 2015/0088518 | A1 | 3/2015 | Kim et al. |
| 2015/0088522 | A1 | 3/2015 | Hendrickson et al. |
| 2015/0088523 | A1 | 3/2015 | Schuster |
| 2015/0088998 | A1 | 3/2015 | Isensee et al. |
| 2015/0092520 | A1 | 4/2015 | Robison et al. |
| 2015/0094834 | A1 | 4/2015 | Vega et al. |
| 2015/0095026 | A1 | 4/2015 | Bisani et al. |
| 2015/0095031 | A1 | 4/2015 | Conkie et al. |
| 2015/0095159 | A1 | 4/2015 | Kennewick et al. |
| 2015/0095268 | A1 | 4/2015 | Greenzeiger et al. |
| 2015/0095278 | A1 | 4/2015 | Flinn et al. |
| 2015/0095310 | A1 | 4/2015 | Beaurepaire |
| 2015/0100144 | A1 | 4/2015 | Lee et al. |

(56) References Cited

U.S. PATENT DOCUMENTS

2015/0100313 A1 4/2015 Sharma
2015/0100316 A1 4/2015 Williams et al.
2015/0100537 A1 4/2015 Grieves et al.
2015/0100983 A1 4/2015 Pan
2015/0106061 A1 4/2015 Yang et al.
2015/0106085 A1 4/2015 Lindahl
2015/0106093 A1 4/2015 Weeks et al.
2015/0106096 A1 4/2015 Toopran et al.
2015/0106737 A1 4/2015 Montoy-Wilson et al.
2015/0109191 A1 4/2015 Johnson et al.
2015/0112684 A1 4/2015 Scheffer et al.
2015/0113407 A1 4/2015 Hoffert et al.
2015/0113435 A1 4/2015 Phillips
2015/0113454 A1 4/2015 McLaughlin
2015/0120296 A1 4/2015 Stern et al.
2015/0120641 A1 4/2015 Soon-Shiong et al.
2015/0120723 A1 4/2015 Deshmukh et al.
2015/0121216 A1 4/2015 Brown et al.
2015/0121227 A1 4/2015 Peng
2015/0121305 A1 4/2015 Saund et al.
2015/0123898 A1 5/2015 Kim et al.
2015/0127336 A1 5/2015 Lei et al.
2015/0127337 A1 5/2015 Heigold et al.
2015/0127348 A1 5/2015 Follis
2015/0127350 A1 5/2015 Agiomyrgiannakis
2015/0128058 A1 5/2015 Anajwala
2015/0130716 A1 5/2015 Sridharan et al.
2015/0133049 A1 5/2015 Lee et al.
2015/0133109 A1 5/2015 Freeman et al.
2015/0134318 A1 5/2015 Cuthbert et al.
2015/0134322 A1 5/2015 Cuthbert et al.
2015/0134323 A1 5/2015 Cuthbert et al.
2015/0134334 A1 5/2015 Sachidanandam et al.
2015/0135085 A1 5/2015 Shoham et al.
2015/0135123 A1 5/2015 Carr et al.
2015/0140934 A1 5/2015 Abdurrahman et al.
2015/0140990 A1 5/2015 Kim et al.
2015/0141150 A1 5/2015 Zha
2015/0142420 A1 5/2015 Sarikaya et al.
2015/0142438 A1 5/2015 Dai et al.
2015/0142440 A1 5/2015 Parkinson et al.
2015/0142447 A1 5/2015 Kennewick et al.
2015/0142851 A1 5/2015 Gupta et al.
2015/0143281 A1 5/2015 Mehta et al.
2015/0143419 A1 5/2015 Bhagwat et al.
2015/0148013 A1 5/2015 Baldwin et al.
2015/0149146 A1 5/2015 Abramovitz et al.
2015/0149177 A1 5/2015 Kalns et al.
2015/0149182 A1 5/2015 Kalns et al.
2015/0149354 A1 5/2015 McCoy
2015/0149469 A1 5/2015 Xu et al.
2015/0149899 A1 5/2015 Bernstein et al.
2015/0149964 A1 5/2015 Bernstein et al.
2015/0154001 A1 6/2015 Knox et al.
2015/0154134 A1 6/2015 Beaumont et al.
2015/0154185 A1 6/2015 Waibel
2015/0154976 A1 6/2015 Mutagi
2015/0160635 A1 6/2015 Schofield et al.
2015/0160855 A1 6/2015 Bi
2015/0161108 A1 6/2015 Back
2015/0161291 A1 6/2015 Nadav et al.
2015/0161370 A1 6/2015 North et al.
2015/0161521 A1 6/2015 Shah et al.
2015/0161989 A1 6/2015 Hsu et al.
2015/0161997 A1 6/2015 Wetsel et al.
2015/0162000 A1 6/2015 Di Censo et al.
2015/0162001 A1 6/2015 Kar et al.
2015/0162006 A1 6/2015 Kummer
2015/0163558 A1 6/2015 Wheatley
2015/0169053 A1 6/2015 Bozarth et al.
2015/0169081 A1 6/2015 Neels et al.
2015/0169195 A1 6/2015 Choi
2015/0169284 A1 6/2015 Quast et al.
2015/0169336 A1 6/2015 Harper et al.
2015/0169696 A1 6/2015 Krishnappa et al.
2015/0170073 A1 6/2015 Baker
2015/0170657 A1 6/2015 Thompson et al.
2015/0170664 A1 6/2015 Doherty et al.
2015/0172262 A1 6/2015 Ortiz, Jr. et al.
2015/0172463 A1 6/2015 Quast et al.
2015/0177945 A1 6/2015 Sengupta et al.
2015/0178388 A1 6/2015 Winnemoeller et al.
2015/0178785 A1 6/2015 Salonen
2015/0179168 A1 6/2015 Hakkani-Tur et al.
2015/0179176 A1 6/2015 Ryu et al.
2015/0181285 A1 6/2015 Zhang et al.
2015/0185718 A1 7/2015 Tappan et al.
2015/0185964 A1 7/2015 Stout
2015/0185993 A1 7/2015 Wheatley et al.
2015/0185996 A1 7/2015 Brown et al.
2015/0186012 A1 7/2015 Coleman et al.
2015/0186110 A1 7/2015 Kannan
2015/0186154 A1 7/2015 Brown et al.
2015/0186155 A1 7/2015 Brown et al.
2015/0186156 A1 7/2015 Brown et al.
2015/0186351 A1 7/2015 Hicks et al.
2015/0186538 A1 7/2015 Yan et al.
2015/0186783 A1 7/2015 Byrne et al.
2015/0186892 A1 7/2015 Zhang et al.
2015/0187355 A1 7/2015 Parkinson et al.
2015/0187369 A1 7/2015 Dadu et al.
2015/0189362 A1 7/2015 Lee et al.
2015/0189425 A1 7/2015 Pang
2015/0193005 A1 7/2015 Di et al.
2015/0193018 A1 7/2015 Venable et al.
2015/0193379 A1 7/2015 Mehta
2015/0193391 A1 7/2015 Khvostichenko et al.
2015/0193392 A1 7/2015 Greenblatt et al.
2015/0194152 A1 7/2015 Katuri et al.
2015/0194165 A1 7/2015 Faaborg et al.
2015/0194187 A1 7/2015 Cleven et al.
2015/0195379 A1 7/2015 Zhang et al.
2015/0195606 A1 7/2015 McDevitt
2015/0199077 A1 7/2015 Zuger et al.
2015/0199960 A1 7/2015 Huo et al.
2015/0199965 A1 7/2015 Leak et al.
2015/0199967 A1 7/2015 Reddy et al.
2015/0200879 A1 7/2015 Wu et al.
2015/0201064 A1 7/2015 Bells et al.
2015/0201077 A1 7/2015 Konig et al.
2015/0205425 A1 7/2015 Kuscher et al.
2015/0205568 A1 7/2015 Matsuoka
2015/0205632 A1 7/2015 Gaster
2015/0205858 A1 7/2015 Xie et al.
2015/0206529 A1 7/2015 Kwon et al.
2015/0208226 A1 7/2015 Kuusilinna et al.
2015/0212791 A1 7/2015 Kumar et al.
2015/0213140 A1 7/2015 Volkert
2015/0213796 A1 7/2015 Waltermann et al.
2015/0215258 A1 7/2015 Nowakowski et al.
2015/0215350 A1 7/2015 Slayton et al.
2015/0217870 A1 8/2015 Mccullough et al.
2015/0220264 A1 8/2015 Lewis et al.
2015/0220507 A1 8/2015 Mohajer et al.
2015/0220715 A1 8/2015 Kim et al.
2015/0220972 A1 8/2015 Subramanya et al.
2015/0221302 A1 8/2015 Han et al.
2015/0221304 A1 8/2015 Stewart
2015/0221307 A1 8/2015 Shah et al.
2015/0222586 A1 8/2015 Ebersman et al.
2015/0224848 A1 8/2015 Eisenhour
2015/0227505 A1 8/2015 Morimoto
2015/0227633 A1 8/2015 Shapira
2015/0228274 A1 8/2015 Leppanen et al.
2015/0228275 A1 8/2015 Watanabe et al.
2015/0228279 A1 8/2015 Biadsy et al.
2015/0228281 A1 8/2015 Raniere
2015/0228282 A1 8/2015 Evrard
2015/0228283 A1 8/2015 Ehsani et al.
2015/0228292 A1 8/2015 Goldstein et al.
2015/0230022 A1 8/2015 Sakai et al.
2015/0230095 A1 8/2015 Smith et al.
2015/0234556 A1 8/2015 Shaofeng et al.
2015/0234636 A1 8/2015 Barnes, Jr.

(56) References Cited

U.S. PATENT DOCUMENTS

2015/0234800 A1 8/2015 Patrick et al.
2015/0242088 A1 8/2015 Hasumi
2015/0249664 A1 9/2015 Talhami et al.
2015/0261758 A1 9/2015 Sharp et al.
2015/0262458 A1 9/2015 Faaborg et al.
2015/0268719 A1 9/2015 Li
2015/0269617 A1 9/2015 Mikurak
2015/0269677 A1 9/2015 Milne
2015/0269943 A1 9/2015 VanBlon et al.
2015/0277574 A1 10/2015 Jain et al.
2015/0278192 A1 10/2015 Bretter et al.
2015/0278199 A1 10/2015 Hazen et al.
2015/0278348 A1 10/2015 Paruchuri et al.
2015/0278370 A1 10/2015 Stratvert et al.
2015/0278737 A1 10/2015 Huebscher et al.
2015/0279354 A1 10/2015 Gruenstein et al.
2015/0279358 A1 10/2015 Kingsbury et al.
2015/0279360 A1 10/2015 Mengibar et al.
2015/0279366 A1 10/2015 Krestnikov et al.
2015/0281380 A1 10/2015 Wang et al.
2015/0281401 A1 10/2015 Le et al.
2015/0286627 A1 10/2015 Chang et al.
2015/0286710 A1 10/2015 Chang et al.
2015/0286716 A1 10/2015 Snibbe et al.
2015/0286937 A1 10/2015 Hildebrand
2015/0287401 A1 10/2015 Lee et al.
2015/0287408 A1 10/2015 Svendsen et al.
2015/0287409 A1 10/2015 Jang
2015/0287411 A1 10/2015 Kojima et al.
2015/0288629 A1 10/2015 Choi et al.
2015/0293602 A1 10/2015 Kay et al.
2015/0294086 A1 10/2015 Kare et al.
2015/0294377 A1 10/2015 Chow
2015/0294516 A1 10/2015 Chiang
2015/0294670 A1 10/2015 Roblek et al.
2015/0295915 A1 10/2015 Xiu
2015/0296065 A1 10/2015 Narita et al.
2015/0300832 A1 10/2015 Moore et al.
2015/0301796 A1 10/2015 Visser et al.
2015/0302316 A1 10/2015 Buryak et al.
2015/0302855 A1 10/2015 Kim et al.
2015/0302856 A1 10/2015 Kim et al.
2015/0302857 A1 10/2015 Yamada
2015/0302870 A1 10/2015 Burke et al.
2015/0308470 A1 10/2015 Graham et al.
2015/0309691 A1 10/2015 Seo et al.
2015/0309997 A1 10/2015 Lee et al.
2015/0310114 A1 10/2015 Ryger et al.
2015/0310852 A1 10/2015 Spizzo et al.
2015/0310858 A1 10/2015 Li et al.
2015/0310862 A1 10/2015 Dauphin et al.
2015/0310879 A1 10/2015 Buchanan et al.
2015/0310888 A1 10/2015 Chen
2015/0312182 A1 10/2015 Langholz
2015/0312409 A1 10/2015 Czarnecki et al.
2015/0312523 A1 10/2015 Li et al.
2015/0314454 A1 11/2015 Breazeal et al.
2015/0317069 A1 11/2015 Clements et al.
2015/0317310 A1 11/2015 Eiche et al.
2015/0319264 A1 11/2015 Allen et al.
2015/0319411 A1 11/2015 Kasmir et al.
2015/0324041 A1 11/2015 Varley et al.
2015/0324334 A1 11/2015 Lee et al.
2015/0324362 A1 11/2015 Glass et al.
2015/0325235 A1 11/2015 Levit et al.
2015/0331664 A1 11/2015 Osawa et al.
2015/0331711 A1 11/2015 Huang et al.
2015/0331728 A1 11/2015 Kim et al.
2015/0332667 A1 11/2015 Mason
2015/0334346 A1 11/2015 Cheatham, III et al.
2015/0339049 A1 11/2015 Kasemset et al.
2015/0339391 A1 11/2015 Kang et al.
2015/0340033 A1 11/2015 Di Fabbrizio et al.
2015/0340034 A1 11/2015 Schalkwyk et al.
2015/0340040 A1 11/2015 Mun et al.
2015/0340042 A1 11/2015 Sejnoha et al.
2015/0341717 A1 11/2015 Song et al.
2015/0346845 A1 12/2015 Di Censo et al.
2015/0347086 A1 12/2015 Liedholm et al.
2015/0347381 A1 12/2015 Bellegarda
2015/0347382 A1 12/2015 Dolfing et al.
2015/0347383 A1 12/2015 Willmore et al.
2015/0347385 A1 12/2015 Flor et al.
2015/0347393 A1 12/2015 Futrell et al.
2015/0347552 A1 12/2015 Habouzit et al.
2015/0347733 A1 12/2015 Tsou et al.
2015/0347985 A1 12/2015 Gross et al.
2015/0348533 A1 12/2015 Saddler et al.
2015/0348547 A1 12/2015 Paulik et al.
2015/0348548 A1 12/2015 Piernot et al.
2015/0348549 A1 12/2015 Giuli et al.
2015/0348551 A1 12/2015 Gruber et al.
2015/0348554 A1 12/2015 Orr et al.
2015/0348555 A1 12/2015 Sugita
2015/0348565 A1 12/2015 Rhoten et al.
2015/0349934 A1 12/2015 Pollack et al.
2015/0350031 A1 12/2015 Burks et al.
2015/0350147 A1 12/2015 Shepherd et al.
2015/0350342 A1 12/2015 Thorpe et al.
2015/0350594 A1 12/2015 Mate et al.
2015/0350771 A1 12/2015 Konchitsky
2015/0352999 A1 12/2015 Bando et al.
2015/0355879 A1 12/2015 Beckhardt et al.
2015/0356410 A1 12/2015 Faith et al.
2015/0363587 A1 12/2015 Ahn et al.
2015/0364128 A1 12/2015 Zhao et al.
2015/0364140 A1 12/2015 Thorn
2015/0365251 A1 12/2015 Kinoshita et al.
2015/0365448 A1 12/2015 Stifelman et al.
2015/0370455 A1 12/2015 Van Os et al.
2015/0370531 A1 12/2015 Faaborg
2015/0370780 A1 12/2015 Wang et al.
2015/0370787 A1 12/2015 Akbacak et al.
2015/0370884 A1 12/2015 Hurley et al.
2015/0371215 A1 12/2015 Zhou et al.
2015/0371529 A1 12/2015 Dolecki
2015/0371639 A1 12/2015 Foerster et al.
2015/0371663 A1 12/2015 Gustafson et al.
2015/0371664 A1 12/2015 Bar-Or et al.
2015/0371665 A1 12/2015 Naik et al.
2015/0373183 A1 12/2015 Woolsey et al.
2015/0373428 A1 12/2015 Trollope et al.
2015/0379118 A1 12/2015 Wickenkamp et al.
2015/0379414 A1 12/2015 Yeh et al.
2015/0379423 A1 12/2015 Dirac et al.
2015/0379993 A1 12/2015 Subhojit et al.
2015/0381923 A1 12/2015 Wickenkamp et al.
2015/0382047 A1 12/2015 Van Os et al.
2015/0382079 A1 12/2015 Lister et al.
2015/0382147 A1 12/2015 Clark et al.
2015/0382164 A1 12/2015 Chung et al.
2015/0382322 A1 12/2015 Migicovsky et al.
2016/0004499 A1 1/2016 Kim et al.
2016/0004690 A1 1/2016 Bangalore et al.
2016/0005320 A1 1/2016 DeCharms et al.
2016/0006795 A1 1/2016 Yunten
2016/0012038 A1 1/2016 Edwards et al.
2016/0014476 A1 1/2016 Caliendo, Jr. et al.
2016/0018872 A1 1/2016 Tu et al.
2016/0018899 A1 1/2016 Tu et al.
2016/0018900 A1 1/2016 Tu et al.
2016/0018959 A1 1/2016 Yamashita et al.
2016/0019886 A1 1/2016 Hong
2016/0019896 A1 1/2016 Guevara et al.
2016/0021168 A1 1/2016 Chaudhri et al.
2016/0021414 A1 1/2016 Padi et al.
2016/0026242 A1 1/2016 Burns et al.
2016/0026258 A1 1/2016 Ou et al.
2016/0027431 A1 1/2016 Kurzweil et al.
2016/0027439 A1 1/2016 Sharifi
2016/0028666 A1 1/2016 Li
2016/0028802 A1 1/2016 Balasingh et al.
2016/0029316 A1 1/2016 Mohan et al.
2016/0034042 A1 2/2016 Joo

(56) References Cited

U.S. PATENT DOCUMENTS

2016/0034253 A1 2/2016 Bang et al.
2016/0034447 A1 2/2016 Shin et al.
2016/0034811 A1 2/2016 Paulik et al.
2016/0036750 A1 2/2016 Yuan et al.
2016/0036953 A1 2/2016 Lee et al.
2016/0041733 A1 2/2016 Qian et al.
2016/0041809 A1 2/2016 Clayton et al.
2016/0042735 A1 2/2016 Vibbert et al.
2016/0042748 A1 2/2016 Jain et al.
2016/0043905 A1 2/2016 Fiedler
2016/0048666 A1 2/2016 Dey et al.
2016/0050254 A1 2/2016 Rao et al.
2016/0055422 A1 2/2016 Li
2016/0057203 A1 2/2016 Gardenfors et al.
2016/0057475 A1 2/2016 Liu
2016/0061623 A1 3/2016 Pahwa et al.
2016/0062459 A1 3/2016 Publicover et al.
2016/0062605 A1 3/2016 Agarwal et al.
2016/0063094 A1 3/2016 Udupa et al.
2016/0063095 A1 3/2016 Nassar et al.
2016/0063998 A1 3/2016 Krishnamoorthy et al.
2016/0065155 A1 3/2016 Bharj et al.
2016/0065626 A1 3/2016 Jain et al.
2016/0066020 A1 3/2016 Mountain
2016/0066360 A1 3/2016 Vinegrad et al.
2016/0070581 A1 3/2016 Soon-Shiong
2016/0071510 A1 3/2016 Li et al.
2016/0071516 A1 3/2016 Lee et al.
2016/0071517 A1 3/2016 Beaver et al.
2016/0071520 A1 3/2016 Hayakawa
2016/0071521 A1 3/2016 Haughay
2016/0072940 A1 3/2016 Cronin
2016/0077794 A1 3/2016 Kim et al.
2016/0078359 A1 3/2016 Csurka et al.
2016/0078860 A1 3/2016 Paulik et al.
2016/0080165 A1 3/2016 Ehsani et al.
2016/0080475 A1 3/2016 Singh et al.
2016/0085295 A1 3/2016 Shimy et al.
2016/0085827 A1 3/2016 Chadha et al.
2016/0086116 A1 3/2016 Rao et al.
2016/0086599 A1 3/2016 Kurata et al.
2016/0088335 A1 3/2016 Zucchetta
2016/0091871 A1 3/2016 Marti et al.
2016/0091967 A1 3/2016 Prokofieva et al.
2016/0092046 A1 3/2016 Hong et al.
2016/0092074 A1 3/2016 Raux et al.
2016/0092434 A1 3/2016 Bellegarda
2016/0092447 A1 3/2016 Pathurudeen et al.
2016/0092766 A1 3/2016 Sainath et al.
2016/0093291 A1 3/2016 Kim
2016/0093298 A1 3/2016 Naik et al.
2016/0093301 A1 3/2016 Bellegarda et al.
2016/0093304 A1 3/2016 Kim et al.
2016/0094700 A1 3/2016 Lee et al.
2016/0094889 A1 3/2016 Venkataraman et al.
2016/0094979 A1 3/2016 Naik et al.
2016/0098991 A1 4/2016 Luo et al.
2016/0098992 A1 4/2016 Renard et al.
2016/0099892 A1 4/2016 Palakovich et al.
2016/0099984 A1 4/2016 Karagiannis et al.
2016/0103830 A1 4/2016 Cheong et al.
2016/0104480 A1 4/2016 Sharifi
2016/0104486 A1 4/2016 Penilla et al.
2016/0105308 A1 4/2016 Dutt
2016/0111091 A1 4/2016 Bakish
2016/0112746 A1 4/2016 Zhang et al.
2016/0112792 A1 4/2016 Lee et al.
2016/0116980 A1 4/2016 George-Svahn et al.
2016/0117386 A1 4/2016 Ajmera et al.
2016/0118048 A1 4/2016 Heide
2016/0119338 A1 4/2016 Cheyer
2016/0125048 A1 5/2016 Hamada
2016/0125071 A1 5/2016 Gabbai
2016/0132046 A1 5/2016 Beoughter et al.
2016/0132290 A1 5/2016 Raux
2016/0132484 A1 5/2016 Nauze et al.
2016/0132488 A1 5/2016 Clark et al.
2016/0133254 A1 5/2016 Vogel et al.
2016/0139662 A1 5/2016 Dabhade
2016/0139720 A1 5/2016 Kritt et al.
2016/0140113 A1 5/2016 Shen
2016/0140951 A1 5/2016 Agiomyrgiannakis et al.
2016/0140962 A1 5/2016 Sharifi
2016/0147725 A1 5/2016 Patten et al.
2016/0147739 A1 5/2016 Lim et al.
2016/0148610 A1 5/2016 Kennewick, Jr. et al.
2016/0148612 A1 5/2016 Guo et al.
2016/0148613 A1 5/2016 Kwon et al.
2016/0149966 A1 5/2016 Remash et al.
2016/0150020 A1 5/2016 Farmer et al.
2016/0151668 A1 6/2016 Barnes et al.
2016/0154624 A1 6/2016 Son et al.
2016/0154792 A1 6/2016 Sarikaya et al.
2016/0154880 A1 6/2016 Hoarty
2016/0155442 A1 6/2016 Kannan et al.
2016/0155443 A1 6/2016 Khan et al.
2016/0156574 A1 6/2016 Hum et al.
2016/0156990 A1 6/2016 Miccoy et al.
2016/0162456 A1 6/2016 Munro et al.
2016/0163311 A1 6/2016 Crook et al.
2016/0163312 A1 6/2016 Naik et al.
2016/0165296 A1 6/2016 Hamon
2016/0169267 A1 6/2016 Pool
2016/0170710 A1 6/2016 Kim et al.
2016/0170966 A1 6/2016 Kolo
2016/0171980 A1 6/2016 Liddell et al.
2016/0173578 A1 6/2016 Sharma et al.
2016/0173617 A1 6/2016 Allinson
2016/0173929 A1 6/2016 Klappert
2016/0173960 A1 6/2016 Snibbe et al.
2016/0179462 A1 6/2016 Bjorkengren
2016/0179464 A1 6/2016 Reddy et al.
2016/0179787 A1 6/2016 Deleeuw
2016/0180840 A1 6/2016 Siddiq et al.
2016/0180844 A1 6/2016 Vanblon et al.
2016/0182410 A1 6/2016 Janakiraman et al.
2016/0182709 A1 6/2016 Kim et al.
2016/0188181 A1 6/2016 Smith
2016/0188738 A1 6/2016 Gruber et al.
2016/0189198 A1 6/2016 Daniel et al.
2016/0189706 A1 6/2016 Zopf et al.
2016/0189715 A1 6/2016 Nishikawa
2016/0189717 A1 6/2016 Kannan et al.
2016/0195924 A1 7/2016 Weber et al.
2016/0196110 A1 7/2016 Yehoshua et al.
2016/0198319 A1 7/2016 Huang et al.
2016/0202957 A1 7/2016 Siddall et al.
2016/0203002 A1 7/2016 Kannan et al.
2016/0203193 A1 7/2016 Kevin et al.
2016/0210115 A1 7/2016 Lee
2016/0210551 A1 7/2016 Lee et al.
2016/0210981 A1 7/2016 Lee
2016/0212206 A1 7/2016 Wu et al.
2016/0212208 A1 7/2016 Kulkarni et al.
2016/0212488 A1 7/2016 Os et al.
2016/0217784 A1 7/2016 Gelfenbeyn et al.
2016/0217794 A1 7/2016 Imoto et al.
2016/0224540 A1 8/2016 Stewart et al.
2016/0224559 A1 8/2016 Hicks et al.
2016/0224774 A1 8/2016 Pender
2016/0225372 A1 8/2016 Cheung et al.
2016/0226713 A1 8/2016 Pitschel et al.
2016/0226956 A1 8/2016 Hong et al.
2016/0227107 A1 8/2016 Beaumont
2016/0227633 A1 8/2016 Sun et al.
2016/0232500 A1 8/2016 Wang et al.
2016/0234206 A1 8/2016 Tunnell et al.
2016/0234553 A1 8/2016 Hampson et al.
2016/0239480 A1 8/2016 Larcheveque et al.
2016/0239568 A1 8/2016 Packer et al.
2016/0239645 A1 8/2016 Heo et al.
2016/0239848 A1 8/2016 Chang et al.
2016/0240187 A1 8/2016 Fleizach et al.
2016/0240189 A1 8/2016 Lee et al.

(56) References Cited

U.S. PATENT DOCUMENTS

| | | | |
|---|---|---|---|
| 2016/0240192 | A1 | 8/2016 | Raghuvir |
| 2016/0242148 | A1 | 8/2016 | Reed |
| 2016/0246776 | A1 | 8/2016 | Zhao et al. |
| 2016/0247061 | A1 | 8/2016 | Trask et al. |
| 2016/0247110 | A1 | 8/2016 | Sinha |
| 2016/0249319 | A1 | 8/2016 | Dotan-Cohen et al. |
| 2016/0252972 | A1 | 9/2016 | Kim et al. |
| 2016/0253312 | A1 | 9/2016 | Rhodes |
| 2016/0253528 | A1 | 9/2016 | Gao et al. |
| 2016/0255549 | A1 | 9/2016 | Lakhdhar et al. |
| 2016/0259623 | A1 | 9/2016 | Sumner et al. |
| 2016/0259656 | A1 | 9/2016 | Sumner et al. |
| 2016/0259779 | A1 | 9/2016 | Labsky et al. |
| 2016/0260130 | A1 | 9/2016 | Chand et al. |
| 2016/0260431 | A1 | 9/2016 | Newendorp et al. |
| 2016/0260433 | A1 | 9/2016 | Sumner et al. |
| 2016/0260434 | A1 | 9/2016 | Gelfenbeyn et al. |
| 2016/0260436 | A1 | 9/2016 | Lemay et al. |
| 2016/0262442 | A1 | 9/2016 | Davila et al. |
| 2016/0266653 | A1 | 9/2016 | Liu et al. |
| 2016/0266871 | A1 | 9/2016 | Schmid et al. |
| 2016/0267904 | A1 | 9/2016 | Biadsy et al. |
| 2016/0269540 | A1 | 9/2016 | Butcher et al. |
| 2016/0274938 | A1 | 9/2016 | Strinati et al. |
| 2016/0275941 | A1 | 9/2016 | Bellegarda et al. |
| 2016/0275947 | A1 | 9/2016 | Li et al. |
| 2016/0282824 | A1 | 9/2016 | Smallwood et al. |
| 2016/0282956 | A1 | 9/2016 | Ouyang et al. |
| 2016/0283055 | A1 | 9/2016 | Haghighat et al. |
| 2016/0283185 | A1 | 9/2016 | McLaren et al. |
| 2016/0283455 | A1 | 9/2016 | Mardanbegi et al. |
| 2016/0283463 | A1 | 9/2016 | Sumesh et al. |
| 2016/0284005 | A1 | 9/2016 | Daniel et al. |
| 2016/0284199 | A1 | 9/2016 | Dotan-Cohen et al. |
| 2016/0284340 | A1 | 9/2016 | Li et al. |
| 2016/0284350 | A1 | 9/2016 | Yun et al. |
| 2016/0285808 | A1 | 9/2016 | Franklin et al. |
| 2016/0286045 | A1 | 9/2016 | Shaltiel et al. |
| 2016/0291831 | A1 | 10/2016 | Baek |
| 2016/0292603 | A1 | 10/2016 | Prajapati et al. |
| 2016/0293157 | A1 | 10/2016 | Chen et al. |
| 2016/0293167 | A1 | 10/2016 | Chen et al. |
| 2016/0293168 | A1 | 10/2016 | Chen |
| 2016/0294755 | A1 | 10/2016 | Prabhu |
| 2016/0294813 | A1 | 10/2016 | Zou |
| 2016/0299685 | A1 | 10/2016 | Zhai et al. |
| 2016/0299882 | A1 | 10/2016 | Hegerty et al. |
| 2016/0299883 | A1 | 10/2016 | Zhu et al. |
| 2016/0299977 | A1 | 10/2016 | Hreha |
| 2016/0300571 | A1 | 10/2016 | Foerster et al. |
| 2016/0301639 | A1 | 10/2016 | Liu et al. |
| 2016/0306683 | A1 | 10/2016 | Standley et al. |
| 2016/0306800 | A1 | 10/2016 | Son et al. |
| 2016/0307566 | A1 | 10/2016 | Bellegarda |
| 2016/0308794 | A1 | 10/2016 | Kim et al. |
| 2016/0308799 | A1 | 10/2016 | Schubert et al. |
| 2016/0309035 | A1 | 10/2016 | Li |
| 2016/0313906 | A1 | 10/2016 | Kilchenko et al. |
| 2016/0313958 | A1 | 10/2016 | Guadarrama et al. |
| 2016/0314341 | A1 | 10/2016 | Maranzana et al. |
| 2016/0314788 | A1 | 10/2016 | Jitkoff et al. |
| 2016/0314789 | A1 | 10/2016 | Marcheret et al. |
| 2016/0314792 | A1 | 10/2016 | Alvarez et al. |
| 2016/0315996 | A1 | 10/2016 | Ha et al. |
| 2016/0316349 | A1 | 10/2016 | Lee et al. |
| 2016/0317924 | A1 | 11/2016 | Tanaka et al. |
| 2016/0320838 | A1 | 11/2016 | Teller et al. |
| 2016/0321239 | A1 | 11/2016 | Iso-Sipila et al. |
| 2016/0321243 | A1 | 11/2016 | Walia et al. |
| 2016/0321261 | A1 | 11/2016 | Spasojevic et al. |
| 2016/0321358 | A1 | 11/2016 | Kanani et al. |
| 2016/0322043 | A1 | 11/2016 | Bellegarda |
| 2016/0322044 | A1 | 11/2016 | Jung et al. |
| 2016/0322045 | A1 | 11/2016 | Hatfield et al. |
| 2016/0322048 | A1 | 11/2016 | Amano et al. |
| 2016/0322050 | A1 | 11/2016 | Wang et al. |
| 2016/0322055 | A1 | 11/2016 | Sainath et al. |
| 2016/0328134 | A1 | 11/2016 | Xu |
| 2016/0328147 | A1 | 11/2016 | Zhang et al. |
| 2016/0328205 | A1 | 11/2016 | Agrawal et al. |
| 2016/0328893 | A1 | 11/2016 | Cordova et al. |
| 2016/0329060 | A1 | 11/2016 | Ito et al. |
| 2016/0334973 | A1 | 11/2016 | Reckhow et al. |
| 2016/0335138 | A1 | 11/2016 | Surti et al. |
| 2016/0335139 | A1 | 11/2016 | Hurley et al. |
| 2016/0335532 | A1 | 11/2016 | Sanghavi et al. |
| 2016/0336006 | A1 | 11/2016 | Levit et al. |
| 2016/0336007 | A1 | 11/2016 | Hanazawa et al. |
| 2016/0336010 | A1 | 11/2016 | Lindahl |
| 2016/0336011 | A1 | 11/2016 | Koll et al. |
| 2016/0336024 | A1 | 11/2016 | Choi et al. |
| 2016/0337299 | A1 | 11/2016 | Lane et al. |
| 2016/0337301 | A1 | 11/2016 | Rollins et al. |
| 2016/0342317 | A1 | 11/2016 | Lim et al. |
| 2016/0342685 | A1 | 11/2016 | Basu et al. |
| 2016/0342781 | A1 | 11/2016 | Jeon |
| 2016/0342803 | A1 | 11/2016 | Goodridge et al. |
| 2016/0350070 | A1 | 12/2016 | Sung et al. |
| 2016/0350650 | A1 | 12/2016 | Leeman-Munk et al. |
| 2016/0350812 | A1 | 12/2016 | Priness et al. |
| 2016/0351190 | A1 | 12/2016 | Piernot et al. |
| 2016/0352567 | A1 | 12/2016 | Robbins et al. |
| 2016/0352924 | A1 | 12/2016 | Senarath et al. |
| 2016/0357304 | A1 | 12/2016 | Hatori et al. |
| 2016/0357362 | A1 | 12/2016 | Gauci et al. |
| 2016/0357507 | A1 | 12/2016 | Decker et al. |
| 2016/0357509 | A1 | 12/2016 | Alsina et al. |
| 2016/0357728 | A1 | 12/2016 | Bellegarda et al. |
| 2016/0357790 | A1 | 12/2016 | Elkington et al. |
| 2016/0357861 | A1 | 12/2016 | Carlhian et al. |
| 2016/0357870 | A1 | 12/2016 | Hentschel et al. |
| 2016/0358180 | A1 | 12/2016 | Van Os et al. |
| 2016/0358598 | A1 | 12/2016 | Williams et al. |
| 2016/0358600 | A1 | 12/2016 | Nallasamy et al. |
| 2016/0358603 | A1 | 12/2016 | Azam et al. |
| 2016/0358605 | A1 | 12/2016 | Ganong et al. |
| 2016/0358609 | A1 | 12/2016 | Connell et al. |
| 2016/0358619 | A1 | 12/2016 | Ramprashad et al. |
| 2016/0359771 | A1 | 12/2016 | Sridhar |
| 2016/0360039 | A1 | 12/2016 | Sanghavi et al. |
| 2016/0360336 | A1 | 12/2016 | Gross et al. |
| 2016/0360382 | A1 | 12/2016 | Gross et al. |
| 2016/0364378 | A1 | 12/2016 | Futrell et al. |
| 2016/0364382 | A1 | 12/2016 | Sarikaya |
| 2016/0365101 | A1 | 12/2016 | Foy et al. |
| 2016/0371054 | A1 | 12/2016 | Beaumont et al. |
| 2016/0371250 | A1 | 12/2016 | Rhodes |
| 2016/0372112 | A1 | 12/2016 | Miller et al. |
| 2016/0372119 | A1 | 12/2016 | Sak et al. |
| 2016/0373571 | A1 | 12/2016 | Woolsey et al. |
| 2016/0378080 | A1 | 12/2016 | Uppala et al. |
| 2016/0378210 | A1 | 12/2016 | Shi |
| 2016/0378747 | A1 | 12/2016 | Orr et al. |
| 2016/0379091 | A1 | 12/2016 | Lin et al. |
| 2016/0379105 | A1 | 12/2016 | Moore, Jr. |
| 2016/0379626 | A1 | 12/2016 | Deisher et al. |
| 2016/0379632 | A1 | 12/2016 | Hoffmeister et al. |
| 2016/0379633 | A1 | 12/2016 | Lehman et al. |
| 2016/0379639 | A1 | 12/2016 | Weinstein et al. |
| 2016/0379641 | A1 | 12/2016 | Liu et al. |
| 2017/0000348 | A1 | 1/2017 | Karsten et al. |
| 2017/0003931 | A1 | 1/2017 | Dvortsov et al. |
| 2017/0004209 | A1 | 1/2017 | Johl et al. |
| 2017/0004409 | A1 | 1/2017 | Chu et al. |
| 2017/0004824 | A1 | 1/2017 | Yoo et al. |
| 2017/0005818 | A1 | 1/2017 | Gould |
| 2017/0006329 | A1 | 1/2017 | Jang et al. |
| 2017/0011091 | A1 | 1/2017 | Chehreghani |
| 2017/0011279 | A1 | 1/2017 | Soldevila et al. |
| 2017/0011303 | A1 | 1/2017 | Annapureddy et al. |
| 2017/0011742 | A1 | 1/2017 | Jing et al. |
| 2017/0013124 | A1 | 1/2017 | Havelka et al. |
| 2017/0013331 | A1 | 1/2017 | Watanabe et al. |
| 2017/0018271 | A1 | 1/2017 | Khan et al. |

(56) References Cited

U.S. PATENT DOCUMENTS

2017/0019987 A1 1/2017 Dragone et al.
2017/0023963 A1 1/2017 Davis et al.
2017/0024398 A1 1/2017 Tomkins et al.
2017/0025124 A1 1/2017 Mixter et al.
2017/0026318 A1 1/2017 Daniel et al.
2017/0026509 A1 1/2017 Rand
2017/0026705 A1 1/2017 Yeh et al.
2017/0027522 A1 2/2017 Van Hasselt et al.
2017/0031576 A1 2/2017 Saoji et al.
2017/0031711 A1 2/2017 Wu et al.
2017/0032022 A1 2/2017 Srinivasan et al.
2017/0032440 A1 2/2017 Paton
2017/0032783 A1 2/2017 Lord et al.
2017/0032787 A1 2/2017 Dayal
2017/0032791 A1 2/2017 Elson et al.
2017/0034087 A1 2/2017 Borenstein et al.
2017/0039283 A1 2/2017 Bennett et al.
2017/0039475 A1 2/2017 Cheyer et al.
2017/0040002 A1 2/2017 Basson et al.
2017/0041388 A1 2/2017 Tal et al.
2017/0041858 A1 2/2017 Tong et al.
2017/0046025 A1 2/2017 Dascola et al.
2017/0046330 A1 2/2017 Si et al.
2017/0047063 A1 2/2017 Ohmura et al.
2017/0052760 A1 2/2017 Johnson et al.
2017/0053652 A1 2/2017 Choi et al.
2017/0055895 A1 3/2017 Jardins et al.
2017/0060385 A1 3/2017 Goldsmith et al.
2017/0060853 A1 3/2017 Lee et al.
2017/0061423 A1 3/2017 Bryant et al.
2017/0068423 A1 3/2017 Napolitano et al.
2017/0068513 A1 3/2017 Stasior et al.
2017/0068550 A1 3/2017 Zeitlin
2017/0068670 A1 3/2017 Orr et al.
2017/0069308 A1 3/2017 Aleksic et al.
2017/0069321 A1 3/2017 Toiyama
2017/0069327 A1 3/2017 Heigold et al.
2017/0075653 A1 3/2017 Dawidowsky et al.
2017/0075879 A1 3/2017 Sakamoto et al.
2017/0076518 A1 3/2017 Patterson et al.
2017/0076720 A1 3/2017 Gopalan et al.
2017/0076721 A1 3/2017 Bargetzi et al.
2017/0078490 A1 3/2017 Kaminsky et al.
2017/0083179 A1 3/2017 Gruber et al.
2017/0083285 A1 3/2017 Meyers et al.
2017/0083504 A1 3/2017 Huang
2017/0083506 A1 3/2017 Liu et al.
2017/0084277 A1 3/2017 Sharifi
2017/0085547 A1 3/2017 De Aguiar et al.
2017/0085696 A1 3/2017 Abkairov
2017/0090428 A1 3/2017 Oohara
2017/0090569 A1 3/2017 Levesque
2017/0090864 A1 3/2017 Jorgovanovic
2017/0091168 A1 3/2017 Bellegarda et al.
2017/0091169 A1 3/2017 Bellegarda et al.
2017/0091612 A1 3/2017 Gruber et al.
2017/0092259 A1 3/2017 Jeon
2017/0092270 A1 3/2017 Newendorp et al.
2017/0092278 A1 3/2017 Evermann et al.
2017/0093356 A1 3/2017 Cudak et al.
2017/0097743 A1 4/2017 Hameed et al.
2017/0102837 A1 4/2017 Toumpelis
2017/0102915 A1 4/2017 Kuscher et al.
2017/0103749 A1 4/2017 Zhao et al.
2017/0103752 A1 4/2017 Senior et al.
2017/0105190 A1 4/2017 Logan et al.
2017/0108236 A1 4/2017 Guan et al.
2017/0110117 A1 4/2017 Chakladar et al.
2017/0110125 A1 4/2017 Xu et al.
2017/0116177 A1 4/2017 Walia
2017/0116982 A1 4/2017 Gelfenbeyn et al.
2017/0116985 A1 4/2017 Mathias et al.
2017/0116987 A1 4/2017 Kang et al.
2017/0116989 A1 4/2017 Yadgar et al.
2017/0124190 A1 5/2017 Wang et al.
2017/0124311 A1 5/2017 Li et al.
2017/0124531 A1 5/2017 McCormack
2017/0125016 A1 5/2017 Wang
2017/0127124 A9 5/2017 Wilson et al.
2017/0131778 A1 5/2017 Iyer
2017/0132019 A1 5/2017 Karashchuk et al.
2017/0132199 A1 5/2017 Vescovi et al.
2017/0133007 A1 5/2017 Drewes
2017/0133009 A1 5/2017 Cho et al.
2017/0134807 A1 5/2017 Shaw et al.
2017/0140041 A1 5/2017 Dotan-Cohen et al.
2017/0140052 A1 5/2017 Bufe, III et al.
2017/0140644 A1 5/2017 Hwang et al.
2017/0140760 A1 5/2017 Sachdev
2017/0147722 A1 5/2017 Greenwood
2017/0147841 A1 5/2017 Stagg et al.
2017/0148044 A1 5/2017 Fukuda et al.
2017/0148307 A1 5/2017 Yeom et al.
2017/0154033 A1 6/2017 Lee
2017/0154055 A1 6/2017 Dimson et al.
2017/0154176 A1 6/2017 Yun et al.
2017/0154628 A1 6/2017 Mohajer et al.
2017/0155940 A1 6/2017 Jin et al.
2017/0155965 A1 6/2017 Ward
2017/0161018 A1 6/2017 Lemay et al.
2017/0161268 A1 6/2017 Badaskar
2017/0161293 A1 6/2017 Ionescu et al.
2017/0161393 A1 6/2017 Oh et al.
2017/0161439 A1 6/2017 Raduchel et al.
2017/0161500 A1 6/2017 Yang
2017/0162191 A1 6/2017 Grost et al.
2017/0162202 A1 6/2017 Anthony et al.
2017/0162203 A1 6/2017 Huang et al.
2017/0169506 A1 6/2017 Wishne et al.
2017/0169818 A1 6/2017 Vanblon et al.
2017/0169819 A1 6/2017 Mese et al.
2017/0171139 A1 6/2017 Marra et al.
2017/0171261 A1 6/2017 Smus
2017/0171387 A1 6/2017 Vendrow
2017/0177080 A1 6/2017 Deleeuw
2017/0177547 A1 6/2017 Ciereszko et al.
2017/0178619 A1 6/2017 Naik et al.
2017/0178620 A1 6/2017 Fleizach et al.
2017/0178626 A1 6/2017 Gruber et al.
2017/0178666 A1 6/2017 Yu
2017/0180499 A1 6/2017 Gelfenbeyn et al.
2017/0185375 A1 6/2017 Martel et al.
2017/0185581 A1 6/2017 Bojja et al.
2017/0186429 A1 6/2017 Giuli et al.
2017/0186432 A1 6/2017 Aleksic et al.
2017/0186446 A1 6/2017 Wosk et al.
2017/0187711 A1 6/2017 Joo et al.
2017/0193083 A1 7/2017 Bhatt et al.
2017/0195493 A1 7/2017 Sudarsan et al.
2017/0195495 A1 7/2017 Deora et al.
2017/0195636 A1 7/2017 Child et al.
2017/0195856 A1 7/2017 Snyder et al.
2017/0199870 A1 7/2017 Zheng et al.
2017/0199874 A1 7/2017 Patel et al.
2017/0200066 A1 7/2017 Wang et al.
2017/0201609 A1 7/2017 Salmenkaita et al.
2017/0201613 A1 7/2017 Engelke et al.
2017/0201846 A1 7/2017 Katayama et al.
2017/0206002 A1 7/2017 Badger et al.
2017/0206797 A1 7/2017 Solomon et al.
2017/0206899 A1 7/2017 Bryant et al.
2017/0215052 A1 7/2017 Koum et al.
2017/0220212 A1 8/2017 Yang et al.
2017/0221486 A1 8/2017 Kurata et al.
2017/0222961 A1 8/2017 Beach et al.
2017/0223189 A1 8/2017 Meredith et al.
2017/0227935 A1 8/2017 Su et al.
2017/0228367 A1 8/2017 Pasupalak et al.
2017/0228382 A1 8/2017 Haviv et al.
2017/0229121 A1 8/2017 Taki et al.
2017/0230429 A1 8/2017 Garmark et al.
2017/0230497 A1 8/2017 Kim et al.
2017/0230709 A1 8/2017 Van Os et al.
2017/0235360 A1 8/2017 George-Svahn

(56) References Cited

U.S. PATENT DOCUMENTS

2017/0235361 A1 8/2017 Rigazio et al.
2017/0235618 A1 8/2017 Lin et al.
2017/0235721 A1 8/2017 Almosallam et al.
2017/0236512 A1 8/2017 Williams et al.
2017/0236514 A1 8/2017 Nelson
2017/0236517 A1 8/2017 Yu et al.
2017/0238039 A1 8/2017 Sabattini
2017/0242478 A1 8/2017 Ma
2017/0242653 A1 8/2017 Lang et al.
2017/0242657 A1 8/2017 Jarvis et al.
2017/0242840 A1 8/2017 Lu et al.
2017/0242920 A1 8/2017 Neland
2017/0243468 A1 8/2017 Dotan-Cohen et al.
2017/0243576 A1 8/2017 Millington et al.
2017/0243583 A1 8/2017 Raichelgauz et al.
2017/0243586 A1 8/2017 Civelli et al.
2017/0249291 A1 8/2017 Patel
2017/0249309 A1 8/2017 Sarikaya
2017/0256256 A1 9/2017 Wang et al.
2017/0257723 A1 9/2017 Morishita et al.
2017/0262051 A1 9/2017 Tall et al.
2017/0262432 A1 9/2017 Sarikaya et al.
2017/0263247 A1 9/2017 Kang et al.
2017/0263248 A1 9/2017 Gruber et al.
2017/0263249 A1 9/2017 Akbacak et al.
2017/0263254 A1 9/2017 Dewan et al.
2017/0264451 A1 9/2017 Yu et al.
2017/0264711 A1 9/2017 Natarajan et al.
2017/0270092 A1 9/2017 He et al.
2017/0270715 A1 9/2017 Lindsay et al.
2017/0270822 A1 9/2017 Cohen
2017/0270912 A1 9/2017 Levit et al.
2017/0270919 A1 9/2017 Parthasarathi et al.
2017/0273044 A1 9/2017 Alsina
2017/0277424 A1 9/2017 Witkowski et al.
2017/0277691 A1 9/2017 Agarwal
2017/0278513 A1 9/2017 Li et al.
2017/0278514 A1 9/2017 Mathias et al.
2017/0279795 A1 9/2017 Redberg
2017/0285915 A1 10/2017 Napolitano et al.
2017/0286397 A1 10/2017 Gonzalez
2017/0286407 A1 10/2017 Chochowski et al.
2017/0287218 A1 10/2017 Nuernberger et al.
2017/0287472 A1 10/2017 Ogawa et al.
2017/0289305 A1 10/2017 Liensberger et al.
2017/0295446 A1 10/2017 Shivappa
2017/0301348 A1 10/2017 Chen et al.
2017/0301353 A1 10/2017 Mozer et al.
2017/0308552 A1 10/2017 Soni et al.
2017/0308589 A1 10/2017 Liu et al.
2017/0308609 A1 10/2017 Berkhin et al.
2017/0311005 A1 10/2017 Lin
2017/0316775 A1 11/2017 Le et al.
2017/0316779 A1 11/2017 Mohapatra et al.
2017/0316782 A1 11/2017 Haughay
2017/0319123 A1 11/2017 Voss et al.
2017/0323637 A1 11/2017 Naik
2017/0329466 A1 11/2017 Krenkler et al.
2017/0329490 A1 11/2017 Esinovskaya et al.
2017/0329572 A1 11/2017 Shah et al.
2017/0329630 A1 11/2017 Jann et al.
2017/0330567 A1 11/2017 Van Wissen et al.
2017/0336920 A1 11/2017 Chan et al.
2017/0337035 A1 11/2017 Choudhary et al.
2017/0337478 A1 11/2017 Sarikaya et al.
2017/0337540 A1 11/2017 Buckman et al.
2017/0344931 A1 11/2017 Shenk et al.
2017/0345411 A1 11/2017 Raitio et al.
2017/0345420 A1 11/2017 Barnett, Jr.
2017/0345429 A1 11/2017 Hardee et al.
2017/0346949 A1 11/2017 Sanghavi et al.
2017/0347180 A1 11/2017 Petrank
2017/0347222 A1 11/2017 Kanter
2017/0351487 A1 12/2017 Avilés-Casco et al.
2017/0352346 A1 12/2017 Paulik et al.
2017/0352350 A1 12/2017 Booker et al.
2017/0357478 A1 12/2017 Piersol et al.
2017/0357529 A1 12/2017 Venkatraman et al.
2017/0357632 A1 12/2017 Pagallo et al.
2017/0357633 A1 12/2017 Wang et al.
2017/0357637 A1 12/2017 Nell et al.
2017/0357640 A1 12/2017 Bellegarda et al.
2017/0357716 A1 12/2017 Bellegarda et al.
2017/0358300 A1 12/2017 Laurens et al.
2017/0358301 A1 12/2017 Raitio et al.
2017/0358302 A1 12/2017 Orr et al.
2017/0358303 A1 12/2017 Walker, II et al.
2017/0358304 A1 12/2017 Castillo et al.
2017/0358305 A1 12/2017 Kudurshian et al.
2017/0358317 A1 12/2017 James
2017/0359680 A1 12/2017 Ledvina et al.
2017/0359707 A1 12/2017 Diaconu et al.
2017/0365251 A1 12/2017 Park et al.
2017/0366909 A1 12/2017 Mickelsen et al.
2017/0366924 A1 12/2017 Thoen
2017/0371509 A1 12/2017 Jung et al.
2017/0371865 A1 12/2017 Eck et al.
2017/0371866 A1 12/2017 Eck
2017/0371885 A1 12/2017 Aggarwal et al.
2017/0372592 A1 12/2017 Neravati et al.
2017/0372703 A1 12/2017 Sung et al.
2017/0372719 A1 12/2017 Li et al.
2017/0374093 A1 12/2017 Dhar et al.
2017/0374176 A1 12/2017 Agrawal et al.
2018/0004372 A1 1/2018 Zurek et al.
2018/0004396 A1 1/2018 Mng
2018/0005112 A1 1/2018 Iso-Sipila et al.
2018/0007060 A1 1/2018 Leblang et al.
2018/0007096 A1 1/2018 Levin et al.
2018/0007210 A1 1/2018 Todasco
2018/0007538 A1 1/2018 Naik et al.
2018/0012596 A1 1/2018 Piernot et al.
2018/0018248 A1 1/2018 Bhargava et al.
2018/0018331 A1 1/2018 Kesamreddy
2018/0018590 A1 1/2018 Szeto et al.
2018/0018814 A1 1/2018 Patrik et al.
2018/0018959 A1 1/2018 Jardins et al.
2018/0018973 A1 1/2018 Moreno et al.
2018/0020093 A1 1/2018 Bentitou et al.
2018/0024985 A1 1/2018 Asano
2018/0025124 A1 1/2018 Mohr et al.
2018/0025287 A1 1/2018 Mathew et al.
2018/0028918 A1 2/2018 Tang et al.
2018/0032884 A1 2/2018 Murugeshan et al.
2018/0033431 A1 2/2018 Newendorp et al.
2018/0033435 A1 2/2018 Jacobs, II
2018/0033436 A1 2/2018 Zhou
2018/0034867 A1 2/2018 Zahn et al.
2018/0034961 A1 2/2018 Engelke et al.
2018/0039239 A1 2/2018 Burchard
2018/0039990 A1 2/2018 Lindemann
2018/0040020 A1 2/2018 Kurian et al.
2018/0041571 A1 2/2018 Rogers et al.
2018/0045963 A1 2/2018 Hoover et al.
2018/0046340 A1 2/2018 Mall
2018/0046851 A1 2/2018 Kienzle et al.
2018/0047201 A1 2/2018 Filev et al.
2018/0047288 A1 2/2018 Cordell et al.
2018/0047391 A1 2/2018 Baik et al.
2018/0047393 A1 2/2018 Tian et al.
2018/0047406 A1 2/2018 Park
2018/0052885 A1 2/2018 Gaskill et al.
2018/0052909 A1 2/2018 Sharifi et al.
2018/0054505 A1 2/2018 Hart et al.
2018/0060032 A1 3/2018 Boesen
2018/0060301 A1 3/2018 Li et al.
2018/0060312 A1 3/2018 Won
2018/0060555 A1 3/2018 Boesen
2018/0061400 A1 3/2018 Carbune et al.
2018/0061401 A1 3/2018 Sarikaya et al.
2018/0061402 A1 3/2018 Devaraj et al.
2018/0061403 A1 3/2018 Devaraj et al.
2018/0062691 A1 3/2018 Barnett, Jr.
2018/0063276 A1 3/2018 Foged

(56) References Cited

U.S. PATENT DOCUMENTS

2018/0063308 A1 3/2018 Crystal et al.
2018/0063324 A1 3/2018 Van Meter, II
2018/0063624 A1 3/2018 Boesen
2018/0067904 A1 3/2018 Li
2018/0067914 A1 3/2018 Chen et al.
2018/0067918 A1 3/2018 Bellegarda et al.
2018/0067929 A1 3/2018 Ahn
2018/0068074 A1 3/2018 Shen
2018/0068194 A1 3/2018 Matsuda
2018/0068660 A1 3/2018 Kawahara et al.
2018/0069743 A1 3/2018 Bakken et al.
2018/0069815 A1 3/2018 Fontana et al.
2018/0075659 A1 3/2018 Browy et al.
2018/0075847 A1 3/2018 Lee et al.
2018/0075849 A1 3/2018 Khoury et al.
2018/0077095 A1 3/2018 Deyle et al.
2018/0077648 A1 3/2018 Nguyen
2018/0081739 A1 3/2018 Gravenites et al.
2018/0081884 A1 3/2018 Tan
2018/0081886 A1 3/2018 Tomkins et al.
2018/0082692 A1 3/2018 Khoury et al.
2018/0083898 A1 3/2018 Pham
2018/0088788 A1 3/2018 Cheung et al.
2018/0088902 A1 3/2018 Mese et al.
2018/0088969 A1 3/2018 Vanblon et al.
2018/0089166 A1 3/2018 Meyer et al.
2018/0089588 A1 3/2018 Ravi et al.
2018/0090143 A1 3/2018 Saddler et al.
2018/0091604 A1 3/2018 Yamashita et al.
2018/0091732 A1 3/2018 Wilson et al.
2018/0091847 A1 3/2018 Wu et al.
2018/0096683 A1 4/2018 James et al.
2018/0096690 A1 4/2018 Mixter et al.
2018/0097812 A1 4/2018 Gillett et al.
2018/0101599 A1 4/2018 Kenneth et al.
2018/0101925 A1 4/2018 Brinig et al.
2018/0102914 A1 4/2018 Kawachi et al.
2018/0103209 A1 4/2018 Fischler et al.
2018/0107917 A1 4/2018 Hewavitharana et al.
2018/0107945 A1 4/2018 Gao et al.
2018/0108346 A1 4/2018 Paulik et al.
2018/0108351 A1 4/2018 Beckhardt et al.
2018/0108356 A1 4/2018 Mizumoto et al.
2018/0108357 A1 4/2018 Liu
2018/0109920 A1 4/2018 Aggarwal et al.
2018/0113673 A1 4/2018 Sheynblat
2018/0114198 A1 4/2018 Ghotbi et al.
2018/0114591 A1 4/2018 Pribanic et al.
2018/0121430 A1 5/2018 Kagoshima et al.
2018/0121432 A1 5/2018 Parson et al.
2018/0122376 A1 5/2018 Kojima
2018/0122378 A1 5/2018 Mixter et al.
2018/0124458 A1 5/2018 Knox
2018/0126260 A1 5/2018 Chansoriya et al.
2018/0129492 A1 5/2018 Singh et al.
2018/0129967 A1 5/2018 Herreshoff
2018/0130470 A1 5/2018 Lemay et al.
2018/0130471 A1 5/2018 Trufinescu et al.
2018/0137097 A1 5/2018 Lim et al.
2018/0137404 A1 5/2018 Fauceglia et al.
2018/0137856 A1 5/2018 Gilbert
2018/0137857 A1 5/2018 Zhou et al.
2018/0137865 A1 5/2018 Ling
2018/0143857 A1 5/2018 Anbazhagan et al.
2018/0143967 A1 5/2018 Anbazhagan et al.
2018/0144465 A1 5/2018 Hsieh et al.
2018/0144615 A1 5/2018 Kinney et al.
2018/0144746 A1 5/2018 Mishra et al.
2018/0144748 A1 5/2018 Leong
2018/0146089 A1 5/2018 Rauenbuehler et al.
2018/0150744 A1 5/2018 Orr et al.
2018/0152557 A1 5/2018 White et al.
2018/0152558 A1 5/2018 Chan et al.
2018/0152803 A1 5/2018 Seefeldt et al.
2018/0157372 A1 6/2018 Kurabayashi
2018/0157398 A1 6/2018 Kaehler et al.
2018/0157408 A1 6/2018 Yu et al.
2018/0157992 A1 6/2018 Susskind et al.
2018/0158548 A1 6/2018 Taheri et al.
2018/0158552 A1 6/2018 Liu et al.
2018/0165278 A1 6/2018 He et al.
2018/0165801 A1 6/2018 Kim et al.
2018/0165857 A1 6/2018 Lee et al.
2018/0166076 A1 6/2018 Higuchi et al.
2018/0167884 A1 6/2018 Dawid et al.
2018/0173403 A1 6/2018 Carbune et al.
2018/0173542 A1 6/2018 Chan et al.
2018/0174406 A1 6/2018 Arashi et al.
2018/0174576 A1 6/2018 Soltau et al.
2018/0174597 A1 6/2018 Lee et al.
2018/0181370 A1 6/2018 Parkinson
2018/0182376 A1 6/2018 Gysel et al.
2018/0188840 A1 7/2018 Tamura et al.
2018/0188948 A1 7/2018 Ouyang et al.
2018/0189267 A1 7/2018 Takiel
2018/0190263 A1 7/2018 Calef, III
2018/0190264 A1 7/2018 Mixter et al.
2018/0190273 A1 7/2018 Karimli et al.
2018/0190274 A1 7/2018 Kirazci et al.
2018/0190279 A1 7/2018 Anderson et al.
2018/0191670 A1 7/2018 Suyama
2018/0196683 A1 7/2018 Radebaugh et al.
2018/0205675 A1 7/2018 Koo et al.
2018/0205983 A1 7/2018 Lee et al.
2018/0210874 A1 7/2018 Fuxman et al.
2018/0211005 A1 7/2018 Allen
2018/0213448 A1 7/2018 Segal et al.
2018/0214061 A1 8/2018 Knoth et al.
2018/0217810 A1 8/2018 Agrawal
2018/0218735 A1 8/2018 Hunt et al.
2018/0221783 A1 8/2018 Gamero
2018/0224231 A1 8/2018 Weinberg
2018/0225131 A1 8/2018 Tommy et al.
2018/0225274 A1 8/2018 Tommy et al.
2018/0232110 A1 8/2018 Cheung et al.
2018/0232203 A1 8/2018 Gelfenbeyn et al.
2018/0232608 A1 8/2018 Pradeep et al.
2018/0232688 A1 8/2018 Pike et al.
2018/0233132 A1 8/2018 Herold et al.
2018/0233140 A1 8/2018 Koishida et al.
2018/0233142 A1 8/2018 Koishida et al.
2018/0247065 A1 8/2018 Rhee et al.
2018/0253209 A1 9/2018 Jaygarl et al.
2018/0253652 A1 9/2018 Palzer et al.
2018/0260680 A1 9/2018 Finkelstein et al.
2018/0267952 A1 9/2018 Osborne et al.
2018/0268023 A1 9/2018 Korpusik et al.
2018/0268106 A1 9/2018 Velaga
2018/0268337 A1 9/2018 Miller et al.
2018/0270343 A1 9/2018 Rout et al.
2018/0275839 A1 9/2018 Kocienda et al.
2018/0276197 A1 9/2018 Nell et al.
2018/0277113 A1 9/2018 Hartung et al.
2018/0278740 A1 9/2018 Choi et al.
2018/0285056 A1 10/2018 Cutler et al.
2018/0288104 A1 10/2018 Padilla et al.
2018/0293086 A1 10/2018 Laird-Mcconnell et al.
2018/0293984 A1 10/2018 Lindahl
2018/0293988 A1 10/2018 Huang et al.
2018/0293989 A1 10/2018 De et al.
2018/0299878 A1 10/2018 Cella et al.
2018/0300317 A1 10/2018 Bradbury
2018/0300400 A1 10/2018 Paulus
2018/0300608 A1 10/2018 Sevrens et al.
2018/0300952 A1 10/2018 Evans et al.
2018/0307216 A1 10/2018 Ypma et al.
2018/0307603 A1 10/2018 Che
2018/0308470 A1 10/2018 Park et al.
2018/0308477 A1 10/2018 Nagasaka
2018/0308480 A1 10/2018 Jang et al.
2018/0308485 A1 10/2018 Kudurshian et al.
2018/0308486 A1 10/2018 Saddler et al.
2018/0308491 A1 10/2018 Oktem et al.
2018/0314362 A1 11/2018 Kim et al.

(56) References Cited

U.S. PATENT DOCUMENTS

2018/0314552 A1 11/2018 Kim et al.
2018/0314689 A1 11/2018 Wang et al.
2018/0314981 A1 11/2018 Chen
2018/0315415 A1 11/2018 Mosley et al.
2018/0315416 A1 11/2018 Berthelsen et al.
2018/0322112 A1 11/2018 Bellegarda et al.
2018/0322881 A1 11/2018 Min et al.
2018/0324518 A1 11/2018 Dusan et al.
2018/0329508 A1 11/2018 Klein et al.
2018/0329512 A1 11/2018 Liao et al.
2018/0329677 A1 11/2018 Gruber et al.
2018/0329957 A1 11/2018 Frazzingaro et al.
2018/0329982 A1 11/2018 Patel et al.
2018/0329998 A1 11/2018 Thomson et al.
2018/0330714 A1 11/2018 Paulik et al.
2018/0330721 A1 11/2018 Thomson et al.
2018/0330722 A1 11/2018 Newendorp et al.
2018/0330723 A1 11/2018 Acero et al.
2018/0330729 A1 11/2018 Golipour et al.
2018/0330730 A1 11/2018 Garg et al.
2018/0330731 A1 11/2018 Zeitlin et al.
2018/0330733 A1 11/2018 Orr et al.
2018/0330737 A1 11/2018 Paulik et al.
2018/0332118 A1 11/2018 Phipps et al.
2018/0332389 A1 11/2018 Ekkizogloy et al.
2018/0335903 A1 11/2018 Coffman et al.
2018/0336006 A1 11/2018 Chakraborty et al.
2018/0336049 A1 11/2018 Mukherjee et al.
2018/0336184 A1 11/2018 Bellegarda et al.
2018/0336197 A1 11/2018 Skilling et al.
2018/0336275 A1 11/2018 Graham et al.
2018/0336439 A1 11/2018 Kliger et al.
2018/0336449 A1 11/2018 Adan et al.
2018/0336880 A1 11/2018 Arik et al.
2018/0336885 A1 11/2018 Mukherjee et al.
2018/0336892 A1 11/2018 Kim et al.
2018/0336893 A1 11/2018 Robinson et al.
2018/0336894 A1 11/2018 Graham et al.
2018/0336904 A1 11/2018 Piercy et al.
2018/0336905 A1 11/2018 Kim et al.
2018/0336911 A1 11/2018 Dahl et al.
2018/0336920 A1 11/2018 Bastian et al.
2018/0338191 A1 11/2018 Van Scheltinga et al.
2018/0341643 A1 11/2018 Alders et al.
2018/0342243 A1 11/2018 Vanblon et al.
2018/0343557 A1 11/2018 Naik et al.
2018/0349084 A1 12/2018 Nagasaka et al.
2018/0349346 A1 12/2018 Hatori et al.
2018/0349349 A1 12/2018 Bellegarda et al.
2018/0349447 A1 12/2018 Maccartney et al.
2018/0349472 A1 12/2018 Kohlschuetter et al.
2018/0349728 A1 12/2018 Wang et al.
2018/0350345 A1 12/2018 Naik
2018/0350353 A1 12/2018 Gruber et al.
2018/0357073 A1 12/2018 Johnson et al.
2018/0357308 A1 12/2018 Cheyer
2018/0358015 A1 12/2018 Cash et al.
2018/0358019 A1 12/2018 Mont-Reynaud
2018/0365091 A1 12/2018 Donaldson et al.
2018/0365653 A1 12/2018 Cleaver et al.
2018/0366105 A1 12/2018 Kim
2018/0366110 A1 12/2018 Hashem et al.
2018/0366116 A1 12/2018 Nicholson et al.
2018/0366118 A1 12/2018 Lovitt et al.
2018/0373398 A1 12/2018 Seixeiro et al.
2018/0373487 A1 12/2018 Gruber et al.
2018/0373493 A1 12/2018 Watson et al.
2018/0373796 A1 12/2018 Rathod
2018/0374484 A1 12/2018 Huang et al.
2019/0005024 A1 1/2019 Somech et al.
2019/0007228 A1 1/2019 Vuskovic et al.
2019/0012141 A1 1/2019 Piersol et al.
2019/0012198 A1 1/2019 Ni et al.
2019/0012445 A1 1/2019 Lesso et al.
2019/0012449 A1 1/2019 Cheyer
2019/0012599 A1 1/2019 El Kaliouby et al.
2019/0013018 A1 1/2019 Rekstad
2019/0013025 A1 1/2019 Alcorn et al.
2019/0014450 A1 1/2019 Gruber et al.
2019/0019077 A1 1/2019 Griffin et al.
2019/0019508 A1 1/2019 Rochford et al.
2019/0020482 A1 1/2019 Gupta et al.
2019/0027135 A1 1/2019 Kim et al.
2019/0027152 A1 1/2019 Huang et al.
2019/0034040 A1 1/2019 Shah et al.
2019/0034826 A1 1/2019 Ahmad et al.
2019/0035385 A1 1/2019 Lawson et al.
2019/0035405 A1 1/2019 Haughay
2019/0037258 A1 1/2019 Justin et al.
2019/0042059 A1 2/2019 Baer
2019/0042560 A1 2/2019 Kakirwar et al.
2019/0042561 A1 2/2019 Kakirwar et al.
2019/0042627 A1 2/2019 Osotio et al.
2019/0043507 A1 2/2019 Huang et al.
2019/0044854 A1 2/2019 Yang et al.
2019/0045040 A1 2/2019 Lee et al.
2019/0050450 A1 2/2019 Uszkoreit
2019/0051306 A1 2/2019 Torama et al.
2019/0051309 A1 2/2019 Kim et al.
2019/0056840 A1 2/2019 Mamaril et al.
2019/0057533 A1 2/2019 Habra
2019/0057697 A1 2/2019 Giuli et al.
2019/0065027 A1 2/2019 Hauenstein et al.
2019/0065144 A1 2/2019 Sumner et al.
2019/0065993 A1 2/2019 Srinivasan et al.
2019/0066674 A1 2/2019 Jaygarl et al.
2019/0068810 A1 2/2019 Okamoto et al.
2019/0073607 A1 3/2019 Jia et al.
2019/0073998 A1 3/2019 Leblang et al.
2019/0074009 A1 3/2019 Kim et al.
2019/0074015 A1 3/2019 Orr et al.
2019/0074016 A1 3/2019 Orr et al.
2019/0079476 A1 3/2019 Funes
2019/0079662 A1 3/2019 Wan et al.
2019/0079724 A1 3/2019 Feuz et al.
2019/0080685 A1 3/2019 Johnson, Jr.
2019/0080698 A1 3/2019 Miller
2019/0082044 A1 3/2019 Olivia et al.
2019/0087205 A1 3/2019 Guday
2019/0087412 A1 3/2019 Ibrahim et al.
2019/0087455 A1 3/2019 He et al.
2019/0090812 A1 3/2019 Martin et al.
2019/0095050 A1 3/2019 Gruber et al.
2019/0095069 A1 3/2019 Proctor et al.
2019/0095171 A1 3/2019 Carson et al.
2019/0095522 A1 3/2019 Galitsky
2019/0095535 A1 3/2019 Miller et al.
2019/0096134 A1 3/2019 Amacker et al.
2019/0102145 A1 4/2019 Wilberding et al.
2019/0102378 A1 4/2019 Piernot et al.
2019/0102381 A1 4/2019 Futrell et al.
2019/0103103 A1 4/2019 Ni et al.
2019/0103112 A1 4/2019 Walker et al.
2019/0108834 A1 4/2019 Nelson et al.
2019/0114320 A1 4/2019 Patwardhan et al.
2019/0116264 A1 4/2019 Sanghavi et al.
2019/0122666 A1 4/2019 Raitio et al.
2019/0122692 A1 4/2019 Binder et al.
2019/0124019 A1 4/2019 Leon et al.
2019/0129499 A1 5/2019 Li
2019/0129615 A1 5/2019 Sundar et al.
2019/0129749 A1 5/2019 White et al.
2019/0130901 A1 5/2019 Kato et al.
2019/0132694 A1 5/2019 Hanes et al.
2019/0134501 A1 5/2019 Feder et al.
2019/0138268 A1 5/2019 Andersen et al.
2019/0138661 A1 5/2019 Paltanavicius et al.
2019/0138704 A1 5/2019 Shrivastava et al.
2019/0139058 A1 5/2019 Clark et al.
2019/0139541 A1 5/2019 Andersen et al.
2019/0139563 A1 5/2019 Chen et al.
2019/0141494 A1 5/2019 Gross et al.
2019/0146219 A1 5/2019 Rodriguez, II
2019/0147052 A1 5/2019 Lu et al.

(56) References Cited

U.S. PATENT DOCUMENTS

| | | | |
|---|---|---|---|
| 2019/0147369 | A1 | 5/2019 | Gupta et al. |
| 2019/0147869 | A1 | 5/2019 | Wang |
| 2019/0147880 | A1 | 5/2019 | Booker et al. |
| 2019/0147883 | A1 | 5/2019 | Mellenthin et al. |
| 2019/0149972 | A1 | 5/2019 | Parks et al. |
| 2019/0156830 | A1 | 5/2019 | Devaraj et al. |
| 2019/0158994 | A1 | 5/2019 | Gross et al. |
| 2019/0163667 | A1 | 5/2019 | Feuz et al. |
| 2019/0164546 | A1 | 5/2019 | Piernot et al. |
| 2019/0172243 | A1 | 6/2019 | Mishra et al. |
| 2019/0172458 | A1 | 6/2019 | Mishra et al. |
| 2019/0172465 | A1 | 6/2019 | Lee et al. |
| 2019/0172467 | A1 | 6/2019 | Kim et al. |
| 2019/0173996 | A1 | 6/2019 | Butcher et al. |
| 2019/0179607 | A1 | 6/2019 | Thangarathnam et al. |
| 2019/0179890 | A1 | 6/2019 | Evermann |
| 2019/0180749 | A1 | 6/2019 | Carey et al. |
| 2019/0180750 | A1 | 6/2019 | Renard et al. |
| 2019/0180770 | A1 | 6/2019 | Kothari et al. |
| 2019/0182176 | A1 | 6/2019 | Niewczas |
| 2019/0187787 | A1 | 6/2019 | White et al. |
| 2019/0187790 | A1 | 6/2019 | Woo et al. |
| 2019/0188326 | A1 | 6/2019 | Daianu et al. |
| 2019/0188328 | A1 | 6/2019 | Oyenan et al. |
| 2019/0189118 | A1 | 6/2019 | Piernot et al. |
| 2019/0189125 | A1 | 6/2019 | Van Os et al. |
| 2019/0190898 | A1 | 6/2019 | Cui |
| 2019/0197053 | A1 | 6/2019 | Graham et al. |
| 2019/0197119 | A1 | 6/2019 | Zhang et al. |
| 2019/0199657 | A1 | 6/2019 | Fawcett et al. |
| 2019/0206397 | A1 | 7/2019 | Zhou |
| 2019/0212815 | A1 | 7/2019 | Zhang et al. |
| 2019/0213498 | A1 | 7/2019 | Adjaoute |
| 2019/0213601 | A1 | 7/2019 | Hackman et al. |
| 2019/0213774 | A1 | 7/2019 | Jiao et al. |
| 2019/0213999 | A1 | 7/2019 | Grupen et al. |
| 2019/0214024 | A1 | 7/2019 | Gruber et al. |
| 2019/0215343 | A1 | 7/2019 | Rykowski et al. |
| 2019/0220245 | A1 | 7/2019 | Martel et al. |
| 2019/0220246 | A1 | 7/2019 | Orr et al. |
| 2019/0220247 | A1 | 7/2019 | Lemay et al. |
| 2019/0220704 | A1 | 7/2019 | Schulz-Trieglaff et al. |
| 2019/0220727 | A1 | 7/2019 | Dohrmann et al. |
| 2019/0222684 | A1 | 7/2019 | Li et al. |
| 2019/0224049 | A1 | 7/2019 | Creasy et al. |
| 2019/0228179 | A1 | 7/2019 | Rakshit et al. |
| 2019/0228581 | A1 | 7/2019 | Dascola et al. |
| 2019/0230215 | A1 | 7/2019 | Zhu et al. |
| 2019/0230426 | A1 | 7/2019 | Chun |
| 2019/0235887 | A1 | 8/2019 | Hemaraj et al. |
| 2019/0236130 | A1 | 8/2019 | Li et al. |
| 2019/0236459 | A1 | 8/2019 | Cheyer et al. |
| 2019/0237061 | A1 | 8/2019 | Rusak et al. |
| 2019/0243902 | A1 | 8/2019 | Saeki et al. |
| 2019/0244604 | A1 | 8/2019 | Masataki et al. |
| 2019/0244618 | A1 | 8/2019 | Newendorp et al. |
| 2019/0244619 | A1 | 8/2019 | Kwon et al. |
| 2019/0251167 | A1 | 8/2019 | Subbaraya et al. |
| 2019/0251339 | A1 | 8/2019 | Hawker |
| 2019/0251960 | A1 | 8/2019 | Maker et al. |
| 2019/0251972 | A1 | 8/2019 | Li |
| 2019/0258852 | A1 | 8/2019 | Shimauchi et al. |
| 2019/0259386 | A1 | 8/2019 | Kudurshian et al. |
| 2019/0260836 | A1 | 8/2019 | Zahl et al. |
| 2019/0265886 | A1 | 8/2019 | Moon et al. |
| 2019/0266246 | A1 | 8/2019 | Wang et al. |
| 2019/0272318 | A1 | 9/2019 | Suzuki et al. |
| 2019/0272818 | A1 | 9/2019 | Fernandez et al. |
| 2019/0272825 | A1 | 9/2019 | O'Malley et al. |
| 2019/0272831 | A1 | 9/2019 | Kajarekar |
| 2019/0273963 | A1 | 9/2019 | Jobanputra et al. |
| 2019/0278841 | A1 | 9/2019 | Pusateri et al. |
| 2019/0279618 | A1 | 9/2019 | Yadav et al. |
| 2019/0279622 | A1 | 9/2019 | Liu et al. |
| 2019/0281387 | A1 | 9/2019 | Woo et al. |
| 2019/0287012 | A1 | 9/2019 | Asli et al. |
| 2019/0287522 | A1 | 9/2019 | Lambourne et al. |
| 2019/0290965 | A1 | 9/2019 | Oren |
| 2019/0294769 | A1 | 9/2019 | Lesso |
| 2019/0294962 | A1 | 9/2019 | Vezer et al. |
| 2019/0295529 | A1 | 9/2019 | Tomita |
| 2019/0295540 | A1 | 9/2019 | Grima |
| 2019/0295542 | A1 | 9/2019 | Huang et al. |
| 2019/0295544 | A1 | 9/2019 | Garcia et al. |
| 2019/0303442 | A1 | 10/2019 | Peitz et al. |
| 2019/0303504 | A1 | 10/2019 | Pasumarthy |
| 2019/0304438 | A1 | 10/2019 | Qian et al. |
| 2019/0310765 | A1 | 10/2019 | Napolitano et al. |
| 2019/0311031 | A1 | 10/2019 | Powell et al. |
| 2019/0311708 | A1 | 10/2019 | Bengio et al. |
| 2019/0311720 | A1 | 10/2019 | Pasko |
| 2019/0318219 | A1 | 10/2019 | Arora et al. |
| 2019/0318722 | A1 | 10/2019 | Bromand |
| 2019/0318724 | A1 | 10/2019 | Chao et al. |
| 2019/0318725 | A1 | 10/2019 | Le Roux et al. |
| 2019/0318732 | A1 | 10/2019 | Huang et al. |
| 2019/0318735 | A1 | 10/2019 | Chao et al. |
| 2019/0318739 | A1 | 10/2019 | Garg et al. |
| 2019/0324780 | A1 | 10/2019 | Zhu et al. |
| 2019/0324925 | A1 | 10/2019 | Toyoda et al. |
| 2019/0325081 | A1 | 10/2019 | Liu et al. |
| 2019/0325866 | A1 | 10/2019 | Bromand et al. |
| 2019/0333523 | A1 | 10/2019 | Kim et al. |
| 2019/0335567 | A1 | 10/2019 | Boudreau et al. |
| 2019/0339784 | A1 | 11/2019 | Lemay et al. |
| 2019/0340252 | A1 | 11/2019 | Huyghe |
| 2019/0340419 | A1 | 11/2019 | Milman et al. |
| 2019/0341027 | A1 | 11/2019 | Vescovi et al. |
| 2019/0341056 | A1 | 11/2019 | Paulik et al. |
| 2019/0347063 | A1 | 11/2019 | Liu et al. |
| 2019/0347525 | A1 | 11/2019 | Liem et al. |
| 2019/0348022 | A1 | 11/2019 | Park et al. |
| 2019/0349333 | A1 | 11/2019 | Pickover et al. |
| 2019/0349622 | A1 | 11/2019 | Kim et al. |
| 2019/0354252 | A1 | 11/2019 | Badr |
| 2019/0354256 | A1 | 11/2019 | Karunamuni et al. |
| 2019/0354548 | A1 | 11/2019 | Orr et al. |
| 2019/0354675 | A1 | 11/2019 | Gan et al. |
| 2019/0355346 | A1 | 11/2019 | Bellegarda |
| 2019/0355384 | A1 | 11/2019 | Sereshki et al. |
| 2019/0361729 | A1 | 11/2019 | Gruber et al. |
| 2019/0361978 | A1 | 11/2019 | Ray et al. |
| 2019/0362252 | A1 | 11/2019 | Miller et al. |
| 2019/0362557 | A1 | 11/2019 | Lacey et al. |
| 2019/0369748 | A1 | 12/2019 | Hindi et al. |
| 2019/0369842 | A1 | 12/2019 | Dolbakian et al. |
| 2019/0369868 | A1 | 12/2019 | Jin et al. |
| 2019/0370292 | A1 | 12/2019 | Irani et al. |
| 2019/0370323 | A1 | 12/2019 | Davidson et al. |
| 2019/0370443 | A1 | 12/2019 | Lesso |
| 2019/0371315 | A1 | 12/2019 | Newendorp et al. |
| 2019/0371316 | A1 | 12/2019 | Weinstein et al. |
| 2019/0371317 | A1 | 12/2019 | Irani et al. |
| 2019/0371331 | A1 | 12/2019 | Schramm et al. |
| 2019/0372902 | A1 | 12/2019 | Piersol |
| 2019/0373102 | A1 | 12/2019 | Weinstein et al. |
| 2019/0377425 | A1 | 12/2019 | Ryu et al. |
| 2019/0377955 | A1 | 12/2019 | Swaminathan et al. |
| 2019/0378493 | A1 | 12/2019 | Kim et al. |
| 2019/0385043 | A1 | 12/2019 | Choudhary et al. |
| 2019/0385418 | A1 | 12/2019 | Mixter et al. |
| 2019/0387352 | A1 | 12/2019 | Jot et al. |
| 2019/0391726 | A1 | 12/2019 | Iskandar et al. |
| 2019/0394547 | A1 | 12/2019 | Lemons et al. |
| 2020/0005779 | A1 | 1/2020 | Liao et al. |
| 2020/0012718 | A1 | 1/2020 | Kung et al. |
| 2020/0019609 | A1 | 1/2020 | Yu et al. |
| 2020/0020326 | A1 | 1/2020 | Srinivasan et al. |
| 2020/0027455 | A1 | 1/2020 | Sugiyama et al. |
| 2020/0034421 | A1 | 1/2020 | Ferrucci et al. |
| 2020/0035224 | A1 | 1/2020 | Ward et al. |
| 2020/0042334 | A1 | 2/2020 | Radebaugh et al. |
| 2020/0043467 | A1 | 2/2020 | Qian et al. |
| 2020/0043471 | A1 | 2/2020 | Ma et al. |

(56) References Cited

U.S. PATENT DOCUMENTS

| | | | |
|---|---|---|---|
| 2020/0043482 | A1 | 2/2020 | Gruber et al. |
| 2020/0043485 | A1 | 2/2020 | Tonetti et al. |
| 2020/0043489 | A1 | 2/2020 | Bradley et al. |
| 2020/0044485 | A1 | 2/2020 | Smith et al. |
| 2020/0045164 | A1 | 2/2020 | Kwatra et al. |
| 2020/0051554 | A1 | 2/2020 | Kim et al. |
| 2020/0051565 | A1 | 2/2020 | Singh |
| 2020/0051583 | A1 | 2/2020 | Wu et al. |
| 2020/0053218 | A1 | 2/2020 | Gray |
| 2020/0058299 | A1 | 2/2020 | Lee et al. |
| 2020/0065601 | A1 | 2/2020 | Andreassen |
| 2020/0066236 | A1 | 2/2020 | Giusti et al. |
| 2020/0073629 | A1 | 3/2020 | Lee et al. |
| 2020/0074993 | A1 | 3/2020 | Lee et al. |
| 2020/0075018 | A1 | 3/2020 | Chen |
| 2020/0075040 | A1 | 3/2020 | Provost et al. |
| 2020/0076538 | A1 | 3/2020 | Soultan et al. |
| 2020/0076939 | A1 | 3/2020 | Lambourne et al. |
| 2020/0081615 | A1 | 3/2020 | et al. |
| 2020/0082807 | A1 | 3/2020 | Kim et al. |
| 2020/0084572 | A1 | 3/2020 | Jadav et al. |
| 2020/0090393 | A1 | 3/2020 | Shin et al. |
| 2020/0090653 | A1 | 3/2020 | Luo |
| 2020/0090658 | A1 | 3/2020 | Shin et al. |
| 2020/0091958 | A1 | 3/2020 | Curtis et al. |
| 2020/0092625 | A1 | 3/2020 | Raffle |
| 2020/0098346 | A1 | 3/2020 | Kemmerer et al. |
| 2020/0098352 | A1 | 3/2020 | Feinstein et al. |
| 2020/0098362 | A1 | 3/2020 | Piernot et al. |
| 2020/0098368 | A1 | 3/2020 | Lemay et al. |
| 2020/0103963 | A1 | 4/2020 | Kelly et al. |
| 2020/0104357 | A1 | 4/2020 | Bellegarda et al. |
| 2020/0104362 | A1 | 4/2020 | Yang et al. |
| 2020/0104369 | A1 | 4/2020 | Bellegarda |
| 2020/0104668 | A1 | 4/2020 | Sanghavi et al. |
| 2020/0105260 | A1 | 4/2020 | Piernot et al. |
| 2020/0112454 | A1 | 4/2020 | Brown et al. |
| 2020/0117717 | A1 | 4/2020 | Ramamurti et al. |
| 2020/0118566 | A1 | 4/2020 | Zhou |
| 2020/0118568 | A1 | 4/2020 | Kudurshian et al. |
| 2020/0125820 | A1 | 4/2020 | Kim et al. |
| 2020/0126547 | A1 | 4/2020 | Truong et al. |
| 2020/0127988 | A1 | 4/2020 | Bradley et al. |
| 2020/0134316 | A1 | 4/2020 | Krishnamurthy et al. |
| 2020/0135180 | A1 | 4/2020 | Mukherjee et al. |
| 2020/0135209 | A1 | 4/2020 | Delfarah et al. |
| 2020/0135212 | A1 | 4/2020 | Cho et al. |
| 2020/0135213 | A1 | 4/2020 | Kim et al. |
| 2020/0135226 | A1 | 4/2020 | Mittal et al. |
| 2020/0137230 | A1 | 4/2020 | Spohrer |
| 2020/0142505 | A1 | 5/2020 | Choi et al. |
| 2020/0142554 | A1 | 5/2020 | Lin et al. |
| 2020/0143330 | A1 | 5/2020 | Perumalla et al. |
| 2020/0143812 | A1 | 5/2020 | Walker, II et al. |
| 2020/0143819 | A1 | 5/2020 | Delcroix et al. |
| 2020/0152186 | A1 | 5/2020 | Koh et al. |
| 2020/0152187 | A1 | 5/2020 | Kline et al. |
| 2020/0159579 | A1 | 5/2020 | Shear et al. |
| 2020/0159609 | A1 | 5/2020 | Korotaev et al. |
| 2020/0159651 | A1 | 5/2020 | Myers |
| 2020/0159801 | A1 | 5/2020 | Sekine |
| 2020/0159838 | A1 | 5/2020 | Kikin-Gil et al. |
| 2020/0160179 | A1 | 5/2020 | Chien et al. |
| 2020/0160838 | A1 | 5/2020 | Lee |
| 2020/0168120 | A1 | 5/2020 | Bravo |
| 2020/0168220 | A1 | 5/2020 | Magielse et al. |
| 2020/0169637 | A1 | 5/2020 | Sanghavi et al. |
| 2020/0175566 | A1 | 6/2020 | Bender et al. |
| 2020/0175961 | A1 | 6/2020 | Thomson et al. |
| 2020/0175975 | A1 | 6/2020 | Kong et al. |
| 2020/0176004 | A1 | 6/2020 | Kleijn et al. |
| 2020/0176018 | A1 | 6/2020 | Feinauer et al. |
| 2020/0184057 | A1 | 6/2020 | Mukund |
| 2020/0184964 | A1 | 6/2020 | Myers et al. |
| 2020/0184966 | A1 | 6/2020 | Yavagal |
| 2020/0193997 | A1 | 6/2020 | Piernot et al. |
| 2020/0194000 | A1 | 6/2020 | Xian et al. |
| 2020/0210142 | A1 | 7/2020 | Mu et al. |
| 2020/0211546 | A1 | 7/2020 | Schairer et al. |
| 2020/0211566 | A1 | 7/2020 | Kang et al. |
| 2020/0218074 | A1 | 7/2020 | Hoover et al. |
| 2020/0218780 | A1 | 7/2020 | Jun et al. |
| 2020/0218805 | A1 | 7/2020 | Liu et al. |
| 2020/0219501 | A1 | 7/2020 | Cartwright et al. |
| 2020/0219517 | A1 | 7/2020 | Wang et al. |
| 2020/0220914 | A1 | 7/2020 | Carrigan et al. |
| 2020/0221155 | A1 | 7/2020 | Hansen et al. |
| 2020/0226481 | A1 | 7/2020 | Sim et al. |
| 2020/0226554 | A1 | 7/2020 | Luna |
| 2020/0226823 | A1 | 7/2020 | Stachniak et al. |
| 2020/0227034 | A1 | 7/2020 | Summa et al. |
| 2020/0227044 | A1 | 7/2020 | Lindahl |
| 2020/0228774 | A1 | 7/2020 | Kar et al. |
| 2020/0243069 | A1 | 7/2020 | Amores et al. |
| 2020/0243094 | A1 | 7/2020 | Thomson et al. |
| 2020/0249985 | A1 | 8/2020 | Zeitlin |
| 2020/0251111 | A1 | 8/2020 | Temkin et al. |
| 2020/0252508 | A1 | 8/2020 | Gray |
| 2020/0258508 | A1 | 8/2020 | Aggarwal et al. |
| 2020/0258512 | A1 | 8/2020 | Smith et al. |
| 2020/0258513 | A1 | 8/2020 | Smith et al. |
| 2020/0259951 | A1 | 8/2020 | Arshad |
| 2020/0264741 | A1 | 8/2020 | Kreiner et al. |
| 2020/0267222 | A1 | 8/2020 | Phipps et al. |
| 2020/0267427 | A1 | 8/2020 | Rogers et al. |
| 2020/0267503 | A1 | 8/2020 | Watkins et al. |
| 2020/0272485 | A1 | 8/2020 | Karashchuk et al. |
| 2020/0273448 | A1 | 8/2020 | Min et al. |
| 2020/0275216 | A1 | 8/2020 | McKinney et al. |
| 2020/0279556 | A1 | 9/2020 | Gruber et al. |
| 2020/0279576 | A1 | 9/2020 | Binder et al. |
| 2020/0279627 | A1 | 9/2020 | Nida et al. |
| 2020/0285327 | A1 | 9/2020 | Hindi et al. |
| 2020/0286472 | A1 | 9/2020 | Newendorp et al. |
| 2020/0286493 | A1 | 9/2020 | Orr et al. |
| 2020/0294487 | A1 | 9/2020 | Donohoe et al. |
| 2020/0294494 | A1 | 9/2020 | Suyama et al. |
| 2020/0294508 | A1 | 9/2020 | Kwasiborski et al. |
| 2020/0298394 | A1 | 9/2020 | Han et al. |
| 2020/0301950 | A1 | 9/2020 | Theo et al. |
| 2020/0302112 | A1 | 9/2020 | Helmbro et al. |
| 2020/0302356 | A1 | 9/2020 | Gruber et al. |
| 2020/0302919 | A1 | 9/2020 | Greborio et al. |
| 2020/0302925 | A1 | 9/2020 | Shah et al. |
| 2020/0302930 | A1 | 9/2020 | Chen et al. |
| 2020/0302932 | A1 | 9/2020 | Schramm et al. |
| 2020/0304955 | A1 | 9/2020 | Gross et al. |
| 2020/0304972 | A1 | 9/2020 | Gross et al. |
| 2020/0305084 | A1 | 9/2020 | Freeman et al. |
| 2020/0310513 | A1 | 10/2020 | Nicholson et al. |
| 2020/0312315 | A1 | 10/2020 | Li et al. |
| 2020/0312317 | A1 | 10/2020 | Kothari et al. |
| 2020/0314191 | A1 | 10/2020 | Madhavan et al. |
| 2020/0314565 | A1 | 10/2020 | Sigwanz et al. |
| 2020/0319850 | A1 | 10/2020 | Stasior et al. |
| 2020/0320592 | A1 | 10/2020 | Soule et al. |
| 2020/0320988 | A1 | 10/2020 | Rastogi et al. |
| 2020/0322571 | A1 | 10/2020 | Awai |
| 2020/0327895 | A1 | 10/2020 | Gruber et al. |
| 2020/0333875 | A1 | 10/2020 | Bansal et al. |
| 2020/0334068 | A1 | 10/2020 | Krishnamurthy et al. |
| 2020/0334492 | A1 | 10/2020 | Zheng et al. |
| 2020/0334524 | A1 | 10/2020 | Sprague et al. |
| 2020/0335121 | A1 | 10/2020 | Mosseri et al. |
| 2020/0335128 | A1 | 10/2020 | Sheeder et al. |
| 2020/0341546 | A1 | 10/2020 | Yuan et al. |
| 2020/0342082 | A1 | 10/2020 | Sapozhnykov et al. |
| 2020/0342182 | A1 | 10/2020 | Premkumar et al. |
| 2020/0342849 | A1 | 10/2020 | Yu et al. |
| 2020/0342858 | A1 | 10/2020 | Gupta et al. |
| 2020/0342862 | A1 | 10/2020 | Gao et al. |
| 2020/0342863 | A1 | 10/2020 | Aggarwal et al. |
| 2020/0348813 | A1 | 11/2020 | Sharifi et al. |
| 2020/0349415 | A1 | 11/2020 | Raju |

(56) References Cited

U.S. PATENT DOCUMENTS

2020/0349966 A1 11/2020 Konzelmann et al.
2020/0356243 A1 11/2020 Meyer et al.
2020/0356585 A1 11/2020 Tomkins et al.
2020/0356589 A1 11/2020 Rekik et al.
2020/0356610 A1 11/2020 Coimbra et al.
2020/0356634 A1 11/2020 Srinivasan et al.
2020/0357387 A1 11/2020 Prabhavalkar et al.
2020/0357391 A1 11/2020 Ghoshal et al.
2020/0357406 A1 11/2020 York et al.
2020/0357409 A1 11/2020 Sun et al.
2020/0364411 A1 11/2020 Evermann
2020/0364858 A1 11/2020 Kaethner et al.
2020/0365134 A1 11/2020 Tu et al.
2020/0365155 A1 11/2020 Milden
2020/0367006 A1 11/2020 Beckhardt
2020/0372633 A1 11/2020 Lee, II et al.
2020/0372719 A1 11/2020 Andjelic et al.
2020/0372904 A1 11/2020 Vescovi et al.
2020/0372905 A1 11/2020 Wang et al.
2020/0374243 A1 11/2020 Jina et al.
2020/0379610 A1 12/2020 Ford et al.
2020/0379640 A1 12/2020 Bellegarda et al.
2020/0379726 A1 12/2020 Blatz et al.
2020/0379727 A1 12/2020 Blatz et al.
2020/0379728 A1 12/2020 Gada et al.
2020/0380053 A1 12/2020 Boukari
2020/0380389 A1 12/2020 Eldeeb et al.
2020/0380956 A1 12/2020 Rossi et al.
2020/0380963 A1 12/2020 Chappidi et al.
2020/0380966 A1 12/2020 Acero et al.
2020/0380973 A1 12/2020 Novitchenko et al.
2020/0380974 A1 12/2020 Gallagher et al.
2020/0380980 A1 12/2020 Shum et al.
2020/0380984 A1 12/2020 Venkatraman et al.
2020/0380985 A1 12/2020 Gada et al.
2020/0382568 A1 12/2020 Krochmal et al.
2020/0382616 A1 12/2020 Vaishampayan et al.
2020/0382635 A1 12/2020 Vora et al.
2020/0394436 A1 12/2020 Rakshit et al.
2020/0411002 A1 12/2020 Lee et al.
2021/0006943 A1 1/2021 Gross et al.
2021/0011557 A1 1/2021 Lemay et al.
2021/0012113 A1 1/2021 Petill et al.
2021/0012775 A1 1/2021 Kang et al.
2021/0012776 A1 1/2021 Peterson et al.
2021/0026896 A1 1/2021 Easton et al.
2021/0027785 A1 1/2021 Kahan et al.
2021/0035429 A1 2/2021 Daoura et al.
2021/0035556 A1 2/2021 Shen et al.
2021/0035567 A1 2/2021 Newendorp et al.
2021/0043190 A1 2/2021 Wang et al.
2021/0044870 A1 2/2021 Li et al.
2021/0049237 A1 2/2021 Demme et al.
2021/0065698 A1 3/2021 Topcu et al.
2021/0067470 A1 3/2021 Freed et al.
2021/0067631 A1 3/2021 Van Os et al.
2021/0072953 A1 3/2021 Amarilio et al.
2021/0073254 A1 3/2021 Ghafourifar et al.
2021/0073293 A1 3/2021 Fenton et al.
2021/0073713 A1 3/2021 Balasubramanian et al.
2021/0074264 A1 3/2021 Liang et al.
2021/0074295 A1 3/2021 Moreno et al.
2021/0081749 A1 3/2021 Claire
2021/0082400 A1 3/2021 Vishnoi et al.
2021/0082420 A1 3/2021 Kraljic et al.
2021/0089124 A1 3/2021 Manjunath et al.
2021/0089724 A1 3/2021 Luong et al.
2021/0090314 A1 3/2021 Hussen et al.
2021/0090575 A1 3/2021 Mahmood et al.
2021/0092128 A1 3/2021 Leblang
2021/0097134 A1 4/2021 Livshits et al.
2021/0097315 A1 4/2021 Carruthers et al.
2021/0097776 A1 4/2021 Faulkner et al.
2021/0097998 A1 4/2021 Kim et al.
2021/0099317 A1 4/2021 Hilleli et al.
2021/0104232 A1 4/2021 Lee et al.
2021/0104236 A1 4/2021 Doggett et al.
2021/0105528 A1 4/2021 Van Os et al.
2021/0110106 A1 4/2021 Vescovi et al.
2021/0110115 A1 4/2021 Moritz et al.
2021/0110254 A1 4/2021 Duy et al.
2021/0117214 A1 4/2021 Presant et al.
2021/0117479 A1 4/2021 Liu et al.
2021/0124417 A1 4/2021 Ma
2021/0124597 A1 4/2021 Ramakrishnan et al.
2021/0127031 A1 4/2021 Kanemoto
2021/0127220 A1 4/2021 Mathieu et al.
2021/0134318 A1 5/2021 Harvey et al.
2021/0141839 A1 5/2021 Tang et al.
2021/0142782 A1 5/2021 Wolf et al.
2021/0143987 A1 5/2021 Xu et al.
2021/0144251 A1 5/2021 Chen
2021/0149629 A1 5/2021 Martel et al.
2021/0149996 A1 5/2021 Bellegarda
2021/0150151 A1 5/2021 Jiaming et al.
2021/0151041 A1 5/2021 Gruber et al.
2021/0151053 A1 5/2021 Takahashi et al.
2021/0151070 A1 5/2021 Binder et al.
2021/0152684 A1 5/2021 Weinstein et al.
2021/0158814 A1 5/2021 Hussain et al.
2021/0165826 A1 6/2021 Graham et al.
2021/0173555 A1 6/2021 Raja et al.
2021/0174020 A1 6/2021 Sohn et al.
2021/0174022 A1 6/2021 Ishikawa et al.
2021/0174403 A1 6/2021 Bellini et al.
2021/0176521 A1 6/2021 Matthews
2021/0182324 A1 6/2021 Raju
2021/0182716 A1 6/2021 Muramoto et al.
2021/0191603 A1 6/2021 Napolitano et al.
2021/0191968 A1 6/2021 Orr et al.
2021/0208752 A1 7/2021 Hwang
2021/0208841 A1 7/2021 Wilberding
2021/0209304 A1 7/2021 Yang et al.
2021/0210089 A1 7/2021 Ma et al.
2021/0210100 A1 7/2021 Wang et al.
2021/0216134 A1 7/2021 Fukunaga et al.
2021/0216760 A1 7/2021 Dominic et al.
2021/0224032 A1 7/2021 Ryan et al.
2021/0224474 A1 7/2021 Jerome et al.
2021/0233532 A1 7/2021 Aram et al.
2021/0241099 A1 8/2021 Li et al.
2021/0241468 A1 8/2021 Zhang
2021/0247959 A1 8/2021 Agarwal et al.
2021/0248804 A1 8/2021 Abdelaziz et al.
2021/0249009 A1 8/2021 Manjunath et al.
2021/0256031 A1 8/2021 Krogh et al.
2021/0256980 A1 8/2021 George-Svahn et al.
2021/0258554 A1 8/2021 Bruls et al.
2021/0258881 A1 8/2021 Freeman et al.
2021/0264913 A1 8/2021 Schramm et al.
2021/0264916 A1 8/2021 Kim et al.
2021/0266725 A1 8/2021 Gray
2021/0271333 A1 9/2021 Hindi et al.
2021/0273894 A1 9/2021 Tian et al.
2021/0278956 A1 9/2021 Dolbakian et al.
2021/0279548 A1 9/2021 Adan et al.
2021/0280180 A1 9/2021 Skobeltsyn et al.
2021/0281965 A1 9/2021 Malik et al.
2021/0287080 A1 9/2021 Moloney
2021/0294569 A1 9/2021 Piersol et al.
2021/0294571 A1 9/2021 Carson et al.
2021/0295602 A1 9/2021 Scapel et al.
2021/0303116 A1 9/2021 Barlow
2021/0303342 A1 9/2021 Dunn et al.
2021/0303798 A1 9/2021 Duong et al.
2021/0304075 A1 9/2021 Duong et al.
2021/0306812 A1 9/2021 Gross et al.
2021/0312138 A1 10/2021 Kaplan
2021/0312917 A1 10/2021 Weksler et al.
2021/0312930 A1 10/2021 Sugaya
2021/0312931 A1 10/2021 Paulik et al.
2021/0313019 A1 10/2021 Pribanic et al.
2021/0314440 A1 10/2021 Matias et al.
2021/0318901 A1 10/2021 Gruber et al.

(56) References Cited

U.S. PATENT DOCUMENTS

| | | | |
|---|---|---|---|
| 2021/0319178 | A1 | 10/2021 | Zhang |
| 2021/0327409 | A1 | 10/2021 | Naik |
| 2021/0327410 | A1 | 10/2021 | Beaufays et al. |
| 2021/0334306 | A1 | 10/2021 | Bo et al. |
| 2021/0334528 | A1 | 10/2021 | Bray et al. |
| 2021/0335342 | A1 | 10/2021 | Yuan et al. |
| 2021/0342050 | A1 | 11/2021 | Wang |
| 2021/0342212 | A1 | 11/2021 | Neumann |
| 2021/0349605 | A1 | 11/2021 | Nonaka et al. |
| 2021/0349608 | A1 | 11/2021 | Blatz et al. |
| 2021/0350799 | A1 | 11/2021 | Hansen et al. |
| 2021/0350803 | A1 | 11/2021 | Hansen et al. |
| 2021/0350810 | A1 | 11/2021 | Phipps et al. |
| 2021/0352115 | A1 | 11/2021 | Hansen et al. |
| 2021/0357172 | A1 | 11/2021 | Sinesio et al. |
| 2021/0357179 | A1 | 11/2021 | Takeshita |
| 2021/0358294 | A1 | 11/2021 | Parashar et al. |
| 2021/0365161 | A1 | 11/2021 | Ellis et al. |
| 2021/0365174 | A1 | 11/2021 | Ellis et al. |
| 2021/0365641 | A1 | 11/2021 | Zhang et al. |
| 2021/0365863 | A1 | 11/2021 | Friske et al. |
| 2021/0366473 | A1 | 11/2021 | Maeng |
| 2021/0366475 | A1 | 11/2021 | Wilkosz et al. |
| 2021/0366480 | A1 | 11/2021 | Lemay et al. |
| 2021/0373851 | A1 | 12/2021 | Stasior et al. |
| 2021/0375275 | A1 | 12/2021 | Yoon et al. |
| 2021/0375290 | A1 | 12/2021 | Hu et al. |
| 2021/0377381 | A1 | 12/2021 | Aggarwal et al. |
| 2021/0377702 | A1 | 12/2021 | Devaraj et al. |
| 2021/0390259 | A1 | 12/2021 | Hildick-Smith et al. |
| 2021/0390955 | A1 | 12/2021 | Piernot et al. |
| 2021/0393168 | A1 | 12/2021 | Santarelli et al. |
| 2021/0398187 | A1 | 12/2021 | Narayanan et al. |
| 2021/0402306 | A1 | 12/2021 | Huang |
| 2021/0406260 | A1 | 12/2021 | Sharifi et al. |
| 2021/0407318 | A1 | 12/2021 | Pitschel et al. |
| 2021/0407502 | A1 | 12/2021 | Vescovi et al. |
| 2022/0004825 | A1 | 1/2022 | Xie et al. |
| 2022/0013106 | A1 | 1/2022 | Deng et al. |
| 2022/0019292 | A1 | 1/2022 | Lemay et al. |
| 2022/0020367 | A1 | 1/2022 | Orkin et al. |
| 2022/0021631 | A1 | 1/2022 | Jina et al. |
| 2022/0021978 | A1 | 1/2022 | Gui et al. |
| 2022/0028379 | A1 | 1/2022 | Carbune et al. |
| 2022/0028387 | A1 | 1/2022 | Walker et al. |
| 2022/0030345 | A1 | 1/2022 | Gong et al. |
| 2022/0035999 | A1 | 2/2022 | Pawelec |
| 2022/0036270 | A1 | 2/2022 | Benyo et al. |
| 2022/0040304 | A1 | 2/2022 | Kim et al. |
| 2022/0043986 | A1 | 2/2022 | Nell et al. |
| 2022/0046310 | A1 | 2/2022 | Shin et al. |
| 2022/0050661 | A1 | 2/2022 | Lange et al. |
| 2022/0050876 | A1 | 2/2022 | Kang et al. |
| 2022/0067283 | A1 | 3/2022 | Bellegarda et al. |
| 2022/0068274 | A1 | 3/2022 | D'Alessandro |
| 2022/0068278 | A1 | 3/2022 | York et al. |
| 2022/0083188 | A1 | 3/2022 | Lin |
| 2022/0083986 | A1 | 3/2022 | Duffy et al. |
| 2022/0084511 | A1 | 3/2022 | Nickson et al. |
| 2022/0092262 | A1 | 3/2022 | Ni et al. |
| 2022/0093088 | A1 | 3/2022 | Sridhar et al. |
| 2022/0093093 | A1 | 3/2022 | Krishnan et al. |
| 2022/0093095 | A1 | 3/2022 | Dighe et al. |
| 2022/0093098 | A1 | 3/2022 | Samal et al. |
| 2022/0093101 | A1 | 3/2022 | Krishnan et al. |
| 2022/0093109 | A1 | 3/2022 | Orr et al. |
| 2022/0093110 | A1 | 3/2022 | Kim et al. |
| 2022/0094765 | A1 | 3/2022 | Niewczas |
| 2022/0100772 | A1 | 3/2022 | Raghura et al. |
| 2022/0100789 | A1 | 3/2022 | Kumar et al. |
| 2022/0103491 | A1 | 3/2022 | Yang et al. |
| 2022/0107780 | A1 | 4/2022 | Gruber et al. |
| 2022/0108081 | A1 | 4/2022 | Dymetman et al. |
| 2022/0114327 | A1 | 4/2022 | Faaborg et al. |
| 2022/0115016 | A1 | 4/2022 | Whalin |
| 2022/0115020 | A1 | 4/2022 | Bradley et al. |
| 2022/0122615 | A1 | 4/2022 | Chen et al. |
| 2022/0130126 | A1 | 4/2022 | Delgado et al. |
| 2022/0139396 | A1 | 5/2022 | Gada et al. |
| 2022/0148587 | A1 | 5/2022 | Drummie et al. |
| 2022/0155857 | A1 | 5/2022 | Lee et al. |
| 2022/0156041 | A1 | 5/2022 | Newendorp et al. |
| 2022/0157310 | A1 | 5/2022 | Newendorp et al. |
| 2022/0157315 | A1 | 5/2022 | Raux et al. |
| 2022/0157317 | A1 | 5/2022 | Burakov et al. |
| 2022/0180857 | A1 | 6/2022 | Aharoni et al. |
| 2022/0180866 | A1 | 6/2022 | Sharifi et al. |
| 2022/0180868 | A1 | 6/2022 | Sharifi et al. |
| 2022/0197491 | A1 | 6/2022 | Meyer et al. |
| 2022/0198025 | A1 | 6/2022 | Gupta et al. |
| 2022/0206298 | A1 | 6/2022 | Goodman |
| 2022/0214743 | A1 | 7/2022 | Dascola et al. |
| 2022/0214775 | A1 | 7/2022 | Shah et al. |
| 2022/0215159 | A1 | 7/2022 | Qian et al. |
| 2022/0222437 | A1 | 7/2022 | Lauber |
| 2022/0223154 | A1 | 7/2022 | Zhou et al. |
| 2022/0229985 | A1 | 7/2022 | Bellegarda et al. |
| 2022/0230000 | A1 | 7/2022 | Jalaluddin et al. |
| 2022/0230653 | A1 | 7/2022 | Binder et al. |
| 2022/0253969 | A1 | 8/2022 | Kamenetskaya et al. |
| 2022/0254338 | A1 | 8/2022 | Gruber et al. |
| 2022/0254339 | A1 | 8/2022 | Acero et al. |
| 2022/0254341 | A1 | 8/2022 | Naganna et al. |
| 2022/0254347 | A1 | 8/2022 | Lindahl |
| 2022/0255885 | A1 | 8/2022 | Aharoni et al. |
| 2022/0261468 | A1 | 8/2022 | Lin et al. |
| 2022/0261769 | A1 | 8/2022 | Vellanti |
| 2022/0262354 | A1 | 8/2022 | Greborio et al. |
| 2022/0264262 | A1 | 8/2022 | Gruber et al. |
| 2022/0277505 | A1 | 9/2022 | Baszucki et al. |
| 2022/0284901 | A1 | 9/2022 | Novitchenko et al. |
| 2022/0291792 | A1 | 9/2022 | Alston |
| 2022/0291816 | A1 | 9/2022 | Fan et al. |
| 2022/0292128 | A1 | 9/2022 | Sharifi et al. |
| 2022/0293124 | A1 | 9/2022 | Weinberg et al. |
| 2022/0293125 | A1 | 9/2022 | Maddika et al. |
| 2022/0295170 | A1 | 9/2022 | Ito et al. |
| 2022/0300094 | A1 | 9/2022 | Hindi et al. |
| 2022/0301549 | A1 | 9/2022 | Lee et al. |
| 2022/0301566 | A1 | 9/2022 | Van Os et al. |
| 2022/0308718 | A1 | 9/2022 | Klein et al. |
| 2022/0310056 | A1 | 9/2022 | Ramabhadran et al. |
| 2022/0318248 | A1 | 10/2022 | Liang et al. |
| 2022/0329691 | A1 | 10/2022 | Chinthakunta et al. |
| 2022/0343066 | A1 | 10/2022 | Kwong et al. |
| 2022/0366889 | A1 | 11/2022 | Yerroju et al. |
| 2022/0374109 | A1 | 11/2022 | Kramer et al. |
| 2022/0374110 | A1 | 11/2022 | Ramaswamy et al. |
| 2022/0374209 | A1 | 11/2022 | Shek et al. |
| 2022/0374597 | A1 | 11/2022 | Bellegarda et al. |
| 2022/0374727 | A1 | 11/2022 | Hansen et al. |
| 2022/0375466 | A1 | 11/2022 | Hergenrader et al. |
| 2022/0375553 | A1 | 11/2022 | Lasko et al. |
| 2022/0382843 | A1 | 12/2022 | Gong et al. |
| 2022/0382994 | A1 | 12/2022 | Cox et al. |
| 2022/0383044 | A1 | 12/2022 | Bellegarda |
| 2022/0383864 | A1 | 12/2022 | Gruber et al. |
| 2022/0383872 | A1 | 12/2022 | Li et al. |
| 2022/0391585 | A1 | 12/2022 | Bellegarda et al. |
| 2022/0391603 | A1 | 12/2022 | Pham et al. |
| 2022/0392446 | A1 | 12/2022 | Webber et al. |
| 2022/0405117 | A1 | 12/2022 | Gruber et al. |
| 2022/0406301 | A1 | 12/2022 | Barros et al. |
| 2022/0406309 | A1 | 12/2022 | Piernot et al. |
| 2022/0408173 | A1 | 12/2022 | Gong et al. |
| 2023/0013615 | A1 | 1/2023 | Sanghavi et al. |
| 2023/0017115 | A1 | 1/2023 | Sanghavi et al. |
| 2023/0018457 | A1 | 1/2023 | Zeitlin |
| 2023/0026764 | A1 | 1/2023 | Karashchuk et al. |
| 2023/0029028 | A1 | 1/2023 | Aitken et al. |
| 2023/0035643 | A1 | 2/2023 | Binder et al. |
| 2023/0035941 | A1 | 2/2023 | Herman et al. |
| 2023/0036059 | A1 | 2/2023 | Blatz et al. |
| 2023/0036798 | A1 | 2/2023 | Newendorp et al. |

(56) References Cited

U.S. PATENT DOCUMENTS

2023/0040703 A1 2/2023 Lemay et al.
2023/0042224 A1 2/2023 Patel et al.
2023/0048256 A1 2/2023 Gui et al.
2023/0051062 A1 2/2023 Hu et al.
2023/0057442 A1 2/2023 Stasior et al.
2023/0058929 A1 2/2023 Lasko et al.
2023/0066552 A1 3/2023 Van Os et al.
2023/0070209 A1 3/2023 Srinivasan et al.
2023/0072481 A1 3/2023 Acero et al.
2023/0076716 A1 3/2023 Dogrusoz et al.
2023/0081605 A1 3/2023 O'Mara et al.
2023/0087244 A1 3/2023 Akmal et al.
2023/0094522 A1 3/2023 Stauber et al.
2023/0098174 A1 3/2023 Simes et al.
2023/0104583 A1 4/2023 Bekker et al.
2023/0111509 A1 4/2023 Kim et al.
2023/0112859 A1 4/2023 Vilhauer et al.
2023/0134970 A1 5/2023 Rasipuram et al.
2023/0179704 A1 6/2023 Chinthakunta et al.
2023/0185397 A1 6/2023 Anzures et al.
2023/0186921 A1 6/2023 Paulik et al.
2023/0197063 A1 6/2023 Greborio et al.
2023/0199147 A1 6/2023 Desserrey et al.
2023/0215435 A1 7/2023 Manjunath et al.
2023/0216963 A1 7/2023 Van Os et al.
2023/0236676 A1 7/2023 Hindi et al.
2023/0236717 A1 7/2023 Meyer et al.
2023/0245657 A1 8/2023 Liang et al.
2023/0251881 A1 8/2023 Radebaugh et al.
2023/0253005 A1 8/2023 Binder et al.
2023/0254448 A1 8/2023 Binder et al.
2023/0259550 A1 8/2023 Graham et al.
2023/0262605 A1 8/2023 Freeman et al.
2023/0267422 A1 8/2023 Herman et al.
2023/0290352 A1 9/2023 York et al.
2023/0292027 A1 9/2023 Gong et al.
2023/0298595 A1 9/2023 Orr et al.
2023/0306968 A1 9/2023 Liang et al.
2023/0325157 A1 10/2023 Hurley et al.
2023/0335132 A1 10/2023 Garcia et al.
2023/0344537 A1 10/2023 Ingebretsen et al.
2023/0352007 A1 11/2023 Castellani et al.
2023/0352014 A1 11/2023 Tennant et al.
2023/0352016 A1 11/2023 Kudurshian et al.
2023/0352022 A1 11/2023 Milden
2023/0359334 A1 11/2023 Chapman et al.
2023/0359475 A1 11/2023 Karashchuk et al.
2023/0367458 A1 11/2023 Burgess et al.
2023/0367777 A1 11/2023 Burgess et al.
2023/0367795 A1 11/2023 Burgess et al.
2023/0368783 A1 11/2023 Marchi et al.
2023/0368787 A1 11/2023 Sumner et al.
2023/0368788 A1 11/2023 Ma et al.
2023/0368791 A1 11/2023 Walker et al.
2023/0368812 A1 11/2023 Marchi et al.
2023/0376690 A1 11/2023 Bellegarda et al.
2023/0386460 A1 11/2023 Fish et al.
2023/0386462 A1 11/2023 Piernot et al.
2023/0386464 A1 11/2023 Manjunath et al.
2023/0386469 A1 11/2023 Horton et al.
2023/0386478 A1 11/2023 Liu et al.
2023/0388409 A1 11/2023 Weinstein et al.
2023/0393712 A1 12/2023 Fujita et al.
2023/0393811 A1 12/2023 Piersol et al.
2023/0393872 A1 12/2023 Ellis et al.
2023/0394248 A1 12/2023 Bellegarda
2023/0395067 A1 12/2023 Perkins et al.
2023/0401795 A1 12/2023 Streja et al.
2023/0401798 A1 12/2023 Bigham et al.
2023/0409174 A1 12/2023 Liang et al.
2023/0409179 A1 12/2023 Liang et al.
2023/0409283 A1 12/2023 Gruber et al.
2023/0410540 A1 12/2023 Dehghan et al.
2023/0410798 A1 12/2023 Greborio et al.
2023/0410805 A1 12/2023 Drummie et al.
2023/0419967 A1 12/2023 Hornberger et al.
2024/0029734 A1 1/2024 Lemay et al.
2024/0054996 A1 2/2024 Vescovi et al.
2024/0055017 A1 2/2024 Maddika et al.
2024/0064370 A1 2/2024 Van Os et al.
2024/0075944 A1 3/2024 Sahoo
2024/0087566 A1 3/2024 Piernot et al.
2024/0096321 A1 3/2024 Naik et al.
2024/0111402 A1 4/2024 Blatz et al.
2024/0118744 A1 4/2024 Vaughan et al.
2024/0134506 A1 4/2024 Napolitano et al.
2024/0146776 A1 5/2024 Hansen et al.
2024/0177424 A1 5/2024 Herman et al.
2024/0185856 A1 6/2024 Paek et al.
2024/0201946 A1 6/2024 Stasior et al.
2024/0211108 A1 6/2024 Ellis et al.
2024/0220292 A1 7/2024 Ellis et al.
2024/0221746 A1 7/2024 Webber et al.
2024/0233752 A1 7/2024 Weinberg et al.
2024/0244531 A1 7/2024 Freeman et al.
2024/0248678 A1 7/2024 Krivoruchko et al.
2024/0265914 A1 8/2024 Perkins et al.
2024/0265936 A1 8/2024 Binder et al.
2024/0267453 A1 8/2024 Aggarwal et al.

FOREIGN PATENT DOCUMENTS

AU 2015101171 A4 10/2015
AU 2015312369 A1 3/2017
AU 2017203668 A1 1/2018
AU 2018100187 A4 3/2018
AU 2017222436 A1 10/2018
CH 709795 A1 12/2015
CN 1361516 A 7/2002
CN 1898721 A 1/2007
CN 101138228 A 3/2008
CN 101247301 A 8/2008
CN 101507179 A 8/2009
CN 1961298 * 5/2010
CN 101833286 A 9/2010
CN 101910960 A 12/2010
CN 101971250 A 2/2011
CN 102137085 A 7/2011
CN 102520789 A 6/2012
CN 102682769 A 9/2012
CN 102792320 A 11/2012
CN 102882752 A 1/2013
CN 103093755 A 5/2013
CN 103365279 A 10/2013
CN 103456303 A 12/2013
CN 103475551 A 12/2013
CN 103477592 A 12/2013
CN 103533143 A 1/2014
CN 103533154 A 1/2014
CN 103543902 A 1/2014
CN 103546453 A 1/2014
CN 103562863 A 2/2014
CN 103582896 A 2/2014
CN 103593054 A 2/2014
CN 103595869 A 2/2014
CN 103608859 A 2/2014
CN 103620605 A 3/2014
CN 103645876 A 3/2014
CN 103677261 A 3/2014
CN 103686723 A 3/2014
CN 103714816 A 4/2014
CN 103716454 A 4/2014
CN 103718568 A 4/2014
CN 103727948 A 4/2014
CN 103730120 A 4/2014
CN 103744761 A 4/2014
CN 103748531 A 4/2014
CN 103748609 A 4/2014
CN 103760984 A 4/2014
CN 103761104 A 4/2014
CN 103765385 A 4/2014
CN 103778527 A 5/2014
CN 103780758 A 5/2014
CN 103782253 A 5/2014

(56) References Cited

FOREIGN PATENT DOCUMENTS

CN 103792985 A 5/2014
CN 103794212 A 5/2014
CN 103795850 A 5/2014
CN 103795866 A 5/2014
CN 103809548 A 5/2014
CN 103841268 A 6/2014
CN 103858083 A 6/2014
CN 103870168 A 6/2014
CN 103885663 A 6/2014
CN 103902373 A 7/2014
CN 103930945 A 7/2014
CN 103942932 A 7/2014
CN 103943107 A 7/2014
CN 103956169 A 7/2014
CN 103959751 A 7/2014
CN 203721183 U 7/2014
CN 103971680 A 8/2014
CN 104007832 A 8/2014
CN 104011731 A 8/2014
CN 102693729 B 9/2014
CN 104036774 A 9/2014
CN 104038621 A 9/2014
CN 104050153 A 9/2014
CN 104090652 A 10/2014
CN 104092829 A 10/2014
CN 104094580 A 10/2014
CN 104113471 A 10/2014
CN 104125322 A 10/2014
CN 104144377 A 11/2014
CN 104145304 A 11/2014
CN 104169837 A 11/2014
CN 104180815 A 12/2014
CN 104185868 A 12/2014
CN 104219785 A 12/2014
CN 104240701 A 12/2014
CN 104243699 A 12/2014
CN 104281259 A 1/2015
CN 104281390 A 1/2015
CN 104284257 A 1/2015
CN 104284486 A 1/2015
CN 104335205 A 2/2015
CN 104335207 A 2/2015
CN 104335234 A 2/2015
CN 104350454 A 2/2015
CN 104360990 A 2/2015
CN 104374399 A 2/2015
CN 104376250 A 2/2015
CN 104378723 A 2/2015
CN 104423594 A 3/2015
CN 104423625 A 3/2015
CN 104423780 A 3/2015
CN 104427104 A 3/2015
CN 104463552 A 3/2015
CN 104464733 A 3/2015
CN 104487929 A 4/2015
CN 104516522 A 4/2015
CN 104520849 A 4/2015
CN 104573472 A 4/2015
CN 104575493 A 4/2015
CN 104575501 A 4/2015
CN 104575504 A 4/2015
CN 104584010 A 4/2015
CN 104584096 A 4/2015
CN 104584601 A 4/2015
CN 104604274 A 5/2015
CN 104662600 A 5/2015
CN 104679472 A 6/2015
CN 104685898 A 6/2015
CN 104699746 A 6/2015
CN 104731441 A 6/2015
CN 104769584 A 7/2015
CN 104769670 A 7/2015
CN 104798012 A 7/2015
CN 104820488 A 8/2015
CN 104821167 A 8/2015
CN 104821934 A 8/2015
CN 104836909 A 8/2015
CN 104854583 A 8/2015
CN 104867492 A 8/2015
CN 104869342 A 8/2015
CN 104932826 A 9/2015
CN 104951077 A 9/2015
CN 104951458 A 9/2015
CN 104967748 A 10/2015
CN 104969289 A 10/2015
CN 104978963 A 10/2015
CN 105025051 A 11/2015
CN 105027197 A 11/2015
CN 105093526 A 11/2015
CN 105100356 A 11/2015
CN 105144037 A 12/2015
CN 105144136 A 12/2015
CN 105164678 A 12/2015
CN 105164719 A 12/2015
CN 105190607 A 12/2015
CN 105247511 A 1/2016
CN 105247551 A 1/2016
CN 105264524 A 1/2016
CN 105264903 A 1/2016
CN 105265005 A 1/2016
CN 105278681 A 1/2016
CN 105320251 A 2/2016
CN 105320726 A 2/2016
CN 105338425 A 2/2016
CN 105379234 A 3/2016
CN 105427122 A 3/2016
CN 105430186 A 3/2016
CN 105468137 A 4/2016
CN 105471705 A 4/2016
CN 105472587 A 4/2016
CN 105516441 A 4/2016
CN 105554217 A 5/2016
CN 105556592 A 5/2016
CN 105677765 A 6/2016
CN 105791920 A 7/2016
CN 105808200 A 7/2016
CN 105830048 A 8/2016
CN 105869641 A 8/2016
CN 105872222 A 8/2016
CN 105917311 A 8/2016
CN 106030699 A 10/2016
CN 106062734 A 10/2016
CN 106062790 A 10/2016
CN 106164909 A 11/2016
CN 106251889 A 12/2016
CN 106294558 A 1/2017
CN 106415412 A 2/2017
CN 106462383 A 2/2017
CN 106462617 A 2/2017
CN 106463114 A 2/2017
CN 106465074 A 2/2017
CN 106471570 A 3/2017
CN 106534469 A 3/2017
CN 106558310 A 4/2017
CN 106575195 A 4/2017
CN 106575501 A 4/2017
CN 106663224 A 5/2017
CN 106773742 A 5/2017
CN 106776581 A 5/2017
CN 107003738 A 8/2017
CN 107004412 A 8/2017
CN 107209883 A 9/2017
CN 107450800 A 12/2017
CN 107480161 A 12/2017
CN 107490971 A 12/2017
CN 107491285 A 12/2017
CN 107491295 A 12/2017
CN 107491468 A 12/2017
CN 107491469 A 12/2017
CN 107506037 A 12/2017
CN 107545262 A 1/2018
CN 107589841 A 1/2018
CN 107608998 A 1/2018
CN 107615378 A 1/2018

(56) References Cited

FOREIGN PATENT DOCUMENTS

| | | | |
|---|---|---|---|
| CN | 107623616 | A | 1/2018 |
| CN | 107644053 | A | 1/2018 |
| CN | 107683470 | A | 2/2018 |
| CN | 107690620 | A | 2/2018 |
| CN | 107786730 | A | 3/2018 |
| CN | 107852436 | A | 3/2018 |
| CN | 107871500 | A | 4/2018 |
| CN | 107889533 | A | 4/2018 |
| CN | 107919123 | A | 4/2018 |
| CN | 107924313 | A | 4/2018 |
| CN | 107978313 | A | 5/2018 |
| CN | 108027738 | A | 5/2018 |
| CN | 108268187 | A | 7/2018 |
| CN | 108604449 | A | 9/2018 |
| CN | 108647681 | A | 10/2018 |
| CN | 109155132 | A | 1/2019 |
| CN | 109447234 | A | 3/2019 |
| CN | 109657629 | A | 4/2019 |
| CN | 109691074 | A | 4/2019 |
| CN | 110135411 | A | 8/2019 |
| CN | 110263144 | A | 9/2019 |
| CN | 105164719 | B | 11/2019 |
| CN | 110446000 | A | 11/2019 |
| CN | 110531860 | A | 12/2019 |
| CN | 110554761 | A | 12/2019 |
| CN | 110598671 | A | 12/2019 |
| CN | 110647274 | A | 1/2020 |
| CN | 110825469 | A | 2/2020 |
| CN | 110945840 | A | 3/2020 |
| CN | 111124224 | A | 5/2020 |
| CN | 107123417 | B | 6/2020 |
| CN | 111316203 | A | 6/2020 |
| CN | 111722716 | A | 9/2020 |
| CN | 111934959 | A | 11/2020 |
| CN | 112204507 | A | 1/2021 |
| DE | 202016008226 | U1 | 5/2017 |
| DK | 179570 | B1 | 2/2019 |
| DK | 180129 | B1 | 6/2020 |
| EP | 2680257 | A1 | 1/2014 |
| EP | 2683147 | A1 | 1/2014 |
| EP | 2683175 | A1 | 1/2014 |
| EP | 2672231 | A3 | 4/2014 |
| EP | 2717259 | A2 | 4/2014 |
| EP | 2725577 | A2 | 4/2014 |
| EP | 2733598 | A2 | 5/2014 |
| EP | 2733896 | A1 | 5/2014 |
| EP | 2741175 | A2 | 6/2014 |
| EP | 2741190 | A2 | 6/2014 |
| EP | 2743846 | A2 | 6/2014 |
| EP | 2752847 | A1 | 7/2014 |
| EP | 2760015 | A1 | 7/2014 |
| EP | 2779160 | A1 | 9/2014 |
| EP | 2781883 | A2 | 9/2014 |
| EP | 2787683 | A1 | 10/2014 |
| EP | 2801890 | A1 | 11/2014 |
| EP | 2801972 | A1 | 11/2014 |
| EP | 2801974 | A2 | 11/2014 |
| EP | 2824564 | A1 | 1/2015 |
| EP | 2849177 | A1 | 3/2015 |
| EP | 2879402 | A1 | 6/2015 |
| EP | 2881898 | A1 | 6/2015 |
| EP | 2881939 | A1 | 6/2015 |
| EP | 2891049 | A1 | 7/2015 |
| EP | 2915021 | A2 | 9/2015 |
| EP | 2930715 | A1 | 10/2015 |
| EP | 2938022 | A1 | 10/2015 |
| EP | 2940556 | A1 | 11/2015 |
| EP | 2947859 | A1 | 11/2015 |
| EP | 2950307 | A1 | 12/2015 |
| EP | 2957986 | A1 | 12/2015 |
| EP | 2973380 | A2 | 1/2016 |
| EP | 2985984 | A2 | 2/2016 |
| EP | 2988513 | A1 | 2/2016 |
| EP | 2891049 | A4 | 3/2016 |
| EP | 2996359 | A1 | 3/2016 |
| EP | 3032532 | A1 | 6/2016 |
| EP | 3035329 | A1 | 6/2016 |
| EP | 3036594 | A2 | 6/2016 |
| EP | 3038333 | A1 | 6/2016 |
| EP | 3076267 | A1 | 10/2016 |
| EP | 3107101 | A1 | 12/2016 |
| EP | 3115905 | A1 | 1/2017 |
| EP | 3125097 | A2 | 2/2017 |
| EP | 3132442 | A1 | 2/2017 |
| EP | 2672231 | B1 | 5/2017 |
| EP | 3161612 | A1 | 5/2017 |
| EP | 3200185 | A1 | 8/2017 |
| EP | 3201770 | A1 | 8/2017 |
| EP | 3224708 | A1 | 10/2017 |
| EP | 3227771 | A1 | 10/2017 |
| EP | 3246916 | A1 | 11/2017 |
| EP | 3270658 | A1 | 1/2018 |
| EP | 3300074 | A1 | 3/2018 |
| EP | 3336805 | A1 | 6/2018 |
| EP | 3155500 | B1 | 7/2018 |
| EP | 2973380 | B1 | 8/2018 |
| EP | 2983065 | B1 | 8/2018 |
| EP | 3382530 | A1 | 10/2018 |
| EP | 3389045 | A1 | 10/2018 |
| EP | 3392876 | A1 | 10/2018 |
| EP | 3401773 | A1 | 11/2018 |
| EP | 3485392 | A1 | 5/2019 |
| EP | 2973002 | B1 | 6/2019 |
| EP | 3506151 | A1 | 7/2019 |
| EP | 3550483 | A1 | 10/2019 |
| EP | 3567584 | A1 | 11/2019 |
| EP | 3588912 | A1 | 1/2020 |
| EP | 3323058 | B1 | 2/2020 |
| EP | 3321928 | B1 | 4/2020 |
| EP | 3646205 | A1 | 5/2020 |
| EP | 3674922 | A1 | 7/2020 |
| EP | 3913475 | A1 | 11/2021 |
| EP | 3971688 | A1 | 3/2022 |
| EP | 4131256 | A1 | 2/2023 |
| EP | 4281855 | A1 | 11/2023 |
| IN | 201917007360 | A | 5/2019 |
| JP | 63-280559 | A | 11/1988 |
| JP | 10-276483 | A | 10/1998 |
| JP | 2002-281170 | A | 9/2002 |
| JP | 2002-318843 | A | 10/2002 |
| JP | 2004-86150 | A | 3/2004 |
| JP | 2004-258809 | A | 9/2004 |
| JP | 2006-50115 | A | 2/2006 |
| JP | 2006-118221 | A | 5/2006 |
| JP | 2006-137366 | A | 6/2006 |
| JP | 2006-203518 | A | 8/2006 |
| JP | 2006-308848 | A | 11/2006 |
| JP | 2007-235602 | A | 9/2007 |
| JP | 2008-76811 | A | 4/2008 |
| JP | 2009-110300 | A | 5/2009 |
| JP | 2011-250027 | A | 12/2011 |
| JP | 2013-88535 | A | 5/2013 |
| JP | 2014-2586 | A | 1/2014 |
| JP | 2014-10688 | A | 1/2014 |
| JP | 2014-500558 | A | 1/2014 |
| JP | 2014-502445 | A | 1/2014 |
| JP | 2014-26629 | A | 2/2014 |
| JP | 2014-45449 | A | 3/2014 |
| JP | 2014-507903 | A | 3/2014 |
| JP | 2014-60600 | A | 4/2014 |
| JP | 2014-72586 | A | 4/2014 |
| JP | 2014-77969 | A | 5/2014 |
| JP | 2014-89711 | A | 5/2014 |
| JP | 2014-109889 | A | 6/2014 |
| JP | 2014-513835 | A | 6/2014 |
| JP | 2014-124332 | A | 7/2014 |
| JP | 2014-126600 | A | 7/2014 |
| JP | 2014-127754 | A | 7/2014 |
| JP | 2014-140121 | A | 7/2014 |
| JP | 2014-518409 | A | 7/2014 |
| JP | 2014-142566 | A | 8/2014 |
| JP | 2014-145842 | A | 8/2014 |
| JP | 2014-146940 | A | 8/2014 |
| JP | 2014-150323 | A | 8/2014 |

(56) References Cited

FOREIGN PATENT DOCUMENTS

| | | | |
|---|---|---|---|
| JP | 2014-157323 | A | 8/2014 |
| JP | 2014-519648 | A | 8/2014 |
| JP | 2014-182042 | A | 9/2014 |
| JP | 2014-524627 | A | 9/2014 |
| JP | 2014-191272 | A | 10/2014 |
| JP | 2014-219614 | A | 11/2014 |
| JP | 2014-222514 | A | 11/2014 |
| JP | 2014-235582 | A | 12/2014 |
| JP | 2015-1931 | A | 1/2015 |
| JP | 2015-4928 | A | 1/2015 |
| JP | 2015-8001 | A | 1/2015 |
| JP | 2015-10979 | A | 1/2015 |
| JP | 2015-12301 | A | 1/2015 |
| JP | 2015-18365 | A | 1/2015 |
| JP | 2015-501022 | A | 1/2015 |
| JP | 2015-501034 | A | 1/2015 |
| JP | 2015-504619 | A | 2/2015 |
| JP | 2015-41845 | A | 3/2015 |
| JP | 2015-52500 | A | 3/2015 |
| JP | 2015-60423 | A | 3/2015 |
| JP | 2015-81971 | A | 4/2015 |
| JP | 2015-83938 | A | 4/2015 |
| JP | 2015-87979 | A | 5/2015 |
| JP | 2015-94848 | A | 5/2015 |
| JP | 2015-514254 | A | 5/2015 |
| JP | 2015-519675 | A | 7/2015 |
| JP | 2015-520409 | A | 7/2015 |
| JP | 2015-524974 | A | 8/2015 |
| JP | 2015-526776 | A | 9/2015 |
| JP | 2015-527683 | A | 9/2015 |
| JP | 2015-528140 | A | 9/2015 |
| JP | 2015-185023 | A | 10/2015 |
| JP | 2015-528918 | A | 10/2015 |
| JP | 2015-531909 | A | 11/2015 |
| JP | 2015-532075 | A | 11/2015 |
| JP | 2016-504651 | A | 2/2016 |
| JP | 2016-35614 | A | 3/2016 |
| JP | 2016-508007 | A | 3/2016 |
| JP | 2016-71247 | A | 5/2016 |
| JP | 2016-119615 | A | 6/2016 |
| JP | 2016-151928 | A | 8/2016 |
| JP | 2016-524193 | A | 8/2016 |
| JP | 2016-156845 | A | 9/2016 |
| JP | 2016-536648 | A | 11/2016 |
| JP | 2017-11608 | A | 1/2017 |
| JP | 2017-19331 | A | 1/2017 |
| JP | 2017-516153 | A | 6/2017 |
| JP | 2017-123187 | A | 7/2017 |
| JP | 2017-211608 | A | 11/2017 |
| JP | 2017-537361 | A | 12/2017 |
| JP | 2018-14086 | A | 1/2018 |
| JP | 6291147 | B1 | 2/2018 |
| JP | 2018-60550 | A | 4/2018 |
| JP | 2018-64297 | A | 4/2018 |
| JP | 2018-511095 | A | 4/2018 |
| JP | 2018-101242 | A | 6/2018 |
| JP | 2018-113035 | A | 7/2018 |
| JP | 2018-523102 | A | 8/2018 |
| JP | 2018-525653 | A | 9/2018 |
| JP | 2018-525950 | A | 9/2018 |
| JP | 2018-536889 | A | 12/2018 |
| JP | 2019-204517 | A | 11/2019 |
| KR | 10-2014-0007282 | A | 1/2014 |
| KR | 10-2014-0024271 | A | 2/2014 |
| KR | 10-2014-0025996 | A | 3/2014 |
| KR | 10-2014-0031283 | A | 3/2014 |
| KR | 10-2014-0033574 | A | 3/2014 |
| KR | 10-2014-0042994 | A | 4/2014 |
| KR | 10-2014-0048779 | A | 4/2014 |
| KR | 10-2014-0055204 | A | 5/2014 |
| KR | 10-2014-0059697 | A | 5/2014 |
| KR | 10-2014-0068752 | A | 6/2014 |
| KR | 10-2014-0071208 | A | 6/2014 |
| KR | 10-2014-0088449 | A | 7/2014 |
| KR | 10-2014-0093949 | A | 7/2014 |
| KR | 10-2014-0106715 | A | 9/2014 |
| KR | 10-2014-0107253 | A | 9/2014 |
| KR | 10-2014-0147557 | A | 12/2014 |
| KR | 10-2015-0006454 | A | 1/2015 |
| KR | 10-2015-0013631 | A | 2/2015 |
| KR | 10-2015-0025059 | A | 3/2015 |
| KR | 10-1506510 | B1 | 3/2015 |
| KR | 10-2015-0038375 | A | 4/2015 |
| KR | 10-2015-0039380 | A | 4/2015 |
| KR | 10-2015-0041974 | A | 4/2015 |
| KR | 10-2015-0043512 | A | 4/2015 |
| KR | 10-1510013 | B1 | 4/2015 |
| KR | 10-2015-0062811 | A | 6/2015 |
| KR | 10-2015-0095624 | A | 8/2015 |
| KR | 10-1555742 | B1 | 9/2015 |
| KR | 10-2015-0113127 | A | 10/2015 |
| KR | 10-2015-0131262 | A | 11/2015 |
| KR | 10-2015-0138109 | A | 12/2015 |
| KR | 10-2016-0004351 | A | 1/2016 |
| KR | 10-2016-0010523 | A | 1/2016 |
| KR | 10-2016-0040279 | A | 4/2016 |
| KR | 10-2016-0055839 | A | 5/2016 |
| KR | 10-2016-0065503 | A | 6/2016 |
| KR | 10-2016-0101079 | A | 8/2016 |
| KR | 10-2016-0101198 | A | 8/2016 |
| KR | 10-2016-0105847 | A | 9/2016 |
| KR | 10-2016-0121585 | A | 10/2016 |
| KR | 10-2016-0127165 | A | 11/2016 |
| KR | 10-2016-0140694 | A | 12/2016 |
| KR | 10-2016-0147854 | A | 12/2016 |
| KR | 10-2017-0004482 | A | 1/2017 |
| KR | 10-2017-0006592 | A | 1/2017 |
| KR | 10-2017-0036805 | A | 4/2017 |
| KR | 10-2017-0096774 | A | 8/2017 |
| KR | 10-2017-0104006 | A | 9/2017 |
| KR | 10-2017-0107058 | A | 9/2017 |
| KR | 10-1776673 | B1 | 9/2017 |
| KR | 10-2018-0032632 | A | 3/2018 |
| KR | 10-2018-0034637 | A | 4/2018 |
| KR | 10-2018-0122837 | A | 11/2018 |
| KR | 10-2018-0133525 | A | 12/2018 |
| KR | 10-2018-0135877 | A | 12/2018 |
| KR | 10-1959328 | B1 | 3/2019 |
| KR | 10-2020-0007926 | A | 1/2020 |
| KR | 10-2020-0105519 | A | 9/2020 |
| RU | 2012141604 | A | 4/2014 |
| TW | 201407184 | A | 2/2014 |
| TW | 201610982 | A | 3/2016 |
| TW | 201629750 | A | 8/2016 |
| WO | 00/75903 | A2 | 12/2000 |
| WO | 2008/085205 | A2 | 7/2008 |
| WO | 2008/130095 | A1 | 10/2008 |
| WO | 2011/088053 | A2 | 7/2011 |
| WO | 2012/092562 | A1 | 7/2012 |
| WO | 2012/145227 | A1 | 10/2012 |
| WO | 2012/167168 | A2 | 12/2012 |
| WO | 2012/173902 | A2 | 12/2012 |
| WO | 2013/048880 | A1 | 4/2013 |
| WO | 2013/057153 | A1 | 4/2013 |
| WO | WO 2013/107604 | * | 7/2013 |
| WO | 2013/122310 | A1 | 8/2013 |
| WO | 2013/128999 | A1 | 9/2013 |
| WO | 2013/173504 | A1 | 11/2013 |
| WO | 2014/003138 | A1 | 1/2014 |
| WO | 2014/004544 | A2 | 1/2014 |
| WO | 2014/004584 | A2 | 1/2014 |
| WO | 2014/008461 | A1 | 1/2014 |
| WO | 2014/018580 | A1 | 1/2014 |
| WO | 2014/021967 | A1 | 2/2014 |
| WO | 2014/022148 | A1 | 2/2014 |
| WO | 2014/028735 | A2 | 2/2014 |
| WO | 2014/028797 | A1 | 2/2014 |
| WO | 2014/031505 | A1 | 2/2014 |
| WO | 2014/032461 | A1 | 3/2014 |
| WO | 2014/040022 | A2 | 3/2014 |
| WO | 2014/046475 | A1 | 3/2014 |
| WO | 2014/047047 | A1 | 3/2014 |
| WO | 2014/048855 | A1 | 4/2014 |
| WO | 2014/066352 | A1 | 5/2014 |

(56) References Cited

FOREIGN PATENT DOCUMENTS

| | | | |
|---|---|---|---|
| WO | 2014/070872 | A2 | 5/2014 |
| WO | 2014/073825 | A1 | 5/2014 |
| WO | 2014/078965 | A1 | 5/2014 |
| WO | 2014/093339 | A1 | 6/2014 |
| WO | 2014/093911 | A2 | 6/2014 |
| WO | 2014/096506 | A1 | 6/2014 |
| WO | 2014/124332 | A2 | 8/2014 |
| WO | 2014/137074 | A1 | 9/2014 |
| WO | 2014/138604 | A1 | 9/2014 |
| WO | 2014/143959 | A2 | 9/2014 |
| WO | 2014/144395 | A2 | 9/2014 |
| WO | 2014/144579 | A1 | 9/2014 |
| WO | 2014/144949 | A2 | 9/2014 |
| WO | 2014/149473 | A1 | 9/2014 |
| WO | 2014/151153 | A2 | 9/2014 |
| WO | 2014/124332 | A3 | 10/2014 |
| WO | 2014/159578 | A1 | 10/2014 |
| WO | 2014/159581 | A1 | 10/2014 |
| WO | 2014/162570 | A1 | 10/2014 |
| WO | 2014/169269 | A1 | 10/2014 |
| WO | 2014/173189 | A1 | 10/2014 |
| WO | 2014/144949 | A3 | 11/2014 |
| WO | 2014/190297 | A1 | 11/2014 |
| WO | 2013/173504 | A8 | 12/2014 |
| WO | 2014/193161 | A1 | 12/2014 |
| WO | 2014/197336 | A1 | 12/2014 |
| WO | 2014/197339 | A1 | 12/2014 |
| WO | 2014/197635 | A2 | 12/2014 |
| WO | 2014/197730 | A1 | 12/2014 |
| WO | 2014/200728 | A1 | 12/2014 |
| WO | 2014/200731 | A1 | 12/2014 |
| WO | 2014/203495 | A1 | 12/2014 |
| WO | 2014/204659 | A2 | 12/2014 |
| WO | 2014/209264 | A1 | 12/2014 |
| WO | 2014/210392 | A2 | 12/2014 |
| WO | 2015/001850 | A1 | 1/2015 |
| WO | 2015/018440 | A1 | 2/2015 |
| WO | 2015/020942 | A1 | 2/2015 |
| WO | 2015/029379 | A1 | 3/2015 |
| WO | 2015/030796 | A1 | 3/2015 |
| WO | 2015/036817 | A1 | 3/2015 |
| WO | 2015/041882 | A1 | 3/2015 |
| WO | 2015/041892 | A1 | 3/2015 |
| WO | 2015/047932 | A1 | 4/2015 |
| WO | 2015/053485 | A1 | 4/2015 |
| WO | 2015/054141 | A1 | 4/2015 |
| WO | 2015/080530 | A1 | 6/2015 |
| WO | 2015/084659 | A1 | 6/2015 |
| WO | 2015/085542 | A1 | 6/2015 |
| WO | 2015/092943 | A1 | 6/2015 |
| WO | 2015/094169 | A1 | 6/2015 |
| WO | 2015/094369 | A1 | 6/2015 |
| WO | 2015/098306 | A1 | 7/2015 |
| WO | 2015/099939 | A1 | 7/2015 |
| WO | 2015/112625 | A1 | 7/2015 |
| WO | 2015/116151 | A1 | 8/2015 |
| WO | 2015/121449 | A1 | 8/2015 |
| WO | 2015/127404 | A1 | 8/2015 |
| WO | 2015/151133 | A1 | 10/2015 |
| WO | 2015/153310 | A1 | 10/2015 |
| WO | 2015/157013 | A1 | 10/2015 |
| WO | 2015/183368 | A1 | 12/2015 |
| WO | 2015/183401 | A1 | 12/2015 |
| WO | 2015/183547 | A1 | 12/2015 |
| WO | 2015/183699 | A1 | 12/2015 |
| WO | 2015/184186 | A1 | 12/2015 |
| WO | 2015/184387 | A1 | 12/2015 |
| WO | 2015/200207 | A1 | 12/2015 |
| WO | 2016/004074 | A1 | 1/2016 |
| WO | 2016/027933 | A1 | 2/2016 |
| WO | 2016/028946 | A1 | 2/2016 |
| WO | 2016/033257 | A1 | 3/2016 |
| WO | 2016/039992 | A1 | 3/2016 |
| WO | 2016/040721 | A1 | 3/2016 |
| WO | 2016/045192 | A1 | 3/2016 |
| WO | 2016/048789 | A1 | 3/2016 |
| WO | 2016/049439 | A1 | 3/2016 |
| WO | 2016/051519 | A1 | 4/2016 |
| WO | 2016/052164 | A1 | 4/2016 |
| WO | 2016/054230 | A1 | 4/2016 |
| WO | 2016/057268 | A1 | 4/2016 |
| WO | 2016/075081 | A1 | 5/2016 |
| WO | 2016/085775 | A2 | 6/2016 |
| WO | 2016/085776 | A1 | 6/2016 |
| WO | 2016/089029 | A1 | 6/2016 |
| WO | 2016/089638 | A1 | 6/2016 |
| WO | 2016/100139 | A1 | 6/2016 |
| WO | 2016/111881 | A1 | 7/2016 |
| WO | 2016/118344 | A1 | 7/2016 |
| WO | 2016/144840 | A1 | 9/2016 |
| WO | 2016/144982 | A1 | 9/2016 |
| WO | 2016/144983 | A1 | 9/2016 |
| WO | 2016/175354 | A1 | 11/2016 |
| WO | 2016/187149 | A1 | 11/2016 |
| WO | 2016/190950 | A1 | 12/2016 |
| WO | 2016/191737 | A2 | 12/2016 |
| WO | 2016/209444 | A1 | 12/2016 |
| WO | 2016/209924 | A1 | 12/2016 |
| WO | 2017/044160 | A1 | 3/2017 |
| WO | 2017/044257 | A1 | 3/2017 |
| WO | 2017/044260 | A1 | 3/2017 |
| WO | 2017/044629 | A1 | 3/2017 |
| WO | 2017/053311 | A1 | 3/2017 |
| WO | 2017/058293 | A1 | 4/2017 |
| WO | 2017/059388 | A1 | 4/2017 |
| WO | 2017/071420 | A1 | 5/2017 |
| WO | 2017/078792 | A1 | 5/2017 |
| WO | 2017/142116 | A1 | 8/2017 |
| WO | 2017/160487 | A1 | 9/2017 |
| WO | 2017/200777 | A1 | 11/2017 |
| WO | 2017/203484 | A1 | 11/2017 |
| WO | 2017/210035 | A1 | 12/2017 |
| WO | 2017/213678 | A1 | 12/2017 |
| WO | 2017/213681 | A1 | 12/2017 |
| WO | 2017/213682 | A1 | 12/2017 |
| WO | 2017/213684 | A1 | 12/2017 |
| WO | 2017/218194 | A1 | 12/2017 |
| WO | 2018/009397 | A1 | 1/2018 |
| WO | 2018/014788 | A1 | 1/2018 |
| WO | 2018/017383 | A1 | 1/2018 |
| WO | 2018/034168 | A1 | 2/2018 |
| WO | 2018/044633 | A1 | 3/2018 |
| WO | 2018/055898 | A1 | 3/2018 |
| WO | 2018/057269 | A1 | 3/2018 |
| WO | 2018/067528 | A1 | 4/2018 |
| WO | 2018/075170 | A1 | 4/2018 |
| WO | 2018/081833 | A1 | 5/2018 |
| WO | 2018/090060 | A1 | 5/2018 |
| WO | 2018/093005 | A1 | 5/2018 |
| WO | 2018/094254 | A1 | 5/2018 |
| WO | 2018/176053 | A1 | 9/2018 |
| WO | 2018/208506 | A1 | 11/2018 |
| WO | 2018/209152 | A1 | 11/2018 |
| WO | 2018/213401 | A1 | 11/2018 |
| WO | 2018/213415 | A1 | 11/2018 |
| WO | 2018/213481 | A1 | 11/2018 |
| WO | 2018/217014 | A1 | 11/2018 |
| WO | 2018/231307 | A1 | 12/2018 |
| WO | 2019/067930 | A1 | 4/2019 |
| WO | 2019/078576 | A1 | 4/2019 |
| WO | 2019/079017 | A1 | 4/2019 |
| WO | 2019/143397 | A1 | 7/2019 |
| WO | 2019/147429 | A1 | 8/2019 |
| WO | 2019/190646 | A2 | 10/2019 |
| WO | 2019/212569 | A1 | 11/2019 |
| WO | 2019/231537 | A1 | 12/2019 |
| WO | 2019/231541 | A1 | 12/2019 |
| WO | 2019/236217 | A1 | 12/2019 |
| WO | 2020/010530 | A1 | 1/2020 |
| WO | 2020/022572 | A1 | 1/2020 |
| WO | 2020/040775 | A1 | 2/2020 |
| WO | 2020/047086 | A1 | 3/2020 |
| WO | 2020/068040 | A1 | 4/2020 |
| WO | 2020/096706 | A1 | 5/2020 |

(56) References Cited

FOREIGN PATENT DOCUMENTS

| | | | |
|---|---|---|---|
| WO | 2020/109074 | A1 | 6/2020 |
| WO | 2020/134896 | A1 | 7/2020 |
| WO | 2020/208302 | A1 | 10/2020 |
| WO | 2020/214006 | A1 | 10/2020 |
| WO | 2020/222871 | A1 | 11/2020 |
| WO | 2021/054565 | A1 | 3/2021 |
| WO | 2021/061349 | A1 | 4/2021 |
| WO | 2021/062148 | A1 | 4/2021 |
| WO | 2021/076164 | A1 | 4/2021 |
| WO | 2021/188439 | A1 | 9/2021 |
| WO | 2021/252230 | A1 | 12/2021 |
| WO | 2022/047214 | A2 | 3/2022 |
| WO | 2022/093401 | A1 | 5/2022 |
| WO | 2022/182668 | A1 | 9/2022 |
| WO | 2022/232568 | A1 | 11/2022 |
| WO | 2023/239663 | A1 | 12/2023 |

OTHER PUBLICATIONS

Machine translation for CN 1961298 (Year: 2010).*
Decision to Grant received for European Patent Application No. 21151452.6, mailed on Mar. 13, 2025, 3 pages.
Abdelaziz et al., "Speaker-Independent Speech-Driven Visual Speech Synthesis using Domain-Adapted Acoustic Models", May 15, 2019, 9 pages.
"Accessibility on iOS", Apple Inc., Online available at: https://developer.apple.com/accessibility/ios/, Retrieved on Jul. 26, 2021, 2 pages.
"Alexa, Turn Up the Heat!", Smartthings Samsung [online], Available online at <https://web.archive.org/web/20160329142041/https://blog.smartthings.com/news/smartthingsupdates/alexa-turn-up-the-heat/>, Mar. 3, 2016, 3 pages.
Alsharif et al., "Long Short Term Memory Neural Network For Keyboard Gesture Decoding", IEEE International Conference on Acoustics, Speech and Signal Processing (ICASSP), Brisbane, Australia, Sep. 2015, 5 pages.
Anania, Peter, "Amazon Echo with Home Automation (Smartthings)", Available online at https://www.youtube.com/watch?v=LMW6aXmsWNE, Dec. 20, 2015, 1 page.
Apple Differential Privacy Team, "Learning with Privacy at Scale", Apple Machine Learning Blog, vol. 1, No. 8, Online available at: https://machinelearning.apple.com/2017/12/06/learning-with-privacy-at-scale.html, Dec. 2017, 9 pages.
Apple, "Apple previews innovative accessibility features combining the power of hardware, software, and machine learning", Available online at: https://www.apple.com/newsroom/2022/05/apple-previews-innovative-accessibility-features/, May 17, 2022, 10 pages.
Apple, "VoiceOver for OS X", http://www.apple.com/accessibility/voiceover/, May 19, 2014, pp. 1-3.
Applicant-Initiated Interview Summary received for U.S. Appl. No. 16/174,046, mailed on Feb. 4, 2020, 5 pages.
Applicant-Initiated Interview Summary received for U.S. Appl. No. 16/175,208, mailed on Feb. 4, 2020, 5 pages.
"Ask Alexa—Things That Are Smart Wiki", Available online at: <http://thingsthataresmart.wiki/index.php?title=Ask_Alexa&oldid=4283>, Jun. 8, 2016, pp. 1-31.
Automate Your Life, "How to Setup Google Home Routines—A Google Home Routines Walkthrough", Online Available at: https://www.youtube.com/watch?v=pXokZHP9kZg, Aug. 12, 2018, 1 page.
Badshah et al., "Deep Features-based Speech Emotion Recognition for Smart Affective Services", Multimedia Tools and Applications, Oct. 31, 2017, pp. 5571-5589.
Bao et al., "Detecting Target Objects by Natural Language Instructions Using an RGB-D Camera", Sensors Basel, Switzerland) 2016, 16 (12), 2117, Dec. 13, 2016, 23 pages.
Bell, Jason, "Machine Learning Hands-On for Developers and Technical Professionals", Wiley, Nov. 3, 2014, 82 pages.
Bellegarda, Jeromer, "Chapter 1: Spoken Language Understanding for Natural Interaction: The Siri Experience", Natural Interaction with Robots, Knowbots and Smartphones, 2014, pp. 3-14.
beointegration.com, "BeoLink Gateway—Programming Example", Online Available at: <https:/ /www.youtube.com/watch?v=TXDaJFm5UH4>, Mar. 4, 2015, 3 pages.
Bodapati et al., "Neural Word Decomposition Models for Abusive Language Detection", Proceedings of the Third Workshop on Abusive Language Online, Aug. 1, 2019, pp. 135-145.
Burgbacher et al., "Synthetic Word Gesture Generation for Stroke-Based Virtual Keyboards", IEEE Transactions on Human-Machine Systems, vol. 47, No. 2, Apr. 2017, 14 pages.
Burgess, Brian, "Amazon Echo Tip: Enable the Wake Up Sound", Available online at:—https://www.groovypost.com/howto/amazon-echo-tip-enable-wake-up-sound/, Jun. 30, 2015, 4 pages.
Buttner et al., "The Design Space of Augmented and Virtual Reality Applications for Assistive Environments in Manufacturing: A Visual Approach", In Proceedings of the 10th International Conference on PErvasive Technologies Related to Assistive Environments (PETRA '17), Island of Rhodes, Greece, Online available at: https://dl.acm.org/doi/pdf/10.1145/3056540.3076193, Jun. 21-23, 2017, pp. 433-440.
"Cake", Online Available at: <https://web.archive.org/web/20170808091948/https://emojipedia.org/search/?q=cake>, Aug. 8, 2017, 5 pages.
Cambria et al., "Jumping NLP curves: A review of natural language processing research.", IEEE Computational Intelligence magazine, 2014, vol. 9, May 2014, pp. 48-57.
Castellini, Rick, "How to enable and use dictation with an iPhone or iPad", Online Available at: <https://www.youtube.com/watch?v=8w133yN6rTU>, Sep. 7, 2017, 3 pages.
Chang et al., "Monaural Multi-Talker Speech Recognition with Attention Mechanism and Gated Convolutional Networks", Interspeech 2018, Sep. 2-6, 2018, pp. 1586-1590.
Chen, Angela, "Amazon's Alexa now handles patient health information", Available online at: https://www.theverge.com/2019/4/4/18295260/amazon-hipaa-alexa-echo-patient-health-information-privacy-voice-assistant, Apr. 4, 2019, 2 pages.
Chen et al., "A Convolutional Neural Network with Dynamic Correlation Pooling", 13th International Conference on Computational Intelligence and Security, IEEE, 2017, pp. 496-499.
Chen et al., "Progressive Joint Modeling in Unsupervised Single-Channel Overlapped Speech Recognition", IEEE/ACM Transactions on Audio, Speech, and Language Processing, vol. 26, No. 1, Jan. 2018, pp. 184-196.
Chenghao, Yuan, "MacroDroid", Online available at: https://www.ifanr.com/weizhizao/612531, Jan. 25, 2016, 7 pages.
Colt, Sam, "Here's One Way Apple's Smartwatch Could Be Better Than Anything Else", Business Insider, Aug. 21, 2014, pp. 1-4.
Conneau et al., "Supervised Learning of Universal Sentence Representations from Natural Language Inference Data", Proceedings of the 2017 Conference on Empirical Methods in Natural Language Processing, Copenhagen, Denmark, Sep. 7-11, 2017, pp. 670-680.
"Context-sensitive user interface", Online available at: https://web.archive.org/web/20190407003349/https://en.wikipedia.org/wiki/Context-sensitive_user_interface, Apr. 7, 2019, 3 pages.
Corrected Notice of Allowance received for U.S. Appl. No. 14/503,105, mailed on Aug. 28, 2018, 2 pages.
Corrected Notice of Allowance received for U.S. Appl. No. 14/503,105, mailed on Sep. 6, 2018, 2 pages.
Corrected Notice of Allowance received for U.S. Appl. No. 16/174,046, mailed on Mar. 23, 2020, 2 pages.
Corrected Notice of Allowance received for U.S. Appl. No. 17/540,942, mailed on Apr. 19, 2023, 2 pages.
Creswell et al., "Generative Adversarial Networks", IEEE Signal Processing Magazine, Jan. 2018, pp. 53-65.
Czech, Lucas, "A System for Recognizing Natural Spelling of English Words", Diploma Thesis, Karlsruhe Institute of Technology, May 7, 2014, 107 pages.
Dai et al., "Transformer—XL: Attentive Language Models Beyond a Fixed-Length Context", Online available at: arXiv:1901.02860v3, Jun. 2, 2019, 20 pages.
Decision on Appeal received for Korean Patent Application No. 10-2021-7001610, mailed on Feb. 22, 2022, 30 pages.
Decision on Appeal received for Korean Patent Application No. 10-2021-7038446, mailed on May 31, 2023, 38 pages.

(56) References Cited

OTHER PUBLICATIONS

Decision to Grant received for European Patent Application No. 15718294.0, mailed on Jan. 21, 2021, 2 pages.
Decision to Refuse received for Japanese Patent Application No. 2021-067225, mailed on Jul. 8, 2022, 4 pages.
Decision to Refuse received for Japanese Patent Application No. 2022-140998, mailed on Apr. 19, 2024, 5 pages.
Deedeevuu, "Amazon Echo Alarm Feature", Available online at https://www.youtube.com/watch?v=fdjU8eRLk7c, Feb. 16, 2015, 1 page.
Delcroix et al., "Context Adaptive Deep Neural Networks for Fast Acoustic Model Adaptation", ICASSP, 2015, pp. 4535-4539.
Delcroix et al., "Context Adaptive Neural Network for Rapid Adaptation of Deep CNN Based Acoustic Models", Interspeech 2016, Sep. 8-12, 2016, pp. 1573-1577.
Derrick Amanda, "How to Set Up Google Home for Multiple Users", Lifewire, Available online at: <https://www.lifewire.com/set-up-google-home-multiple-users-4685691>, Jun. 8, 2020, 9 pages.
Dighe et al., "Lattice-based improvements for voice triggering using graph neural networks", in 2020 IEEE International Conference on Acoustics, Speech and Signal Processing (ICASSP), Jan. 25, 2020, 5 pages.
Dihelson, "How can I use voice or phrases as triggers to Macrodroid?", Macrodroid Forums, Online Available at: https://www.tapatalk.com/groups/macrodroid/how-can-i-use-voice-or-phrases-as-triggers-to-macr-t4845.html, May 9, 2018, 5 pages.
Diuniliumou, "Use Macrodroid skillfully to automatically clock in with Ding Talk", Online available at: https://blog.csdn.net/qq_26614295/article/details/84304541, Nov. 20, 2018, 11 pages.
Dwork et al., "The Algorithmic Foundations of Differential Privacy", Foundations and Trends in Theoretical Computer Science: vol. 9: No. 3-4, 211-407, 2014, 281 pages.
Eder et al., "At the Lower End of Language—Exploring the Vulgar and Obscene Side of German", Proceedings of the Third Workshop on Abusive Language Online, Florence, Italy, Aug. 1, 2019, pp. 119-128.
Examiner's Pre-Review Report received for Japanese Patent Application No. 2019-007866, mailed on Jun. 29, 2021, 4 pages.
Extended European Search Report received for European Patent Application No. 21151452.6, mailed on Apr. 29, 2021, 10 pages.
Filipowicz, Luke, "How to use the QuickType keyboard in iOS 8", available online at <https://www.imore.com/comment/568232>, Oct. 11, 2014, pp. 1-17.
Final Office Action received for U.S. Appl. No. 14/503,105, mailed on May 20, 2016, 45 pages.
Fitzpatrick, Aidan, "Introducing Camo 1.5: AR modes", Available Online at: "https://reincubate.com/blog/camo-ar-modes-release/", Oct. 28, 2021, 8 pages.
Gadget Hacks, "Tasker Too Complicated? Give MacroDroid a Try [How-To]", Online available at: https://www.youtube.com/watch?v=8YL9cWCykKc, May 28, 2016, 1 page.
Ganin et al., "Unsupervised Domain Adaptation by Backpropagation", in Proceedings of the 32nd International Conference on Machine Learning, vol. 37, Jul. 2015, 10 pages.
Gatys et al., "Image Style Transfer Using Convolutional Neural Networks", Proceedings of IEEE International Conference on Acoustics, Speech and Signal Processing (ICASSP), 2016, pp. 2414-2423.
Geyer et al., "Differentially Private Federated Learning: A Client Level Perspective", arXiv:1712.07557v2, Mar. 2018, 7 pages.
Ghauth et al., "Text Censoring System for Filtering Malicious Content Using Approximate String Matching and Bayesian Filtering", Proc. 4th INNS Symposia Series on Computational Intelligence in Information Systems, Bandar Seri Begawan, Brunei, 2015, pp. 149-158.
Goodfellow et al., "Generative Adversarial Networks", Proceedings of the Neural Information Processing Systems, Dec. 2014, 9 pages.
Google Developers, "Voice search in your app", Available online at: https://www.youtube.com/watch?v=PS1FbB5qWEI, Nov. 12, 2014, 1 page.
Google, "Hey Google: How to create a shopping list with your Google Assistant", Available online at: https://www.youtube.com/watch?v=w9NCsElax1Y, May 25, 2018, 1 page.
Gu et al., "BadNets: Evaluating Backdooring Attacks on Deep Neural Networks", IEEE Access, vol. 7, Mar. 21, 2019, pp. 47230-47244.
Guim Mark, "How to Set a Person-Based Reminder with Cortana", available at <http://www.wpcentral.com/how-to-person-based-reminder-cortana>, Apr. 26, 2014, 15 pages.
Guo et al., "StateLens: A Reverse Engineering Solution for Making Existing Dynamic Touchscreens Accessible", In Proceedings of the 32nd Annual Symposium on User Interface Software and Technology (UIST '19), New Orleans, LA, USA, Online available at: https://dl.acm.org/doi/pdf/10.1145/3332165.3347873, Oct. 20-23, 2019, pp. 371-385.
Guo et al., "Time-delayed bottleneck highway networks using a dft feature for keyword spotting", IEEE International Conference on Acoustics, Speech and Signal Processing (ICASSP). IEEE, 2018, 5 pages.
Guo et al., "VizLens: A Robust and Interactive Screen Reader for Interfaces in the Real World", In Proceedings of the 29th Annual Symposium on User Interface Software and Technology (UIST '16), Tokyo, Japan, Online available at: https://dl.acm.org/doi/pdf/10.1145/2984511.2984518, Oct. 16-19, 2016, pp. 651-664.
Gupta et al., "I-vector-based Speaker Adaptation of Deep Neural Networks for French Broadcast Audio Transcription", ICASSP, 2014, 2014, pp. 6334-6338.
Hanqing et al., "Deep Learning of Instruction Intention Understanding Using Stacked Denoising Autoencoder", Journal of Shanghai Jiaotong University, vol. 50 No. 7, Jul. 28, 2016, 6 pages.
Haung et al., "A study for improving device-directed speech detection toward frictionless human-machine interaction", in Proc. Interspeech, 2019, 5 pages.
Hawkeye, "Hawkeye—A better user testing platform", Online Available at: https://www.youtube.com/watch?v=el0TW0g_760, Oct. 16, 2019, 3 pages.
Hawkeye, "Learn where people look in your products", Online Available at: https://www.usehawkeye.com, 2019, 6 pages.
"Headset Button Controller v7.3 APK Full APP Download for Andriod, Blackberry, iPhone", Available online at: http://fullappdownload.com/headset-button-controller-v7-3-apk/, Jan. 27, 2014, 11 pages.
Heller et al., "AudioScope: Smartphones as Directional Microphones in Mobile Audio Augmented Reality Systems", In Proceedings of the 33rd Annual ACM Conference on Human Factors in Computing Systems (CHI '15), Crossings, Seoul, Korea, Online available at: https://dl.acm.org/doi/pdf/10.1145/2702123.2702159, Apr. 18-23, 2015, pp. 949-952.
Henderson et al., "Efficient Natural Language Response Suggestion for Smart Reply", Available Online at: https://static.googleusercontent.com/media/research.google.com/en//pubs/archive/1846e8a466c079eae7e90727e27caf5f98f10e0c.pdf, 2017, 15 pages.
Hershey et al., "Deep Clustering: Discriminative Embeddings for Segmentation And Separation", Proc. ICASSP, Mar. 2016, 6 pages.
Hinton et al., "Distilling the knowledge in a neural network", arXiv preprintarXiv:1503.02531, Mar. 2, 2015, 9 pages.
Hook et al., "Automatic speech based emotion recognition using paralinguistics features", Bulletin of the Polish Academy of Sciences, Technical Sciences, vol. 67, No. 3, 2019, pp. 479-488.
"How to adjust the order of control center buttons on iPhone iOS12 version after buying a mobile phone", Available online at: https://jingyan.baidu.com/article/5bbb5albbe5a9713eba1791b.html?, Jun. 14, 2019, 4 pages.
"Id3v2.4.0-Frames", available at <http://id3.org/id3v2.4.0-frames?action=print>, retrieved on Jan. 22, 2015, pp. 1-41.
Idasällinen, "What's the 'Like' Meter Based on?", Online Available at:—<https://community.spotify.com/t5/Content-Questions/What-s-the-like-meter-based-on/td-p/1209974>, Sep. 22, 2015, 6 pages.
Ikeda, Masaru, "beGLOBAL Seoul 2015 Startup Battle: Talkey", YouTube Publisher, Online Available at: https://www.youtube.com/watch?v=4Wkp7sAAldg, May 14, 2015, 1 page.

(56) References Cited

OTHER PUBLICATIONS

Iluvtrading, "Galaxy S7: How to Adjust Screen Timeout & Lock Screen Timeout", Available online at: https://www.youtube.com/watch?v=n6e1WKUS2ww,.
Inews and Tech, "How to Use The QuickType Keyboard in IOS 8", Available online at: http://www.inewsandtech.com/how-to-use-the-quicktype-keyboard-in-ios-8/, Sep. 17, 2014, 6 pages.
Intention to Grant received for European Patent Application No. 15718294.0, mailed on Sep. 4, 2020, 6 pages.
"Interactive Voice", available at <http://www.helloivee.com/company/>, retrieved on Feb. 10, 2014, 2 pages.
International Preliminary Report on Patentability received for PCT Patent Application No. PCT/US2015/023593, mailed on Dec. 15, 2016, 12 pages.
International Search Report and Written Opinion received for PCT Patent Application No. PCT/US2015/023593, mailed on Aug. 14, 2015, 16 pages.
"IPhone 6 Smart Guide Full Version for SoftBank", Gijutsu-Hyohron Co. Ltd. vol. 1, Dec. 1, 2014, 4 pages.
Isik et al., "Single-Channel Multi-Speaker Separation using Deep Clustering", Interspeech 2016, Sep. 8-12, 2016, pp. 545-549.
Jeon et al., "Voice trigger detection from lvcsr hypothesis lattices using bidirectional lattice recurrent neural networks", International Conference on Acoustics, Speech and Signal Processing (ICASSP). IEEE, Feb. 29, 2020, 5 pages.
Jonsson et al., "Proximity-based Reminders Using Bluetooth", 2014 IEEE International Conference on Pervasive Computing and Communications Demonstrations, 2014, pp. 151-153.
Kannan et al., "Smart Reply: Automated Response Suggestion for Email", Available Online at: https://arxiv.org/pdf/1606.04870.pdf, Jun. 15, 2016, 10 pages.
Karn Ujjwal, "An Intuitive Explanation of Convolutional Neural Networks", The Data Science Blog, Aug. 11, 2016, 23 pages.
Kastrenakes, Jacob, "Siri's creators will unveil their new AI bot on Monday", The Verge, Online available at: https://web.archive.org/web/20160505090418/https://www.theverge.com/2016/5/4/11593564/viv-labs-unveiling-monday-new-ai-from-siri-creators, May 4, 2016, 3 pages.
Kickstarter, "Ivee Sleek: Wi-Fi Voice-Activated Assistant", available at <https://www.kickstarter.com/projects/ivee/ivee-sleek-wi-fi-voice-activated-assistant>, retrieved on Feb. 10, 2014, pp. 1-13.
King et al., "Robust Speech Recognition Via Anchor Word Representations", Interspeech 2017, Aug. 20-24, 2017, pp. 2471-2475.
Kruger et al., "Virtual World Accessibility with the Perspective Viewer", Proceedings of ICEAPVI, Athens, Greece, Feb. 12-14, 2015, 6 pages.
Kumar, Shiu, "Ubiquitous Smart Home System Using Android Application", International Journal of Computer Networks & Communications (IJCNC) vol. 6, No. 1, Available online at : https://arxiv.org/ftp/arxiv/papers/1402/1402.2114.pdf, Jan. 2014, pp. 33-43.
Kumatani et al., "Direct modeling of raw audio with dnns for wake word detection", in 2017 IEEE Automatic Speech Recognition and Understanding Workshop (ASRU), 2017, 6 pages.
Li et al., "Deep neural network for short-text sentiment classification", International Conference on Database Systems for Advanced Applications, Springer, Cham, 2016, 2016, 8 pages.
Lin, Luyuan, "An Assistive Handwashing System with Emotional Intelligence", Using Emotional Intelligence in Cognitive Intelligent Assistant Systems, 2014, 101 pages.
"Link your voice to your devices with Voice Match", Google Assistant Help, Available online at: <https://support.google.com/assistant/answer/9071681?co=GENIE.Platform%3DAndroid&hl=en>, Retrieved on Jul. 1, 2020, 2 pages.
Liou et al., "Autoencoder for Words", Neurocomputing, vol. 139, Sep. 2014, pp. 84-96.
Liu et al., "Accurate Endpointing with Expected Pause Duration", Sixteenth Annual Conference of the International Speech Communication Association, Sep. 6-10, 2015, pp. 2912-2916.
Loukides et al., "What Is the Internet of Things?", O'Reilly Media, Inc., Online Available at: https://www.oreilly.com/library/view/what-is-the/9781491975633/, Jan. 13, 2015, 31 pages.
Luo et al., "Speaker-Independent Speech Separation With Deep Attractor Network", IEEE/ACM Transactions on Audio, Speech, and Language Processing, vol. 26, No. 4,, Apr. 2018, pp. 787-796.
Maas et al., "Combining acoustic embeddings and decoding features for end-of-utterance detection in real-time far-field speech recognition systems", in 2018 IEEE International Conference on Acoustics, Speech and Signal Processing (ICASSP). IEEE, 2018, 5 pages.
Mallidi et al., "Device-directed Utterance Detection", Proc. Interspeech, Aug. 7, 2018, 4 pages.
Marketing Land, "Amazon Echo: Play music", Online Available at: <https://www.youtube.com/watch?v=A7V5NPbsXi4>, Apr. 27, 2015, 3 pages.
"Meet Ivee, Your Wi-Fi Voice Activated Assistant", available at <http://www.helloivee.com/>, retrieved on Feb. 10, 2014, 8 pages.
Mehri et al., "Multi-Granularity Representations of Dialog", Language Technologies Institute, Carnegie Mellon University, arXiv:1908.09890v1, Aug. 26, 2019, 10 pages.
"Method to Provide Remote Voice Navigation Capability on the Device", ip.com, Jul. 21, 2016, 4 pages.
Mhatre et al., "Donna Interactive Chat-bot acting as a Personal Assistant", International Journal of Computer Applications (0975-8887), vol. 140, No. 10, Apr. 2016, 6 pages.
Michalevsky et al., "Gyrophone: Recognizing Speech from Gyroscope Signals", Proceedings of the 23rd USENIX Security Symposium, Aug. 20-22, 2014, pp. 1053-1067.
"Microsoft Soundscape—A map delivered in 3D sound", Microsoft Research, Online available at: https://www.microsoft.com/en-us/research/product/soundscape/, Retrieved on Jul. 26, 2021, 5 pages.
Miller, Chance, "Google Keyboard Updated with New Personalized Suggestions Feature", available at <http://9to5google.com/2014/03/19/google-keyboard-updated-with-new-personalized-suggestions-feature/>, Mar. 19, 2014, 4 pages.
MJ Tube, "How to Use Ok Google Assistant Even Phone is Locked", Available online at:—https://www.youtube.com/watch?v=9B_gP4j_SP8, Mar. 12, 2018, 1 page.
Mnih et al., "Human-level Control Through Deep Reinforcement Learning", Nature, vol. 518, Feb. 26, 2015, pp. 529-533.
Modern Techies, "Braina-Artificial Personal Assistant for PC (like Cortana, Siri)!!! ", Online available at: https://www.youtube.com/watch?v=_Coo2P8ilqQ, Feb. 24, 2017, 3 pages.
Müller et al., "A Taxonomy for Information Linking in Augmented Reality", AVR 2016, Part I, LNCS 9768, 2016, pp. 368-387.
Muller et al., "Control Theoretic Models of Pointing", ACM Transactions on Computer-Human Interaction, Aug. 2017, 36 pages.
Myers, Brada, "Shortcutter for Palm", available at <http://www.cs.cmu.edu/~pebbles/v5/shortcutter/palm/index.html>, retrieved on Jun. 18, 2014, 10 pages.
Myrick et al., "How to Insert Emojis Using Your Voice with Google Assistant", Online available at: <https://web.archive.org/web/20211107160722/https://www.androidcentral.com/how-insert-emojis-using-your-voice-google-assistant, Nov. 7, 2021, 11 pages.
Non-Final Office Action received for U.S. Appl. No. 14/503,105, mailed on Dec. 8, 2015, 31 pages.
Non-Final Office Action received for U.S. Appl. No. 16/174,046, mailed on Jan. 2, 2020, 9 pages.
Non-Final Office Action received for U.S. Appl. No. 16/175,208, mailed on Nov. 27, 2019, 13 pages.
Non-Final Office Action received for U.S. Appl. No. 18/200,764, mailed on Mar. 15, 2024, 10 pages.
Norouzian et al., "Exploring attention mechanism for acousticbased classification of speech utterances into system-directed and non-system-directed", International Conference on Acoustics, Speech and Signal Processing (ICASSP). IEEE, Feb. 1, 2019, 5 pages.
Notice of Acceptance received for Australian Patent Application No. 2015267612, mailed on Jan. 3, 2018, 3 pages.
Notice of Acceptance received for Australian Patent Application No. 2018201834, mailed on Sep. 30, 2019, 3 pages.
Notice of Acceptance received for Australian Patent Application No. 2020200103, mailed on May 6, 2021, 3 pages.

(56) References Cited

OTHER PUBLICATIONS

Notice of Acceptance received for Australian Patent Application No. 2021218051, mailed on Sep. 8, 2022, 3 pages.
Notice of Allowance received for Chinese Patent Application No. 201580028666.0, mailed on Jun. 4, 2020, 5 pages.
Notice of Allowance received for Chinese Patent Application No. 202010735884.0, mailed on Aug. 1, 2022, 2 pages.
Notice of Allowance received for Chinese Patent Application No. 202010736257.9, mailed on Aug. 30, 2021, 5 pages.
Notice of Allowance received for Japanese Patent Application No. 2016-564974, mailed on Dec. 21, 2018, 4 pages.
Notice of Allowance received for Japanese Patent Application No. 2019-007866, mailed on Nov. 7, 2022, 3 pages.
Notice of Allowance received for Japanese Patent Application No. 2021-067225, mailed on Nov. 28, 2022, 4 pages.
Notice of Allowance received for Korean Patent Application No. 10-2016-7032258, mailed on Jul. 30, 2018, 3 pages.
Notice of Allowance received for Korean Patent Application No. 10-2018-7031452, mailed on Dec. 27, 2019, 4 pages.
Notice of Allowance received for U.S. Appl. No. 14/503,105, mailed on Aug. 14, 2018, 8 pages.
Notice of Allowance received for U.S. Appl. No. 16/174,046, mailed on Feb. 27, 2020, 14 pages.
Notice of Allowance received for U.S. Appl. No. 16/175,208, mailed on Feb. 26, 2020, 8 pages.
Notice of Allowance received for U.S. Appl. No. 16/881,625, mailed on Sep. 1, 2021, 11 pages.
Notice of Allowance received for U.S. Appl. No. 17/540,942, mailed on Feb. 24, 2023, 10 pages.
Notice of Allowance received for U.S. Appl. No. 18/200,764, mailed on Apr. 18, 2024, 7 pages.
"Nuance Dragon Naturally Speaking", Version 13 End-User Workbook, Nuance Communications, Inc. Online Available at: https://www.nuance.com/content/dam/nuance/en_us/collateral/dragon/guide/gd-dragon-naturally-speaking-13-workbook-en-us.pdf, Sep. 2014, 125 pages.
Office Action received for Australian Patent Application No. 2015267612, mailed on Jun. 13, 2017, 4 pages.
Office Action received for Australian Patent Application No. 2018201834, mailed on Mar. 22, 2019, 6 pages.
Office Action received for Australian Patent Application No. 2020200103, mailed on Aug. 31, 2020, 4 pages.
Office Action received for Australian Patent Application No. 2021218051, mailed on Jun. 3, 2022, 2 pages.
Office Action received for Chinese Patent Application No. 201580028666.0, mailed on Feb. 3, 2020, 6 pages.
Office Action received for Chinese Patent Application No. 201580028666.0, mailed on Jun. 20, 2019, 18 pages.
Office Action received for Chinese Patent Application No. 201580028666.0, mailed on Nov. 5, 2018, 19 pages.
Office Action received for Chinese Patent Application No. 202010735884.0, mailed on Aug. 9, 2021, 10 pages.
Office Action received for Chinese Patent Application No. 202010735884.0, mailed on Feb. 16, 2022, 10 pages.
Office Action received for Chinese Patent Application No. 202010735884.0, mailed on Mar. 10, 2021, 15 pages.
Office Action received for Chinese Patent Application No. 202010736257.9, mailed on Mar. 19, 2021, 16 pages.
Office Action received for European Patent Application No. 15718294.0, mailed on Nov. 6, 2018, 7 pages.
Office Action received for European Patent Application No. 15718294.0, mailed on Nov. 13, 2019, 8 pages.
Office Action received for European Patent Application No. 21151452.6, mailed on Nov. 9, 2023, 6 pages.
Office Action received for European Patent Application No. 21151452.6, mailed on Sep. 9, 2022, 7 pages.
Office Action received for Japanese Patent Application No. 2016-564974, mailed on Jan. 4, 2018, 9 pages.
Office Action received for Japanese Patent Application No. 2019-007866, mailed on Apr. 24, 2020, 14 pages.
Office Action received for Japanese Patent Application No. 2019-007866, mailed on Dec. 14, 2020, 4 pages.
Office Action received for Japanese Patent Application No. 2019-007866, mailed on May 6, 2022, 28 pages.
Office Action received for Japanese Patent Application No. 2021-067225, mailed on Feb. 7, 2022, 6 pages.
Office Action received for Japanese Patent Application No. 2021-067225, mailed on Sep. 6, 2021, 7 pages.
Office Action received for Japanese Patent Application No. 2022-140998, mailed on Oct. 27, 2023, 8 pages.
Office Action received for Korean Patent Application No. 10-2016-7032258, mailed on Mar. 29, 2018, 6 pages.
Office Action received for Korean Patent Application No. 10-2016-7032258, mailed on Sep. 13, 2017, 15 pages.
Office Action received for Korean Patent Application No. 10-2018-7031452, mailed on Feb. 14, 2019, 11 pages.
Office Action received for Korean Patent Application No. 10-2018-7031455, mailed on Dec. 16, 2020, 7 pages.
Office Action received for Korean Patent Application No. 10-2018-7031455, mailed on Oct. 20, 2020, 6 pages.
Office Action received for Korean Patent Application No. 10-2018-7031455, mailed on Oct. 29, 2019, 9 pages.
Office Action received for Korean Patent Application No. 10-2021-7001610, mailed on Apr. 23, 2021, 12 pages.
Office Action received for Korean Patent Application No. 10-2021-7001610, mailed on Jan. 7, 2022, 2 pages.
Office Action received for Korean Patent Application No. 10-2021-7001610, mailed on Oct. 25, 2021, 6 pages.
Office Action received for Korean Patent Application No. 10-2021-7038446, mailed on Aug. 26, 2022, 7 pages.
Office Action received for Korean Patent Application No. 10-2021-7038446, mailed on Dec. 14, 2022, 7 pages.
Office Action received for Korean Patent Application No. 10-2021-7038446, mailed on Feb. 23, 2022, 12 pages.
Office Action received for Korean Patent Application No. 10-2022-7013616, mailed on Dec. 18, 2022, 12 pages.
Office Action received for Korean Patent Application No. 10-2022-7013616, mailed on Jul. 28, 2023, 7 pages.
Office Action received for Korean Patent Application No. 10-2018-7031455, mailed on Feb. 3, 2019, 16 pages.
Office Action received for Taiwanese Patent Application No. 104112907, mailed on Jun. 12, 2020, 10 pages.
Office Action received for Taiwanese Patent Application No. 104112907, mailed on Nov. 26, 2015, 5 pages.
Pak Gamerz, "Braina: Artificially Intelligent Assistant Software for Windows PC in (urdu / hindhi)", Online available at: https://www.youtube.com/watch?v=JH_rMjw8lqc, Jul. 24, 2018, 3 pages.
Pavlopoulos et al., "ConvAI at SemEval-2019 Task 6: Offensive Language Identification and Categorization with Perspective and BERT", Proceedings of the 13th International Workshop on Semantic Evaluation (SemEval—2019), Jun. 6-7, 2019, pp. 571-576.
PC Mag, "How to Voice Train Your Google Home Smart Speaker", Available online at: <https://in.pcmag.com/google-home/126520/how-to-voice-train-your-google-home-smart-speaker>, Oct. 25, 2018, 12 pages.
Pennington et al., "GloVe: Global Vectors for Word Representation", Proceedings of the Conference on Empirical Methods Natural Language Processing (EMNLP), Doha, Qatar, Oct. 25-29, 2014, pp. 1532-1543.
Perlow, Jason, "Alexa loop mode with playlist for sleep noise", Online Available at: <https://www.youtube.com/watch?v=nSkSuXziJSg>, Apr. 11, 2016, 3 pages.
Phillips, Chris, "Thumbprint Radio: A Uniquely Personal Station Inspired by All of Your Thumbs Up", Pandora News, Online Available at:—<https://blog.pandora.com/author/chris-phillips/>, Dec. 14, 2015, 7 pages.
Ping et al., "Deep Voice 3: Scaling Text to Speech with Convolutional Sequence Learning", Available online at: https://arxiv.org/abs/1710.07654, Feb. 22, 2018, 16 pages.
"Pose", Cambridge Dictionary Definition of Pose, Available online at: <https://dictionary.cambridge.org/dictionary/english/pose>, Retrieved on Mar. 9, 2021, 4 pages.

(56) References Cited

OTHER PUBLICATIONS

Products for Pals—Als Tech, “Skyle for iPad Pro eye gaze control real world review”, Online Available at: <https://www.youtube.com/watch?v=_3TxZtDJpFo>, Aug. 13, 2020, 4 pages.

Qian et al., “Single-channel Multi-talker Speech Recognition with Permutation Invariant Training”, Speech Communication, Issue 104, 2018, pp. 1-11.

“Quick Type Keyboard on iOS 8 Makes Typing Easier”, Online available at: <https://www.youtube.com/watch?v=0CldLR4fhVU >, Jun. 3, 2014, 3 pages.

Raux, Antoine, “High-Density Dialog Management. The Topic Stack”, Adventures in High Density, Online available at: https://medium.com/adventures-in-high-density/high-density-dialog-management-23efcf91db1e, Aug. 1, 2018, 10 pages.

Ravi, Sujith, “Google AI Blog: On-Device Machine Intelligence”, Available Online at: https://ai.googleblog.com/2017/02/on-device-machine-intelligence.html, Feb. 9, 2017, 4 pages.

Ritchie, Rene, “QuickType keyboard in iOS 8: Explained”, Retrieved via URL: https://www.imore.com/quicktype-keyboards-ios-8-explained, Jun. 21, 2014, pp. 1-19.

Robbins, Mikef, “Automatically place an Android Phone on Vibrate at Work”, Available online at: https://mikefrobbins.com/2016/07/21/automatically-place-an-android-phone-on-vibrate-at-work/, Jul. 21, 2016, pp. 1-11.

Rodrigues et al., “Exploring Mixed Reality in Specialized Surgical Environments”, In Proceedings of the 2017 CHI Conference Extended Abstracts on Human Factors in Computing Systems (CHI EA ’17), Denver, CO, USA, Online available at: https://dl.acm.org/doi/pdf/10.1145/3027063.3053273, May 6-11, 2017, pp. 2591-2598.

Ross et al., “Epidemiology as a Framework for Large-Scale Mobile Application Accessibility Assessment”, In Proceedings of the 19th International ACM SIGACCESS Conference on Computers and Accessibility (Assets ’17), Baltimore, MD, USA, Online available at: https://dl.acm.org/doi/pdf/10.1145/3132525.3132547, Oct. 29-Nov. 1, 2017, pp. 2-11.

Routines, “SmartThings Support”, Available online at https://web.archive.org/web/20151207165701/https://support.smartthings.com/hc/en-us/articles/205380034-Routines, 2015, 3 pages.

Rowland et al., “Designing Connected Products: UX for the Consumer Internet of Things”, O’Reilly, May 2015, 452 pages.

Samsung Support, “Create a Quick Command in Bixby to launch custom settings by at your command”, Retrieved from internet: https://www.facebook.com/samsungsupport/videos/10154746303151213, Nov. 13, 2017, 1 page.

Santos et al., “Fighting Offensive Language on Social Media with Unsupervised Text Style Transfer”, Proceedings of the 56th Annual Meeting of the Association for Computational Linguistics (vol. 2: Short Papers), Melbourne, Australia, May 20, 2018, 6 pages.

Schenk et al., “GazeEverywhere: Enabling Gaze-only User Interaction on an Unmodified Desktop PC in Everyday Scenarios”, In Proceedings of the 2017 CHI Conference on Human Factors in Computing Systems (CHI’17). ACM, New York, NY, 30343044. Online Available at: https://doi.org/10.1145/3025453.3025455, May 6-11, 2017, 11 pages.

Seehafer, Brent, “Activate google assistant on Galaxy S7 with screen off”, Available online at: https://productforums.google.com/forum/#!topic/websearch/lp3qIGBHLVI, Mar. 8, 2017, 4 pages.

Selfridge et al., “Interact: Tightly-coupling Multimodal Dialog with an Interactive Virtual Assistant”, International Conference on Multimodal Interaction, ACM, Nov. 9, 2015, pp. 381-382.

Senior et al., “Improving DNN Speaker Independence With I-Vector Inputs”, ICASSP, 2014, pp. 225-229.

Seroter et al., “SOA Patterns with BizTalk Server 2013 and Microsoft Azure”, Second Edition, Packt Publishing, Jun. 30, 2015, 454 pages.

Settle et al., “End-to-End Multi-Speaker Speech Recognition”, Proc. ICASSP, Apr. 2018, 6 pages.

Shen et al., “Style Transfer from Non-Parallel Text by Cross-Alignment”, 31st Conference on Neural Information Processing Systems (NIPS 2017), Long Beach, CA, USA, 2017, 12 pages.

Sigtia et al., “Efficient voice trigger detection for low resource hardware”, in Proc. Interspeech 2018, Sep. 2-6, 2018, pp. 2092-2096.

Sigtia et al., “Multi-task learning for voice trigger detection”, in IEEE International Conference on Acoustics, Speech and Signal Processing (ICASSP), 2020, Apr. 20, 2020, 5 pages.

Simonite, Tom, “Confronting Siri: Microsoft launches digital assistant Cortana”, 2014, 2 pages.

Siou, Serge, “How To Control Apple TV 3rd Generation Using Remote app”, Available Online at: https://www.youtube.com/watch?v=PhyKftZ0S9M, May 12, 2014, 3 pages.

SmartThings +Amazon Echo, Smartthings Samsung [online], Available online at <https://web.archive.org/web/20160509231428/https://blog.smartthings.com/featured/alexa-turn-on-my-smartthings/>, Aug. 21, 2015, 3 pages.

Smith, Jake, “Amazon Alexa Calling: How to Set it up and Use it on Your Echo”, iGeneration, May 30, 2017, 5 pages.

Speicher et al., “What is Mixed Reality?”, In Proceedings of the 2019 CHI Conference on Human Factors in Computing Systems (CHI ’19). ACM, Article 537, Glasgow, Scotland, UK, Online available at: https://dl.acm.org/doi/pdf/10.1145/3290605.3300767, May 4-9, 2019, 15 pages.

Sperber et al., “Self-attentional models for lattice inputs”, in Proceedings of the 57th Annual Meeting of the Association for Computational Linguistics, Florence, Italy, Association for Computational Linguistics., Jun. 4, 2019, 13 pages.

Sundermeyer et al., “From feedforward to recurrent LSTM neural networks for language modeling.”, IEEE Transactions to Audio, Speech, and Language Processing, vol. 23, No. 3, Mar. 2015, pp. 517-529.

Supplemental Notice of Allowance received for U.S. Appl. No. 16/175,208, mailed on Mar. 24, 2020, 2 pages.

Supplemental Notice of Allowance received for U.S. Appl. No. 16/881,625, mailed on Dec. 23, 2021, 2 pages.

Supplemental Notice of Allowance received for U.S. Appl. No. 16/881,625, mailed on Nov. 4, 2021, 2 pages.

Supplemental Notice of Allowance received for U.S. Appl. No. 16/881,625, mailed on Nov. 26, 2021, 3 pages.

Supplemental Notice of Allowance received for U.S. Appl. No. 16/881,625, mailed on Oct. 29, 2021, 2 pages.

Supplemental Notice of Allowance received for U.S. Appl. No. 16/881,625, mailed on Sep. 15, 2021, 2 pages.

Supplemental Notice of Allowance received for U.S. Appl. No. 18/200,764, mailed on Jun. 20, 2024, 2 pages.

Sutskever et al., “Sequence to Sequence Learning With Neural Networks”, Proceedings of the 27th International Conference on Neural Information Processing Systems, 2014, 9 pages.

Tamar et al., “Value Iteration Networks”, Advances in Neural Information Processing Systems, vol. 29, 2016, pp. 2154-2162.

Tan et al., “Knowledge Transfer in Permutation Invariant Training For Single-channel Multi-talker Speech Recognition”, ICASSP 2018, 2018, pp. 5714-5718.

Tech Target Contributor, “AI Accelerator”, Available online at: https://searchenterpriseai.techtarget.com/definition/AI-accelerator, Apr. 2018, 3 pages.

Tech With Brett, “Everything the Google Nest Hub Can Do”, Available online at: https://www.youtube.com/watch?v=x3vdytgru2E, Nov. 12, 2018, 13 pages.

Tech With Brett, “Google Home Multiple Users Setup”, Available online at: https://www.youtube.com/watch?v=BQOAbRUeFRo&t=257s, Jun. 29, 2017, 4 pages.

Tkachenko, Sergey, “Chrome will automatically create Tab Groups”, Available online at: https://winaero.com/chrome-will-automatically-create-tab-groups/, Sep. 18, 2020, 5 pages.

Tkachenko, Sergey, “Enable Tab Groups Auto Create in Google Chrome”, Available online at: https://winaero.com/enable-tab-groups-auto-create-in-google-chrome/, Nov. 30, 2020, 5 pages.

Vaswani et al., “Attention Is All You Need”, 31st Conference on Neural Information Processing Systems (NIPS 2017), 2017, pp. 1-11.

Vazquez et al., “An Assisted Photography Framework to Help Visually Impaired Users Properly Aim a Camera”, ACM Transac-

(56) References Cited

OTHER PUBLICATIONS tions on Computer-Human Interaction, vol. 21, No. 5, Article 25, Online available at: https://dl.acm.org/doi/pdf/10.1145/2651380, Nov. 2014, 29 pages.
Velian Speaks Tech, "10 Google Assistant Tips!", Available online at: https://www.youtube.com/watch?v=3RNWA3NK9fs, Feb. 24, 2020, 13 pages.
Villemure et al., "The Dragon Drive Innovation Showcase: Advancing the State-of-the-art in Automotive Assistants", Retrieved from the Internet: http://essv2018.de/wp-content/uploads/2018/03/41_Villemure_ESSV2018.pdf, 2018, 7 pages.
Vitalii, Vasyliev, "How to Enable Google Assistant on Galaxy S7 and other android phones (No Root)", Available online at: https://www.youtube.com/watch?v=HekIQbWyksE, Mar. 20, 2017, 1 page.
Walker, Amy, "Nhs gives Amazon free use of health data under Alexa advice deal", Available online at: https://www.theguardian.com/society/2019/dec/08/nhs-gives-amazon-free-use-of-health-data-under-alexa-advice-deal, Dec. 8, 2019, 3 pages.
Wang et al., "End-to-end Anchored Speech Recognition", Proc. ICASSP2019, May 12-17, 2019, 5 pages.
Wang et al., "Tacotron: Towards End to End Speech Synthesis", Available online at: https://arxiv.org/abs/1703.10135, Apr. 6, 2017, 10 pages.
Wang et al., "Training Deep Neural Networks with 8-bit Floating Point Numbers", 32nd Conference on Neural Information Processing Systems (Neurl PS 2018), 2018, 10 pages.
Wei et al., "Design and Implement on Smart Home System", 2013 Fourth International Conference on Intelligent Systems Design and Engineering Applications, Available online at: https://ieeexplore.ieee.org/document/6843433, 2013, pp. 229-231.
Weng et al., "Deep Neural Networks for Single-Channel Multi-Talker Speech Recognition", IEEE/ACM Transactions on Audio, Speech, and Language Processing, vol. 23, No. 10,, Oct. 2015, pp. 1670-1679.
What's on Spotify?, Music for everyone, Online Available at:—<https://web.archive.org/web/20160428115328/https://www.spotify.com/us/>, Apr. 28, 2016, 6 pages.
Wikipedia, "Home Automation", Available At: <https://en.wikipedia.org/w/index.php?title=Home_automation&oldid=686569068>, Oct. 19, 2015, 9 pages.
Wikipedia, "Siri", Available At: URL: <https://en.wikipedia.org/w/index.php?title=Siri&oldid=689697795>, Nov. 8, 2015, 13 pages.
Wikipedia, "Virtual Assistant", Wikipedia, Online Available at: <https://en.wikipedia.org/w/index.php?title=Virtual_assistant&oldid=679330666>, Sep. 3, 2015, 4 pages.
Win et al., "Myanmar Text to Speech System based on Tacotron-2", International Conference on Information and Communication Technology Convergence (ICTC), Oct. 21-23, 2020, pp. 578-583.
"Working with the Dragon Bar", Nuance Communications, Inc. Online Available at: https://www.nuance.com/products/help/dragon15/dragon-for-pc/enx/dpg-vla/Content/DragonBar/dragonbar_working_with.htm, Jun. 27, 2016, 2 pages.
Wu et al., "Monophone-based background modeling for two-stage ondevice wake word detection", in 2018 IEEE International Conference on Acoustics, Speech and Signal Processing (ICASSP), Apr. 2018, 5 pages.
Xai, "How it Works", Available online at: https://web.archive.org/web/20160531201426/https://x.ai/how-it-works/, May 31, 2016, 6 pages.
Xu et al., "Policy Optimization of Dialogue Management in Spoken Dialogue System for Out-of-Domain Utterances", 2016 International Conference on Asian Language Processing (IALP), IEEE, Nov. 21-23, 2016, pp. 10-13.
Xu et al., "Show, Attend and Tell: Neural Image Caption Generation with Visual Attention", Proceedings of the 32nd International Conference on Machine Learning, Lille, France, 2015, 10 pages.
Yang, Astor, "Control Android TV via Mobile Phone APP RKRemoteControl", Online Available at: https://www.youtube.com/watch?v=zpmUeOX_xro, Mar. 31, 2015, 4 pages.
Yates, Michaelc, "How can I exit Google Assistant after i'm finished with it", Available online at: https://productforums.google.com/forum/#!msg/phone-by-google/faECnR2RJwA/gKNtOkQgAQAJ, Jan. 11, 2016, 2 pages.
Yeh, Jui-Feng, "Speech Act Identification Using Semantic Dependency Graphs with Probabilistic Context-free Grammars", ACM Transactions on Asian and Low-Resource Language Information Processing, vol. 15, No. 1, Dec. 2015, pp. 5.1-5.28.
Yousef, Zulfikara, "Braina (A.I) artificial intelligence virtual personal assistant", Online available at: https://www.youtube.com/watch?v=2h6xpB8bPSA, Feb. 7, 2017, 3 pages.
Yu et al., "Permutation Invariant Training of Deep Models for Speaker-independent Multi-talker Speech Separation", Proc. ICASSP, 2017, 5 pages.
Yu et al., "Recognizing Multi-talker Speech with Permutation Invariant Training", Interspeech 2017, Aug. 20-24, 2017, pp. 2456-2460.
Zhang et al., ""IEHouse: A Non-Intrusive Household Appliance State Recognition System"", IEEE Smart World, Ubiquitous Intelligence & Computing, Advanced & Trusted Computed, 2017, 8 pages.
Zhang et al., "A Fiber-Optic Sensor for Acoustic Emission Detection in a High Voltage Cable System", Online Available at: https://www.mdpi.com/1424-8220/16/12/2026, Nov. 30, 2016, 11 pages.
Zhang et al., "Interaction Proxies for Runtime Repair and Enhancement of Mobile Application Accessibility", In Proceedings of the 2017 CHI Conference on Human Factors in Computing Systems (CHI '17). ACM, Denver, CO, USA, Online available at: https://dl.acm.org/doi/pdf/10.1145/3025453.3025846, May 6-11, 2017, pp. 6024-6037.
Zhang et al., "Very Deep Convolutional Networks for End-to-End Speech Recognition", IEEE International Conference on Acoustics, Speech and Signal Processing (ICASSP), 2017, 5 pages.
Zhang et al., "Voicemoji: Emoji Entry Using Voice for Visually Impaired People", CHI'21,, May 8-13, 2021, 18 pages.
Zhao et al., "Big Data Analysis and Application", Aviation Industry Press, Dec. 2015, pp. 236-241.
Zhao et al., "CueSee: Exploring Visual Cues for People with Low Vision to Facilitate a Visual Search Task", In Proceedings of the 2016 ACM International Joint Conference on Pervasive and Ubiquitous Computing. ACM, UbiComp '16, Heidelberg, Germany, Online available at: https://dl.acm.org/doi/pdf/10.1145/2971648.2971730, Sep. 12-16, 2016, pp. 73-84.
Zhao et al., "Enabling People with Visual Impairments to Navigate Virtual Reality with a Haptic and Auditory Cane Simulation", In Proceedings of the 2018 CHI Conference on Human Factors in Computing Systems (CHI '18). ACM, Article 116, Montréal, QC, Canada, Online available at: https://dl.acm.org/doi/pdf/10.1145/3173574.3173690, Apr. 21-26, 2018, 14 pages.
Zhao et al., "SeeingVR: A Set of Tools to Make Virtual Reality More Accessible to People with Low Vision", In Proceedings of the 2019 CHI Conference on Human Factors in Computing Systems (CHI '19). ACM, Article 111, Glasgow, Scotland, UK, Online available at: https://dl.acm.org/doi/pdf/10.1145/3290605.3300341, May 4-9, 2019, 14 pages.
Zhao et al., "Transferring Age and Gender Attributes for Dimensional Emotion Prediction from Big Speech Data Using Hierarchical Deep Learning", 2018 4th IEEE International Conference on Big Data Security on Cloud, 2018, pp. 20-24.
Zheng et al., "Intent Detection and Semantic Parsing for Navigation Dialogue Language Processing", 2017 IEEE 20th International Conference on Intelligent Transportation Systems (ITSC), 2017, 6 pages.
Zhong et al., "JustSpeak: Enabling Universal Voice Control on Android", W4A'14, Proceedings of the 11th Web for All Conference, No. 36, Apr. 7-9, 2014, 8 pages.
Zhou et al., "Learning Dense Correspondence via 3D-guided Cycle Consistency", Proceedings of the IEEE Conference on Computer Vision and Pattern Recognition (CVPR), 2016, 10 pages.
Zmolikova et al., "Speaker-aware Neural Network Based Beamformer for Speaker Extraction in Speech Mixtures", Interspeech 2017, Aug. 20-24, 2017, pp. 2655-2659.

(56) References Cited

OTHER PUBLICATIONS

CHOI et al., "Evaluation of Frequency Warping Based Features and Spectro-Temporal Features for Speaker Recognition", Speech Sounds and Phonetic Science, Online Available at: http://koreascience.or.kr/article/JAKO201510534323834.page, vol. 7, No. 1, Mar. 31,2015, pp. 3-10, Cited by the Korean Patent Office in an Office Action for related Patent Application No. 10-2022-7006388 on Jul. 18, 2023.
Jun, Yu, "Research on 3D visual speech expression and emotional simulation", China Excellence Master's Theses Full-text Database Information Technology Edition, No. 3, Mar. 15, 2018, 78 pages, Cited by the Chinese Patent Office in an Office Action for related Patent Application No. 202110168987.8 on May 12, 2024.
Amazon, Alexa, "Getting your news with Alexa flash briefing", Online available at: https://www.youtube.com/watch?v=xui8rumrNaE, Sep. 9, 2019, 2 pages.
Choi et al., "Evaluation of Frequency Warping Based Features and Spectro-Temporal Features for Speaker Recognition", Speech Sounds and Phonetic Science, Online Available at: http://koreascience.or.kr/article/JAKO201510534323834.page, vol. 7, No. 1, Mar. 31, 2015, pp. 3-10. (Official Copy only). {See communication under 37 CFR § 1.98(a) (3)}.
Daxm, "How to update your TESLA with your phone app", Retrieved from the internet: https://www.youtube.com/watch?v=8kgNGXycGKE, Oct. 31, 2018, 8 pages.
Ermolina et al., "Voice-Controlled Intelligent Personal Assistants in Health Care: International Delphi Study", Journal of Medical Internet Research, 2021, Online available at: doi: 10.2196/25312., Apr. 9, 2021, 20 pages.
Francis, Christopher, "PTAB Broadest Reasonable Interpretation: "in response to" Means "subsequent to"", The B2 IP Report retrieved from: http://web.archive.org/web/20220704055910/https://www.b2ipreport.com/claims-interpreted/ptab-broadest-reasonable-interpretation-in-response-to-means-subsequent-to/, Jan. 27, 2017, 4 pages.
Google Codelabs, "Extend Dynamic Shortcuts to Google Assistant with App Actions (Beta)" Available on: https://web.archive.org/web/20220524223852/https://codelabs.developers.google.com/codelabs/appactions-dynamic-shortcuts, May 24, 2022, 25 pages.
Graus et al., "Analyzing and Predicting Task Reminders", Conference on User Modeling Adaptation and Personalization, 2016, 9 pages.
Gu et al. "Alohomora: Motion-Based Hotword Detection in Head-Mounted Displays", IEEE Internet of Things Journal, vol. 7, No. 1, Jan. 2020, pp. 611-620.
Guarese et al., "Cooking in the Dark: Exploring Spatial Audio as MR Assistive Technology for the Visually Impaired", 18th IFIP Conference on Human-Computer Interaction (INTERACT), Available online at: https://inria.hal.science/hal-04291191/file/520519_1_En_29_Chapter.pdf, Aug. 2021, 6 pages.
Jun, Yu, "Research on 3D visual speech expression and emotional simulation", China Excellence Master's Theses Full-text Database Information Technology Edition, No. 3, Mar. 15, 2018, 78 pages (Official Copy only). {See communication under 37 CFR § 1.98(a) (3)}.
Maharjan et al., "Alexa, What Should I Eat? : A Personalized Virtual Nutrition Coach for Native American Diabetes Patients Using Amazon's Smart Speaker Technology", 2019 IEEE International Conference on E-health Networking, Application & Services (HealthCom), Online available at: https://ieeexplore.ieee.org/document/9009613, 2019, 6 pages.
Matias, Yossi, "Easier access to web pages: Ask Google Assistant to read it aloud", Available online at: https://blog.google/products/assistant/easier-access-web-pages-let-assistant-read-it-aloud/, Mar. 4, 2020, 3 pages.
Price et al., "Speaker Adaptation of Deep Neural Networks Using a Hierarchy of Output Layers", SLT 2014. Online Available at: IEEE Explore, 2014, pp. 153-158.
White et al., "Task completion detection: A Study in the Context of Intelligent Systems", Proceedings of the 42nd International ACM SIGIR Conference on Research and Development in Information Retrieval, Jul. 21-25, 2019, pp. 405-414.
Yeh et al., "Dialog Modeling in Audiobook Synthesis", Retrieved on Sep. 27, 2023, 6 pages.
Zhou et al., "Using Paralinguistic Information to Disambiguate User Intentions for Distinguishing Phrase Structure and Sarcasm in Spoken Dialog Systems", IEEE Spoken Language Technology Workshop (SLT), Jan. 19, 2021, pp. 1020-1027.
Notice of Allowance received for Korean Patent Application No. 10-2023-7034098, mailed on Jun. 26, 2025, 7 pages (2 pages of English Translation and 5 pages of Official Copy).
Notice of Allowance received for Japanese Patent Application No. 2024-123353, mailed on Aug. 25, 2025, 4 pages (1 page of English Translation and 3 pages of Official Copy).
Notice of Allowance received for Japanese Patent Application No. 2022-140998, mailed on Sep. 2, 2024, 4 pages (1 page of English Translation and 3 pages of Official Copy).
Intention to Grant received for European Patent Application No. 21151452.6, mailed on Nov. 6, 2024, 9 pages.
Office Action received for Korean Patent Application No. 10-2023-7034098, mailed on Oct. 22, 2024, 11 pages (5 pages of English Translation and 6 pages of Official Copy).

* cited by examiner

INTELLIGENT ASSISTANT FOR HOME AUTOMATION

CROSS-REFERENCE TO RELATED APPLICATIONS

This application is a continuation application of U.S. patent application Ser. No. 18/200,764, filed May 23, 2023, entitled "INTELLIGENT ASSISTANT FOR HOME AUTOMATION," which is a continuation application of U.S. patent application Ser. No. 17/540,942, now U.S. Pat. No. 11,699,448, filed Dec. 2, 2021, entitled "INTELLIGENT ASSISTANT FOR HOME AUTOMATION," which is a continuation application of U.S. patent application Ser. No. 16/881,625, now U.S. Pat. No. 11,257,504, filed May 22, 2020, entitled "INTELLIGENT ASSISTANT FOR HOME AUTOMATION," which is a continuation application of U.S. patent application Ser. No. 16/174,046, now U.S. Pat. No. 10,714,095, filed Oct. 29, 2018, entitled "INTELLIGENT ASSISTANT FOR HOME AUTOMATION," which is a continuation of U.S. patent application Ser. No. 14/503,105, now U.S. Pat. No. 10,170,123, filed Sep. 30, 2014, entitled "INTELLIGENT ASSISTANT FOR HOME AUTOMATION," which claims priority to U.S. Patent Application Ser. No. 62/005,893, filed May 30, 2014, entitled "INTELLIGENT ASSISTANT FOR HOME AUTOMATION." The contents of these applications are hereby incorporated by reference in their entirety for all purposes.

This application is related to U.S. patent application Ser. No. 16/175,208, filed Oct. 30, 2018, entitled "INTELLIGENT ASSISTANT FOR HOME AUTOMATION," which is a continuation of U.S. patent application Ser. No. 14/503,105, filed Sep. 30, 2014, now U.S. Pat. No. 10,170,123, entitled "INTELLIGENT ASSISTANT FOR HOME AUTOMATION," which claims priority to U.S. Patent Application Ser. No. 62/005,893, filed May 30, 2014, entitled "INTELLIGENT ASSISTANT FOR HOME AUTOMATION." The contents of these applications are hereby incorporated by reference in their entirety for all purposes.

FIELD

This relates generally to natural language processing and, more specifically, to the use of a virtual assistant with natural language processing to control electronic devices.

BACKGROUND

Home electronic devices that can be controlled remotely using software applications running on a computing device, such as a mobile phone, tablet computer, laptop computer, desktop computer, or the like, have become increasingly popular. For example, numerous manufacturers create light bulbs that can be controlled by a software application running on a mobile phone to adjust the brightness and/or color of the bulb. Other devices, such as door locks, thermostats, and the like, having similar controls are also available.

While these devices can provide users with a greater level of control and convenience, it can become exceedingly difficult to manage these devices as the number of remotely controlled devices and the number of types of remotely controlled devices in the home increase. For example, a typical home can include 40-50 light bulbs placed throughout the various rooms of the home. Using conventional software applications, each light bulb is given a unique identifier, and a user attempting to control one of these devices must select the appropriate identifier from a list of available devices within a graphical user interface. Remembering the correct identifier for a particular light bulb and finding that identifier from a list of 40-50 identifiers can be a difficult and time-consuming process. To add to the difficulty of managing and controlling a large number of remotely controlled devices, different manufactures typically provide different software applications that must be used to control their respective devices. As a result, a user must locate and open one software application to turn on/off their light bulbs, and must then locate and open another software application to set the temperature of their thermostat.

SUMMARY

Systems and processes for using a virtual assistant to control electronic devices are provided. In one example process, a user can speak an input in natural language form to a user device to control one or more electronic devices. The user device can transmit the user speech to a server to be converted into a textual representation. The server can identify the one or more electronic devices and appropriate commands to be performed by the one or more electronic devices based on the textual representation. The identified one or more devices and commands to be performed can be transmitted back to the user device, which can forward the commands to the appropriate one or more electronic devices for execution. In response to receiving the commands, the one or more electronic devices can perform the commands and transmit their current states to the user device.

DETAILED DESCRIPTION

In the following description of examples, reference is made to the accompanying drawings in which it is shown by way of illustration specific examples that can be practiced. It is to be understood that other examples can be used and structural changes can be made without departing from the scope of the various examples.

Intelligent automated assistants (or virtual assistants) provide an intuitive interface between users and electronic devices. These assistants can allow users to interact with devices or systems using natural language in spoken and/or text forms. For example, a user can access the services of an electronic device by providing a spoken user input in natural language form to a virtual assistant associated with the electronic device. The virtual assistant can perform natural language processing on the spoken user input to infer the user's intent and operationalize the user's intent into tasks. The tasks can then be performed by executing one or more functions of the electronic device and a relevant output can be returned to the user in natural language form.

This relates to systems and processes for using a virtual assistant to control electronic devices. In one example process, a user can speak an input in natural language form to a user device to control one or more electronic devices. The user device can transmit the user speech to a server to be converted into a textual representation. The server can identify the one or more electronic devices and appropriate commands to be performed by the one or more electronic devices based on the textual representation. The identified one or more devices and commands to be performed can be transmitted back to the user device, which can forward the commands to the appropriate one or more electronic devices for execution. In response to receiving the commands, the one or more electronic devices can perform the commands and transmit their current states to the user device.

System Overview

Figure 1:
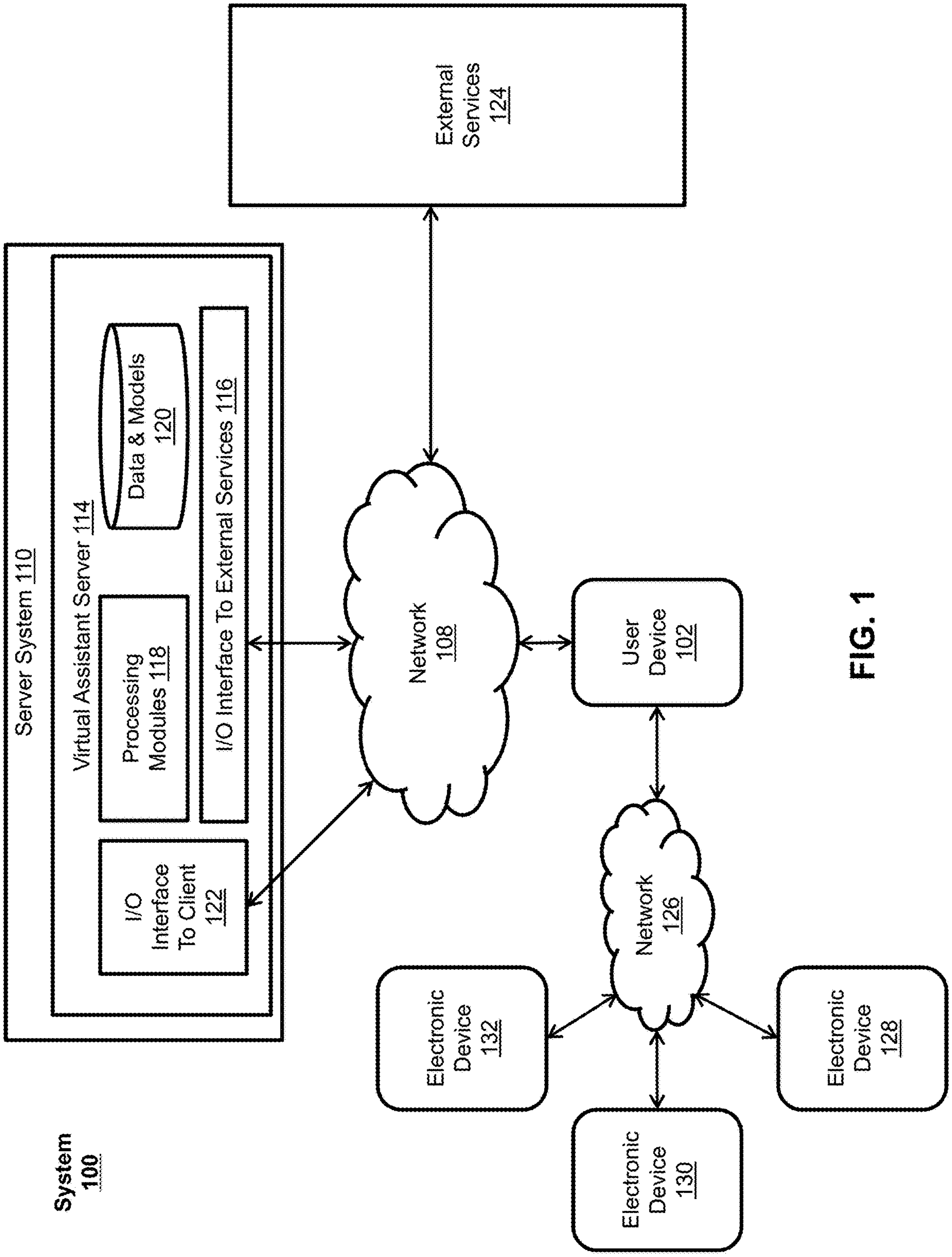
FIG. 1 illustrates an exemplary environment in which a virtual assistant can be used to control electronic devices according to various examples.

FIG. 1 illustrates exemplary system 100 for implementing a virtual assistant to control electronic devices according to various examples. The terms "virtual assistant," "digital assistant," "intelligent automated assistant," or "automatic digital assistant" can refer to any information processing system that interprets natural language input in spoken and/or textual form to infer user intent, and performs actions based on the inferred user intent. For example, to act on an inferred user intent, the system can perform one or more of the following: identifying a task flow with steps and parameters designed to accomplish the inferred user intent; inputting specific requirements from the inferred user intent into the task flow; executing the task flow by invoking programs, methods, services, APIs, or the like; and generating output responses to the user in an audible (e.g., speech) and/or visual form.

A virtual assistant can be capable of accepting a user request at least partially in the form of a natural language command, request, statement, narrative, and/or inquiry. Typically, the user request seeks either an informational answer or performance of a task by the virtual assistant. A satisfactory response to the user request can include provision of the requested informational answer, performance of the requested task, or a combination of the two. For example, a user can ask the virtual assistant a question, such as "Where am I right now?" Based on the user's current location, the virtual assistant can answer, "You are in Central Park." The user can also request the performance of a task, for example, "Please remind me to call Mom at 4 p.m. today." In response, the virtual assistant can acknowledge the request and then create an appropriate reminder item in the user's electronic schedule. During the performance of a requested task, the virtual assistant can sometimes interact with the user in a continuous dialogue involving multiple exchanges of information over an extended period of time. There are numerous other ways of interacting with a virtual assistant to request information or performance of various tasks. In addition to providing verbal responses and taking programmed actions, the virtual assistant can also provide responses in other visual or audio forms (e.g., as text, alerts, music, videos, animations, etc.).

An example of a virtual assistant is described in Applicants' U.S. Utility application Ser. No. 12/987,982 for "Intelligent Automated Assistant," filed Jan. 10, 2011, the entire disclosure of which is incorporated herein by reference.

As shown in FIG. 1, in some examples, a virtual assistant can be implemented according to a client-server model. The virtual assistant can include a client-side portion executed on a user device 102, and a server-side portion executed on a server system 110. User device 102 can include any electronic device, such as a mobile phone, tablet computer, portable media player, desktop computer, laptop computer, PDA, television, television set-top box, wearable electronic device, or the like, and can communicate with server system 110 through one or more networks 108, which can include the Internet, an intranet, or any other wired or wireless public or private network. The client-side portion executed on user device 102 can provide client-side functionalities, such as user-facing input and output processing and communications with server system 110. Server system 110 can provide server-side functionalities for any number of clients residing on a respective user device 102.

Server system 110 can include one or more virtual assistant servers 114 that can include a client-facing I/O interface 122, one or more processing modules 118, data and model storage 120, and an I/O interface to external services 116. The client-facing I/O interface 122 can facilitate the client-facing input and output processing for virtual assistant server 114. The one or more processing modules 118 can utilize data and model storage 120 to determine the user's intent based on natural language input, and perform task execution based on inferred user intent. Additionally, data and model storage 120 can store a unique identifier, a state, a type, a location, and any other relevant information associated with one or more of electronic devices (e.g., electronic devices 128, 130, and 132) capable of being controlled by user device 102 and/or server system 110. In some examples, virtual assistant server 114 can communicate with external services 124, such as telephony services, calendar services, information services, messaging services, navigation services, and the like, through network(s) 108 for task completion or information acquisition. The I/O interface to external services 116 can facilitate such communications.

Server system 110 can be implemented on one or more standalone data processing devices or a distributed network of computers. In some examples, server system 110 can employ various virtual devices and/or services of third party service providers (e.g., third-party cloud service providers) to provide the underlying computing resources and/or infrastructure resources of server system 110.

User device 102 can be further coupled to electronic devices 128, 130, and 132 via one or more networks 126. Electronic devices 128, 130, and 132 can include any type of remotely controlled electronic device, such as a light bulb (e.g., having a binary ON/OFF state, numerical dimmable state, color state, etc.), garage door (e.g., having a binary OPEN/CLOSED state), door lock (e.g., having binary LOCKED/UNLOCKED state), thermostat (e.g., having one or more numerical temperature states, such as a high temperature, low temperature, time-based temperatures, etc.), electrical outlet (e.g., having a binary ON/OFF state), switch (e.g., having a binary ON/OFF state), or the like. Network(s) 126 can include a WiFi network or any other wired or wireless public or private local network. Additionally or alternatively, user device 102 can be coupled to communicate directly with electronic devices 128, 130, or 132 using, for example, Bluetooth, BTLE, line of sight, peer-to-peer, or another radio-based or other wireless communication. Thus, in the illustrated example, user device 102 can be located near electronic devices 128, 130, and 132, such that it can communicate with them directly or over the same local network. For example, user device 102 and electronic devices 128, 130, and 132 can be located within the same home or building, and network(s) 126 can include the home or building's WiFi network. As discussed in greater detail below with respect to FIGS. 5, 8, and 9, user device 102 can issue commands to control any of electronic devices 128, 130, and 132 in response to a natural language spoken input provided by a user to user device 102.

While only three electronic devices 128, 130, and 132 are shown, it should be appreciated that system 100 can include any number of electronic devices. Additionally, although the functionality of the virtual assistant is shown in FIG. 1 as including both a client-side portion and a server-side portion, in some examples, the functions of the assistant can be implemented as a standalone application installed on a user device. Moreover, the division of functionalities between the client and server portions of the virtual assistant can vary in different examples. For instance, in some examples, the client executed on user device 102 can be a thin-client that provides only user-facing input and output processing functions, and delegates all other functionalities of the virtual assistant to a backend server.

Figure 2:
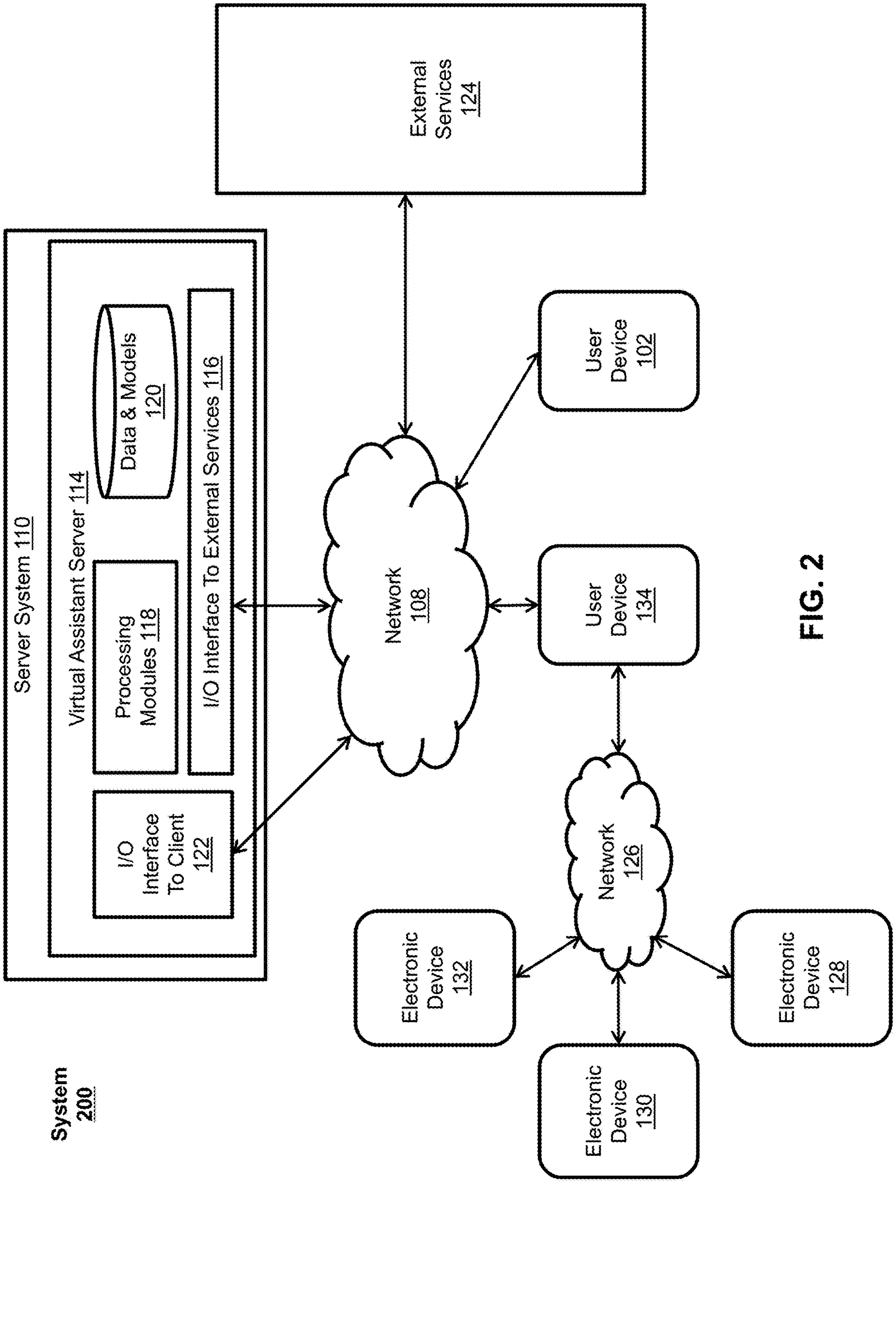
FIG. 2 illustrates an exemplary environment in which a virtual assistant can be used to remotely control electronic devices according to various examples.

FIG. 2 illustrates another exemplary system 200 for implementing a virtual assistant to remotely control electronic devices according to various examples. Similar to system 100, system 200 can include user device 102, server system 110, and external services 124 communicatively coupled together by network(s) 108. However, in contrast to system 100, user device 102 may not be coupled to electronic devices 128, 130, and 132. Instead, system 200 can include a second user device 134 coupled to communicate with user device 102 and/or server system 110 via network(s) 108 and coupled to communicate with electronic devices 128, 130, and 132 via network(s) 126. This configuration can represent a situation in which the user and user device 102 are located remotely from electronic devices 128, 130, and 132 (e.g., the user and user device 102 are at the user's office, while electronic devices 128, 130, and 132 are at the user's home).

Second user device 134 can include any type of electronic device, such as a mobile phone, tablet computer, portable media player, desktop computer, laptop computer, PDA, television, television set-top box, wearable electronic device, or the like, and can be configured to receive commands from user device 102 and/or server system 110 and to issue commands to electronic devices 128, 130, and 132. As discussed in greater detail below with respect to FIG. 6, second user device 134 can issue commands to control any of electronic devices 128, 130, and 132 in response to a natural language spoken input provided by a user to user device 102.

User Device

Figure 3:
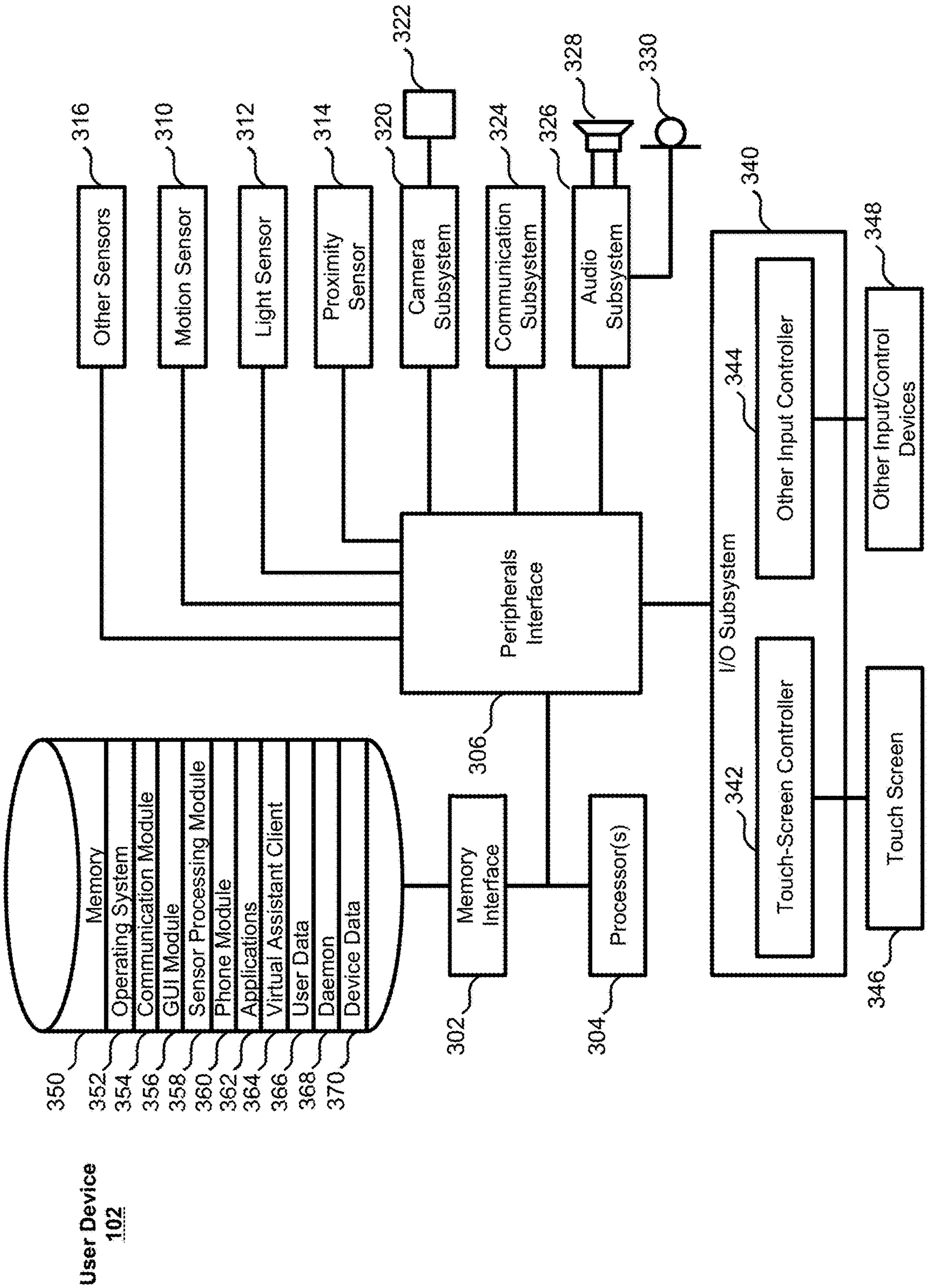
FIG. 3 illustrates an exemplary user device according to various examples.

FIG. 3 is a block diagram of a user-device 102 (or second user device 134) according to various examples. As shown, user device 102 can include a memory interface 302, one or more processors 304, and a peripherals interface 306. The various components in user device 102 can be coupled together by one or more communication buses or signal lines. User device 102 can further include various sensors, subsystems, and peripheral devices that are coupled to the peripherals interface 306. The sensors, subsystems, and peripheral devices gather information and/or facilitate various functionalities of user device 102.

For example, user device 102 can include a motion sensor 310, a light sensor 312, and a proximity sensor 314 coupled to peripherals interface 306 to facilitate orientation, light, and proximity sensing functions. One or more other sensors 316, such as a positioning system (e.g., a GPS receiver), a temperature sensor, a biometric sensor, a gyroscope, a compass, an accelerometer, and the like, are also connected to peripherals interface 306, to facilitate related functionalities.

In some examples, a camera subsystem 320 and an optical sensor 322 can be utilized to facilitate camera functions, such as taking photographs and recording video clips. Communication functions can be facilitated through one or more wired and/or wireless communication subsystems 324, which can include various communication ports, radio frequency receivers and transmitters, and/or optical (e.g., infrared) receivers and transmitters. An audio subsystem 326 can be coupled to speakers 328 and a microphone 330 to facilitate voice-enabled functions, such as voice recognition, voice replication, digital recording, and telephony functions.

In some examples, user device 102 can further include an I/O subsystem 340 coupled to peripherals interface 306. I/O subsystem 340 can include a touch screen controller 342 and/or other input controller(s) 344. Touch-screen controller 342 can be coupled to a touch screen 346. Touch screen 346 and the touch screen controller 342 can, for example, detect contact and movement or break thereof using any of a plurality of touch sensitivity technologies, such as capacitive, resistive, infrared, and surface acoustic wave technologies, proximity sensor arrays, and the like. Other input controller(s) 344 can be coupled to other input/control devices 348, such as one or more buttons, rocker switches, a thumb-wheel, an infrared port, a USB port, and/or a pointer device such as a stylus.

In some examples, user device 102 can further include a memory interface 302 coupled to memory 350. Memory 350 can include any electronic, magnetic, optical, electromagnetic, infrared, or semiconductor system, apparatus, or device, a portable computer diskette (magnetic), a random access memory (RAM) (magnetic), a read-only memory (ROM) (magnetic), an erasable programmable read-only memory (EPROM) (magnetic), a portable optical disc such as CD, CD-R, CD-RW, DVD, DVD-R, or DVD-RW, or flash memory such as compact flash cards, secured digital cards, USB memory devices, memory sticks, and the like. In some examples, a non-transitory computer-readable storage medium of memory 350 can be used to store instructions (e.g., for performing some or all of processes 500, 600, 700, 800, or 900, described below) for use by or in connection with an instruction execution system, apparatus, or device, such as a computer-based system, processor-containing system, or other system that can fetch the instructions from the instruction execution system, apparatus, or device, and execute the instructions. In other examples, the instructions (e.g., for performing processes 500, 600, 700, 800, or 900, described below) can be stored on a non-transitory computer-readable storage medium of server system 110, or can be divided between the non-transitory computer-readable storage medium of memory 350 and the non-transitory computer-readable storage medium of server system 110. In the context of this document, a "non-transitory computer readable storage medium" can be any medium that can contain or store the program for use by or in connection with the instruction execution system, apparatus, or device.

In some examples, the memory 350 can store an operating system 352, a communication module 354, a graphical user interface module 356, a sensor processing module 358, a phone module 360, and applications 362. Operating system 352 can include instructions for handling basic system services and for performing hardware dependent tasks. Communication module 354 can facilitate communicating with one or more additional devices, one or more computers, and/or one or more servers. Graphical user interface module 356 can facilitate graphic user interface processing. Sensor processing module 358 can facilitate sensor related processing and functions. Phone module 360 can facilitate phone-related processes and functions. Application module 362 can facilitate various functionalities of user applications, such as electronic-messaging, web browsing, media processing, navigation, imaging, and/or other processes and functions.

Memory 350 can also store client-side virtual assistant instructions (e.g., in a virtual assistant client module 364) and various user data 366 (e.g., user-specific vocabulary data, preference data, and/or other data, such as the user's electronic address book, to-do lists, shopping lists, etc.) to provide the client-side functionalities of the virtual assistant.

In various examples, virtual assistant client module 364 can be capable of accepting voice input (e.g., speech input), text input, touch input, and/or gestural input through various user interfaces (e.g., I/O subsystem 340, audio subsystem 326, or the like) of user device 102. Virtual assistant client module 364 can also be capable of providing output in audio (e.g., speech output), visual, and/or tactile forms. For example, output can be provided as voice, sound, alerts, text messages, menus, graphics, videos, animations, vibrations, and/or combinations of two or more of the above. During operation, virtual assistant client module 364 can communicate with the virtual assistant server using communication subsystem 324.

In some examples, virtual assistant client module 364 can utilize the various sensors, subsystems, and peripheral devices to gather additional information from the surrounding environment of user device 102 to establish a context associated with a user, the current user interaction, and/or the current user input. In some examples, virtual assistant client module 364 can provide the contextual information or a subset thereof with the user input to the virtual assistant server to help infer the user's intent. The virtual assistant can also use the contextual information to determine how to prepare and deliver outputs to the user.

In some examples, the contextual information that accompanies the user input can include sensor information, such as lighting, ambient noise, ambient temperature, images or videos of the surrounding environment, distance to another object, and the like. The contextual information can further include information associated with the physical state of user device 102 (e.g., device orientation, device location, device temperature, power level, speed, acceleration, motion patterns, cellular signal strength, etc.) or the software state of user device 102 (e.g., running processes, installed programs, past and present network activities, background services, error logs, resources usage, etc.). Any of these types of contextual information can be provided to the virtual assistant server 114 as contextual information associated with a user input.

In some examples, virtual assistant client module 364 can selectively provide information (e.g., user data 366) stored on user device 102 in response to requests from the virtual assistant server 114. Virtual assistant client module 364 can also elicit additional input from the user via a natural language dialogue or other user interfaces upon request by virtual assistant server 114. Virtual assistant client module 364 can pass the additional input to virtual assistant server 114 to help virtual assistant server 114 in intent inference and/or fulfillment of the user's intent expressed in the user request.

Figure 4:
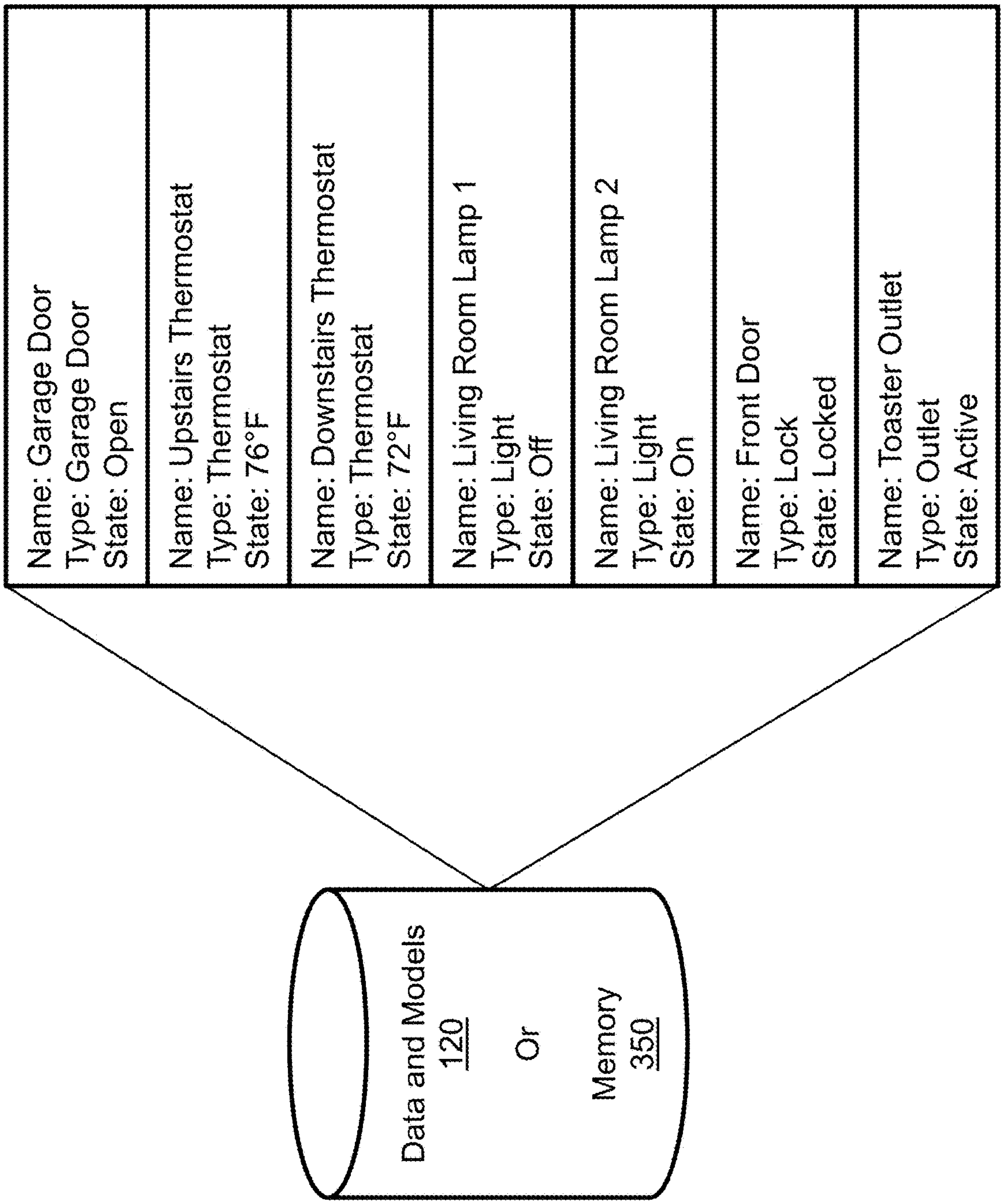
FIG. 4 shows a visual representation of multiple entries used to store information associated with electronic devices according to various examples.

Memory 350 can further store electronic device data 370 that can include a unique identifier, a state, a type, a location, and any other relevant information associated with one or more of the electronic devices capable of being controlled by user device 102 and/or server system 110 (e.g., electronic devices 128, 130, and 132). FIG. 4 shows a visual representation of entries that can be stored in electronic device data 370 for seven different electronic devices. As shown, each entry includes a unique name, type, and state of the electronic device. Data and model storage 120 of virtual assistant server 114 can include similar or identical entries for the electronic devices that can be maintained separately from that of electronic device data 370 of memory 350.

Referring back to FIG. 3, memory 350 can further include instructions (e.g., in daemon module 368) for creating and updating entries for electronic devices in electronic device data 370, communicating with the electronic devices of system 100, and for communicating with server system 110. For example, to add an electronic device to system 100, a software application associated with the electronic device can communicate with processor(s) 304 executing daemon module 368 to provide user device 102 with a unique name, type, state, location, and the like, of the electronic device. The software application can allow the user to enter the unique name in any desired manner. For example, a drop-down box with common names and/or a freeform text field can be provided in the application to allow a user to name a particular device. The type, state, and/or location of the electronic device can be predetermined or determined by the software application through communication with the electronic device. Processor(s) 304 executing daemon module 368 can store this information as an entry in electronic device data 370 and can also transmit this information to server system 110 to be stored in data and models storage 120. Additionally, when executed by processor(s) 304, daemon module 368 can receive commands that are to be provided to electronic devices 128, 130, and 132 from server system 110 via network(s), and can transmit those commands to the appropriate electronic devices. Processor(s) 304 executing daemon module 368 can further receive state updates from electronic devices 128, 130, and 132, update the corresponding entries in electronic device data 370 to reflect the updated states of the devices, and transmit the state updates to server system 110 to allow server system 110 to update the corresponding entries in data and models storage 120 to reflect the updated states of the devices.

Additionally, daemon module 368 can include instructions to manage access to electronic device data 370 by other devices and software applications. For example, when executed by processor(s) 304, daemon module 368 can grant access to all of electronic device data 370 by server system 110, but can restrict access to only a portion of electronic device data 370 by other devices or software applications. This can be useful when user device 102 is used to control electronic devices made by different manufacturers. In these situations, devices or software applications from each manufacturer can communicate with daemon module 368 using an API, and daemon module 368 can limit their access to only the portions of electronic device data 370 that correspond to their respective electronic devices. For example, company X can manufacture a light bulb capable of being controlled by user device 102, and company Y can manufacture a thermostat capable of being controlled by user device 102. Daemon module 368 can facilitate communication between user device 102 and each of the light bulb and the thermostat to allow user device 102 to issue commands to the electronic devices and to receive state information associated with the electronic devices for updating electronic device data 370. However, daemon module 368 can limit the access that the light bulb (and an associated software application running on user device 102) has to information in electronic device data 370 to only the information associated with the light bulb (and possibly any other electronic devices manufactured by company X). Similarly, daemon module 368 can limit the access that the thermostat (and an associated software application running on user device 102) has to information in electronic device data 370 to only the information associated with the thermostat (and possibly any other electronic devices manufactured by company Y). However, daemon module 368 can grant access to all of the information in electronic device data 370 to server system 110.

In various examples, memory 350 can include additional instructions or fewer instructions. Furthermore, various functions of user device 102 can be implemented in hardware and/or in firmware, including in one or more signal processing and/or application specific integrated circuits.

Local Control of Electronic Devices

Figure 5:
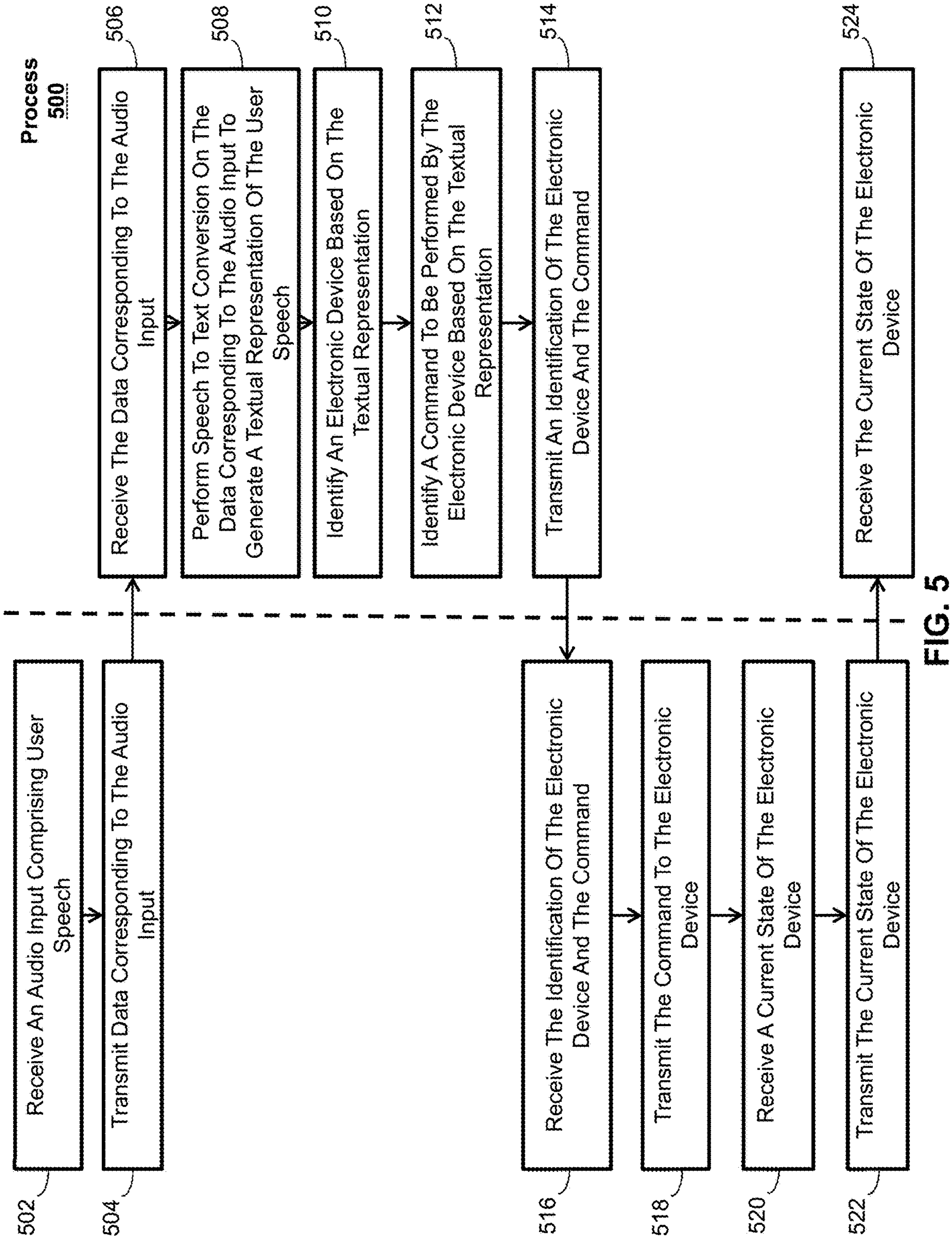
FIG. 5 illustrates an exemplary process for controlling electronic devices using a virtual assistant implemented using a client-server model according to various examples.

FIG. 5 illustrates an exemplary process 500 for controlling electronic devices using a virtual assistant. In some examples, process 500 can be performed using a system similar or identical to system 100, shown in FIG. 1. In these examples, the blocks of process 500 can be performed by both user device 102 and server system 110. Specifically, the blocks on the left side of FIG. 5 can be performed by user device 102, while the blocks on the right side of FIG. 5 can be performed by server system 110.

At block 502, an audio input including user speech can be received at a user device. In some examples, a user device (e.g., user device 102) can receive audio input that includes a user's speech via a microphone (e.g., microphone 330). The microphone can convert the audio input into an analog or digital representation, and provide the audio data to one or more processors (e.g., processor(s) 304).

At block 504, data corresponding to the audio input received at block 502 can be transmitted to one or more servers for processing. For example, user device 102 can transmit data corresponding to the audio input to virtual assistant server 114 of server system 110 via network(s) 108.

At block 506, data corresponding to the audio input transmitted by the user device at block 504 can be received by one or more servers. For example, virtual assistant server 114 of server system 110 can receive the data corresponding to the audio input transmitted by user device 102 via network(s) 108.

At block 508, speech-to-text conversion can be performed on the data corresponding to the audio input to convert the user speech into a textual representation of the user speech. The user speech can be converted using any known speech-to-text conversion process.

At block 510, one or more electronic devices can be identified based at least in part on the textual representation generated at block 508. In some examples, block 510 can include processing the textual representation of the user input to determine a user intent to issue a command to one or more electronic devices. As discussed above, server system 110 can include one or more data and model storages 120 that can store a unique identifier, a state, a type, a location, and any other relevant information associated with the electronic devices that can be controlled using system 100. Thus, block 510 can include identifying one or more of the electronic devices having associated information stored in data models and storages 120.

The one or more electronic devices can be identified in any number of ways. In some examples, the one or more electronic devices can be identified by parsing the textual representation to identify any of a set of nouns that correspond to the electronic devices supported by system 100. For example, the set of nouns can include the unique names of the electronic devices stored in electronic device data 370 and data and models storage 120, the possible types of electronic devices and their synonyms (e.g., garage door, thermostat, light, dimmable light, switch, color changeable light, bulb, lamp, lock, outlet, socket, etc.), categories of possible device states (e.g., volume, temperature, brightness, color, etc.), and the like.

To illustrate, using the example electronic device entries of FIG. 4, the set of nouns can include the unique names of the seven electronic devices (e.g., "Garage Door," "Upstairs Thermostat," "Downstairs Thermostat," "Living Room Lamp 1," "Living Room Lamp 2," "Front Door," and "Toaster Outlet"), the possible types of electronic devices and their synonyms (e.g., "Garage Door," "Thermostat," "Light," "Bulb," "Lamp," "Lock," "Outlet," "Socket," etc.), and categories of possible device states (e.g., temperature). Thus, if the textual representation of user speech generated at block 508 includes "Lock the front door," the textual representation can be processed using processing modules 118 and data and models storage 120 to search for any of the set of nouns. As a result of the search, it can be determined that the textual representation includes the unique name "Front Door," and the electronic device identified at block 510 can include this device. It should be appreciated that more than one electronic device can be identified at block 510 depending on the textual representation of user speech. For example, if the textual representation of user speech generated at block 508 instead includes "Turn off all the bulbs," the textual representation can be processed using processing modules 118 and data and models storage 120 to search for any of the set of nouns. As a result of the search, it can be determined that the textual representation includes the synonym "bulb" of the possible device type "light," and that the instruction from the user was to turn off all of those types of devices. As a result, the electronic devices identified at block 510 can include both "Living Room Lamp 1" and "Living Room Lamp 2."

In some examples, it can be difficult to identify the appropriate electronic device using only the set of nouns described above. For example, a textual representation that includes "Turn on the light" can produce a type match with both "Living Room Lamp 1" and "Living Room Lamp 2." In these examples, block 510 can further include the use of contextual information received from user device 102 (e.g., received as part of the data corresponding to the audio input at block 506) to disambiguate between potential matching electronic devices. Any type of contextual information can be used, such as sensor information (e.g., lighting, ambient noise, ambient temperature, images or videos of the surrounding environment, distance to another object, and the like), information associated with the physical state of user device 102 (e.g., device orientation, device location, device temperature, power level, speed, acceleration, motion patterns, cellular signal strength, etc.), the software state of user device 102 (e.g., running processes, installed programs, past and present network activities, background services, error logs, resources usage, etc.), or the like. For example, continuing with the "Turn on the light" example provided above, the location and orientation of user device 102 when user device 102 received the audio input at block 502 can be provided to server system 110 at blocks 504 and 506. This contextual information can be used to determine a location of user device 102 and/or a direction at which user device 102 was pointed when receiving the user speech. When compared with the known locations of "Living Room Lamp 1" and "Living Room Lamp 2" stored in data and models storage 120, the closest light or the light at which user device 102 was pointing can be selected as the electronic device at block 510. Other types of contextual information can be used in similar ways to disambiguate between potential matching electronic devices at block 510 by identifying contextual information that makes one or more of the potential matching electronic devices more or less likely to have been referenced by the textual representation of user speech.

In yet other examples, words associated with a state in the textual representation of user input can additionally or alternatively be used to disambiguate between potential matching electronic devices or to identify the appropriate electronic device. For example, a textual representation that includes "Turn it to 68" may not produce any matches using the set of nouns described above. Thus, in these examples, block 510 can further include parsing the textual representation to identify any of a set of words associated with a state that corresponds to the electronic devices supported by system 100. For example, the set of words associated with a state can include the possible states of the electronic devices and their synonyms (e.g., open, closed, close, shut, on, off, active, inactive, lock, locked, a color, etc.), the types of values of the states (e.g., binary, float, etc.), a query for the state of the device, adjectives associated with a specific type of state (e.g., warmer, cooler, brighter, dimmer, a color, etc.), or the like. When used to parse "Turn it to 68," it can be determined that the textual representation includes the float value "68." When compared to the entries shown in FIG. 4, it can be determined that only "Upstairs Thermostat" and "Downstairs Thermostat" accept state float values. To disambiguate between the two thermostats, contextual information, such as a location of user device 102 can be used to select the thermostat that is closer to user device 102 as the electronic device identified at block 510. Similarly, if the textual representation instead included "Make it brighter," the set of words associated with a state can be used to determine that the textual representation includes the word "brighter," which is an adjective that describes the state of devices having the type "light." To disambiguate between the two lights, contextual information, such as a location of user device 102 can be used to select the light that is closer to user device 102 as the electronic device identified at block 510.

At block 512, a command to be performed by each of the one or more electronic devices identified at block 510 can be identified. The command(s) to be performed can be identified in any number of ways. In some examples, the command(s) to be performed can be identified by parsing the textual representation of user speech to identify any of the set of words associated with a state (e.g., the possible states of the electronic devices and their synonyms, the types of values of the states, a query for the state of the device, adjectives associated with a specific type of state). The identified state or operation can then be used to identify a command to be performed by each of the one or more electronic devices identified at block 510. For example, if the textual representation of user speech includes "Lock the front door," it can be determined that the textual representation includes the state "lock" from the set of states. Thus, a command to transition to the "lock" state can be generated and identified at block 512 as being the command to be performed by the electronic device "Front Door" that was identified at block 510. While a single command for a single electronic device is identified in the example above, it should be appreciated that multiple commands can be identified if multiple electronic devices were identified at block 510. For example, the textual representation "Turn on all of the lights" can result in the identification a command to transition to the "on" state for each of "Living Room Lamp 1" and "Living Room Lamp 2" at block 512.

In some examples, when the textual representation of user speech includes one of the adjectives associated with a specific type of state (e.g., warmer, cooler, brighter, dimmer, etc.), block 512 can include identifying a command to set a state of the electronic device identified at block 510 to a value relative to its current value. For example, if the textual representation includes "make it warmer," the command identified at block 514 can be a command to increase the temperature of the thermostat identified at block 510 by a predetermined amount. The command can be a command to change the state value by an amount relative to the electronic device's current value rather than a command to transition the state value to a specific value (e.g., determined using the state of the thermostat stored in data and models storage 120) since the actual state of the electronic device may differ from the state stored in data and models storage 120.

In some examples, when the textual representation of user speech includes a query for the state of the device, block 512 can include identifying an instruction to cause user device 102 to query the identified electronic device(s). For example, if the textual representation includes "Is the garage door closed?", the command identified at block 514 can be a command to query the state of electronic device "Garage Door."

At block 514, an identification of each of the one or more electronic devices identified at block 510 and the command(s) to be performed by the one or more electronic devices identified at block 512 can be transmitted to the user device. For example, server system 110 can transmit the unique identifier associated with each of the electronic devices identified at block 510 and the command(s) to be performed by the one or more electronic devices to user device 102 via network(s) 108.

In some examples, the textual representation of the user speech generated at block 508 can also be transmitted to the user device at block 514. In these examples, blocks 510 and 514 can also be performed on the user device. The transmitted textual representation can be used by the user device to identify one or more electronic devices and/or identify a command or commands to be performed by the one or more electronic devices in electronic device data 370. This can be desirable, for example, when the electronic device data 370 in the user device is more up-to-date than the data on the one or more servers. In such instances, the user device can identify an electronic devices and/or a command that is not included in the data of the one or more servers.

In other examples, the textual representation can be parsed at blocks 510 and/or 512 at the one or more servers to determine key words or terms that can be suitable for identifying one or more of electronic devices and/or identifying a command or commands to be performed by the one or more electronic devices. In these examples, the parsed key words or terms can also be transmitted to the user device at block 514. The transmitted key words or terms can be used by the user device to identify one or more electronic devices and/or identify a command or commands to be performed by the one or more electronic devices in electronic device data 370. This can be desirable, for example, when the electronic device data 370 in the user device is more up-to-date than the data on the one or more servers. In such instances, the user device can identify an electronic devices and/or a command that is not included in the data of the one or more servers.

At block 516, the identification of each of the one or more the electronic devices and command(s) transmitted by the one or more servers can be received by the user device. For example, user device 102 can receive the unique identifier(s) and the command(s) transmitted by server system 110 at block 514 via network(s) 108.

At block 518, the user device can transmit the command(s) received at block 516 to the electronic device(s) associated with the identifier(s) received at block 516. For example, if user device 102 received an identifier associated with electronic device 128 (e.g., "Front Door") and a command to transition the electronic device to a "locked" state at block 516, user device 102 can transmit the command to electronic device 128 to transition to the "locked" state via network(s) 126. If user device 102 received additional identifiers and commands at block 516, user device 102 can further transmit those commands to the identified electronic devices at block 518.

In some examples, the actual state of an electronic device may not be the same as the state of the electronic device as stored in user device 102 (e.g., in memory 350) and/or server system 110 (e.g., in data and models storage 120). For example, a door lock could have been manually opened or closed without using the virtual assistant of system 100. Thus, in some examples, block 518 can be performed regardless of the state of the electronic device as stored in user device 102 and/or server system 110. For example, a command to set a door lock's state to "locked" can be transmitted to the door lock even if the corresponding entry in user device 102 and/or server system 110 indicates that they door is already locked. Moreover, block 518 can be performed without first querying the electronic device (e.g., between blocks 516 and 518) to determine its actual state in order to reduce the amount of time required to issue a command to the electronic device. For example, the command to set the door lock's state to "locked" can be transmitted to the door lock without first querying its state, thereby reducing the time required to transmit the command to the door lock by an amount corresponding to the time required to send a query to the door lock and to receive the state from the door lock.

At block 520, the user device can receive a current state of each electronic device (that was sent a command at block 518) after each electronic device executes their respective command. For example, user device 102 can receive an updated status of electronic device 128 after it performed the command to set its state to "locked." In this example, the current state returned to user device 102 can be the state "locked." If commands were sent to more than one electronic device at block 518, block 520 can further include receiving current states from those electronic devices. In some examples, block 520 can further include updating the state of the electronic device in electronic device data 370 based on the received current state. For example, user device 102 can update the state of electronic device 128 in electronic device data 370 to "locked." In some examples, block 520 can further include outputting an audio or visual indication of a result of the command(s) transmitted to the electronic device(s) at block 518 based on the transmitted command(s) and the received current state(s) of the electronic device(s). For example, if the command transmitted to electronic device 128 was a command to transition the device's state to "locked" and the current state of electronic device 128 received at block 520 was "locked," an indication of the result can be that electronic device 128 was successfully transitioned to the "locked" state. Alternatively, if the received current state of the electronic device (e.g., "unlocked") differs from the desired state indicated in the command (e.g., "locked"), an indication of a failure to transition to the "locked" state can be presented to the user. The current state can further include an error state, such as an undetermined or unavailable state of the device.

At block 522, the user device can transmit the current state(s) of the electronic device(s) received at block 520 to the one or more servers. For example, user device 102 can transmit the current state of the electronic device received at block 520 to server system 110. If the current state of more than one electronic device was received at block 520, block 522 can further include transmitting those current states to server system 110.

At block 524, the one or more servers can receive the current state(s) of the electronic device(s) transmitted by the user device at block 522. For example, server system 110 can receive the current state of the electronic device transmitted by user device 102 at block 522. If user device 102 transmitted more than one current state, block 524 can further include receiving those current states as well. In some examples, block 524 can further include updating the state(s) of the electronic device(s) in data and models storage 120 based on the received current state(s). For example, server system 110 can update the state of electronic device 128 in data and models storage 120 to "locked."

In some examples, process 500 can further include generating a notification associated with the current state of one or more of the electronic devices in response to determining that a predetermined condition has been satisfied. For example, in response to the location of user device 102 exiting a predetermined area (e.g., an area corresponding to the user's home) while one or more of the electronic devices are in a predetermined state (e.g., the "Front Door" is unlocked), a notification can be presented to the user via user device 102 indicating that the user forgot to lock their door. Other similar notifications can be generated in response to other predetermined conditions.

Using process 500, a virtual assistant implemented by a user device can receive natural language commands to set the state or query any number of electronic devices. The natural language commands can refer to the electronic devices in any desired manner and need not include unique identifiers of the electronic devices or a type of the electronic device.

Remote Control of Electronic Devices

Figure 6:
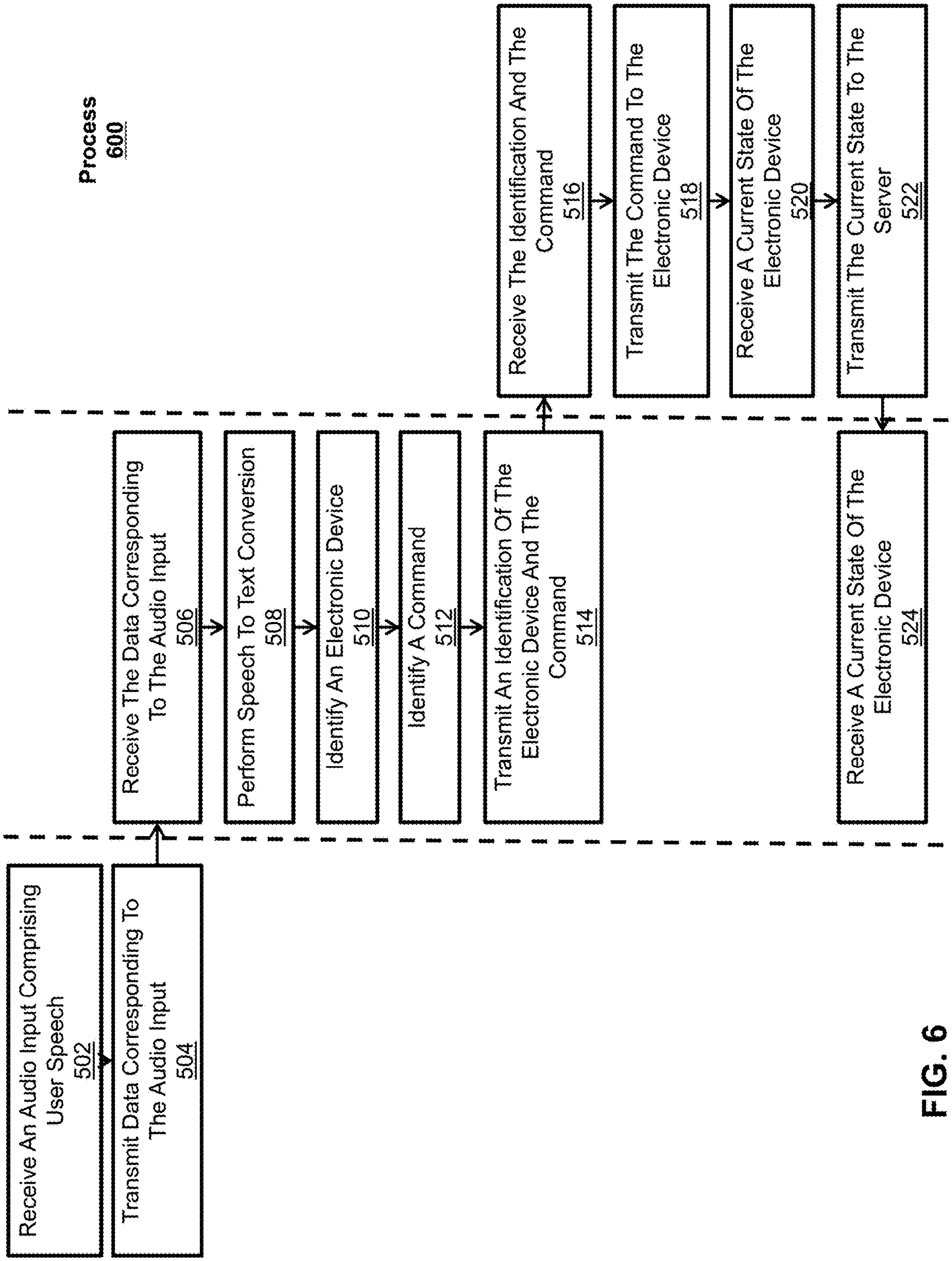
FIG. 6 illustrates an exemplary process for remotely controlling electronic devices using a virtual assistant implemented using a client-server model according to various examples.

FIG. 6 illustrates an exemplary process 600 for remotely controlling electronic devices using a virtual assistant. In some examples, process 600 can be similar to process 500, except that process 600 can be performed using a system similar or identical to system 200, shown in FIG. 2. For example, process 600 can be performed by a user device (e.g., user device 102) that is located remotely from the electronic devices being controlled (e.g., electronic devices 128, 130, and 132), and a second user device (e.g., second user device 134) can instead be used to control the electronic devices. Thus, portions of process 600 can be performed by each of user device 102, server system 110, and second user device 134. Specifically, the blocks on the left side of FIG. 6 can be performed by user device 102, the blocks in the middle of FIG. 6 can be performed by server system 110, and the blocks on the right side of FIG. 6 can be performed by second user device 134.

The blocks of process 600 can be similar or identical to the identically numbered blocks of process 500, except that blocks 516, 518, 520, and 522 of process 600 can instead be performed by a second user device (e.g., second user device 134). Additionally, as a result, the identification of each of the one or more electronic devices and command(s) to be performed by the electronic device(s) can instead be transmitted to the second user device at block 514, and the current state(s) of the electronic device(s) can instead be received from the second user device at block 524.

In some examples, process 600 can further include transmitting, by the one or more servers, the current state(s) of the electronic device(s) received at block 524 to the user device that received the audio input at block 502. Additionally or alternatively, the process can include transmitting an indication of success of the command transmitted to the electronic device at block 518. For example, a visual or audio output can be generated that notifies the user of the success, partial success, or failure to execute the command by the electronic device. The success determination can depend on the command transmitted to the electronic device and the current state of the device received at block 524.

Standalone Control of Electronic Devices

Figure 7:
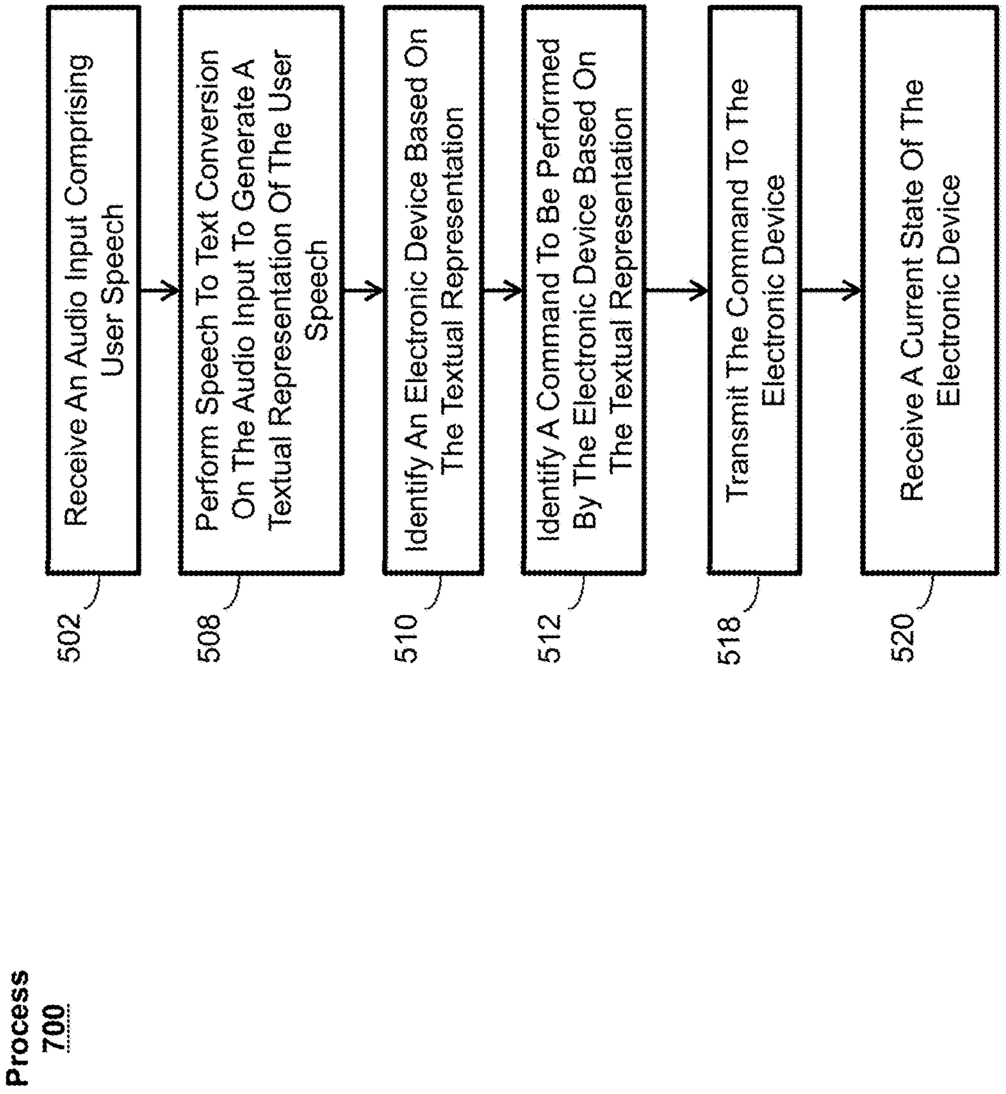
FIG. 7 illustrates an exemplary process for controlling electronic devices using a virtual assistant on a standalone user device according to various examples.

FIG. 7 illustrates an exemplary process 700 for controlling electronic devices using a virtual assistant. In some examples, process 700 can be similar to process 500, except that process 700 can be performed using a standalone user device that can perform the functions of both user device 102 and server system 110. As a result, all blocks of process 700 can be performed by the user device (e.g., user device 102).

The blocks of process 700 can be similar or identical to the identically numbered blocks of process 500, except that blocks 508, 510, and 512 can instead be performed by the user device (e.g., user device 102). Additionally, as a result, the blocks corresponding to functions for communicating between user device 102 and server system 110 (e.g., blocks 504, 506, 514, 516, 522, and 524) need not be performed.

Storing a Configuration of Electronic Devices

Figure 8:
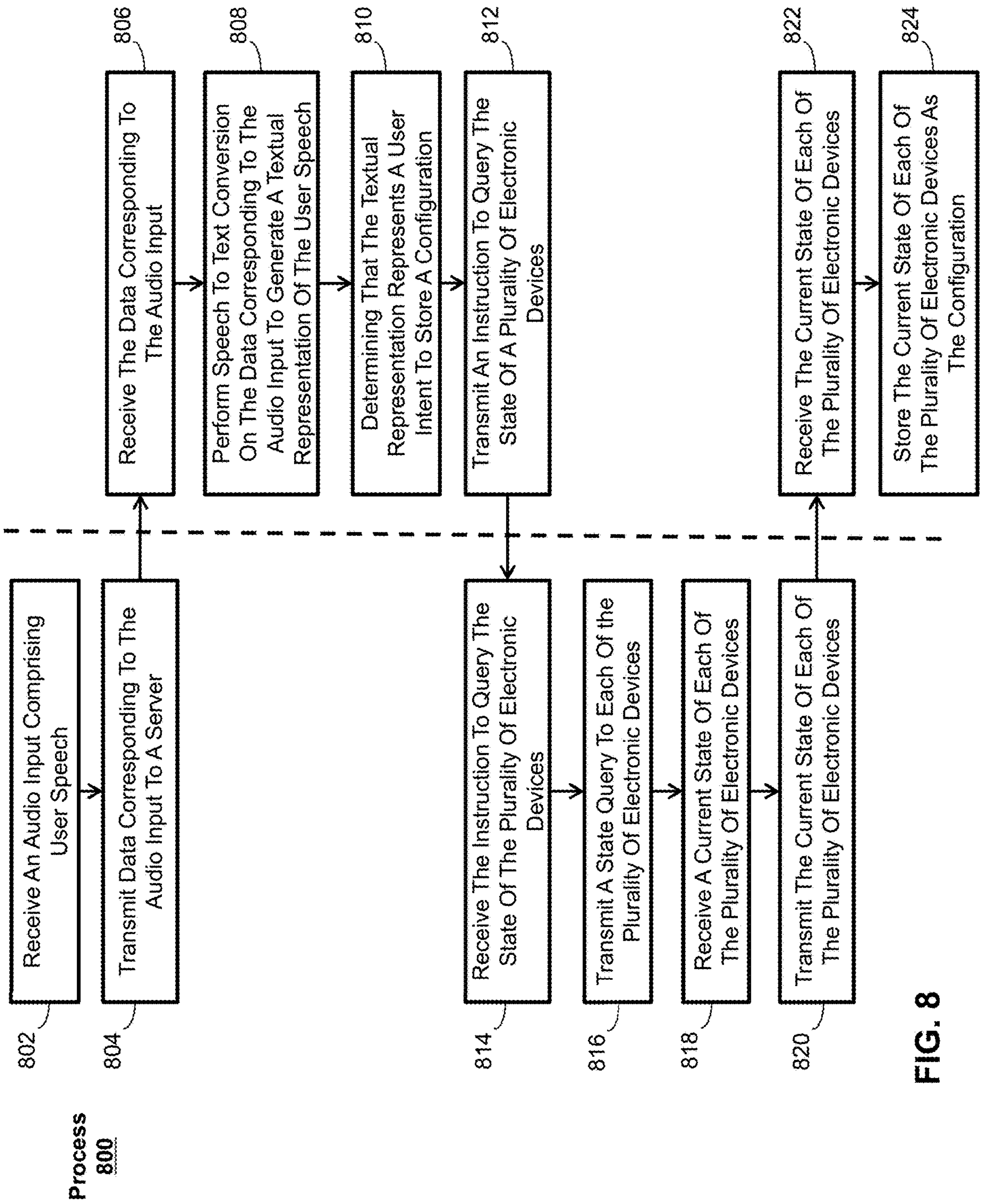
FIG. 8 illustrates an exemplary process for storing the states of electronic devices as a configuration according to various examples.

FIG. 8 illustrates an exemplary process 800 for storing the states of multiple electronic devices as a configuration using a virtual assistant. The configuration can represent a stored set of states of the multiple electronic devices that can be referenced in a spoken user input to cause the multiple electronic devices to transition to the states defined in the configuration. For example, a user may create a "sleep" configuration in which the states of all lights are set to off, the states of the thermostats are set to 72° F., the state of all doors are set to locked, and the state of the garage door is set to closed. Thus, when the user is about to go to sleep, the user can provide user device 102 with a command that references the stored configuration, such as "I'm going to sleep," and system 100 can set the states of the electronic devices based on the stored states in the sleep configuration. In some examples, process 800 can be performed using a system similar or identical to system 100, shown in FIG. 1. In these examples, the blocks of process 800 can be performed by both user device 102 and server system 110. Specifically, the blocks on the left side of FIG. 8 can be performed by user device 102, while the blocks on the right can be performed by server system 110.

At block 802, an audio input including user speech can be received at a user device in a manner similar or identical to block 502 of process 500. At block 804, data corresponding to the audio input received at block 802 can be transmitted to one or more servers for processing in a manner similar or identical to block 504 of process 500.

At block 806, the data corresponding to the audio input transmitted by the user device at block 804 can be received by one or more servers in a manner similar or identical to block 506 of process 500. At block 808, speech to text conversion can be performed on the data corresponding to the audio input to convert the user speech into a textual representation of the user speech in a manner similar or identical to block 508 of process 500.

At block 810, it can be determined that the textual representation of the user speech represents a user intent to store the states of the electronic devices of system 100 as a configuration. For example, one or more processing modules 118 of server system 110 can utilize data and model storage 120 to determine the user's intent based on natural language input. In some examples, this can include parsing the textual representation for words likely to be related to storing a configuration, such as "save," "store," "name," "keep," "configuration," "scene," their synonyms, and the like. For example, if the textual representation includes "Store this configuration as sleep," it can be determined at block 810 that the user intends to store the state of the electronic devices as a configuration named "sleep." Other textual representations, such as "Save this scene as work," can similarly result in a determination at block 810 that the user intends to store the state of the electronic devices as a configuration named "work."

At block 812, in response to determining that the textual representation of the user speech represents a user intent to store the state of the electronic devices of system 100 as a configuration, the one or more servers can transmit an instruction to the user device to query the state of the electronic devices. For example, server system 110 can transmit an instruction to user device 102 to query the state of electronic devices 128, 130, and 132 via network(s) 108.

At block 814, the instruction to query the state of the electronic devices transmitted by the one or more servers can be received by the user device. For example, user device 102 can receive the instruction to query the state of electronic devices 128, 130, and 132 from server system 110 via network(s) 108.

At block 816, the user device can transmit a query to each of the electronic devices for their current state. For example, user device 102 can transmit a command to each of electronic devices 128, 130, and 132 instructing them to return their current state via network(s) 126.

At block 818, the user device can receive a current state of each of the electronic device(s) in response to the query transmitted at block 516 (or a current state of all electronic devices capable of transmitting their current state). For example, user device 102 can receive a current state of electronic devices 128, 130, and 132 via network(s) 126 in response to the query sent to each of the devices at block 816. In some examples, block 818 can further include updating the state of the electronic device in electronic device data 370 based on the received current state. The current state can further include an error state, such as an undetermined or unavailable state of the device.

At block 820, the user device can transmit the current states of the electronic devices received at block 818 to the one or more servers. For example, user device 102 can transmit the current states of the electronic devices received at block 818 to server system 110.

At block 822, the one or more servers can receive the current states of the electronic devices transmitted by the user device at block 820. For example, server system 110 can receive the current state of electronic devices 128, 130, and 132 from user device 102 via network(s) 126.

At block 824, the one or more servers can store the current states of the electronic devices received at block 822 as a configuration. In some examples, the configuration can be assigned a unique identifier, such as "sleep," "morning," "work," or the like, based on the name provided in the textual representation and identified at block 810. For example, server system 110 can store the current states of electronic devices 128, 130, and 132 as a "sleep" configuration in model and data storage 120 in response to a user speech received at block 802 that included "name this configuration sleep."

Controlling Electronic Devices Using a Stored Configuration

Figure 9:
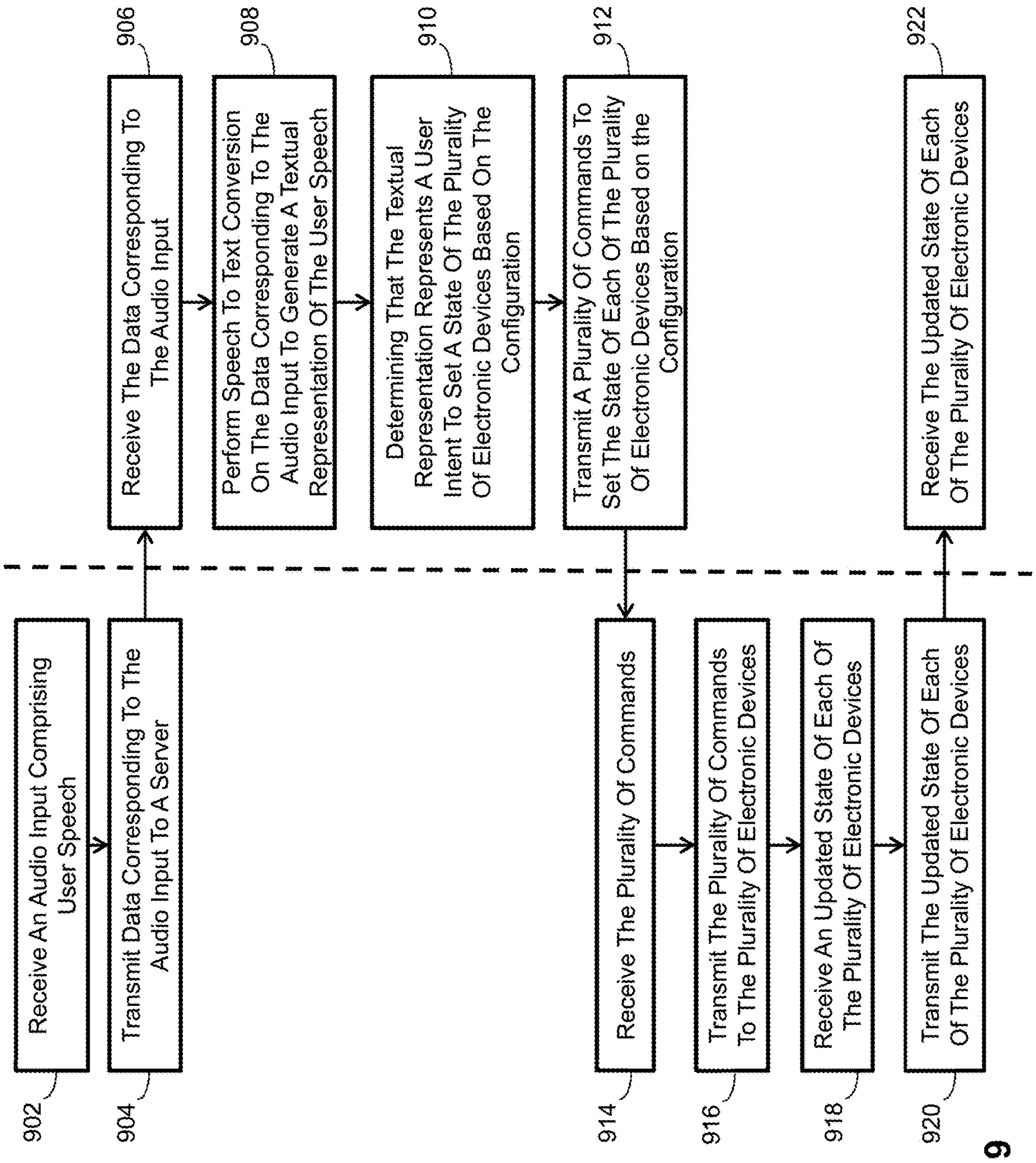
FIG. 9 illustrates an exemplary process for setting the states of electronic devices using a previously stored configuration according to various examples.

FIG. 9 illustrates an exemplary process 900 for setting the states of multiple electronic devices using a previously stored configuration (e.g., created using process 800) using a virtual assistant. In some examples, process 900 can be performed using a system similar or identical to system 100, shown in FIG. 1. In these examples, the blocks of process 900 can be performed by both user device 102 and server system 110. Specifically, the blocks on the left side of FIG. 9 can be performed by user device 102, while the blocks on the right can be performed by server system 110.

At block 902, an audio input including user speech can be received at a user device in a manner similar or identical to block 502 of process 500. At block 904, data corresponding to the audio input received at block 902 can be transmitted to one or more servers for processing in a manner similar or identical to block 504 of process 500.

At block 906, data corresponding to the audio input transmitted by the user device at block 904 can be received by one or more servers in a manner similar or identical to block 506 of process 500. At block 908, speech to text conversion can be performed on the user speech of the audio input to convert the user speech into a textual representation of the user speech in a manner similar or identical to block 508 of process 500.

At block 910, it can be determined that the textual representation of the user speech represents a user intent to set the states of the electronic devices of system 100 based on a stored configuration. For example, one or more processing modules 118 of server system 110 can utilize data and model storage 120 to determine the user's intent based on natural language input. In some examples, this can include parsing the textual representation for words likely to be related to using a stored configuration, such as the unique identifiers associated with the stored configurations, "set," "configuration," "scene," their synonyms, or the like. For example, if the textual representation includes "I'm going to sleep," it can be determined at block 910 that the user intends to set the state of the electronic devices based on the "sleep" configuration. Other textual representations, such as "night mode," "set to sleep," or the like, can similarly result in a determination at block 910 that the user intends set the state of the electronic devices based on the "sleep" configuration.

At block 912, commands to set the states of the electronic devices of system 100 based on the configuration identified at block 910 can be transmitted by the one or more servers to the user device. Identifications associated with the commands can also be transmitted to identify which devices are to perform each command. For example, server system 110 can transmit the unique identifiers associated with the electronic devices and the commands that are to be performed by those electronic devices to cause the electronic devices to be in the states specified by the stored configuration.

At block 914, commands to set the states of the electronic devices of system 100 transmitted by the server(s) can be received by the user device. For example, user device 102 can receive the commands transmitted by server system 110 at block 912 via network(s) 108.

At block 916, the user device can transmit the commands received at block 914 to the electronic devices associated with the commands. For example, user device 102 can transmit commands to electronic devices 128, 130, and 132 via network(s) 126 to cause the electronic devices to be in the states specified by the stored configuration.

In some examples, the actual state of an electronic device may not be the same as the state of the electronic device as stored in user device 102 (e.g., in memory 350) and/or server system 110 (e.g., in data and models storage 120). Thus, in some examples and similar to process 500, block 916 can be performed regardless of the state of the electronic device as stored in user device 102 and/or server system 110, and without first querying the electronic devices (e.g., between blocks 914 and 916) to determine their actual states in order to reduce the amount of time required to issue a command to the electronic devices.

At block 918, the user device can receive an updated state of the electronic devices after the electronic devices perform the commands transmitted by the user device at block 916. For example, user device 102 can receive updated statuses of electronic devices 128, 130, and 132 after they performed the commands to set their states to the states specified by the stored configuration. In some examples, block 920 can further include updating the state of the electronic device in electronic device data 370 based on the received current state. For example, user device 102 can update the state of electronic device 128 in electronic device data 370 to "locked." In some examples, similar to block 520, block 918 can further include outputting an audio or visual indication of a result of the command(s) transmitted to the electronic device(s) at block 916 based on the transmitted command(s) and the received current state(s) of the electronic device(s). The updated state can further include an error state, such as an undetermined or unavailable state of the device.

At block 920, the user device can transmit the updated states of the electronic device received at block 918 to the one or more servers. For example, user device 102 can transmit the updated states of the electronic devices received at block 918 to server system 110.

At block 922, the one or more servers can receive the updated states of the electronic devices transmitted by the user device at block 920. For example, server system 110 can receive the updated states of the electronic devices transmitted by user device 102 at block 920. In some examples, block 922 can further include updating the states of the electronic devices in data and models storage 120 based on the received updated states.

In some examples, additionally or alternatively, the states of the electronic devices can be configured using a stored configuration in response to determining that a predetermined condition has been satisfied. For example, in response to the location of user device 102 entering a predetermined area (e.g., an area corresponding to the user's home), commands can be sent to the electronic devices to transition to states specified by a stored configuration (e.g., a "home" configuration). Similarly, commands can be sent to the electronic devices to transition to states specified by another stored configuration (e.g., a "work" configuration) in response to the location of user device 102 exiting a predetermined area (e.g., an area corresponding to the user's home) during a predetermined window of time (e.g., between 8-9 a.m. on a weekday). Other similar predetermined conditions can be created to cause system 100 to configure the electronic devices based on stored configurations.

Electronic Device

Figure 10:
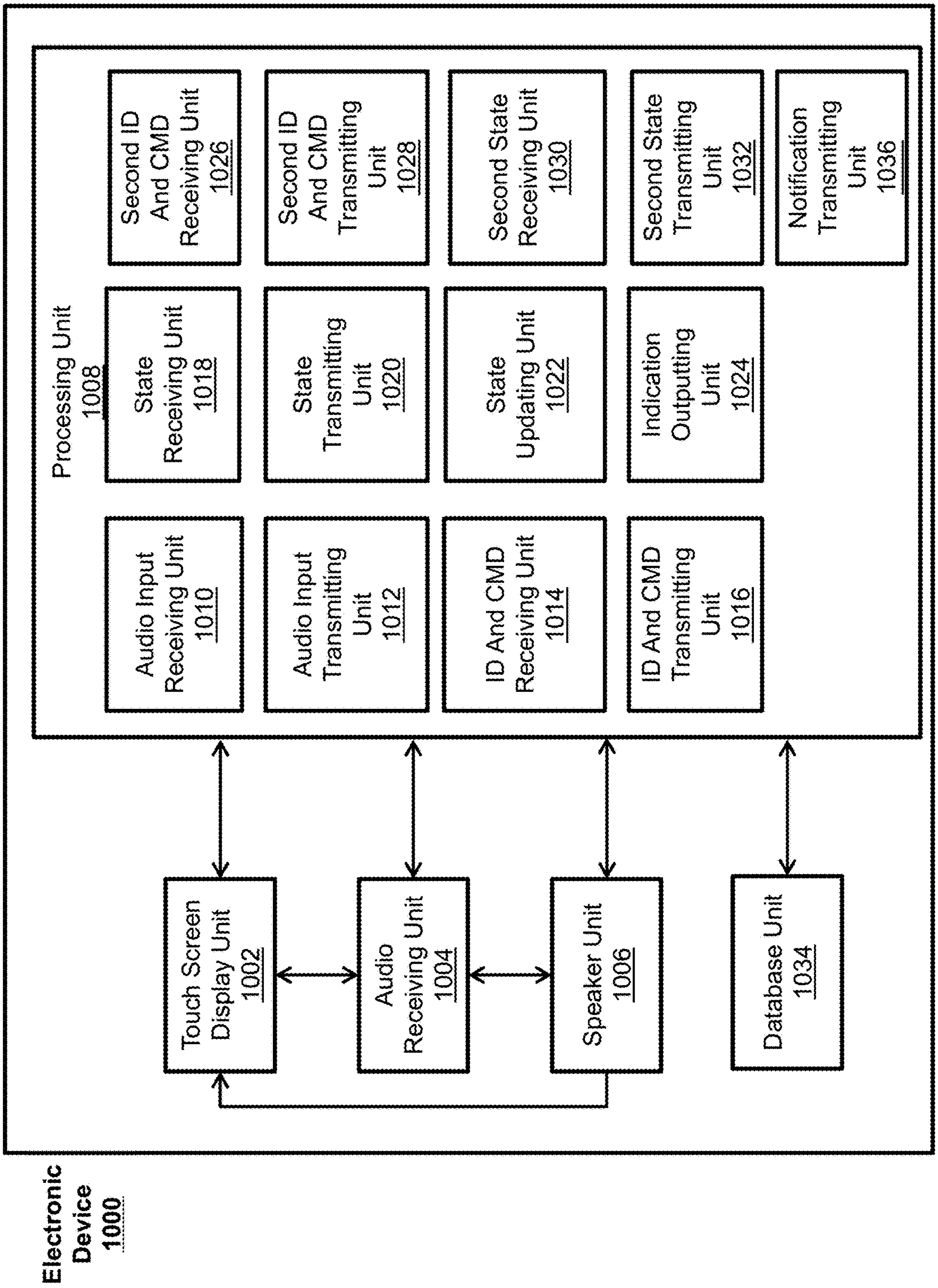
FIG. 10 illustrates a functional block diagram of an electronic device configured to control electronic devices according to various examples.

In accordance with some examples, FIG. 10 shows a functional block diagram of an electronic device 1000 configured in accordance with the principles of the various described examples. The functional blocks of the device can be implemented by hardware, software, or a combination of hardware and software to carry out the principles of the various described examples. It is understood by persons of skill in the art that the functional blocks described in FIG. 10 can be combined or separated into sub-blocks to implement the principles of the various described examples. Therefore, the description herein optionally supports any possible combination or separation or further definition of the functional blocks described herein.

As shown in FIG. 10, electronic device 1000 can include a touch screen display unit 1002 configured to display a user interface and to receive touch input, and a sound receiving unit 1004 configured to receive sound input. In some examples, electronic device 1000 can include a speaker unit 1006 configured to generate sound. Electronic device 1000 can further include a processing unit 1008 coupled to touch screen display unit 1002 and sound receiving unit 1004 (and, optionally, coupled to speaker unit 1006). In some examples, processing unit 1008 can include an audio input receiving unit 1010, an audio input transmitting unit 1012, an identification and command receiving unit 1014, an identification and command transmitting unit 1016, a state receiving unit 1018, a state transmitting unit 1020, a state updating unit 1022, an indication outputting unit 1024, a second identification and command receiving unit 1026, a second identification and command transmitting unit 1028, and a second state receiving unit 1030, a second state transmitting unit 1032, and a notification transmitting unit 1036.

Processing unit 1008 can be configured to receive an audio input (e.g., using audio input receiving unit 1010) containing user speech. Processing unit 1008 can be further configured to transmit (e.g., using audio input transmitting unit 1012) data corresponding to the audio input to one or more servers. Processing unit 1008 can be further configured to receive (e.g., using identification and command receiving unit 1014), from the one or more servers, an identification of a first electronic device determined by the one or more servers based on the data corresponding to the audio input and a first command to be performed by the first electronic device determined by the one or more servers based on the data corresponding to the audio input. The first command can be transmitted to the first electronic device (e.g., using identification and command transmitting unit 1016). A current state of the first electronic device can be received (e.g., using state receiving unit 1018) from the first electronic device after transmitting the first command to the first electronic device. The current state of the first electronic device can be transmitted (e.g., using state transmitting unit 1020) to the one or more servers.

In some examples, first electronic device includes a light bulb. In other examples, the first command includes a command to set an ON/OFF state, dimmable state, or color state of the light. In yet other examples, the current state of the first electronic device includes the ON/OFF state, dimmable state, or color state of the light bulb after transmitting the first command to set the ON/OFF state, dimmable state, or color state of the light bulb.

In some examples, first electronic device includes a switch. In other examples, the first command includes a command to set an ON/OFF state of the switch. In yet other examples, the current state of the first electronic device includes the ON/OFF state of the switch after transmitting the first command to set the ON/OFF state of the switch.

In some examples, the first electronic device includes an electrical outlet. In other examples, the first command includes a command to set an ACTIVE/INACTIVE state of the electrical outlet. In yet other examples, the current state of the first electronic device includes the ACTIVE/INACTIVE state of the electrical outlet after transmitting the command to set the ACTIVE/INACTIVE state of the electrical outlet.

In some examples, the first electronic device includes a door lock. In other examples, the first command includes a command to set a LOCKED/UNLOCKED state of the door lock. In yet other examples, the current state of the first electronic device includes the LOCKED/UNLOCKED state of the door lock after transmitting the command to set the LOCKED/UNLOCKED state of the door lock.

In some examples, the first electronic device includes a garage door. In other examples, the first command includes a command to set an OPEN/CLOSED state of the garage door. In yet other examples, the current state of the first electronic device includes the OPEN/CLOSED state of the garage door after transmitting the command to set the OPEN/CLOSED state of the garage door.

In some examples, the first electronic device includes a thermostat. In other examples, the first command includes a command to set a numerical value of a temperature setting of the thermostat. In yet other examples, the current state of the first electronic device includes the numerical value of the temperature setting of the thermostat after transmitting the first command to set the numerical value of the temperature setting of the thermostat.

In some examples, the first command includes a query for the current state of the first electronic device.

In some examples, the first command can be transmitted (e.g., using identification and command transmitting unit 1016) to first electronic device over a local wireless network.

In some examples, the first command can be transmitted to the first electronic device directly through Bluetooth, line of sight, peer-to-peer, or WiFi communication.

In some examples, processing unit 1008 can be configured to exclude querying the first electronic device for the state of the first electronic device between receiving the first command from the one or more servers and transmitting the first command to the first electronic device.

In some examples, electronic device 1000 can further include a database unit 1034 for storing a state of each of a plurality of electronic devices, the plurality of electronic devices including the first electronic device. In other examples, processing unit 1008 can be further configured to update (e.g., using state updating unit 1022) a state of the first electronic device stored in database unit 1034 based at least in part on the current state of the first electronic device received from the first electronic device.

In some examples, processing unit 1008 can be further configured to output (e.g., using indication outputting unit 1024) an indication of a result of the first command based on the first command and the current state of the first electronic device received from the first electronic device.

In some examples, electronic device 1000 can include a mobile phone, desktop computer, laptop computer, tablet computer, portable media player, television, television set-top box, or wearable electronic device.

In some examples, processing unit 1008 can be further configured to receive (e.g., using second identification and command receiving unit 1026), from the one or more servers, an identification of a second electronic device determined by the one or more servers based on the data corresponding to the audio input and a second command to be performed by the second electronic device determined by the one or more servers based on the data corresponding to the audio input. Processing unit 1008 can be further configured to transmit (e.g., using second identification and command transmitting unit 1028) the second command to the second electronic device and to receive (e.g., using second state receiving unit 1030), after transmitting the second command to the second electronic device, a current state of the second electronic device from the second electronic device. Processing unit 1008 can be further configured to transmit (e.g., using second state transmitting unit 1032) the current state of the second electronic device to the one or more servers.

In some examples, processing unit 1008 can be further configured to transmit (e.g., using notification transmitting unit 1036) a notification associated with the current state of the first electronic device in response to determining that a predetermined condition has been satisfied.

Figure 11:
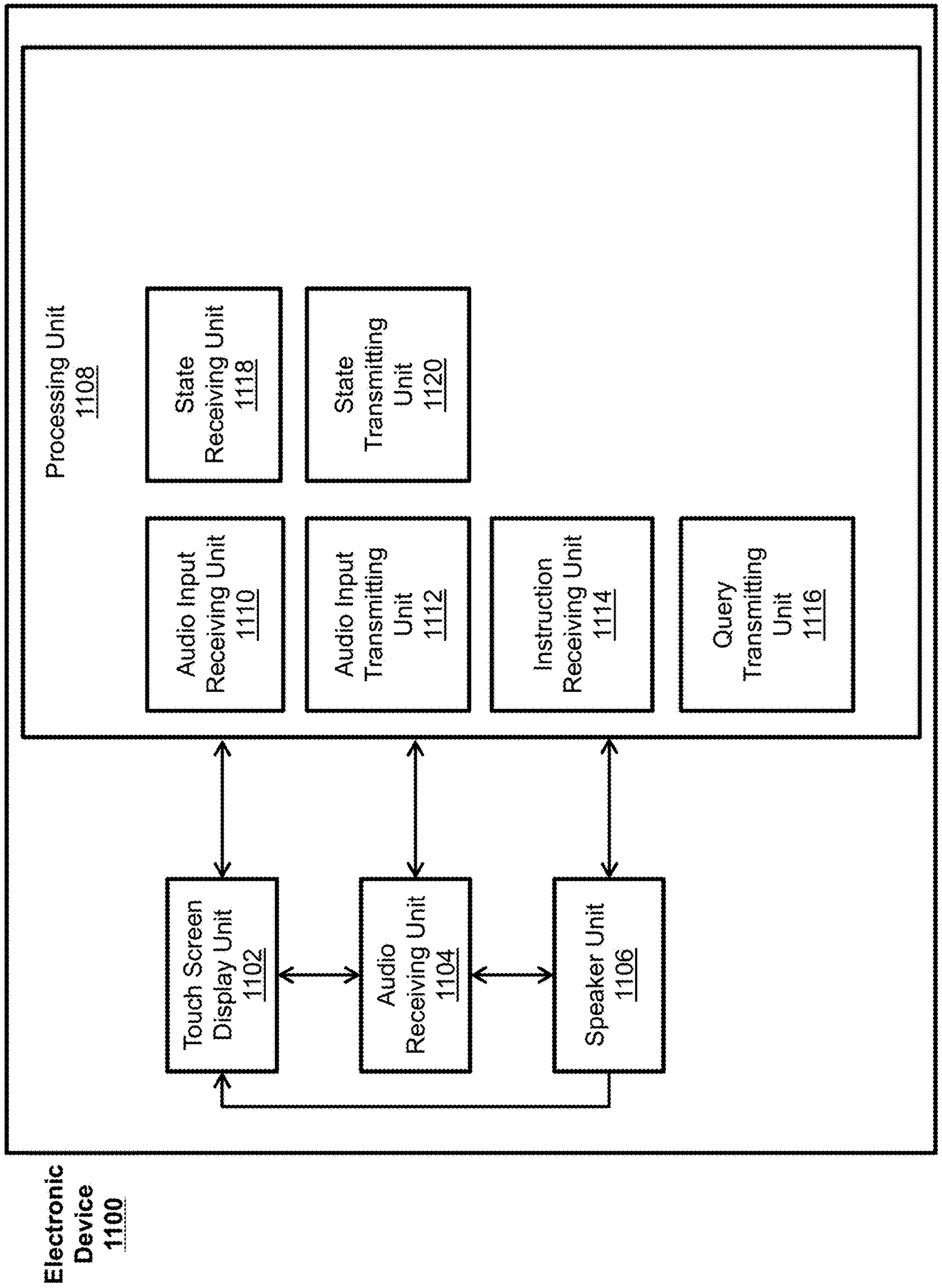
FIG. 11 illustrates a functional block diagram of an electronic device configured to store the states of electronic devices as a configuration according to various examples.

In accordance with some examples, FIG. 11 shows a functional block diagram of an electronic device 1100 configured in accordance with the principles of the various described examples. The functional blocks of the device can be implemented by hardware, software, or a combination of hardware and software to carry out the principles of the various described examples. It is understood by persons of skill in the art that the functional blocks described in FIG. 11 can be combined or separated into sub-blocks to implement the principles of the various described examples. Therefore, the description herein optionally supports any possible combination or separation or further definition of the functional blocks described herein.

As shown in FIG. 11, electronic device 1100 can include a touch screen display unit 1102 configured to display a user interface and to receive touch input, and a sound receiving unit 1104 configured to receive sound input. In some examples, electronic device 1100 can include a speaker unit 1106 configured to generate sound. Electronic device 1100 can further include a processing unit 1108 coupled to touch screen display unit 1102 and sound receiving unit 1104 (and, optionally, coupled to speaker unit 1106). In some examples, processing unit 1108 can include an audio input receiving unit 1110, an audio input transmitting unit 1112, an instruction receiving unit 1114, a query transmitting unit 1116, a state receiving unit 1118, and a state transmitting unit 1120.

Processing unit 1108 can be configured to receive an audio input (e.g., using audio input receiving unit 1110) containing user speech. Processing unit 1108 can be further configured to transmit (e.g., using audio input transmitting unit 1112) data corresponding to the audio input to one or more servers. Processing unit 1108 can be further configured to receive (e.g., using instruction receiving unit 1114), from the one or more servers, an instruction to query a state of each of a plurality of electronic devices determined by the one or more servers based on the data corresponding to the audio input. A state query can be transmitted (e.g., using query transmitting unit 1116) to each of the plurality of electronic devices, and a current state of each of the plurality of electronic devices can be received (e.g., using state receiving unit 1118) from the plurality of electronic devices. The current state of each of the plurality of electronic devices can be transmitted (e.g., using state transmitting unit 1120) to the one or more servers to be stored as a configuration.

Figure 12:
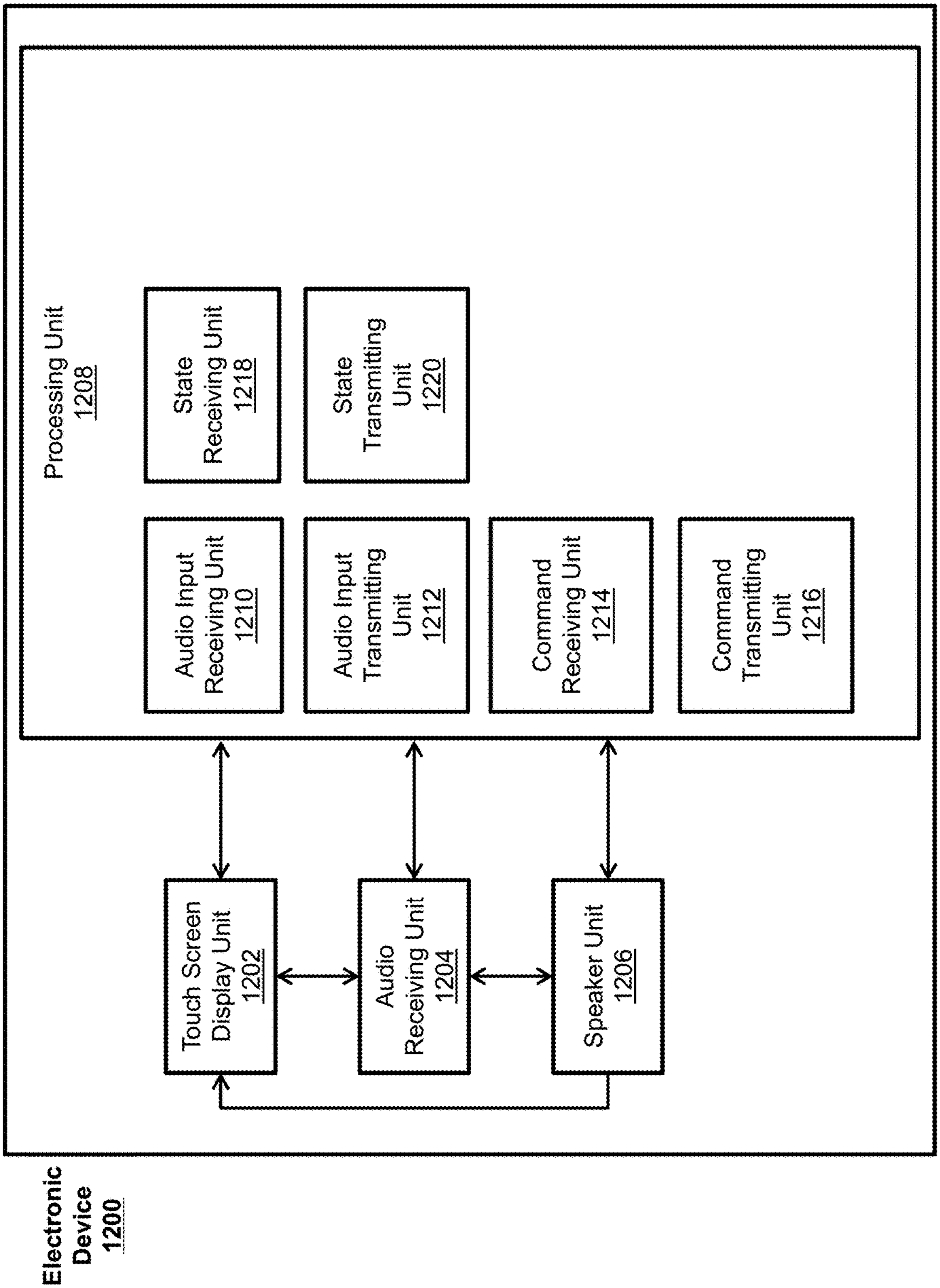
FIG. 12 illustrates a functional block diagram of an electronic device configured to set the states of electronic devices based on a stored configuration according to various examples.

In accordance with some examples, FIG. 12 shows a functional block diagram of an electronic device 1200 configured in accordance with the principles of the various described examples. The functional blocks of the device can be implemented by hardware, software, or a combination of hardware and software to carry out the principles of the various described examples. It is understood by persons of skill in the art that the functional blocks described in FIG. 12 can be combined or separated into sub-blocks to implement the principles of the various described examples. Therefore, the description herein optionally supports any possible combination or separation or further definition of the functional blocks described herein.

As shown in FIG. 12, electronic device 1200 can include a touch screen display unit 1202 configured to display a user interface and to receive touch input, and a sound receiving unit 1204 configured to receive sound input. In some examples, electronic device 1200 can include a speaker unit 1206 configured to generate sound. Electronic device 1200 can further include a processing unit 1208 coupled to touch screen display unit 1202 and sound receiving unit 1204 (and, optionally, coupled to speaker unit 1206). In some examples, processing unit 1208 can include an audio input receiving unit 1210, an audio input transmitting unit 1212, an instruction receiving unit 1214, a query transmitting unit 1216, a state receiving unit 1218, and a state transmitting unit 1220.

In some examples, processing unit 1208 can be further configured to receive (e.g., using audio input receiving unit 1210) an audio input including a user speech, transmit (e.g., using audio input transmitting unit 1212) data corresponding to the audio input to the one or more servers, and receive (e.g., using command receiving unit 1214), from the one or more servers, a plurality of commands to set the state of each of the plurality of electronic devices determined by the one or more servers based on a stored configuration. Processing unit 1208 can be further configured to transmit (e.g., using command transmitting unit 1216) the plurality of commands to the plurality of electronic devices. Processing unit 1208 can be further configured to receive (e.g., using state receiving unit 1218) an updated state of each of the plurality of electronic devices from the plurality of electronic devices and to transmit (e.g., using state transmitting unit 1220) the updated state of each of the plurality of electronic devices to the one or more servers.

Figure 13:
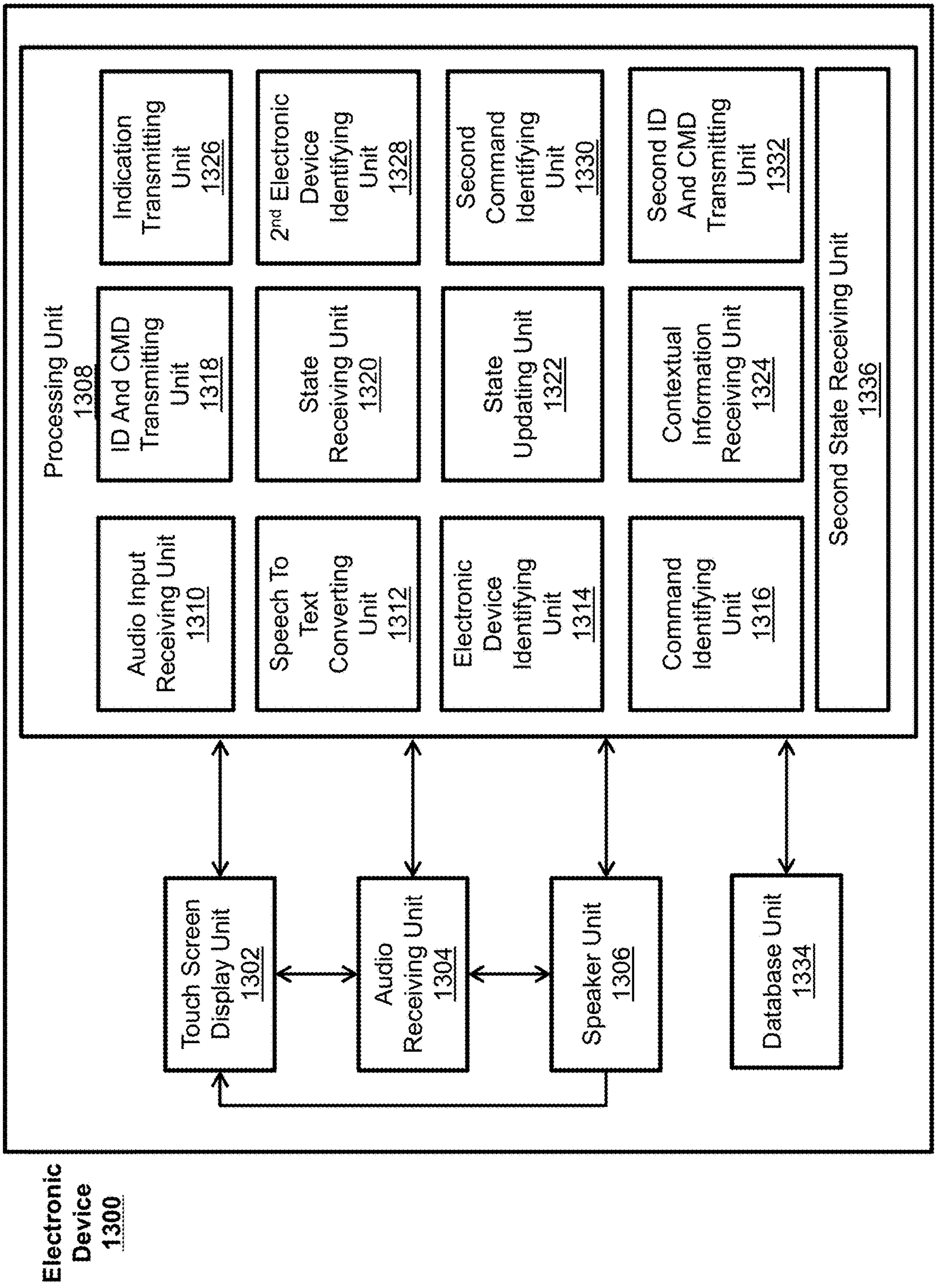
FIG. 13 illustrates a functional block diagram of an electronic device configured to control electronic devices according to various examples.

As shown in FIG. 13, electronic device 1300 can include a touch screen display unit 1302 configured to display a user interface and to receive touch input, and a sound receiving unit 1304 configured to receive sound input. In some examples, electronic device 1300 can include a speaker unit 1306 configured to generate sound. Electronic device 1300 can further include a processing unit 1308 coupled to touch screen display unit 1302 and sound receiving unit 1304 (and, optionally, coupled to speaker unit 1306). In some examples, processing unit 1308 can include an audio input receiving unit 1310, speech-to-text converting unit 1312, an electronic device identifying unit 1314, a command identifying unit 1316, an identification and command transmitting unit 1318, a state receiving unit 1320, a state updating unit 1322, a contextual information receiving unit 1324, an indication transmitting unit 1326, a second electronic device identifying unit 1328, a second command identifying unit 1330, a second identification and command transmitting unit 1332, and a second state receiving unit 1336.

Processing unit 1308 can be configured to receive data corresponding to an audio input (e.g., using audio input receiving unit 1310) containing user speech. Processing unit 1308 can be further configured perform (e.g., using speech to text converting unit 1312) speech-to-text conversion on the data corresponding to the audio input to generate a textual representation of the user speech. Processing unit 1308 can be further configured to identify (e.g., using electronic device identifying unit 1314) a first electronic device based on the textual representation of the user speech. Processing unit 1308 can be further configured to identify (e.g., using command identifying unit 1316) a first command to be performed by the first electronic device based on the textual representation of user speech. Processing unit 1308 can be further configured to transmit (e.g., using identification and command transmitting unit 1318) an identification of the first electronic device and the first command to the user device. Processing unit 1308 can be further configured to receive (e.g., using state receiving unit 1320) a current state of the first electronic device.

In some examples, first electronic device includes a light bulb. In other examples, the first command includes a command to set an ON/OFF state, dimmable state, or color state of the light. In yet other examples, the current state of the first electronic device includes the ON/OFF state, dimmable state, or color state of the light bulb after transmitting the first command to set the ON/OFF state, dimmable state, or color state of the light bulb.

In some examples, the first electronic device includes an electrical outlet. In other examples, the first command includes a command to set an ACTIVE/INACTIVE state of the electrical outlet. In yet other examples, the current state of the first electronic device includes the ACTIVE/INACTIVE state of the electrical outlet after transmitting the command to set the ACTIVE/INACTIVE state of the electrical outlet.

In some examples, the first electronic device includes a switch. In other examples, the first command includes a command to set an ON/OFF state of the switch. In yet other examples, the current state of the first electronic device includes the ON/OFF state of the electrical outlet after transmitting the command to set the ON/OFF state of the switch.

In some examples, the first electronic device includes a door lock. In other examples, the first command includes a command to set a LOCKED/UNLOCKED state of the door lock. In yet other examples, the current state of the first electronic device includes the LOCKED/UNLOCKED state of the door lock after transmitting the command to set the LOCKED/UNLOCKED state of the door lock.

In some examples, the first electronic device includes a garage door. In other examples, the first command includes a command to set an OPEN/CLOSED state of the garage door. In yet other examples, the current state of the first electronic device includes the OPEN/CLOSED state of the garage door after transmitting the command to set the OPEN/CLOSED state of the garage door.

In some examples, the first electronic device includes a thermostat. In other examples, the first command includes a command to set a numerical value of a temperature setting of the thermostat. In yet other examples, the current state of the first electronic device includes the numerical value of the temperature setting of the thermostat after transmitting the first command to set the numerical value of the temperature setting of the thermostat.

In some examples, the first command includes a query for the current state of the first electronic device.

In some examples, electronic device 1300 further includes a database unit 1334 for storing a name, a type, and a state of each of a plurality of electronic devices, the plurality of electronic devices comprising the first electronic device. In other examples, processing unit 1308 can be further configured to update (e.g., using state updating unit 1322) the state of the first electronic device stored in database unit 1334 based on the current state of the first electronic device.

In some examples, processing unit 1308 can be further configured to receive (e.g., using contextual information receiving unit 1324) contextual information within the data corresponding to the audio input from the user device. In other examples, processing unit 1308 can be further configured to identify (e.g., using electronic device identifying unit 1314) the first electronic device based on the contextual information. In yet other examples, processing unit 1308 can be further configured to identify (e.g., using command identifying unit 1316) the first command based on the contextual information. In some examples, the contextual information includes an orientation of the user device when the user device received the audio input or a location of the user device when the user device received the audio input.

In some examples, the textual representation of the user speech excludes the name of the first electronic device. In other examples, the textual representation of the user speech excludes the type of the first electronic device.

In some examples, electronic device 1300 includes a mobile phone, desktop computer, laptop computer, tablet computer, portable media player, television, television set-top box, or wearable electronic device.

In some examples, processing unit 1308 can be further configured to transmit (e.g., using identification and command transmitting unit 1318) the identification of the first electronic device and the first command to the user device, and to receive (e.g., using state receiving unit 1320) the current state of the first electronic device from the user device.

In other examples, processing unit 1308 can be further configured to transmit (e.g., using identification and command transmitting unit 1318) the identification of the first electronic device and the first command to a second user device, and to receive (e.g., using state receiving unit 1320) the current state of the first electronic device from the second user device.

In other examples, processing unit 1308 can be further configured to transmit (e.g., using indication transmitting unit 1326) an indication to the second user device of a result of the first command based on the first command and the current state of the first electronic device.

In other examples, processing unit 1308 can be further configured to identify (e.g., using second electronic device identifying unit 1328) a second electronic device based on the textual representation of the user speech, identify (e.g., using second command identifying unit 1330) a second command to be performed by the second electronic device based on the textual representation of the user speech, transmit (e.g., using second identification and command transmitting unit 1332) an identification of the second electronic device and the second command, and receive (e.g., using second state receiving unit 1336) a current state of the second electronic device.

Figure 14:
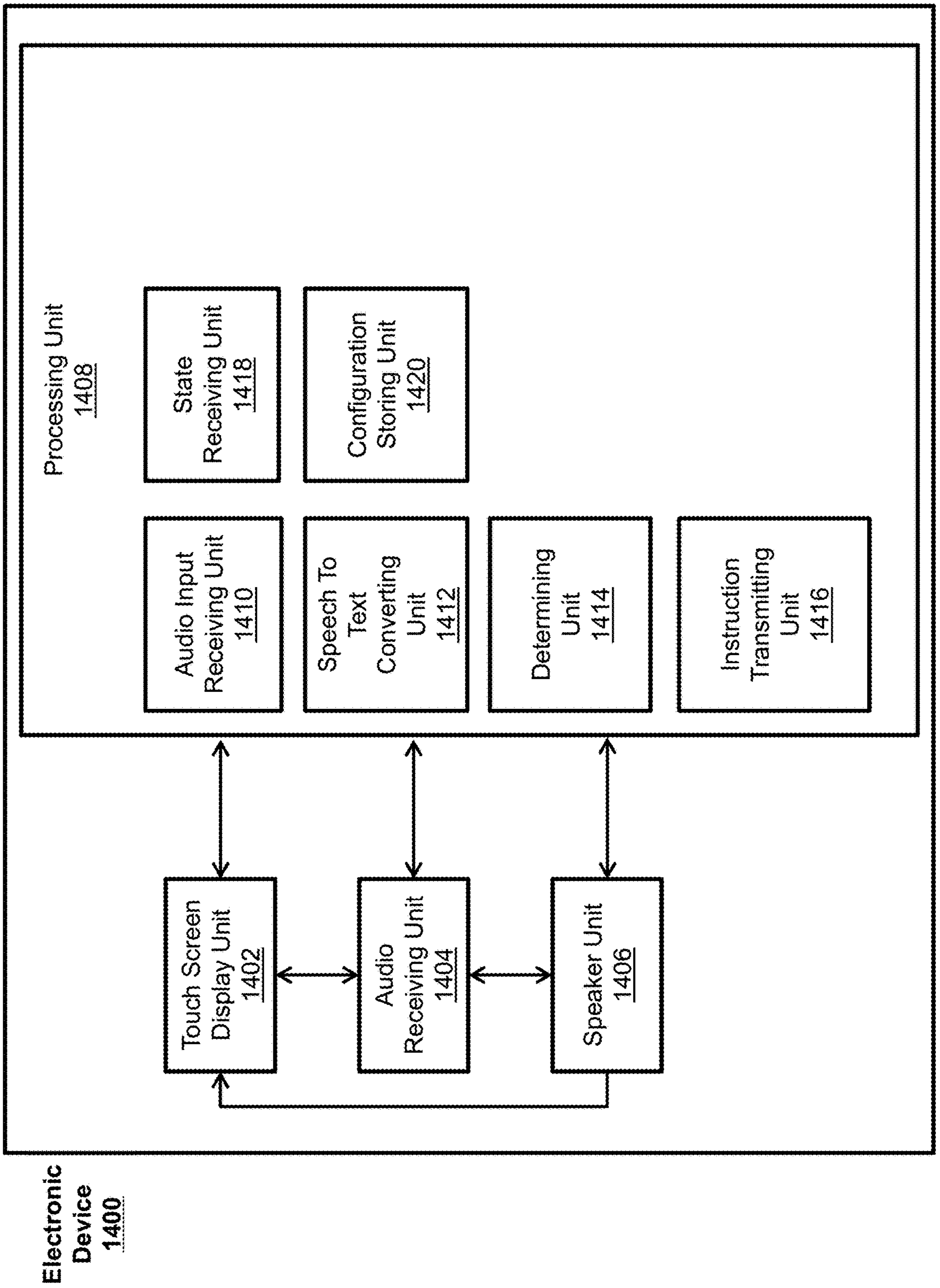
FIG. 14 illustrates a functional block diagram of an electronic device configured to store the states of electronic devices as a configuration according to various examples.

As shown in FIG. 14, electronic device 1400 can include a touch screen display unit 1402 configured to display a user interface and to receive touch input, and a sound receiving unit 1404 configured to receive sound input. In some examples, electronic device 1400 can include a speaker unit 1406 configured to generate sound. Electronic device 1400 can further include a processing unit 1408 coupled to touch screen display unit 1402 and sound receiving unit 1404 (and, optionally, coupled to speaker unit 1406). In some examples, processing unit 1408 can include an audio input receiving unit 1410, speech-to-text converting unit 1412, a determining unit 1414, an instruction transmitting unit 1416, a state receiving unit 1416, a configuration storing unit 1420, a second audio input receiving unit 1422, a second speech to text converting unit 1424, a second determining unit 1426, a command transmitting unit 1428, and a second state receiving unit 1430.

Processing unit 1408 can be configured to receive (e.g., using audio input receiving unit 1410) data corresponding to an audio input comprising a user speech from a user device. Processing unit 1408 can be further configured perform (e.g., using speech to text converting unit 1412) speech-to-text conversion on the data corresponding to the audio input to generate a textual representation of the user speech. Processing unit 1408 can be further configured to determine (e.g., using determining unit 1414) that the textual representation of the user speech represents a user intent to store a state of each of a plurality of electronic devices as a configuration. Processing unit 1408 can be further configured to transmit (e.g., using instruction transmitting unit 1416) an instruction to query the state of each of the plurality of electronic devices. Processing unit 1408 can be further configured to receive (e.g., using state receiving unit 1418) a current state of each of the plurality of electronic devices. Processing unit 1408 can be further configured to store (e.g., using configuration storing unit 1420) the received current state of each of the plurality of electronic devices as the configuration.

Figure 15:
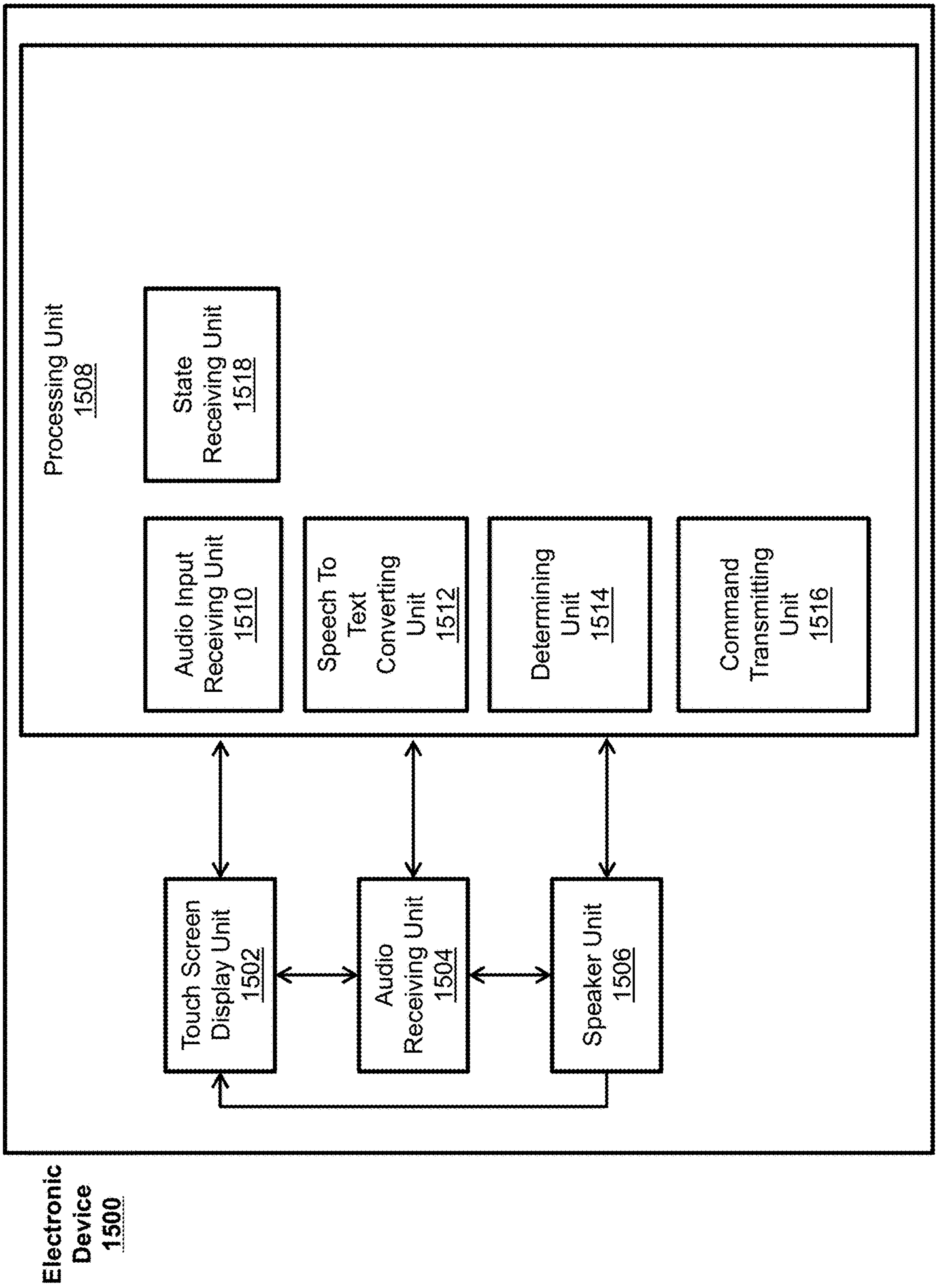
FIG. 15 illustrates a functional block diagram of an electronic device configured to set the states of electronic devices based on a stored configuration according to various examples.

As shown in FIG. 15, electronic device 1500 can include a touch screen display unit 1502 configured to display a user interface and to receive touch input, and a sound receiving unit 1504 configured to receive sound input. In some examples, electronic device 1500 can include a speaker unit 1506 configured to generate sound. Electronic device 1500 can further include a processing unit 1508 coupled to touch screen display unit 1502 and sound receiving unit 1504 (and, optionally, coupled to speaker unit 1506). In some examples, processing unit 1408 can include an audio input receiving unit 1510, speech-to-text converting unit 1512, a determining unit 1514, an instruction transmitting unit 1516, a state receiving unit 1516, a configuration storing unit 1520, a second audio input receiving unit 1522, a second speech to text converting unit 1524, a second determining unit 1526, a command transmitting unit 1528, and a second state receiving unit 1530.

In some examples, processing unit 1508 can be further configured to receive (e.g., using audio input receiving unit 1510) data corresponding to an audio input comprising a user speech, perform (e.g., using speech to text converting unit 1512) speech-to-text conversion on the data corresponding to the audio input to generate a textual representation of the user speech, determine (e.g., using determining unit 1514) that the textual representation of the user speech represents a user intent to change the state of each of the plurality of electronic devices based on the configuration, transmit (e.g., using command transmitting unit 1516) a plurality of commands to set the state of each of the plurality of electronic devices based on the configuration, and receive (e.g., using state receiving unit 1518) an updated state of each of the plurality of electronic devices.

As described above, one aspect of the present technology is the gathering and use of data available from various sources to improve the delivery to users of invitational content or any other content that may be of interest to them. The present disclosure contemplates that in some instances, this gathered data can include personal information data that uniquely identifies or can be used to contact or locate a specific person. Such personal information data can include demographic data, location-based data, telephone numbers, email addresses, home addresses, or any other identifying information.

The present disclosure recognizes that the use of such personal information data, in the present technology, can be used to the benefit of users. For example, the personal information data can be used to deliver targeted content that is of greater interest to the user. Accordingly, use of such personal information data enables calculated control of the delivered content. Further, other uses for personal information data that benefit the user are also contemplated by the present disclosure.

The present disclosure further contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. For example, personal information from users should be collected for legitimate and reasonable uses of the entity and not shared or sold outside of those legitimate uses. Further, such collection should occur only after receiving the informed consent of the users. Additionally, such entities would take any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices.

Despite the foregoing, the present disclosure also contemplates examples in which users selectively block the use of, or access to, personal information data. That is, the present disclosure contemplates that hardware and/or software elements can be provided to prevent or block access to such personal information data. For example, in the case of advertisement delivery services, the present technology can be configured to allow users to select to "opt in" or "opt out" of participation in the collection of personal information data during registration for services. In another example, users can select not to provide location information for targeted content delivery services. In yet another example, users can select to not provide precise location information, but permit the transfer of location zone information.

Therefore, although the present disclosure broadly covers use of personal information data to implement one or more various disclosed examples, the present disclosure also contemplates that the various examples can also be implemented without the need for accessing such personal information data. That is, the various examples of the present technology are not rendered inoperable due to the lack of all or a portion of such personal information data. For example, content can be selected and delivered to users by inferring preferences based on non-personal information data or a bare minimum amount of personal information, such as the content being requested by the device associated with a user, other non-personal information available to the content delivery services, or publicly available information.

Although examples have been fully described with reference to the accompanying drawings, it is to be noted that various changes and modifications will become apparent to those skilled in the art. Such changes and modifications are to be understood as being included within the scope of the various examples as defined by the appended claims.

What is claimed is:

1. A non-transitory computer-readable storage medium storing one or more programs configured to be executed by one or more processors of a user device, the one or more programs including instructions for:

receiving, by the user device, an audio input comprising a user speech;

transmitting data corresponding to the audio input to one or more servers;

receiving, from the one or more servers, an instruction to query a state of each of a plurality of electronic device determined by the one or more servers based on the data corresponding to the audio input;

transmitting a state query to each of the plurality of electronic devices;

receiving from a first electronic device of the plurality of electronic devices, a current state of the first electronic device; and transmitting the current state of the first electronic device to the one or more servers to be stored as at least a portion of a configuration, wherein the configuration defines a plurality of states of a plurality of corresponding electronic devices to use in response to a command that references the configuration.

2. The non-transitory computer-readable storage medium of claim 1, wherein the first electronic device of the plurality of electronic devices comprises a light bulb.

3. The non-transitory computer-readable storage medium of claim 2, wherein the current state of the first electronic device comprises the ON/OFF state, dimmable state, or color state of the light bulb.

4. The non-transitory computer-readable storage medium of claim 1, wherein a second electronic device of the plurality of electronic devices comprises an electrical outlet.

5. The non-transitory computer-readable storage medium of claim 4, wherein a current state of the second electronic device comprises the ACTIVE/INACTIVE state of the electrical outlet.

6. The non-transitory computer-readable storage medium of claim 1, wherein a third electronic device of the plurality of electronic devices comprises a switch.

7. The non-transitory computer-readable storage medium of claim 6, wherein a current state of the third electronic device comprises the ON/OFF state of the switch.

8. The non-transitory computer-readable storage medium of claim 1, wherein a fourth electronic device of the plurality of electronic devices comprises a door lock.

9. The non-transitory computer-readable storage medium of claim 8, wherein a current state of the fourth electronic device comprises the LOCKED/UNLOCKED state of the door lock.

10. The non-transitory computer-readable storage medium of claim 1, wherein a fifth electronic device of the plurality of electronic devices comprises a thermostat.

11. The non-transitory computer-readable storage medium of claim 10, wherein the current state of the first electronic device comprises a numerical value of a temperature setting of the thermostat.

12. The non-transitory computer-readable storage medium of claim 1, the one or more programs further including instructions for:

outputting a notification associated with the current state of the plurality of electronic devices in response to determining that a predetermined condition has been satisfied.

13. A method for controlling electronic devices using a virtual assistant on a user device having a memory and at least one processor, the method comprising:

at the user device:

receiving, by the user device, an audio input comprising a user speech;

transmitting data corresponding to the audio input to one or more servers;

receiving, from the one or more servers, an instruction to query a state of each of a plurality of electronic device determined by the one or more servers based on the data corresponding to the audio input;

transmitting a state query to each of the plurality of electronic devices;

receiving from a first electronic device of the plurality of electronic devices, a current state of the first electronic device; and transmitting the current state of the first electronic device to the one or more servers to be stored as at least a portion of a configuration, wherein the configuration defines a plurality of states of a plurality of corresponding electronic devices to use in response to a command that references the configuration.

14. The method of claim 13, wherein the first electronic device of the plurality of electronic devices comprises a light bulb.

15. The method of claim 14, wherein the current state of the first electronic device comprises the ON/OFF state, dimmable state, or color state of the light bulb.

16. The method of claim 13, wherein a second electronic device of the plurality of electronic devices comprises an electrical outlet.

17. The method of claim 16, wherein a current state of the second electronic device comprises the ACTIVE/INACTIVE state of the electrical outlet.

18. The method of claim 13, wherein a third electronic device of the plurality of electronic devices comprises a switch.

19. The method of claim 18, wherein a current state of the third electronic device comprises the ON/OFF state of the switch.

20. The method of claim 13, wherein a fourth electronic device of the plurality of electronic devices comprises a door lock.

21. The method of claim 20, wherein a current state of the fourth electronic device comprises the LOCKED/UNLOCKED state of the door lock.

22. The method of claim 13, wherein a fifth electronic device of the plurality of electronic devices comprises a thermostat.

23. The method of claim 22, wherein the current state of the first electronic device comprises a numerical value of a temperature setting of the thermostat.

24. The method of claim 13, the further comprising:

outputting a notification associated with the current state of the plurality of electronic devices in response to determining that a predetermined condition has been satisfied.

25. A user device comprising:

one or more processors;

a memory; and one or more programs, wherein the one or more programs are stored in the memory and configured to be executed by the one or more processors, the one or more programs including instructions for:

receiving, by the user device, an audio input comprising a user speech;

transmitting data corresponding to the audio input to one or more servers;

receiving, from the one or more servers, an instruction to query a state of each of a plurality of electronic device determined by the one or more servers based on the data corresponding to the audio input;

transmitting a state query to each of the plurality of electronic devices;

receiving from a first electronic device of the plurality of electronic devices, a current state of the first electronic device; and transmitting the current state of the first electronic device to the one or more servers to be stored as at least a portion of a configuration, wherein the configuration defines a plurality of states of a plurality of corresponding electronic devices to use in response to a command that references the configuration.

26. The user device of claim 25, wherein the first electronic device of the plurality of electronic devices comprises a light bulb.

27. The user device of claim 26, wherein the current state of the first electronic device comprises the ON/OFF state, dimmable state, or color state of the light bulb.

28. The user device of claim 25, wherein a second electronic device of the plurality of electronic devices comprises an electrical outlet.

29. The user device of claim 28, wherein a current state of the second electronic device comprises the ACTIVE/INACTIVE state of the electrical outlet.

30. The user device of claim 25, wherein a third electronic device of the plurality of electronic devices comprises a switch.

31. The user device of claim 30, wherein a current state of the third electronic device comprises the ON/OFF state of the switch.

32. The user device of claim 25, wherein a fourth electronic device of the plurality of electronic devices comprises a door lock.

33. The user device of claim 32, wherein a current state of the fourth electronic device comprises the LOCKED/UNLOCKED state of the door lock.

34. The user device of claim 25, wherein a fifth electronic device of the plurality of electronic devices comprises a thermostat.

35. The user device of claim 34, wherein the current state of the first electronic device comprises a numerical value of a temperature setting of the thermostat.

36. The user device of claim 25, the one or more programs further including instructions for:

outputting a notification associated with the current state of the plurality of electronic devices in response to determining that a predetermined condition has been satisfied.

* * * * *